US010982119B2

(12) United States Patent
El-Kady et al.

(10) Patent No.: US 10,982,119 B2
(45) Date of Patent: Apr. 20, 2021

(54) METHODS FOR CONDUCTIVE ADHESIVES BASED ON GRAPHENE AND APPLICATIONS THEREOF

(71) Applicants: The Regents of the University of California, Oakland, CA (US); Nanotech Energy, Inc., Los Angeles, CA (US)

(72) Inventors: Maher F. El-Kady, Los Angeles, CA (US); Nahla Mohamed, Los Angeles, CA (US); Jack Kavanaugh, Los Angeles, CA (US); Richard B. Kaner, Pacific Palisades, CA (US)

(73) Assignees: The Regents of the University of California, Oakland, CA (US); Nanotech Energy, Inc., Los Angeles, CA (US)

( * ) Notice: Subject to any disclaimer, the term of this patent is extended or adjusted under 35 U.S.C. 154(b) by 0 days.

(21) Appl. No.: 16/203,694

(22) Filed: Nov. 29, 2018

(65) Prior Publication Data

US 2019/0169472 A1 Jun. 6, 2019

Related U.S. Application Data

(60) Provisional application No. 62/680,615, filed on Jun. 5, 2018, provisional application No. 62/593,506, filed on Dec. 1, 2017.

(51) Int. Cl.
*C09J 11/04* (2006.01)
*C09J 9/02* (2006.01)
(Continued)

(52) U.S. Cl.
CPC ............... *C09J 9/02* (2013.01); *C09D 11/037* (2013.01); *C09D 11/322* (2013.01); *C09D 11/52* (2013.01);
(Continued)

(58) Field of Classification Search
CPC . H01B 1/22; C09D 133/00; C09J 9/02; C08K 3/042
(Continued)

(56) References Cited

U.S. PATENT DOCUMENTS

2005/0131106 A1 6/2005 Tonapi et al.
2012/0138913 A1 6/2012 Alsayed et al.
(Continued)

FOREIGN PATENT DOCUMENTS

CN 105131881 A 12/2015
CN 105419444 A * 3/2016 .......... C09D 133/00
CN 106816202 A * 6/2017 .............. H01B 1/22

OTHER PUBLICATIONS

Ma et al., "Hydrothermal Fabrication of Silver Nanowires-Silver Nanoparticles-Graphene Nanosheets Composites in Enhancing Electrical Conductive Performance of Electrically Conductive Adhesives", Nanomaterials, 2016, 6, 119, pp. 1-10.*
(Continued)

*Primary Examiner* — Khanh T Nguyen
(74) *Attorney, Agent, or Firm* — Withrow & Terranova, P.L.L.C.

(57) ABSTRACT

The present disclosure relates to conductive adhesives and inks. The disclosed conductive adhesives include glues and epoxies, based on graphene and graphene/carbon composites and the methods of manufacture thereof, such conductive adhesives exhibiting excellent conductivity, thermal properties, durability, low curing temperatures, mechanical flexibility, and reduced environmental impact. Further, adhesives with conductive additives such as silver nanowires and the methods of production thereof are disclosed herein.

19 Claims, 71 Drawing Sheets

(51) Int. Cl.

| | |
|---|---|
| ***C09D 11/52*** | (2014.01) |
| ***C09D 11/037*** | (2014.01) |
| ***C09D 11/322*** | (2014.01) |
| *C08K 3/08* | (2006.01) |
| *B82Y 40/00* | (2011.01) |
| *C08K 3/04* | (2006.01) |
| *B82Y 30/00* | (2011.01) |
| *C08K 7/00* | (2006.01) |

(52) U.S. Cl.

CPC .............. *C09J 11/04* (2013.01); *B82Y 30/00* (2013.01); *B82Y 40/00* (2013.01); *C08K 3/042* (2017.05); *C08K 3/08* (2013.01); *C08K 7/00* (2013.01); *C08K 2003/0806* (2013.01); *C08K 2201/001* (2013.01); *C08K 2201/011* (2013.01); *C09J 2463/00* (2013.01)

(58) Field of Classification Search

USPC .......................................... 252/500; 428/201

See application file for complete search history.

(56) References Cited

U.S. PATENT DOCUMENTS

| | | | | |
|---|---|---|---|---|
| 2012/0217453 | A1 | 8/2012 | Lowenthal et al. | |
| 2015/0282330 | A1* | 10/2015 | Iseda | C09J 11/08 428/201 |
| 2016/0225482 | A1 | 8/2016 | Wu | |

OTHER PUBLICATIONS

Ahn, Bok, et al., "Omidirectional Printing of Flexible, Stretchable, and Spanning Silver Microelectrodes," Science, vol. 323, Mar. 20, 2009, pp. 1590-1593.

Author Unknown, "Compact Vacuum Mixer w/ Pump & Vibration Stage & Two Containers (150 & 500m1)—MSK-SFM-7," Product Specification, mtixtl.com/MSK-SFM-7.aspx, accessed Aug. 31, 2017, MTI Corporation, 2 pages.

Author Unknown, "5-Minute Epoxy Resin," Material Safety Data Sheet 0619, Part No. 1233, Jun. 10, 2004, ITW Devcon, Danvers, Massachusettes, 12 pages.

Author Unknown, "5 Minute Epoxy," Technical Data Sheet, Mar. 16, 2012, ITW Polymers Adhesives North America, Danvers, Massachusettes, 2 pages.

Author Unknown, "Safety Data Sheet—Gorilla Glue," Version 1.0, May 21, 2015, The Gorilla Glue Company, 11 pages.

Author Unknown, "Technical Data Sheet: Gorilla Glue, Fast Cure," Jan. 31, 2007, Gorilla Glue Europe, 2 pages.

Ellis, B., "Chemistry and Technology of Epoxy Resins," First Edition, 1993, Chapman and Hall, 342 pages.

Finn, David, et al., "Inkjet Printing of Silver Nanowire Networks," ACS Applied Materials and Interfaces, vol. 7, Apr. 15, 2015, American Chemical Society, pp. 9254-9261.

Hu, Liangbing, et al., "Scalable Coating and Properties of Transparent, Flexible, Silver Nanowire Electrodes," ACS Nano, vol. 4, Issue 5, Apr. 28, 2010, pp. 2955-2963.

Jin, Fan-Long, "Synthesis and application of epoxy resins: A review," Journal of Industrial and Engineering Chemistry, vol. 29, Apr. 2015, Elsevier B.V., 11 pages.

Wang, Y.H., et al., "Isotropical conductive adhesives with very-long silver nanowires as conductive fillers," Journal of Materials Science, vol. 28, Aug. 4, 2016, Springer, pp. 10-17.

White, Sadie, et al., "Electrical Percolation Behavior in Silver Nanowire-Polystyrene Composites: Simulation and Experiment," Advanced Functional Materials, vol. 20, Jul. 1, 2010, Wiley-VCH, pp. 2709-2716.

Invitation to Pay Additional Fees for International Patent Application No. PCT/US18/62960, dated Jan. 25, 2019, 2 pages.

International Search Report and Written Opinion for International Patent Application No. PCT/US18/62960, dated Apr. 3, 2019, 13 pages.

International Preliminary Report on Patentability for International Patent Application No. PCT/US2018/062960, dated Jun. 11, 2020, 9 pages.

* cited by examiner

| | Metal flakes | Conductive polymer | CNT | Metal nanowires | Graphene ink |
|---|---|---|---|---|---|
| Ink type |  |  |  |  |  |
| Conductivity | ● | ◑ | ◕ | ● | ◕ |
| Mechanical properties | ◑ | ◑ | ● | ● | ● |
| Environmental effects | ◕ | ◑ | ◕ | ◕ | ● |
| Cost | ◔ | ◑ | ◔ | ◑ | ● |
| Examples | Ag, Au and Ni | PEDOT/PSS and polyaniline | SWCNT and MWCNT | Ag and Cu | Graphene-based ink |

METHODS FOR CONDUCTIVE ADHESIVES BASED ON GRAPHENE AND APPLICATIONS THEREOF

CROSS-REFERENCE

This application claims the benefit of U.S. Provisional Application No. 62/593,506, filed Dec. 1, 2017, and of U.S. Provisional Application No. 62/680,615, filed Jun. 5, 2018, which are incorporated herein by reference.

BACKGROUND

Device packaging and assembly plays an important role in the modern electronics industry. In many cases, an electronic component comprises a printed circuit board and a plurality of electronic components such as chips, energy sources, and memory devices attached to the circuit board. Some such electronic devices are designed to be flexible for increased durability and ease of use.

Current techniques to adhere electrical components comprise sewing, mechanical fastening, and thermal bonding.

SUMMARY

Provided herein is a conductive adhesive comprising: a conductive additive comprising at least one of: a carbon-based additive comprising two or more of graphene nanoparticles, graphene nanosheets, and graphene microparticles; and a silver-based additive comprising a silver nanowire, a silver nanoparticle, or both, wherein the silver-based additive has a diameter of less than 0.5 μm; and an adhesive agent.

In some embodiments, the conductive adhesive has percolation threshold when dried of about 5% to about 25%. In some embodiments, the conductive adhesive has percolation threshold when dried of about 5% to about 6%, about 5% to about 7%, about 5% to about 8%, about 5% to about 9%, about 5% to about 10%, about 5% to about 11%, about 5% to about 12%, about 5% to about 15%, about 5% to about 18%, about 5% to about 21%, about 5% to about 25%, about 6% to about 7%, about 6% to about 8%, about 6% to about 9%, about 6% to about 10%, about 6% to about 11%, about 6% to about 12%, about 6% to about 15%, about 6% to about 18%, about 6% to about 21%, about 6% to about 25%, about 7% to about 8%, about 7% to about 9%, about 7% to about 10%, about 7% to about 11%, about 7% to about 12%, about 7% to about 15%, about 7% to about 18%, about 7% to about 21%, about 7% to about 25%, about 8% to about 9%, about 8% to about 10%, about 8% to about 11%, about 8% to about 12%, about 8% to about 15%, about 8% to about 18%, about 8% to about 21%, about 8% to about 25%, about 9% to about 10%, about 9% to about 11%, about 9% to about 12%, about 9% to about 15%, about 9% to about 18%, about 9% to about 21%, about 9% to about 25%, about 10% to about 11%, about 10% to about 12%, about 10% to about 15%, about 10% to about 18%, about 10% to about 21%, about 10% to about 25%, about 11% to about 12%, about 11% to about 15%, about 11% to about 18%, about 11% to about 21%, about 11% to about 25%, about 12% to about 15%, about 12% to about 18%, about 12% to about 21%, about 12% to about 25%, about 15% to about 18%, about 15% to about 21%, about 15% to about 25%, about 18% to about 21%, about 18% to about 25%, or about 21% to about 25%. In some embodiments, the conductive adhesive has percolation threshold when dried of about 5%, about 6%, about 7%, about 8%, about 9%, about 10%, about 11%, about 12%, about 15%, about 18%, about 21%, or about 25%. In some embodiments, the conductive adhesive has percolation threshold when dried of at least about 5%, about 6%, about 7%, about 8%, about 9%, about 10%, about 11%, about 12%, about 15%, about 18%, or about 21%. In some embodiments, the conductive adhesive has percolation threshold when dried of at most about 6%, about 7%, about 8%, about 9%, about 10%, about 11%, about 12%, about 15%, about 18%, about 21%, or about 25%.

The silver-based additive may comprise a silver nanowire, a silver nanoparticle, or both. The silver-based additive may comprise a silver nanowire, and not a silver nanoparticle. The silver-based additive may comprise a silver nanoparticle, and not a silver nanowire. The silver-based additive may comprise a silver nanowire and a silver nanoparticle. Alternatively, the silver-based material may comprise silver nanorods, silver nanoflowers, silver nanofibers, silver nanoplatelets, silver nanoribbons, silver nanocubes, silver bipyramids, or any combination thereof. The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. The silver nanowire may have an average aspect ratio of about 250:1, 300:1, 350:1, 400:1, 450:1, 500:1, 600:1, 700:1, 800:1, 900:1, or 1000:1. The silver nanowire may have an average aspect ratio of at least about 250:1, 300:1, 350:1, 400:1, 450:1, 500:1, 600:1, 700:1, 800:1, 900:1, or 1000:1.

In some embodiments, the adhesive agent comprises a hardener and a resin. In some embodiments, at least a portion of the conductive additive is incorporated into the hardener, the resin, or both. In some embodiments, the conductive adhesive further comprises a thinner. In some embodiments, the conductive adhesive further comprises a pigment, a silver metallic pigment, a colorant, a silver metallic colorant, a dye, or any combination thereof.

In some embodiments, the conductive adhesive has a sheet resistance when dry of about 5 ohm/sq to about 500 ohm/sq. In some embodiments, the conductive adhesive has a sheet resistance when dry of about 5 ohm/sq to about 10 ohm/sq, about 5 ohm/sq to about 20 ohm/sq, about 5 ohm/sq to about 50 ohm/sq, about 5 ohm/sq to about 100 ohm/sq, about 5 ohm/sq to about 150 ohm/sq, about 5 ohm/sq to about 200 ohm/sq, about 5 ohm/sq to about 250 ohm/sq, about 5 ohm/sq to about 300 ohm/sq, about 5 ohm/sq to about 350 ohm/sq, about 5 ohm/sq to about 400 ohm/sq, about 5 ohm/sq to about 500 ohm/sq, about 10 ohm/sq to about 20 ohm/sq, about 10 ohm/sq to about 50 ohm/sq, about 10 ohm/sq to about 100 ohm/sq, about 10 ohm/sq to about 150 ohm/sq, about 10 ohm/sq to about 200 ohm/sq, about 10 ohm/sq to about 250 ohm/sq, about 10 ohm/sq to about 300 ohm/sq, about 10 ohm/sq to about 350 ohm/sq, about 10 ohm/sq to about 400 ohm/sq, about 10 ohm/sq to about 500 ohm/sq, about 20 ohm/sq to about 50 ohm/sq, about 20 ohm/sq to about 100 ohm/sq, about 20 ohm/sq to about 150 ohm/sq, about 20 ohm/sq to about 200 ohm/sq, about 20 ohm/sq to about 250 ohm/sq, about 20 ohm/sq to about 300 ohm/sq, about 20 ohm/sq to about 350 ohm/sq, about 20 ohm/sq to about 400 ohm/sq, about 20 ohm/sq to about 500 ohm/sq, about 50 ohm/sq to about 100 ohm/sq, about 50 ohm/sq to about 150 ohm/sq, about 50 ohm/sq to about 200 ohm/sq, about 50 ohm/sq to about 250 ohm/sq, about 50 ohm/sq to about 300 ohm/sq, about 50 ohm/sq to about 350 ohm/sq, about 50 ohm/sq to about 400 ohm/sq, about 50 ohm/sq to about 500 ohm/sq, about 100 ohm/sq to about 150 ohm/sq, about 100 ohm/sq to about 200 ohm/sq, about 100 ohm/sq to about 250 ohm/sq, about 100 ohm/sq to about 300 ohm/sq, about 100 ohm/sq to about 350 ohm/sq, about 100 ohm/sq to about 400 ohm/sq, about 100 ohm/sq to about 500 ohm/sq, about 150 ohm/sq to about 200 ohm/sq, about 150 ohm/sq to about 250 ohm/sq, about 150 ohm/sq to about 300 ohm/sq, about 150 ohm/sq to about 350 ohm/sq, about 150 ohm/sq to about 400 ohm/sq, about 150 ohm/sq to about 500 ohm/sq, about 200 ohm/sq to about 250 ohm/sq, about 200 ohm/sq to about 300 ohm/sq, about 200 ohm/sq to about 350 ohm/sq, about 200 ohm/sq to about 400 ohm/sq, about 200 ohm/sq to about 500 ohm/sq, about 250 ohm/sq to about 300 ohm/sq, about 250 ohm/sq to about 350 ohm/sq, about 250 ohm/sq to about 400 ohm/sq, about 250 ohm/sq to about 500 ohm/sq, about 300 ohm/sq to about 350 ohm/sq, about 300 ohm/sq to about 400 ohm/sq, about 300 ohm/sq to about 500 ohm/sq, about 350 ohm/sq to about 400 ohm/sq, about 350 ohm/sq to about 500 ohm/sq, or about 400 ohm/sq to about 500 ohm/sq. In some embodiments, the conductive adhesive has a sheet resistance when dry of about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq. In some embodiments, the conductive adhesive has a sheet resistance when dry of at least about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq. In some embodiments, the conductive adhesive has a sheet resistance when dry of at most about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq.

In some embodiments, the conductive adhesive has a sheet resistance when dry of about 0.3 ohm/sq/mil to about 2 ohm/sq/mil. In some embodiments, the conductive adhesive has a sheet resistance when dry of about 0.3 ohm/sq/mil to about 0.4 ohm/sq/mil, about 0.3 ohm/sq/mil to about 0.6 ohm/sq/mil, about 0.3 ohm/sq/mil to about 0.8 ohm/sq/mil, about 0.3 ohm/sq/mil to about 1 ohm/sq/mil, about 0.3 ohm/sq/mil to about 1.2 ohm/sq/mil, about 0.3 ohm/sq/mil to about 1.4 ohm/sq/mil, about 0.3 ohm/sq/mil to about 1.6 ohm/sq/mil, about 0.3 ohm/sq/mil to about 1.8 ohm/sq/mil, about 0.3 ohm/sq/mil to about 2 ohm/sq/mil, about 0.4 ohm/sq/mil to about 0.6 ohm/sq/mil, about 0.4 ohm/sq/mil to about 0.8 ohm/sq/mil, about 0.4 ohm/sq/mil to about 1 ohm/sq/mil, about 0.4 ohm/sq/mil to about 1.2 ohm/sq/mil, about 0.4 ohm/sq/mil to about 1.4 ohm/sq/mil, about 0.4 ohm/sq/mil to about 1.6 ohm/sq/mil, about 0.4 ohm/sq/mil to about 1.8 ohm/sq/mil, about 0.4 ohm/sq/mil to about 2 ohm/sq/mil, about 0.6 ohm/sq/mil to about 0.8 ohm/sq/mil, about 0.6 ohm/sq/mil to about 1 ohm/sq/mil, about 0.6 ohm/sq/mil to about 1.2 ohm/sq/mil, about 0.6 ohm/sq/mil to about 1.4 ohm/sq/mil, about 0.6 ohm/sq/mil to about 1.6 ohm/sq/mil, about 0.6 ohm/sq/mil to about 1.8 ohm/sq/mil, about 0.6 ohm/sq/mil to about 2 ohm/sq/mil, about 0.8 ohm/sq/mil to about 1 ohm/sq/mil, about 0.8 ohm/sq/mil to about 1.2 ohm/sq/mil, about 0.8 ohm/sq/mil to about 1.4 ohm/sq/mil, about 0.8 ohm/sq/mil to about 1.6 ohm/sq/mil, about 0.8 ohm/sq/mil to about 1.8 ohm/sq/mil, about 0.8 ohm/sq/mil to about 2 ohm/sq/mil, about 1 ohm/sq/mil to about 1.2 ohm/sq/mil, about 1 ohm/sq/mil to about 1.4 ohm/sq/mil, about 1 ohm/sq/mil to about 1.6 ohm/sq/mil, about 1 ohm/sq/mil to about 1.8 ohm/sq/mil, about 1 ohm/sq/mil to about 2 ohm/sq/mil, about 1.2 ohm/sq/mil to about 1.4 ohm/sq/mil, about 1.2 ohm/sq/mil to about 1.6 ohm/sq/mil, about 1.2 ohm/sq/mil to about 1.8 ohm/sq/mil, about 1.2 ohm/sq/mil to about 2 ohm/sq/mil, about 1.4 ohm/sq/mil to about 1.6 ohm/sq/mil, about 1.4 ohm/sq/mil to about 1.8 ohm/sq/mil, about 1.4 ohm/sq/mil to about 2 ohm/sq/mil, about 1.6 ohm/sq/mil to about 1.8 ohm/sq/mil, about 1.6 ohm/sq/mil to about 2 ohm/sq/mil, or about 1.8 ohm/sq/mil to about 2 ohm/sq/mil. In some embodiments, the conductive adhesive has a sheet resistance when dry of about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive adhesive has a sheet resistance when dry of at least about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive adhesive has a sheet resistance when dry of at most about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil.

In some embodiments, the conductive adhesive has a conductivity when dried of about 0.15 S/m to about 60 S/m. In some embodiments, the conductive adhesive has a conductivity when dried of about 0.15 S/m to about 0.3 S/m, about 0.15 S/m to about 0.5 S/m, about 0.15 S/m to about 1 S/m, about 0.15 S/m to about 2 S/m, about 0.15 S/m to about 5 S/m, about 0.15 S/m to about 10 S/m, about 0.15 S/m to about 20 S/m, about 0.15 S/m to about 30 S/m, about 0.15 S/m to about 40 S/m, about 0.15 S/m to about 50 S/m, about 0.15 S/m to about 60 S/m, about 0.3 S/m to about 0.5 S/m, about 0.3 S/m to about 1 S/m, about 0.3 S/m to about 2 S/m, about 0.3 S/m to about 5 S/m, about 0.3 S/m to about 10 S/m, about 0.3 S/m to about 20 S/m, about 0.3 S/m to about 30 S/m, about 0.3 S/m to about 40 S/m, about 0.3 S/m to about 50 S/m, about 0.3 S/m to about 60 S/m, about 0.5 S/m to about 1 S/m, about 0.5 S/m to about 2 S/m, about 0.5 S/m to about 5 S/m, about 0.5 S/m to about 10 S/m, about 0.5 S/m to about 20 S/m, about 0.5 S/m to about 30 S/m, about 0.5 S/m to about 40 S/m, about 0.5 S/m to about 50 S/m, about 0.5 S/m to about 60 S/m, about 1 S/m to about 2 S/m, about 1 S/m to about 5 S/m, about 1 S/m to about 10 S/m, about 1 S/m to about 20 S/m, about 1 S/m to about 30 S/m, about 1 S/m to about 40 S/m, about 1 S/m to about 50 S/m, about 1 S/m to about 60 S/m, about 2 S/m to about 5 S/m, about 2 S/m to about 10 S/m, about 2 S/m to about 20 S/m, about 2 S/m to about 30 S/m, about 2 S/m to about 40 S/m, about 2 S/m to about 50 S/m, about 2 S/m to about 60 S/m, about 5 S/m to about 10 S/m, about 5 S/m to about 20 S/m, about 5 S/m to about 30 S/m, about 5 S/m to about 40 S/m, about 5 S/m to about 50 S/m, about 5 S/m to about 60 S/m, about 10 S/m to about 20 S/m, about 10 S/m to about 30 S/m, about 10 S/m to about 40 S/m, about 10 S/m to about 50 S/m, about 10 S/m to about 60 S/m, about 20 S/m to about 30 S/m, about 20 S/m to about 40 S/m, about 20 S/m to about 50 S/m, about 20 S/m to about 60 S/m, about 30 S/m to about 40 S/m, about 30 S/m to about 50 S/m, about 30 S/m to about 60 S/m, about 40 S/m to about 50 S/m, about 40 S/m to about 60 S/m, or about 50 S/m to about 60 S/m. In some embodiments, the conductive adhesive has a conductivity when dried of about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m. In some embodiments, the conductive adhesive has a conductivity when dried of at least about 0.15 S/m, about 0.3 S/m, about 0.5 S/m, about 1 S/m, about 2 S/m, about 5 S/m, about 10 S/m, about 20 S/m, about 30 S/m, about 40 S/m, or about 50 S/m. In some embodiments, the conductive adhesive has a conductivity when dried of at most about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m.

Another aspect provided herein is a conductive ink comprising: a conductive additive comprising at least one of: a carbon-based additive comprising two or more of graphene nanoparticles, graphene nanosheets, and graphene microparticles; and a silver-based additive comprising a silver nanowire, a silver nanoparticle, or both, wherein the silver-based additive has a diameter of less than 0.5 μm; and a solvent.

In some embodiments, the conductive ink has a percolation threshold when dried of about 5% to about 25%. In some embodiments, the conductive ink has a percolation threshold when dried of about 5% to about 6%, about 5% to about 7%, about 5% to about 8%, about 5% to about 9%, about 5% to about 10%, about 5% to about 11%, about 5% to about 12%, about 5% to about 15%, about 5% to about 18%, about 5% to about 21%, about 5% to about 25%, about 6% to about 7%, about 6% to about 8%, about 6% to about 9%, about 6% to about 10%, about 6% to about 11%, about 6% to about 12%, about 6% to about 15%, about 6% to about 18%, about 6% to about 21%, about 6% to about 25%, about 7% to about 8%, about 7% to about 9%, about 7% to about 10%, about 7% to about 11%, about 7% to about 12%, about 7% to about 15%, about 7% to about 18%, about 7% to about 21%, about 7% to about 25%, about 8% to about 9%, about 8% to about 10%, about 8% to about 11%, about 8% to about 12%, about 8% to about 15%, about 8% to about 18%, about 8% to about 21%, about 8% to about 25%, about 9% to about 10%, about 9% to about 11%, about 9% to about 12%, about 9% to about 15%, about 9% to about 18%, about 9% to about 21%, about 9% to about 25%, about 10% to about 11%, about 10% to about 12%, about 10% to about 15%, about 10% to about 18%, about 10% to about 21%, about 10% to about 25%, about 11% to about 12%, about 11% to about 15%, about 11% to about 18%, about 11% to about 21%, about 11% to about 25%, about 12% to about 15%, about 12% to about 18%, about 12% to about 21%, about 12% to about 25%, about 15% to about 18%, about 15% to about 21%, about 15% to about 25%, about 18% to about 21%, about 18% to about 25%, or about 21% to about 25%. In some embodiments, the conductive ink has a percolation threshold when dried of about 5%, about 6%, about 7%, about 8%, about 9%, about 10%, about 11%, about 12%, about 15%, about 18%, about 21%, or about 25%. In some embodiments, the conductive ink has a percolation threshold when dried of at least about 5%, about 6%, about 7%, about 8%, about 9%, about 10%, about 11%, about 12%, about 15%, about 18%, or about 21%. In some embodiments, the conductive ink has a percolation threshold when dried of at most about 6%, about 7%, about 8%, about 9%, about 10%, about 11%, about 12%, about 15%, about 18%, about 21%, or about 25%.

The silver-based additive may comprise a silver nanowire, a silver nanoparticle, or both. The silver-based additive may comprise a silver nanowire, and not a silver nanoparticle. The silver-based additive may comprise a silver nanoparticle, and not a silver nanowire. The silver-based additive may comprise a silver nanowire and a silver nanoparticle. Alternatively, the silver-based material may comprise silver nanorods, silver nanoflowers, silver nanofibers, silver nanoplatelets, silver nanoribbons, silver nanocubes, silver bipyramids, or any combination thereof. The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75

μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. The silver nanowire may have an average aspect ratio of about 250:1, 300:1, 350:1, 400:1, 450:1, 500:1, 600:1, 700:1, 800:1, 900:1, or 1000:1. The silver nanowire may have an average aspect ratio of at least about 250:1, 300:1, 350:1, 400:1, 450:1, 500:1, 600:1, 700:1, 800:1, 900:1, or 1000:1.

In some embodiments, the proportion by weight of the conductive additive in the conductive ink is about 0.25% to about 20%. In some embodiments, the proportion by weight of the conductive additive in the conductive ink is about 0.25% to about 0.5%, about 0.25% to about 0.75%, about 0.25% to about 1%, about 0.25% to about 2%, about 0.25% to about 4%, about 0.25% to about 6%, about 0.25% to about 8%, about 0.25% to about 10%, about 0.25% to about 15%, about 0.25% to about 20%, about 0.5% to about 0.75%, about 0.5% to about 1%, about 0.5% to about 2%, about 0.5% to about 4%, about 0.5% to about 6%, about 0.5% to about 8%, about 0.5% to about 10%, about 0.5% to about 15%, about 0.5% to about 20%, about 0.75% to about 1%, about 0.75% to about 2%, about 0.75% to about 4%, about 0.75% to about 6%, about 0.75% to about 8%, about 0.75% to about 10%, about 0.75% to about 15%, about 0.75% to about 20%, about 1% to about 2%, about 1% to about 4%, about 1% to about 6%, about 1% to about 8%, about 1% to about 10%, about 1% to about 15%, about 1% to about 20%, about 2% to about 4%, about 2% to about 6%, about 2% to about 8%, about 2% to about 10%, about 2% to about 15%, about 2% to about 20%, about 4% to about 6%, about 4% to about 8%, about 4% to about 10%, about 4% to about 15%, about 4% to about 20%, about 6% to about 8%, about 6% to about 10%, about 6% to about 15%, about 6% to about 20%, about 8% to about 10%, about 8% to about 15%, about 8% to about 20%, about 10% to about 15%, about 10% to about 20%, or about 15% to about 20%. In some embodiments, the proportion by weight of the conductive additive in the conductive ink is about 0.25%, about 0.5%, about 0.75%, about 1%, about 2%, about 4%, about 6%, about 8%, about 10%, about 15%, or about 20%. In some embodiments, the proportion by weight of the conductive additive in the conductive ink is at least about 0.25%, about 0.5%, about 0.75%, about 1%, about 2%, about 4%, about 6%, about 8%, about 10%, or about 15%. In some embodiments, the proportion by weight of the conductive additive in the conductive ink is at most about 0.5%, about 0.75%, about 1%, about 2%, about 4%, about 6%, about 8%, about 10%, about 15%, or about 20%.

In some embodiments, the conductive ink has a viscosity of about 5 centipoise (cps) to about 40 cps. In some embodiments, the conductive ink has a viscosity of about 5 cps to about 10 cps, about 5 cps to about 15 cps, about 5 cps to about 20 cps, about 5 cps to about 25 cps, about 5 cps to about 30 cps, about 5 cps to about 35 cps, about 5 cps to about 40 cps, about 10 cps to about 15 cps, about 10 cps to about 20 cps, about 10 cps to about 25 cps, about 10 cps to about 30 cps, about 10 cps to about 35 cps, about 10 cps to about 40 cps, about 15 cps to about 20 cps, about 15 cps to about 25 cps, about 15 cps to about 30 cps, about 15 cps to about 35 cps, about 15 cps to about 40 cps, about 20 cps to about 25 cps, about 20 cps to about 30 cps, about 20 cps to about 35 cps, about 20 cps to about 40 cps, about 25 cps to about 30 cps, about 25 cps to about 35 cps, about 25 cps to about 40 cps, about 30 cps to about 35 cps, about 30 cps to about 40 cps, or about 35 cps to about 40 cps. In some embodiments, the conductive ink has a viscosity of about 5 cps, about 10 cps, about 15 cps, about 20 cps, about 25 cps, about 30 cps, about 35 cps, or about 40 cps. In some embodiments, the conductive ink has a viscosity of at least about 5 cps, about 10 cps, about 15 cps, about 20 cps, about 25 cps, about 30 cps, or about 35 cps. In some embodiments, the conductive ink has a viscosity of at most about 10 cps, about 15 cps, about 20 cps, about 25 cps, about 30 cps, about 35 cps, or about 40 cps.

In some embodiments, the conductive ink has a sheet resistance when dried of about 0.1 ohm/sq/mil to about 0.8 ohm/sq/mil. In some embodiments, the conductive ink has a sheet resistance when dried of about 0.1 ohm/sq/mil to about 0.2 ohm/sq/mil, about 0.1 ohm/sq/mil to about 0.3 ohm/sq/mil, about 0.1 ohm/sq/mil to about 0.4 ohm/sq/mil, about 0.1 ohm/sq/mil to about 0.5 ohm/sq/mil, about 0.1 ohm/sq/mil to about 0.6 ohm/sq/mil, about 0.1 ohm/sq/mil to about 0.7 ohm/sq/mil, about 0.1 ohm/sq/mil to about 0.8 ohm/sq/mil, about 0.2 ohm/sq/mil to about 0.3 ohm/sq/mil, about 0.2 ohm/sq/mil to about 0.4 ohm/sq/mil, about 0.2 ohm/sq/mil to about 0.5 ohm/sq/mil, about 0.2 ohm/sq/mil to about 0.6 ohm/sq/mil, about 0.2 ohm/sq/mil to about 0.7 ohm/sq/mil, about 0.2 ohm/sq/mil to about 0.8 ohm/sq/mil, about 0.3 ohm/sq/mil to about 0.4 ohm/sq/mil, about 0.3 ohm/sq/mil to about 0.5 ohm/sq/mil, about 0.3 ohm/sq/mil to about 0.6 ohm/sq/mil, about 0.3 ohm/sq/mil to about 0.7 ohm/sq/mil, about 0.3 ohm/sq/mil to about 0.8 ohm/sq/mil, about 0.4 ohm/sq/mil to about 0.5 ohm/sq/mil, about 0.4 ohm/sq/mil to about 0.6 ohm/sq/mil, about 0.4 ohm/sq/mil to about 0.7 ohm/sq/mil, about 0.4 ohm/sq/mil to about 0.8 ohm/sq/mil, about 0.5 ohm/sq/mil to about 0.6 ohm/sq/mil, about 0.5 ohm/sq/mil to about 0.7 ohm/sq/mil, about 0.5 ohm/sq/mil to about 0.8 ohm/sq/mil, about 0.6 ohm/sq/mil to about 0.7 ohm/sq/mil, about 0.6 ohm/sq/mil to about 0.8 ohm/sq/mil, or about 0.7 ohm/sq/mil to about 0.8 ohm/sq/mil. In some embodiments, the conductive ink has a sheet resistance when dried of about 0.1 ohm/sq/mil, about 0.2 ohm/sq/mil, about 0.3 ohm/sq/mil, about 0.4 ohm/sq/mil, about 0.5 ohm/sq/mil, about 0.6 ohm/sq/mil, about 0.7 ohm/sq/mil, or about 0.8 ohm/sq/mil. In some embodiments, the conductive ink has a sheet resistance when dried of at least about 0.1 ohm/sq/mil, about 0.2 ohm/sq/mil, about 0.3 ohm/sq/mil, about 0.4 ohm/sq/mil, about 0.5 ohm/sq/mil, about 0.6 ohm/sq/mil, or about 0.7 ohm/sq/mil. In some embodiments, the conductive ink has a sheet resistance when dried of at most about 0.2 ohm/sq/mil, about 0.3 ohm/sq/mil, about 0.4 ohm/sq/mil, about 0.5 ohm/sq/mil, about 0.6 ohm/sq/mil, about 0.7 ohm/sq/mil, or about 0.8 ohm/sq/mil.

In some embodiments, the conductive ink further comprises at least one of a binder, a surfactant, and a defoamer. In some embodiments, the conductive ink further comprises a pigment, a silver metallic pigment, a colorant, a silver metallic colorant, a dye, or any combination thereof. In some embodiments, the conductive ink has a conductivity of greater than 10 S/cm when dried.

Another aspect provided herein is a method of forming silver nanowires comprising: heating a solvent; adding a catalyst solution and a polymer solution to the solvent to form a first solution; injecting a silver-based solution into the first solution to form a second solution; centrifuging the second solution; and washing the second solution with a washing solution to extract the silver nanowires.

In some embodiments, the method further comprises heating the second solution before centrifuging the second solution. In some embodiments, the method further comprises cooling the second solution before centrifuging the second solution. In some embodiments, the solvent comprises a glycol, a polymer solution, or both. In some embodiments, washing the second solution comprises a plurality of washing cycles comprising from about two cycles to about six cycles. In some embodiments, the method is performed in a solvothermal chamber. In some embodiments, the solvent is stirred while being heated.

The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm.

In some embodiments, the polymer solution has a concentration of about 0.075 M to about 0.25 M. In some embodiments, the polymer solution has a concentration of about 0.075 M to about 0.1 M, about 0.075 M to about 0.125 M, about 0.075 M to about 0.15 M, about 0.075 M to about 0.175 M, about 0.075 M to about 0.2 M, about 0.075 M to about 0.225 M, about 0.075 M to about 0.25 M, about 0.1 M to about 0.125 M, about 0.1 M to about 0.15 M, about 0.1 M to about 0.175 M, about 0.1 M to about 0.2 M, about 0.1 M to about 0.225 M, about 0.1 M to about 0.25 M, about 0.125 M to about 0.15 M, about 0.125 M to about 0.175 M, about 0.125 M to about 0.2 M, about 0.125 M to about 0.225 M, about 0.125 M to about 0.25 M, about 0.15 M to about 0.175 M, about 0.15 M to about 0.2 M, about 0.15 M to about 0.225 M, about 0.15 M to about 0.25 M, about 0.175 M to about 0.2 M, about 0.175 M to about 0.225 M, about 0.175 M to about 0.25 M, about 0.2 M to about 0.225 M, about 0.2 M to about 0.25 M, or about 0.225 M to about 0.25 M. In some embodiments, the polymer solution has a concentration of about 0.075 M, about 0.1 M, about 0.125 M, about 0.15 M, about 0.175 M, about 0.2 M, about 0.225 M, or about 0.25 M. In some embodiments, the polymer solution has a concentration of at least about 0.075 M, about 0.1 M, about 0.125 M, about 0.15 M, about 0.175 M, about 0.2 M, about 0.225 M, or about 0.25 M. In some embodiments, the polymer solution has a concentration of at most about 0.075 M, about 0.1 M, about 0.125 M, about 0.15 M, about 0.175 M, about 0.2 M, about 0.225 M, or about 0.25 M.

In some embodiments, the catalyst solution has a concentration of about 2 mM to about 8 mM. In some embodiments, the catalyst solution has a concentration of about 2 mM to about 2.5 mM, about 2 mM to about 3 mM, about 2 mM to about 3.5 mM, about 2 mM to about 4 mM, about 2 mM to about 4.5 mM, about 2 mM to about 5 mM, about 2 mM to about 5.5 mM, about 2 mM to about 6 mM, about 2 mM to about 6.5 mM, about 2 mM to about 7 mM, about 2 mM to about 8 mM, about 2.5 mM to about 3 mM, about 2.5 mM to about 3.5 mM, about 2.5 mM to about 4 mM, about 2.5 mM to about 4.5 mM, about 2.5 mM to about 5 mM, about 2.5 mM to about 5.5 mM, about 2.5 mM to about 6 mM, about 2.5 mM to about 6.5 mM, about 2.5 mM to about 7 mM, about 2.5 mM to about 8 mM, about 3 mM to about 3.5 mM, about 3 mM to about 4 mM, about 3 mM to about 4.5 mM, about 3 mM to about 5 mM, about 3 mM to about 5.5 mM, about 3 mM to about 6 mM, about 3 mM to about 6.5 mM, about 3 mM to about 7 mM, about 3 mM to about 8 mM, about 3.5 mM to about 4 mM, about 3.5 mM to about 4.5 mM, about 3.5 mM to about 5 mM, about 3.5 mM to about 5.5 mM, about 3.5 mM to about 6 mM, about 3.5 mM to about 6.5 mM, about 3.5 mM to about 7 mM, about 3.5 mM to about 8 mM, about 4 mM to about 4.5 mM, about 4 mM to about 5 mM, about 4 mM to about 5.5 mM, about 4 mM to about 6 mM, about 4 mM to about 6.5 mM, about 4 mM to about 7 mM, about 4 mM to about 8 mM, about 4.5 mM to about 5 mM, about 4.5 mM to about 5.5 mM, about 4.5 mM to about 6 mM, about 4.5 mM to about 6.5 mM, about 4.5 mM to about 7 mM, about 4.5 mM to about 8 mM, about 5 mM to about 5.5 mM, about 5 mM to about 6 mM, about 5 mM to about 6.5 mM, about 5 mM to about 7 mM, about 5 mM to about 8 mM, about 5.5 mM to about 6 mM, about 5.5 mM to about 6.5 mM, about 5.5 mM to about 7 mM, about 5.5 mM to about 8 mM, about 6 mM to about 6.5 mM, about 6 mM to about 7 mM, about 6 mM to about 8 mM, about 6.5 mM to about 7 mM, about 6.5 mM to about 8 mM, or about 7 mM to about 8 mM. In some embodiments, the catalyst solution has a concentration of about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM. In some embodiments, the catalyst solution has a concentration of at least about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM. In some embodiments, the catalyst solution has a concentration of at most about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM.

In some embodiments, the volume of the solvent is greater than the volume of the catalyst solution by a factor of about 75 to about 250. In some embodiments, the volume of the solvent is greater than the volume of the catalyst solution by a factor of about 75 to about 100, about 75 to about 125, about 75 to about 150, about 75 to about 175, about 75 to about 200, about 75 to about 225, about 75 to about 250, about 100 to about 125, about 100 to about 150, about 100 to about 175, about 100 to about 200, about 100 to about 225, about 100 to about 250, about 125 to about 150, about 125 to about 175, about 125 to about 200, about 125 to about 225, about 125 to about 250, about 150 to about 175, about 150 to about 200, about 150 to about 225, about 150 to about 250, about 175 to about 200, about 175 to about 225, about 175 to about 250, about 200 to about 225, about 200 to about 250, or about 225 to about 250. In some embodiments, the volume of the solvent is greater than the volume of the catalyst solution by a factor of about 75, about 100, about 125, about 150, about 175, about 200, about 225, or about 250. In some embodiments, the volume of the solvent is greater than the volume of the catalyst solution by a factor of at least about 75, about 100, about 125, about 150, about 175, about 200, about 225, or about 250. In some embodiments, the volume of the solvent is greater than the volume of the catalyst solution by a factor of at most about 75, about 100, about 125, about 150, about 175, about 200, about 225, or about 250.

In some embodiments, the volume of the solvent is greater than the volume of the polymer solution by a factor of about 1.5 to about 6.5. In some embodiments, the volume of the solvent is greater than the volume of the polymer solution by a factor of about 1.5 to about 2, about 1.5 to about 2.5, about 1.5 to about 3, about 1.5 to about 3.5, about 1.5 to about 4, about 1.5 to about 4.5, about 1.5 to about 5, about 1.5 to about 5.5, about 1.5 to about 6, about 1.5 to about 6.5, about 2 to about 2.5, about 2 to about 3, about 2 to about 3.5, about 2 to about 4, about 2 to about 4.5, about 2 to about 5, about 2 to about 5.5, about 2 to about 6, about 2 to about 6.5, about 2.5 to about 3, about 2.5 to about 3.5, about 2.5 to about 4, about 2.5 to about 4.5, about 2.5 to about 5, about 2.5 to about 5.5, about 2.5 to about 6, about 2.5 to about 6.5, about 3 to about 3.5, about 3 to about 4, about 3 to about 4.5, about 3 to about 5, about 3 to about 5.5, about 3 to about 6, about 3 to about 6.5, about 3.5 to about 4, about 3.5 to about 4.5, about 3.5 to about 5, about 3.5 to about 5.5, about 3.5 to about 6, about 3.5 to about 6.5, about 4 to about 4.5, about 4 to about 5, about 4 to about 5.5, about 4 to about 6, about 4 to about 6.5, about 4.5 to about 5, about 4.5 to about 5.5, about 4.5 to about 6, about 4.5 to about 6.5, about 5 to about 5.5, about 5 to about 6, about 5 to about 6.5, about 5.5 to about 6, about 5.5 to about 6.5, or about 6 to about 6.5. In some embodiments, the volume of the solvent is greater than the volume of the polymer solution by a factor of about 1.5, about 2, about 2.5, about 3, about 3.5, about 4, about 4.5, about 5, about 5.5, about 6, or about 6.5. In some embodiments, the volume of the solvent is greater than the volume of the polymer solution by a factor of at least about 1.5, about 2, about 2.5, about 3, about 3.5, about 4, about 4.5, about 5, about 5.5, about 6, or about 6.5. In some embodiments, the volume of the solvent is greater than the volume of the polymer solution by a factor of at most bout 1.5, about 2, about 2.5, about 3, about 3.5, about 4, about 4.5, about 5, about 5.5, about 6, or about 6.5.

In some embodiments, the silver-based solution has a concentration of about 0.05 M to about 0.2 M. In some embodiments, the silver-based solution has a concentration of at least about 0.05 M. In some embodiments, the silver-based solution has a concentration of at most about 0.2 M. In some embodiments, the silver-based solution has a concentration of about 0.05 M to about 0.075 M, about 0.05 M to about 0.1 M, about 0.05 M to about 0.125 M, about 0.05 M to about 0.15 M, about 0.05 M to about 0.175 M, about 0.05 M to about 0.2 M, about 0.075 M to about 0.1 M, about 0.075 M to about 0.125 M, about 0.075 M to about 0.15 M, about 0.075 M to about 0.175 M, about 0.075 M to about 0.2 M, about 0.1 M to about 0.125 M, about 0.1 M to about 0.15 M, about 0.1 M to about 0.175 M, about 0.1 M to about 0.2 M, about 0.125 M to about 0.15 M, about 0.125 M to about 0.175 M, about 0.125 M to about 0.2 M, about 0.15 M to about 0.175 M, about 0.15 M to about 0.2 M, or about 0.175 M to about 0.2 M. In some embodiments, the silver-based solution has a concentration of about 0.05 M, about 0.075 M, about 0.1 M, about 0.125 M, about 0.15 M, about 0.175 M, or about 0.2 M. In some embodiments, the silver-based solution has a concentration of at least about 0.05 M, about 0.075 M, about 0.1 M, about 0.125 M, about 0.15 M, about 0.175 M, or about 0.2 M. In some embodiments, the silver-based solution has a concentration of at most about 0.05 M, about 0.075 M, about 0.1 M, about 0.125 M, about 0.15 M, about 0.175 M, or about 0.2 M.

In some embodiments, the volume of the solvent is greater than the volume of the silver-based solution by a factor of about 1.5 to about 6.5. In some embodiments, the volume of the solvent is greater than the volume of the silver-based solution by a factor of at least about 1.5. In some embodiments, the volume of the solvent is greater than the volume of the silver-based solution by a factor of at most about 6.5. In some embodiments, the volume of the solvent is greater than the volume of the silver-based solution by a factor of about 1.5 to about 2, about 1.5 to about 2.5, about 1.5 to about 3, about 1.5 to about 3.5, about 1.5 to about 4, about 1.5 to about 4.5, about 1.5 to about 5, about 1.5 to about 5.5, about 1.5 to about 6, about 1.5 to about 6.5, about 2 to about 2.5, about 2 to about 3, about 2 to about 3.5, about 2 to about 4, about 2 to about 4.5, about 2 to about 5, about 2 to about 5.5, about 2 to about 6, about 2 to about 6.5, about 2.5 to about 3, about 2.5 to about 3.5, about 2.5 to about 4, about 2.5 to about 4.5, about 2.5 to about 5, about 2.5 to about 5.5, about 2.5 to about 6, about 2.5 to about 6.5, about 3 to about 3.5, about 3 to about 4, about 3 to about 4.5, about 3 to about 5, about 3 to about 5.5, about 3 to about 6, about 3 to about 6.5, about 3.5 to about 4, about 3.5 to about 4.5, about 3.5 to about 5, about 3.5 to about 5.5, about 3.5 to about 6, about 3.5 to about 6.5, about 4 to about 4.5, about 4 to about 5, about 4 to about 5.5, about 4 to about 6, about 4 to about 6.5, about 4.5 to about 5, about 4.5 to about 5.5, about 4.5 to about 6, about 4.5 to about 6.5, about 5 to about 5.5, about 5 to about 6, about 5 to about 6.5, about 5.5 to about 6, about 5.5 to about 6.5, or about 6 to about 6.5. In some embodiments, the volume of the solvent is greater than the volume of the silver-based solution by a factor of about 1.5, about 2, about 2.5, about 3, about 3.5, about 4, about 4.5, about 5, about 5.5, about 6, or about 6.5. In some embodiments, the volume of the solvent is greater than the volume of the silver-based solution by a factor of at least about 1.5, about 2, about 2.5, about 3, about 3.5, about 4, about 4.5, about 5, about 5.5, about 6, or about 6.5. In some embodiments, the volume of the solvent is greater than the volume of the silver-based solution by a factor of at most about 1.5, about 2, about 2.5, about 3, about 3.5, about 4, about 4.5, about 5, about 5.5, about 6, or about 6.5.

In some embodiments, the solvent is heated to a temperature of about 75° C. to about 300° C. In some embodiments, the solvent is heated to a temperature of at least about 75° C. In some embodiments, the solvent is heated to a temperature of at most about 300° C. In some embodiments, the solvent is heated to a temperature of about 75° C. to about 100° C., about 75° C. to about 125° C., about 75° C. to about 150° C., about 75° C. to about 175° C., about 75° C. to about 200° C., about 75° C. to about 225° C., about 75° C. to about 250° C., about 75° C. to about 275° C., about 75° C. to about 300° C., about 100° C. to about 125° C., about 100° C. to about 150° C., about 100° C. to about 175° C., about 100° C. to about 200° C., about 100° C. to about 225° C., about 100° C. to about 250° C., about 100° C. to about 275° C., about 100° C. to about 300° C., about 125° C. to about 150° C., about 125° C. to about 175° C., about 125° C. to about 200° C., about 125° C. to about 225° C., about 125° C. to about 250° C., about 125° C. to about 275° C., about 125° C. to about 300° C., about 150° C. to about 175° C., about 150° C. to about 200° C., about 150° C. to about 225° C., about 150° C. to about 250° C., about 150° C. to about 275° C., about 150° C. to about 300° C., about 175° C. to about 200° C., about 175° C. to about 225° C., about 175° C. to about 250° C., about 175° C. to about 275° C., about 175° C. to about 300° C., about 200° C. to about 225° C., about 200° C. to about 250° C., about 200° C. to about 275° C., about 200° C. to about 300° C., about 225° C. to about 250° C., about 225° C. to about 275° C., about 225° C. to about 300° C., about 250° C. to about 275° C., about 250° C. to about 300° C., or about 275° C. to about 300° C. In some embodiments, the solvent is heated to a temperature of about 75° C., about 100° C., about 125° C., about 150° C., about 175° C., about 200° C., about 225° C., about 250° C., about 275° C., or about 300° C. In some embodiments, the solvent is heated to a temperature of at least about 75° C., about 100° C., about 125° C., about 150° C., about 175° C., about 200° C., about 225° C., about 250° C., about 275° C., or about 300° C. In some embodiments, the solvent is heated to a temperature of at most about 75° C., about 100° C., about 125° C., about 150° C., about 175° C., about 200° C., about 225° C., about 250° C., about 275° C., or about 300° C.

In some embodiments, the solvent is heated for a period of time of about 30 minutes to about 120 minutes. In some embodiments, the solvent is heated for a period of time of at least about 30 minutes. In some embodiments, the solvent is heated for a period of time of at most about 120 minutes. In some embodiments, the solvent is heated for a period of time of about 30 minutes to about 40 minutes, about 30 minutes to about 50 minutes, about 30 minutes to about 60 minutes, about 30 minutes to about 70 minutes, about 30 minutes to about 80 minutes, about 30 minutes to about 90 minutes, about 30 minutes to about 100 minutes, about 30 minutes to about 110 minutes, about 30 minutes to about 120 minutes, about 40 minutes to about 50 minutes, about 40 minutes to about 60 minutes, about 40 minutes to about 70 minutes, about 40 minutes to about 80 minutes, about 40 minutes to about 90 minutes, about 40 minutes to about 100 minutes, about 40 minutes to about 110 minutes, about 40 minutes to about 120 minutes, about 50 minutes to about 60 minutes, about 50 minutes to about 70 minutes, about 50 minutes to about 80 minutes, about 50 minutes to about 90 minutes, about 50 minutes to about 100 minutes, about 50 minutes to about 110 minutes, about 50 minutes to about 120 minutes, about 60 minutes to about 70 minutes, about 60 minutes to about 80 minutes, about 60 minutes to about 90 minutes, about 60 minutes to about 100 minutes, about 60 minutes to about 110 minutes, about 60 minutes to about 120 minutes, about 70 minutes to about 80 minutes, about 70 minutes to about 90 minutes, about 70 minutes to about 100 minutes, about 70 minutes to about 110 minutes, about 70 minutes to about 120 minutes, about 80 minutes to about 90 minutes, about 80 minutes to about 100 minutes, about 80 minutes to about 110 minutes, about 80 minutes to about 120 minutes, about 90 minutes to about 100 minutes, about 90 minutes to about 110 minutes, about 90 minutes to about 120 minutes, about 100 minutes to about 110 minutes, about 100 minutes to about 120 minutes, or about 110 minutes to about 120 minutes. In some embodiments, the solvent is heated for a period of time of about 30 minutes, about 40 minutes, about 50 minutes, about 60 minutes, about 70 minutes, about 80 minutes, about 90 minutes, about 100 minutes, about 110 minutes, or about 120 minutes. In some embodiments, the solvent is heated for a period of time of at least about 30 minutes, about 40 minutes, about 50 minutes, about 60 minutes, about 70 minutes, about 80 minutes, about 90 minutes, about 100 minutes, about 110 minutes, or about 120 minutes. In some embodiments, the solvent is heated for a period of time of at most about 30 minutes, about 40 minutes, about 50 minutes, about 60 minutes, about 70 minutes, about 80 minutes, about 90 minutes, about 100 minutes, about 110 minutes, or about 120 minutes.

In some embodiments, the second solution is heated for a period of time of about 30 minutes to about 120 minutes. In some embodiments, the second solution is heated for a period of time of at least about 30 minutes. In some embodiments, the second solution is heated for a period of time of at most about 120 minutes. In some embodiments, the second solution is heated for a period of time of about 30 minutes to about 40 minutes, about 30 minutes to about 50 minutes, about 30 minutes to about 60 minutes, about 30 minutes to about 70 minutes, about 30 minutes to about 80 minutes, about 30 minutes to about 90 minutes, about 30 minutes to about 100 minutes, about 30 minutes to about 110 minutes, about 30 minutes to about 120 minutes, about 40 minutes to about 50 minutes, about 40 minutes to about 60 minutes, about 40 minutes to about 70 minutes, about 40 minutes to about 80 minutes, about 40 minutes to about 90 minutes, about 40 minutes to about 100 minutes, about 40 minutes to about 110 minutes, about 40 minutes to about 120 minutes, about 50 minutes to about 60 minutes, about 50 minutes to about 70 minutes, about 50 minutes to about 80 minutes, about 50 minutes to about 90 minutes, about 50 minutes to about 100 minutes, about 50 minutes to about 110 minutes, about 50 minutes to about 120 minutes, about 60 minutes to about 70 minutes, about 60 minutes to about 80 minutes, about 60 minutes to about 90 minutes, about 60 minutes to about 100 minutes, about 60 minutes to about 110 minutes, about 60 minutes to about 120 minutes, about 70 minutes to about 80 minutes, about 70 minutes to about 90 minutes, about 70 minutes to about 100 minutes, about 70 minutes to about 110 minutes, about 70 minutes to about 120 minutes, about 80 minutes to about 90 minutes, about 80 minutes to about 100 minutes, about 80 minutes to about 110 minutes, about 80 minutes to about 120 minutes, about 90 minutes to about 100 minutes, about 90 minutes to about 110 minutes, about 90 minutes to about 120 minutes, about 100 minutes to about 110 minutes, about 100 minutes to about 120 minutes, or about 110 minutes to about 120 minutes. In some embodiments, the second solution is heated for a period of time of about 30 minutes, about 40 minutes, about 50 minutes, about 60 minutes, about 70 minutes, about 80 minutes, about 90 minutes, about 100 minutes, about 110 minutes, or about 120 minutes. In some embodiments, the second solution is heated for a period of time of at least about 30 minutes, about 40 minutes, about 50 minutes, about 60 minutes, about 70 minutes, about 80 minutes, about 90 minutes, about 100 minutes, about 110 minutes, or about 120 minutes. In some embodiments, the second solution is heated for a period of time of at most about 30 minutes, about 40 minutes, about 50 minutes, about 60 minutes, about 70 minutes, about 80 minutes, about 90 minutes, about 100 minutes, about 110 minutes, or about 120 minutes.

In some embodiments, the stirring is performed at a rate of about 100 rpm to about 400 rpm. In some embodiments, the stirring is performed at a rate of at least about 100 rpm. In some embodiments, the stirring is performed at a rate of at most about 400 rpm. In some embodiments, the stirring is performed at a rate of about 100 rpm to about 125 rpm, about 100 rpm to about 150 rpm, about 100 rpm to about 175 rpm, about 100 rpm to about 200 rpm, about 100 rpm to about 225 rpm, about 100 rpm to about 250 rpm, about 100 rpm to about 275 rpm, about 100 rpm to about 300 rpm, about 100 rpm to about 350 rpm, about 100 rpm to about 400 rpm, about 125 rpm to about 150 rpm, about 125 rpm to about 175 rpm, about 125 rpm to about 200 rpm, about 125 rpm to about 225 rpm, about 125 rpm to about 250 rpm, about 125 rpm to about 275 rpm, about 125 rpm to about 300 rpm, about 125 rpm to about 350 rpm, about 125 rpm to about 400 rpm, about 150 rpm to about 175 rpm, about 150 rpm to about 200 rpm, about 150 rpm to about 225 rpm, about 150 rpm to about 250 rpm, about 150 rpm to about 275 rpm, about 150 rpm to about 300 rpm, about 150 rpm to about 350 rpm, about 150 rpm to about 400 rpm, about 175 rpm to about 200 rpm, about 175 rpm to about 225 rpm, about 175 rpm to about 250 rpm, about 175 rpm to about 275 rpm, about 175 rpm to about 300 rpm, about 175 rpm to about 350 rpm, about 175 rpm to about 400 rpm, about 200 rpm to about 225 rpm, about 200 rpm to about 250 rpm, about 200 rpm to about 275 rpm, about 200 rpm to about 300 rpm, about 200 rpm to about 350 rpm, about 200 rpm to about 400 rpm, about 225 rpm to about 250 rpm, about 225 rpm to about 275 rpm, about 225 rpm to about 300 rpm, about 225 rpm to about 350 rpm, about 225 rpm to about 400 rpm, about 250 rpm to about 275 rpm, about 250 rpm to about 300 rpm, about 250 rpm to about 350 rpm, about 250 rpm to about 400 rpm, about 275 rpm to about 300 rpm, about 275 rpm to about 350 rpm, about 275 rpm to about 400 rpm, about 300 rpm to about 350 rpm, about 300 rpm to about 400 rpm, or about 350 rpm to about 400 rpm. In some embodiments, the stirring is performed at a rate of about 100 rpm, about 125 rpm, about 150 rpm, about 175 rpm, about 200 rpm, about 225 rpm, about 250 rpm, about 275 rpm, about 300 rpm, about 350 rpm, or about 400 rpm. In some embodiments, the stirring is performed at a rate of at least about 100 rpm, about 125 rpm, about 150 rpm, about 175 rpm, about 200 rpm, about 225 rpm, about 250 rpm, about 275 rpm, about 300 rpm, about 350 rpm, or about 400 rpm. In some embodiments, the stirring is performed at a rate of at most about 100 rpm, about 125 rpm, about 150 rpm, about 175 rpm, about 200 rpm, about 225 rpm, about 250 rpm, about 275 rpm, about 300 rpm, about 350 rpm, or about 400 rpm.

In some embodiments, the centrifuging occurs over a period of time of about 10 minutes to about 40 minutes. In some embodiments, the centrifuging occurs over a period of time of at least about 10 minutes. In some embodiments, the centrifuging occurs over a period of time of at most about 40 minutes. In some embodiments, the centrifuging occurs over a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some embodiments, the centrifuging occurs over a period of time of about 10 minutes, about 15 minutes, about 20 minutes, about 25 minutes, about 30 minutes, about 35 minutes, or about 40 minutes. In some embodiments, the centrifuging occurs over a period of time of at least about 10 minutes, about 15 minutes, about 20 minutes, about 25 minutes, about 30 minutes, about 35 minutes, or about 40 minutes. In some embodiments, the centrifuging occurs over a period of time of at most about 10 minutes, about 15 minutes, about 20 minutes, about 25 minutes, about 30 minutes, about 35 minutes, or about 40 minutes.

Another aspect provided herein is a conductive carbon-based glue comprising a carbon-based material and an adhesive agent. In some embodiments, the carbon-based material comprises graphene, graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

In some embodiments, the adhesive agent comprises a percentage by weight of the conductive carbon-based glue of about 60% to about 99.9%. In some embodiments, the adhesive agent comprises a percentage by weight of the conductive carbon-based glue of at least about 60%. In some embodiments, the adhesive agent comprises a percentage by weight of the conductive carbon-based glue of at most about 99.9%. In some embodiments, the adhesive agent comprises a percentage by weight of the conductive carbon-based glue of about 60% to about 65%, about 60% to about 70%, about 60% to about 75%, about 60% to about 80%, about 60% to about 85%, about 60% to about 90%, about 60% to about 95%, about 60% to about 97%, about 60% to about 99%, about 60% to about 99.9%, about 65% to about 70%, about 65% to about 75%, about 65% to about 80%, about 65% to about 85%, about 65% to about 90%, about 65% to about 95%, about 65% to about 97%, about 65% to about 99%, about 65% to about 99.9%, about 70% to about 75%, about 70% to about 80%, about 70% to about 85%, about 70% to about 90%, about 70% to about 95%, about 70% to about 97%, about 70% to about 99%, about 70% to about 99.9%, about 75% to about 80%, about 75% to about 85%, about 75% to about 90%, about 75% to about 95%, about 75% to about 97%, about 75% to about 99%, about 75% to about 99.9%, about 80% to about 85%, about 80% to about 90%, about 80% to about 95%, about 80% to about 97%, about 80% to about 99%, about 80% to about 99.9%, about 85% to about 90%, about 85% to about 95%, about 85% to about 97%, about 85% to about 99%, about 85% to about 99.9%, about 90% to about 95%, about 90% to about 97%, about 90% to about 99%, about 90% to about 99.9%, about 95% to about 97%, about 95% to about 99%, about 95% to about 99.9%, about 97% to about 99%, about 97% to about 99.9%, or about 99% to about 99.9%. In some embodiments, the adhesive agent comprises a percentage by weight of the conductive carbon-based glue of about 60%, about 65%, about 70%, about 75%, about 80%, about 85%, about 90%, about 95%, about 97%, about 99%, or about 99.9%. In some embodiments, the adhesive agent comprises a percentage by weight of the conductive carbon-based glue of at least bout 60%, about 65%, about 70%, about 75%, about 80%, about 85%, about 90%, about 95%, about 97%, about 99%, or about 99.9%. In some embodiments, the adhesive agent comprises a percentage by weight of the conductive carbon-based glue of at most about 60%, about 65%, about 70%, about 75%, about 80%, about 85%, about 90%, about 95%, about 97%, about 99%, or about 99.9%.

In some embodiments, the carbon-based material comprises a percentage by weight of the conductive carbon-based glue of about 0.1% to about 40%. In some embodiments, the carbon-based material comprises a percentage by weight of the conductive carbon-based glue of at least about 0.1%. In some embodiments, the carbon-based material comprises a percentage by weight of the conductive carbon-based glue of at most about 40%. In some embodiments, the carbon-based material comprises a percentage by weight of the conductive carbon-based glue of about 0.1% to about 0.2%, about 0.1% to about 0.5%, about 0.1% to about 1%, about 0.1% to about 5%, about 0.1% to about 10%, about 0.1% to about 15%, about 0.1% to about 20%, about 0.1% to about 25%, about 0.1% to about 30%, about 0.1% to about 35%, about 0.1% to about 40%, about 0.2% to about 0.5%, about 0.2% to about 1%, about 0.2% to about 5%, about 0.2% to about 10%, about 0.2% to about 15%, about 0.2% to about 20%, about 0.2% to about 25%, about 0.2% to about 30%, about 0.2% to about 35%, about 0.2% to about 40%, about 0.5% to about 1%, about 0.5% to about 5%, about 0.5% to about 10%, about 0.5% to about 15%, about 0.5% to about 20%, about 0.5% to about 25%, about 0.5% to about 30%, about 0.5% to about 35%, about 0.5% to about 40%, about 1% to about 5%, about 1% to about 10%, about 1% to about 15%, about 1% to about 20%, about 1% to about 25%, about 1% to about 30%, about 1% to about 35%, about 1% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, the carbon-based material comprises a percentage by weight of the conductive carbon-based glue of about 0.1%, about 0.2%, about 0.5%, about 1%, about 5%, about 10%, about 15%, about 20%, about 25%, about 30%, about 35%, or about 40%. In some embodiments, the carbon-based material comprises a percentage by weight of the conductive carbon-based glue of at least about 0.1%, about 0.2%, about 0.5%, about 1%, about 5%, about 10%, about 15%, about 20%, about 25%, about 30%, about 35%, or about 40%. In some embodiments, the carbon-based material comprises a percentage by weight of the conductive carbon-based glue of at most about 0.1%, about 0.2%, about 0.5%, about 1%, about 5%, about 10%, about 15%, about 20%, about 25%, about 30%, about 35%, or about 40%.

In some embodiments, the carbon-based material comprises graphene, wherein a percentage by weight of the graphene in the carbon-based material is about 0.1% to about 10%. In some embodiments, the carbon-based material comprises graphene, wherein a percentage by weight of the graphene in the carbon-based material is at least about 0.1%. In some embodiments, the carbon-based material comprises graphene, wherein a percentage by weight of the graphene in the carbon-based material is at most about 10%. In some embodiments, the carbon-based material comprises graphene, wherein a percentage by weight of the graphene in the carbon-based material is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, the carbon-based material comprises graphene, wherein a percentage by weight of the graphene in the carbon-based material is about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at least about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at most about 0.1%, about 0.2%, about 0.5%, about 1%, about 2%, about 3%, about 4%, about 5%, about 6%, about 7%, about 8%, or about 10%.

In some embodiments, the carbon-based material comprises graphite powder, wherein a percentage by weight of the graphite powder in the carbon-based material is about 1% to about 40%. In some embodiments, the carbon-based material comprises graphite powder, wherein a percentage by weight of the graphite powder in the carbon-based material is at least about 1%. In some embodiments, the carbon-based material comprises graphite powder, wherein a percentage by weight of the graphite powder in the carbon-based material is at most about 40%. In some embodiments, the carbon-based material comprises graphite powder, wherein a percentage by weight of the graphite powder in the carbon-based material is about 1% to about 2%, about 1% to about 5%, about 1% to about 10%, about 1% to about 15%, about 1% to about 20%, about 1% to about 25%, about 1% to about 30%, about 1% to about 35%, about 1% to about 40%, about 2% to about 5%, about 2% to about 10%, about 2% to about 15%, about 2% to about 20%, about 2% to about 25%, about 2% to about 30%, about 2% to about 35%, about 2% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, the carbon-based material comprises graphite powder, wherein a percentage by weight of the graphene in the carbon-based material is about 1%, about 2%, about 5%, about 10%, about 15%, about 20%, about 25%, about 30%, about 35%, or about 40%. In some embodiments, the carbon-based material comprises graphite powder, wherein a percentage by weight of the graphene in the carbon-based material is at least about 1%, about 2%, about 5%, about 10%, about 15%, about 20%, about 25%, about 30%, about 35%, or about 40%. In some embodiments, the carbon-based material comprises graphite powder, wherein a percentage by weight of the graphene in the carbon-based material is at most about 1%, about 2%, about 5%, about 10%, about 15%, about 20%, about 25%, about 30%, about 35%, or about 40%.

In some embodiments, the adhesive agent comprises carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof. In some embodiments, the conductive carbon-based glue further comprises a conductive filler. In some embodiments, the conductive filler comprises silver. In some embodiments, the silver comprises silver nanoparticles, silver nanorods, silver nanowires, silver nanoflowers, silver nanofibers, silver nanoplatelets, silver nanoribbons, silver nanocubes, silver bipyramids, or any combination thereof. In some embodiments, the conductive carbon-based glue further comprises a thinner. In some embodiments, the thinner comprises butyl acetate, lacquer thinner, acetone, petroleum naphtha, mineral spirits, xylene, or any combination thereof.

In some embodiments, the conductive carbon-based glue comprises a percent by volume of the thinner of about 50% to about 99%. In some embodiments, the conductive carbon-based glue comprises a percent by volume of the thinner of at least about 50%. In some embodiments, the conductive carbon-based glue comprises a percent by volume of the thinner of at most about 99%. In some embodiments, the conductive carbon-based glue comprises a percent by volume of the thinner of about 50% to about 55%, about 50% to about 60%, about 50% to about 65%, about 50% to about 70%, about 50% to about 75%, about 50% to about 80%, about 50% to about 85%, about 50% to about 90%, about 50% to about 95%, about 50% to about 99%, about 55% to about 60%, about 55% to about 65%, about 55% to about 70%, about 55% to about 75%, about 55% to about 80%, about 55% to about 85%, about 55% to about 90%, about 55% to about 95%, about 55% to about 99%, about 60% to about 65%, about 60% to about 70%, about 60% to about 75%, about 60% to about 80%, about 60% to about 85%, about 60% to about 90%, about 60% to about 95%, about 60% to about 99%, about 65% to about 70%, about 65% to about 75%, about 65% to about 80%, about 65% to about 85%, about 65% to about 90%, about 65% to about 95%, about 65% to about 99%, about 70% to about 75%, about 70% to about 80%, about 70% to about 85%, about 70% to about 90%, about 70% to about 95%, about 70% to about 99%, about 75% to about 80%, about 75% to about 85%, about 75% to about 90%, about 75% to about 95%, about 75% to about 99%, about 80% to about 85%, about 80% to about 90%, about 80% to about 95%, about 80% to about 99%, about 85% to about 90%, about 85% to about 95%, about 85% to about 99%, about 90% to about 95%, about 90% to about 99%, or about 95% to about 99%. In some embodiments, the conductive carbon-based glue comprises a percent by volume of the thinner of about 50%, about 55%, about 60%, about 65%, about 70%, about 75%, about 80%, about 85%, about 90%, about 95%, or about 99%. In some embodiments, the conductive carbon-based glue comprises a percent by volume of the thinner of at least about 50%, about 55%, about 60%, about 65%, about 70%, about 75%, about 80%, about 85%, about 90%, about 95%, or about 99%. In some embodiments, the conductive carbon-based glue comprises a percent by volume of the thinner of at most about 50%, about 55%, about 60%, about 65%, about 70%, about 75%, about 80%, about 85%, about 90%, about 95%, or about 99%.

In some embodiments, the conductive carbon-based glue has a sheet resistance of about 5 ohm/sq to about 500 ohm/sq. In some embodiments, the conductive carbon-based glue has a sheet resistance of at least about 5 ohm/sq. In some embodiments, the conductive carbon-based glue has a sheet resistance of at most about 500 ohm/sq. In some embodiments, the conductive carbon-based glue has a sheet resistance of about 5 ohm/sq to about 10 ohm/sq, about 5 ohm/sq to about 20 ohm/sq, about 5 ohm/sq to about 50 ohm/sq, about 5 ohm/sq to about 100 ohm/sq, about 5 ohm/sq to about 150 ohm/sq, about 5 ohm/sq to about 200 ohm/sq, about 5 ohm/sq to about 250 ohm/sq, about 5 ohm/sq to about 300 ohm/sq, about 5 ohm/sq to about 350 ohm/sq, about 5 ohm/sq to about 400 ohm/sq, about 5 ohm/sq to about 500 ohm/sq, about 10 ohm/sq to about 20 ohm/sq, about 10 ohm/sq to about 50 ohm/sq, about 10 ohm/sq to about 100 ohm/sq, about 10 ohm/sq to about 150 ohm/sq, about 10 ohm/sq to about 200 ohm/sq, about 10 ohm/sq to about 250 ohm/sq, about 10 ohm/sq to about 300 ohm/sq, about 10 ohm/sq to about 350 ohm/sq, about 10 ohm/sq to about 400 ohm/sq, about 10 ohm/sq to about 500 ohm/sq, about 20 ohm/sq to about 50 ohm/sq, about 20 ohm/sq to about 100 ohm/sq, about 20 ohm/sq to about 150 ohm/sq, about 20 ohm/sq to about 200 ohm/sq, about 20 ohm/sq to about 250 ohm/sq, about 20 ohm/sq to about 300 ohm/sq, about 20 ohm/sq to about 350 ohm/sq, about 20 ohm/sq to about 400 ohm/sq, about 20 ohm/sq to about 500 ohm/sq, about 50 ohm/sq to about 100 ohm/sq, about 50 ohm/sq to about 150 ohm/sq, about 50 ohm/sq to about 200 ohm/sq, about 50 ohm/sq to about 250 ohm/sq, about 50 ohm/sq to about 300 ohm/sq, about 50 ohm/sq to about 350 ohm/sq, about 50 ohm/sq to about 400 ohm/sq, about 50 ohm/sq to about 500 ohm/sq, about 100 ohm/sq to about 150 ohm/sq, about 100 ohm/sq to about 200 ohm/sq, about 100 ohm/sq to about 250 ohm/sq, about 100 ohm/sq to about 300 ohm/sq, about 100 ohm/sq to about 350 ohm/sq, about 100 ohm/sq to about 400 ohm/sq, about 100 ohm/sq to about 500 ohm/sq, about 150 ohm/sq to about 200 ohm/sq, about 150 ohm/sq to about 250 ohm/sq, about 150 ohm/sq to about 300 ohm/sq, about 150 ohm/sq to about 350 ohm/sq, about 150 ohm/sq to about 400 ohm/sq, about 150 ohm/sq to about 500 ohm/sq, about 200 ohm/sq to about 250 ohm/sq, about 200 ohm/sq to about 300 ohm/sq, about 200 ohm/sq to about 350 ohm/sq, about 200 ohm/sq to about 400 ohm/sq, about 200 ohm/sq to about 500 ohm/sq, about 250 ohm/sq to about 300 ohm/sq, about 250 ohm/sq to about 350 ohm/sq, about 250 ohm/sq to about 400 ohm/sq, about 250 ohm/sq to about 500 ohm/sq, about 300 ohm/sq to about 350 ohm/sq, about 300 ohm/sq to about 400 ohm/sq, about 300 ohm/sq to about 500 ohm/sq, about 350 ohm/sq to about 400 ohm/sq, about 350 ohm/sq to about 500 ohm/sq, or about 400 ohm/sq to about 500 ohm/sq. In some embodiments, the conductive carbon-based glue has a sheet resistance of about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq. In some embodiments, the conductive carbon-based glue has a sheet resistance of at least about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq. In some embodiments, the conductive carbon-based glue has a sheet resistance of at most about 5 ohm/sq, about 10 ohm/sq, about 20 ohm/sq, about 50 ohm/sq, about 100 ohm/sq, about 150 ohm/sq, about 200 ohm/sq, about 250 ohm/sq, about 300 ohm/sq, about 350 ohm/sq, about 400 ohm/sq, or about 500 ohm/sq.

In some embodiments, the conductive carbon-based glue has a sheet resistance of about 0.3 ohm/sq/mil to about 2 ohm/sq/mil. In some embodiments, the conductive carbon-based glue has a sheet resistance of at least about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based glue has a sheet resistance of at most about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based glue has a sheet resistance of about 0.3 ohm/sq/mil to about 0.4 ohm/sq/mil, about 0.3 ohm/sq/mil to about 0.6 ohm/sq/mil, about 0.3 ohm/sq/mil to about 0.8 ohm/sq/mil, about 0.3 ohm/sq/mil to about 1 ohm/sq/mil, about 0.3 ohm/sq/mil to about 1.2 ohm/sq/mil, about 0.3 ohm/sq/mil to about 1.4 ohm/sq/mil, about 0.3 ohm/sq/mil to about 1.6 ohm/sq/mil, about 0.3 ohm/sq/mil to about 1.8 ohm/sq/mil, about 0.3 ohm/sq/mil to about 2 ohm/sq/mil, about 0.4 ohm/sq/mil to about 0.6 ohm/sq/mil, about 0.4 ohm/sq/mil to about 0.8 ohm/sq/mil, about 0.4 ohm/sq/mil to about 1 ohm/sq/mil, about 0.4 ohm/sq/mil to about 1.2 ohm/sq/mil, about 0.4 ohm/sq/mil to about 1.4 ohm/sq/mil, about 0.4 ohm/sq/mil to about 1.6 ohm/sq/mil, about 0.4 ohm/sq/mil to about 1.8 ohm/sq/mil, about 0.4 ohm/sq/mil to about 2 ohm/sq/mil, about 0.6 ohm/sq/mil to about 0.8 ohm/sq/mil, about 0.6 ohm/sq/mil to about 1 ohm/sq/mil, about 0.6 ohm/sq/mil to about 1.2 ohm/sq/mil, about 0.6 ohm/sq/mil to about 1.4 ohm/sq/mil, about 0.6 ohm/sq/mil to about 1.6 ohm/sq/mil, about 0.6 ohm/sq/mil to about 1.8 ohm/sq/mil, about 0.6 ohm/sq/mil to about 2 ohm/sq/mil, about 0.8 ohm/sq/mil to about 1 ohm/sq/mil, about 0.8 ohm/sq/mil to about 1.2 ohm/sq/mil, about 0.8 ohm/sq/mil to about 1.4 ohm/sq/mil, about 0.8 ohm/sq/mil to about 1.6 ohm/sq/mil, about 0.8 ohm/sq/mil to about 1.8 ohm/sq/mil, about 0.8 ohm/sq/mil to about 2 ohm/sq/mil, about 1 ohm/sq/mil to about 1.2 ohm/sq/mil, about 1 ohm/sq/mil to about 1.4 ohm/sq/mil, about 1 ohm/sq/mil to about 1.6 ohm/sq/mil, about 1 ohm/sq/mil to about 1.8 ohm/sq/mil, about 1 ohm/sq/mil to about 2 ohm/sq/mil, about 1.2 ohm/sq/mil to about 1.4 ohm/sq/mil, about 1.2 ohm/sq/mil to about 1.6 ohm/sq/mil, about 1.2 ohm/sq/mil to about 1.8 ohm/sq/mil, about 1.2 ohm/sq/mil to about 2 ohm/sq/mil, about 1.4 ohm/sq/mil to about 1.6 ohm/sq/mil, about 1.4 ohm/sq/mil to about 1.8 ohm/sq/mil, about 1.4 ohm/sq/mil to about 2 ohm/sq/mil, about 1.6 ohm/sq/mil to about 1.8 ohm/sq/mil, about 1.6 ohm/sq/mil to about 2 ohm/sq/mil, or about 1.8 ohm/sq/mil to about 2 ohm/sq/mil. In some embodiments, the conductive carbon-based glue has a sheet resistance of about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based glue has a sheet resistance of at least about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based glue has a sheet resistance of at most about 0.3 ohm/sq/mil, about 0.4 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil.

In some embodiments, the conductive carbon-based glue has a conductivity of about 0.15 S/m to about 60 S/m. In some embodiments, the conductive carbon-based glue has a conductivity of at least about 0.15 S/m. In some embodiments, the conductive carbon-based glue has a conductivity of at most about 60 S/m. In some embodiments, the conductive carbon-based glue has a conductivity of about 0.15 S/m to about 0.3 S/m, about 0.15 S/m to about 0.5 S/m, about 0.15 S/m to about 1 S/m, about 0.15 S/m to about 2 S/m, about 0.15 S/m to about 5 S/m, about 0.15 S/m to about 10 S/m, about 0.15 S/m to about 20 S/m, about 0.15 S/m to about 30 S/m, about 0.15 S/m to about 40 S/m, about 0.15 S/m to about 50 S/m, about 0.15 S/m to about 60 S/m, about 0.3 S/m to about 0.5 S/m, about 0.3 S/m to about 1 S/m, about 0.3 S/m to about 2 S/m, about 0.3 S/m to about 5 S/m, about 0.3 S/m to about 10 S/m, about 0.3 S/m to about 20 S/m, about 0.3 S/m to about 30 S/m, about 0.3 S/m to about 40 S/m, about 0.3 S/m to about 50 S/m, about 0.3 S/m to about 60 S/m, about 0.5 S/m to about 1 S/m, about 0.5 S/m to about 2 S/m, about 0.5 S/m to about 5 S/m, about 0.5 S/m to about 10 S/m, about 0.5 S/m to about 20 S/m, about 0.5 S/m to about 30 S/m, about 0.5 S/m to about 40 S/m, about 0.5 S/m to about 50 S/m, about 0.5 S/m to about 60 S/m, about 1 S/m to about 2 S/m, about 1 S/m to about 5 S/m, about 1 S/m to about 10 S/m, about 1 S/m to about 20 S/m, about 1 S/m to about 30 S/m, about 1 S/m to about 40 S/m, about 1 S/m to about 50 S/m, about 1 S/m to about 60 S/m, about 2 S/m to about 5 S/m, about 2 S/m to about 10 S/m, about 2 S/m to about 20 S/m, about 2 S/m to about 30 S/m, about 2 S/m to about 40 S/m, about 2 S/m to about 50 S/m, about 2 S/m to about 60 S/m, about 5 S/m to about 10 S/m, about 5 S/m to about 20 S/m, about 5 S/m to about 30 S/m, about 5 S/m to about 40 S/m, about 5 S/m to about 50 S/m, about 5 S/m to about 60 S/m, about 10 S/m to about 20 S/m, about 10 S/m to about 30 S/m, about 10 S/m to about 40 S/m, about 10 S/m to about 50 S/m, about 10 S/m to about 60 S/m, about 20 S/m to about 30 S/m, about 20 S/m to about 40 S/m, about 20 S/m to about 50 S/m, about 20 S/m to about 60 S/m, about 30 S/m to about 40 S/m, about 30 S/m to about 50 S/m, about 30 S/m to about 60 S/m, about 40 S/m to about 50 S/m, about 40 S/m to about 60 S/m, or about 50 S/m to about 60 S/m. In some embodiments, the conductive carbon-based glue has a conductivity of about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m. In some embodiments, the conductive carbon-based glue has a conductivity of at least about 0.15

S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m. In some embodiments, the conductive carbon-based glue has a conductivity of at most about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m.

In some embodiments, the conductive carbon-based glue has a sheet resistance difference between a flat position and a position with a convex bend angle of at most 180 degrees, of at most about 6%, 5%, 4%, 3%, 2%, or 1%. In some embodiments, the conductive carbon-based glue has a sheet resistance difference between a flat position and a position with a concave bend angle of at most 180 degrees, of at most about 6%, 5%, 4%, 3%, 2%, or 1%. In some embodiments, the conductive carbon-based glue has a sheet resistance difference between a flat position and a position with a twist angle of at most 800 degrees, of at most about 10%, 9%, 8%, 7%, 6%, 5%, 4%, 3%, or 2%.

In some embodiments, the conductive carbon-based glue a shear strength of at least about 20 MPa, 15 MPA, 10 MPa, or 5 MPa. In some embodiments, the conductive carbon-based glue a shear strength of at least about 10 MPa.

In some embodiments, the conductive carbon-based glue has a tensile strength of at least about 30 MPa, 25 MPA, 20 MPa, 10 MPa, or 5 MPa. In some embodiments, the conductive carbon-based glue a tensile strength of at least about 20 MPa.

In some embodiments, the viscosity of the conductive glue is about 10 centipoise to about 10,000 centipoise. In some embodiments, the viscosity of the conductive glue is at least about 10 centipoise. In some embodiments, the viscosity of the conductive glue is at most about 10,000 centipoise. In some embodiments, the viscosity of the conductive glue is about 10 centipoise to about 20 centipoise, about 10 centipoise to about 50 centipoise, about 10 centipoise to about 100 centipoise, about 10 centipoise to about 200 centipoise, about 10 centipoise to about 500 centipoise, about 10 centipoise to about 1,000 centipoise, about 10 centipoise to about 2,000 centipoise, about 10 centipoise to about 5,000 centipoise, about 10 centipoise to about 10,000 centipoise, about 20 centipoise to about 50 centipoise, about 20 centipoise to about 100 centipoise, about 20 centipoise to about 200 centipoise, about 20 centipoise to about 500 centipoise, about 20 centipoise to about 1,000 centipoise, about 20 centipoise to about 2,000 centipoise, about 20 centipoise to about 5,000 centipoise, about 20 centipoise to about 10,000 centipoise, about 50 centipoise to about 100 centipoise, about 50 centipoise to about 200 centipoise, about 50 centipoise to about 500 centipoise, about 50 centipoise to about 1,000 centipoise, about 50 centipoise to about 2,000 centipoise, about 50 centipoise to about 5,000 centipoise, about 50 centipoise to about 10,000 centipoise, about 100 centipoise to about 200 centipoise, about 100 centipoise to about 500 centipoise, about 100 centipoise to about 1,000 centipoise, about 100 centipoise to about 2,000 centipoise, about 100 centipoise to about 5,000 centipoise, about 100 centipoise to about 10,000 centipoise, about 200 centipoise to about 500 centipoise, about 200 centipoise to about 1,000 centipoise, about 200 centipoise to about 2,000 centipoise, about 200 centipoise to about 5,000 centipoise, about 200 centipoise to about 10,000 centipoise, about 500 centipoise to about 1,000 centipoise, about 500 centipoise to about 2,000 centipoise, about 500 centipoise to about 5,000 centipoise, about 500 centipoise to about 10,000 centipoise, about 1,000 centipoise to about 2,000 centipoise, about 1,000 centipoise to about 5,000 centipoise, about 1,000 centipoise to about 10,000 centipoise, about 2,000 centipoise to about 5,000 centipoise, about 2,000 centipoise to about 10,000 centipoise, or about 5,000 centipoise to about 10,000 centipoise. In some embodiments, the viscosity of the conductive glue is about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the conductive glue is at least about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the conductive glue is no more than about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise.

In some embodiments, the conductive carbon-based glue further comprises a pigment, a colorant, a dye, or any combination thereof. In some embodiments, the conductive carbon-based glue comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof.

In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof.

In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black S170, Color Black S150, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Another aspect provided herein is a conductive carbon-based epoxy comprising a resin comprising a carbon-based material and an adhesive agent and a hardener.

In some embodiments, the carbon-based material comprises graphene, graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

In some embodiments, the carbon-based material comprises graphene, wherein a percentage by weight of the graphene in the carbon-based material is about 0.1% to about 10%. In some embodiments, the carbon-based material comprises graphene, wherein a percentage by weight of the graphene in the carbon-based material is at least about 0.1%. In some embodiments, the carbon-based material comprises graphene, wherein a percentage by weight of the graphene in the carbon-based material is at most about 10%. In some embodiments, the carbon-based material comprises graphene, wherein a percentage by weight of the graphene in the carbon-based material is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, the carbon-based material comprises graphene, wherein a percentage by weight of the graphene in the carbon-based material is about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at least about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at most about 0.1%, about 0.2%, about 0.5%, about 1%, about 2%, about 3%, about 4%, about 5%, about 6%, about 7%, about 8%, or about 10%.

In some embodiments, the carbon-based material comprises graphite powder, wherein a percentage by weight of the graphite powder in the carbon-based material is about 1% to about 40%. In some embodiments, the carbon-based material comprises graphite powder, wherein a percentage by weight of the graphite powder in the carbon-based material is at least about 1%. In some embodiments, the carbon-based material comprises graphite powder, wherein a percentage by weight of the graphite powder in the carbon-based material is at most about 40%. In some embodiments, the carbon-based material comprises graphite powder, wherein a percentage by weight of the graphite powder in the carbon-based material is about 1% to about 2%, about 1% to about 5%, about 1% to about 10%, about 1% to about 15%, about 1% to about 20%, about 1% to about 25%, about 1% to about 30%, about 1% to about 35%, about 1% to about 40%, about 2% to about 5%, about 2% to about 10%, about 2% to about 15%, about 2% to about 20%, about 2% to about 25%, about 2% to about 30%, about 2% to about 35%, about 2% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, the carbon-based material comprises graphite powder, wherein a percentage by weight of the graphite powder in the carbon-based material is about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at least about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at most about 1%, about 2%, about 5%, about 10%, about 15%, about 20%, about 25%, about 30%, about 35%, or about 40%.

In some embodiments, the adhesive agent comprises carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof. In some embodiments, the hardener comprises Bisphenol A, Bisphenol F, a novolac, an aliphatic alcohol, an aliphatic polyol, a glycidylamine, triethylene triamine, or any combination thereof. In some embodiments, the conductive carbon-based glue further comprises a conductive filler. In some embodiments, the conductive filler comprises silver. In some embodiments, the silver comprises silver nanoparticles, silver nanorods, silver nanowires, silver nanoflowers, silver nanofibers, silver nanoplatelets, silver nanoribbons, silver nanocubes, silver bipyramids, or any combination thereof. In some embodiments, the conductive carbon-based glue further comprises a thinner. In some embodiments, the thinner comprises butyl acetate, lacquer thinner, acetone, petroleum naphtha, mineral spirits, xylene, or any combination thereof.

In some embodiments, the percent by volume of the thinner in the conductive carbon-based epoxy is about 50% to about 99%. In some embodiments, the percent by volume of the thinner is at least about 50%. In some embodiments, the percent by volume of the thinner is at most about 99%.

In some embodiments, the percent by volume of the thinner is about 50% to about 55%, about 50% to about 60%, about 50% to about 65%, about 50% to about 70%, about 50% to about 75%, about 50% to about 80%, about 50% to about 85%, about 50% to about 90%, about 50% to about 95%, about 50% to about 99%, about 55% to about 60%, about 55% to about 65%, about 55% to about 70%, about 55% to about 75%, about 55% to about 80%, about 55% to about 85%, about 55% to about 90%, about 55% to about 95%, about 55% to about 99%, about 60% to about 65%, about 60% to about 70%, about 60% to about 75%, about 60% to about 80%, about 60% to about 85%, about 60% to about 90%, about 60% to about 95%, about 60% to about 99%, about 65% to about 70%, about 65% to about 75%, about 65% to about 80%, about 65% to about 85%, about 65% to about 90%, about 65% to about 95%, about 65% to about 99%, about 70% to about 75%, about 70% to about 80%, about 70% to about 85%, about 70% to about 90%, about 70% to about 95%, about 70% to about 99%, about 75% to about 80%, about 75% to about 85%, about 75% to about 90%, about 75% to about 95%, about 75% to about 99%, about 80% to about 85%, about 80% to about 90%, about 80% to about 95%, about 80% to about 99%, about 85% to about 90%, about 85% to about 95%, about 85% to about 99%, about 90% to about 95%, about 90% to about 99%, or about 95% to about 99%. In some embodiments, the percent by volume of the thinner is about 50%, about 55%, about 60%, about 65%, about 70%, about 75%, about 80%, about 85%, about 90%, about 95%, or about 99%. In some embodiments, the percent by volume of the thinner is at least about 50%, about 55%, about 60%, about 65%, about 70%, about 75%, about 80%, about 85%, about 90%, about 95%, or about 99%. In some embodiments, the percent by volume of the thinner is at most about 50%, about 55%, about 60%, about 65%, about 70%, about 75%, about 80%, about 85%, about 90%, about 95%, or about 99%.

In some embodiments, the percentage by weight of the resin in the conductive carbon-based epoxy is about 25% to about 75%. In some embodiments, the percentage by weight of the resin in the conductive carbon-based epoxy is at least about 25%. In some embodiments, the percentage by weight of the resin in the conductive carbon-based epoxy is at most about 75%. In some embodiments, the percentage by weight of the resin in the conductive carbon-based epoxy is about 25% to about 30%, about 25% to about 35%, about 25% to about 40%, about 25% to about 45%, about 25% to about 50%, about 25% to about 55%, about 25% to about 60%, about 25% to about 65%, about 25% to about 70%, about 25% to about 75%, about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 35% to about 40%, about 35% to about 45%, about 35% to about 50%, about 35% to about 55%, about 35% to about 60%, about 35% to about 65%, about 35% to about 70%, about 35% to about 75%, about 40% to about 45%, about 40% to about 50%, about 40% to about 55%, about 40% to about 60%, about 40% to about 65%, about 40% to about 70%, about 40% to about 75%, about 45% to about 50%, about 45% to about 55%, about 45% to about 60%, about 45% to about 65%, about 45% to about 70%, about 45% to about 75%, about 50% to about 55%, about 50% to about 60%, about 50% to about 65%, about 50% to about 70%, about 50% to about 75%, about 55% to about 60%, about 55% to about 65%, about 55% to about 70%, about 55% to about 75%, about 60% to about 65%, about 60% to about 70%, about 60% to about 75%, about 65% to about 70%, about 65% to about 75%, or about 70% to about 75%. In some embodiments, the percentage by weight of the resin in the conductive carbon-based epoxy is about 25%, about 30%, about 35%, about 40%, about 45%, about 50%, about 55%, about 60%, about 65%, about 70%, or about 75%. In some embodiments, the percentage by weight of the resin in the conductive carbon-based epoxy is at least about 25%, about 30%, about 35%, about 40%, about 45%, about 50%, about 55%, about 60%, about 65%, about 70%, or about 75%. In some embodiments, the percentage by weight of the resin in the conductive carbon-based epoxy is at most about 25%, about 30%, about 35%, about 40%, about 45%, about 50%, about 55%, about 60%, about 65%, about 70%, or about 75%.

In some embodiments, the resin comprises a percentage by weight of the carbon-based material of about 60% to about 99%. In some embodiments, the resin comprises a percentage by weight of the carbon-based material of at least about 60%. In some embodiments, the resin comprises a percentage by weight of the carbon-based material of at most about 99%. In some embodiments, the resin comprises a percentage by weight of the carbon-based material of about 60% to about 65%, about 60% to about 70%, about 60% to about 75%, about 60% to about 80%, about 60% to about 85%, about 60% to about 90%, about 60% to about 95%, about 60% to about 96%, about 60% to about 97%, about 60% to about 98%, about 60% to about 99%, about 65% to about 70%, about 65% to about 75%, about 65% to about 80%, about 65% to about 85%, about 65% to about 90%, about 65% to about 95%, about 65% to about 96%, about 65% to about 97%, about 65% to about 98%, about 65% to about 99%, about 70% to about 75%, about 70% to about 80%, about 70% to about 85%, about 70% to about 90%, about 70% to about 95%, about 70% to about 96%, about 70% to about 97%, about 70% to about 98%, about 70% to about 99%, about 75% to about 80%, about 75% to about 85%, about 75% to about 90%, about 75% to about 95%, about 75% to about 96%, about 75% to about 97%, about 75% to about 98%, about 75% to about 99%, about 80% to about 85%, about 80% to about 90%, about 80% to about 95%, about 80% to about 96%, about 80% to about 97%, about 80% to about 98%, about 80% to about 99%, about 85% to about 90%, about 85% to about 95%, about 85% to about 96%, about 85% to about 97%, about 85% to about 98%, about 85% to about 99%, about 90% to about 95%, about 90% to about 96%, about 90% to about 97%, about 90% to about 98%, about 90% to about 99%, about 95% to about 96%, about 95% to about 97%, about 95% to about 98%, about 95% to about 99%, about 96% to about 97%, about 96% to about 98%, about 96% to about 99%, about 97% to about 98%, about 97% to about 99%, or about 98% to about 99%. In some embodiments, the resin comprises a percentage by weight of the carbon-based material of about 60%, about 65%, about 70%, about 75%, about 80%, about 85%, about 90%, about 95%, about 96%, about 97%, about 98%, or about 99%. In some embodiments, the resin comprises a percentage by weight of the carbon-based material of at least about 60%, about 65%, about 70%, about 75%, about 80%, about 85%, about 90%, about 95%, about 96%, about 97%, about 98%, or about 99%. In some embodiments, the resin comprises a percentage by weight of the carbon-based material of at most about 60%, about 65%, about 70%, about 75%, about 80%, about 85%, about 90%, about 95%, about 96%, about 97%, about 98%, or about 99%.

In some embodiments, the conductive carbon-based epoxy is configured to cure at room temperature. In some embodiments, the conductive carbon-based epoxy has a curing time at room temperature of about 12 hours to about 48 hours. In some embodiments, the conductive carbon-based epoxy has a curing time at room temperature of at least about 12 hours. In some embodiments, the conductive carbon-based epoxy has a curing time at room temperature of at most about 48 hours. In some embodiments, the conductive carbon-based epoxy has a curing time at room temperature of about 12 hours to about 16 hours, about 12 hours to about 20 hours, about 12 hours to about 24 hours, about 12 hours to about 28 hours, about 12 hours to about 32 hours, about 12 hours to about 36 hours, about 12 hours to about 40 hours, about 12 hours to about 44 hours, about 12 hours to about 48 hours, about 16 hours to about 20 hours, about 16 hours to about 24 hours, about 16 hours to about 28 hours, about 16 hours to about 32 hours, about 16 hours to about 36 hours, about 16 hours to about 40 hours, about 16 hours to about 44 hours, about 16 hours to about 48 hours, about 20 hours to about 24 hours, about 20 hours to about 28 hours, about 20 hours to about 32 hours, about 20 hours to about 36 hours, about 20 hours to about 40 hours, about 20 hours to about 44 hours, about 20 hours to about 48 hours, about 24 hours to about 28 hours, about 24 hours to about 32 hours, about 24 hours to about 36 hours, about 24 hours to about 40 hours, about 24 hours to about 44 hours, about 24 hours to about 48 hours, about 28 hours to about 32 hours, about 28 hours to about 36 hours, about 28 hours to about 40 hours, about 28 hours to about 44 hours, about 28 hours to about 48 hours, about 32 hours to about 36 hours, about 32 hours to about 40 hours, about 32 hours to about 44 hours, about 32 hours to about 48 hours, about 36 hours to about 40 hours, about 36 hours to about 44 hours, about 36 hours to about 48 hours, about 40 hours to about 44 hours, about 40 hours to about 48 hours, or about 44 hours to about 48 hours. In some embodiments, the conductive carbon-based epoxy has a curing time at room temperature of about 12 hours, about 16 hours, about 20 hours, about 24 hours, about 28 hours, about 32 hours, about 36 hours, about 40 hours, about 44 hours, or about 48 hours. In some embodiments, the conductive carbon-based epoxy has a curing time at room temperature of at least about 12 hours, about 16 hours, about 20 hours, about 24 hours, about 28 hours, about 32 hours, about 36 hours, about 40 hours, about 44 hours, or about 48 hours. In some embodiments, the conductive carbon-based epoxy has a curing time at room temperature of at most about 12 hours, about 16 hours, about 20 hours, about 24 hours, about 28 hours, about 32 hours, about 36 hours, about 40 hours, about 44 hours, or about 48 hours.

In some embodiments, the conductive carbon-based epoxy has a curing time at a temperature of 65° C. of about 10 minutes to about 40 minutes. In some embodiments, the conductive carbon-based epoxy has a curing time at a temperature of 65° C. of at least about 10 minutes. In some embodiments, the conductive carbon-based epoxy has a curing time at a temperature of 65° C. of at most about 40 minutes. In some embodiments, the conductive carbon-based epoxy has a curing time at a temperature of 65° C. of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some embodiments, the conductive carbon-based epoxy has a curing time at a temperature of 65° C. of about 10 minutes, about 15 minutes, about 20 minutes, about 25 minutes, about 30 minutes, about 35 minutes, or about 40 minutes. In some embodiments, the conductive carbon-based epoxy has a curing time at a temperature of 65° C. of at least about 10 minutes, about 15 minutes, about 20 minutes, about 25 minutes, about 30 minutes, about 35 minutes, or about 40 minutes. In some embodiments, the conductive carbon-based epoxy has a curing time at a temperature of 65° C. of at most about 10 minutes, about 15 minutes, about 20 minutes, about 25 minutes, about 30 minutes, about 35 minutes, or about 40 minutes.

In some embodiments, the conductive carbon-based epoxy has a working time of about 10 minutes to about 40 minutes. In some embodiments, the conductive carbon-based epoxy has a working time of at least about 10 minutes. In some embodiments, the conductive carbon-based epoxy has a working time of at most about 40 minutes. In some embodiments, the conductive carbon-based epoxy has a working time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some embodiments, the conductive carbon-based epoxy has a working time of about 10 minutes, about 15 minutes, about 20 minutes, about 25 minutes, about 30 minutes, about 35 minutes, or about 40 minutes. In some embodiments, the conductive carbon-based epoxy has a working time of at least about 10 minutes, about 15 minutes, about 20 minutes, about 25 minutes, about 30 minutes, about 35 minutes, or about 40 minutes. In some embodiments, the conductive carbon-based epoxy has a working time of at most about 10 minutes, about 15 minutes, about 20 minutes, about 25 minutes, about 30 minutes, about 35 minutes, or about 40 minutes.

In some embodiments, the conductive carbon-based epoxy has a sheet resistance of about 50 ohm/sq to about 300 ohm/sq. In some embodiments, the conductive carbon-based epoxy has a sheet resistance of at least about 50 ohm/sq. In some embodiments, the conductive carbon-based epoxy has a sheet resistance of at most about 300 ohm/sq. In some embodiments, the conductive carbon-based epoxy has a sheet resistance of about 50 ohm/sq to about 75 ohm/sq, about 50 ohm/sq to about 100 ohm/sq, about 50 ohm/sq to about 125 ohm/sq, about 50 ohm/sq to about 150 ohm/sq, about 50 ohm/sq to about 175 ohm/sq, about 50 ohm/sq to about 200 ohm/sq, about 50 ohm/sq to about 225 ohm/sq, about 50 ohm/sq to about 250 ohm/sq, about 50 ohm/sq to about 275 ohm/sq, about 50 ohm/sq to about 300 ohm/sq, about 75 ohm/sq to about 100 ohm/sq, about 75 ohm/sq to about 125 ohm/sq, about 75 ohm/sq to about 150 ohm/sq, about 75 ohm/sq to about 175 ohm/sq, about 75 ohm/sq to about 200 ohm/sq, about 75 ohm/sq to about 225 ohm/sq, about 75 ohm/sq to about 250 ohm/sq, about 75 ohm/sq to about 275 ohm/sq, about 75 ohm/sq to about 300 ohm/sq, about 100 ohm/sq to about 125 ohm/sq, about 100 ohm/sq to about 150 ohm/sq, about 100 ohm/sq to about 175 ohm/sq, about 100 ohm/sq to about 200 ohm/sq, about 100 ohm/sq to about 225 ohm/sq, about 100 ohm/sq to about 250 ohm/sq, about 100 ohm/sq to about 275 ohm/sq, about 100 ohm/sq to about 300 ohm/sq, about 125 ohm/sq to about 150 ohm/sq, about 125 ohm/sq to about 175 ohm/sq, about 125 ohm/sq to about 200 ohm/sq, about 125 ohm/sq to about 225 ohm/sq, about 125 ohm/sq to about 250 ohm/sq, about 125 ohm/sq to about 275 ohm/sq, about 125 ohm/sq to about 300 ohm/sq, about 150 ohm/sq to about 175 ohm/sq, about 150 ohm/sq to about 200 ohm/sq, about 150 ohm/sq to about 225 ohm/sq, about 150 ohm/sq to about 250 ohm/sq, about 150 ohm/sq to about 275 ohm/sq, about 150 ohm/sq to about 300 ohm/sq, about 175 ohm/sq to about 200 ohm/sq, about 175 ohm/sq to about 225 ohm/sq, about 175 ohm/sq to about 250 ohm/sq, about 175 ohm/sq to about 275 ohm/sq, about 175 ohm/sq to about 300 ohm/sq, about 200 ohm/sq to about 225 ohm/sq, about 200 ohm/sq to about 250 ohm/sq, about 200 ohm/sq to about 275 ohm/sq, about 200 ohm/sq to about 300 ohm/sq, about 225 ohm/sq to about 250 ohm/sq, about 225 ohm/sq to about 275 ohm/sq, about 225 ohm/sq to about 300 ohm/sq, about 250 ohm/sq to about 275 ohm/sq, about 250 ohm/sq to about 300 ohm/sq, or about 275 ohm/sq to about 300 ohm/sq. In some embodiments, the conductive carbon-based epoxy has a sheet resistance of about 50 ohm/sq, about 75 ohm/sq, about 100 ohm/sq, about 125 ohm/sq, about 150 ohm/sq, about 175 ohm/sq, about 200 ohm/sq, about 225 ohm/sq, about 250 ohm/sq, about 275 ohm/sq, or about 300 ohm/sq. In some embodiments, the conductive carbon-based epoxy has a sheet resistance of at least about 50 ohm/sq, about 75 ohm/sq, about 100 ohm/sq, about 125 ohm/sq, about 150 ohm/sq, about 175 ohm/sq, about 200 ohm/sq, about 225 ohm/sq, about 250 ohm/sq, about 275 ohm/sq, or about 300 ohm/sq. In some embodiments, the conductive carbon-based epoxy has a sheet resistance of at most about 50 ohm/sq, about 75 ohm/sq, about 100 ohm/sq, about 125 ohm/sq, about 150 ohm/sq, about 175 ohm/sq, about 200 ohm/sq, about 225 ohm/sq, about 250 ohm/sq, about 275 ohm/sq, or about 300 ohm/sq.

In some embodiments, the conductive carbon-based epoxy has a sheet resistance of about 0.3 ohm/sq/mil to about 2 ohm/sq/mil. In some embodiments, the conductive carbon-based epoxy has a sheet resistance of at least about 0.3 ohm/sq/mil. In some embodiments, the conductive carbon-based epoxy has a sheet resistance of at most about 2 ohm/sq/mil. In some embodiments, the conductive carbon-based epoxy has a sheet resistance of about 0.3 ohm/sq/mil to about 0.6 ohm/sq/mil, about 0.3 ohm/sq/mil to about 0.8 ohm/sq/mil, about 0.3 ohm/sq/mil to about 1 ohm/sq/mil, about 0.3 ohm/sq/mil to about 1.2 ohm/sq/mil, about 0.3 ohm/sq/mil to about 1.4 ohm/sq/mil, about 0.3 ohm/sq/mil to about 1.6 ohm/sq/mil, about 0.3 ohm/sq/mil to about 1.8 ohm/sq/mil, about 0.3 ohm/sq/mil to about 2 ohm/sq/mil, about 0.6 ohm/sq/mil to about 0.8 ohm/sq/mil, about 0.6 ohm/sq/mil to about 1 ohm/sq/mil, about 0.6 ohm/sq/mil to about 1.2 ohm/sq/mil, about 0.6 ohm/sq/mil to about 1.4 ohm/sq/mil, about 0.6 ohm/sq/mil to about 1.6 ohm/sq/mil, about 0.6 ohm/sq/mil to about 1.8 ohm/sq/mil, about 0.6 ohm/sq/mil to about 2 ohm/sq/mil, about 0.8 ohm/sq/mil to about 1 ohm/sq/mil, about 0.8 ohm/sq/mil to about 1.2 ohm/sq/mil, about 0.8 ohm/sq/mil to about 1.4 ohm/sq/mil, about 0.8 ohm/sq/mil to about 1.6 ohm/sq/mil, about 0.8 ohm/sq/mil to about 1.8 ohm/sq/mil, about 0.8 ohm/sq/mil to about 2 ohm/sq/mil, about 1 ohm/sq/mil to about 1.2 ohm/sq/mil, about 1 ohm/sq/mil to about 1.4 ohm/sq/mil, about 1 ohm/sq/mil to about 1.6 ohm/sq/mil, about 1 ohm/sq/mil to about 1.8 ohm/sq/mil, about 1 ohm/sq/mil to about 2 ohm/sq/mil, about 1.2 ohm/sq/mil to about 1.4 ohm/sq/mil, about 1.2 ohm/sq/mil to about 1.6 ohm/sq/mil, about 1.2 ohm/sq/mil to about 1.8 ohm/sq/mil, about 1.2 ohm/sq/mil to about 2 ohm/sq/mil, about 1.4 ohm/sq/mil to about 1.6 ohm/sq/mil, about 1.4 ohm/sq/mil to about 1.8 ohm/sq/mil, about 1.4 ohm/sq/mil to about 2 ohm/sq/mil, about 1.6 ohm/sq/mil to about 1.8 ohm/sq/mil, about 1.6 ohm/sq/mil to about 2 ohm/sq/mil, or about 1.8 ohm/sq/mil to about 2 ohm/sq/mil. In some embodiments, the conductive carbon-based epoxy has a sheet resistance of about 0.3 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based epoxy has a sheet resistance of at least about 0.3 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil. In some embodiments, the conductive carbon-based epoxy has a sheet resistance of at most about 0.3 ohm/sq/mil, about 0.6 ohm/sq/mil, about 0.8 ohm/sq/mil, about 1 ohm/sq/mil, about 1.2 ohm/sq/mil, about 1.4 ohm/sq/mil, about 1.6 ohm/sq/mil, about 1.8 ohm/sq/mil, or about 2 ohm/sq/mil.

In some embodiments, the conductive carbon-based epoxy has a conductivity of about 0.15 S/m to about 60 S/m. In some embodiments, the conductive carbon-based epoxy has a conductivity of at least about 0.15 S/m. In some embodiments, the conductive carbon-based epoxy has a conductivity of at most about 60 S/m. In some embodiments, the conductive carbon-based epoxy has a conductivity of about 0.15 S/m to about 0.3 S/m, about 0.15 S/m to about 0.5 S/m, about 0.15 S/m to about 1 S/m, about 0.15 S/m to about 2 S/m, about 0.15 S/m to about 5 S/m, about 0.15 S/m to about 10 S/m, about 0.15 S/m to about 20 S/m, about 0.15 S/m to about 30 S/m, about 0.15 S/m to about 40 S/m, about 0.15 S/m to about 50 S/m, about 0.15 S/m to about 60 S/m, about 0.3 S/m to about 0.5 S/m, about 0.3 S/m to about 1 S/m, about 0.3 S/m to about 2 S/m, about 0.3 S/m to about 5 S/m, about 0.3 S/m to about 10 S/m, about 0.3 S/m to about 20 S/m, about 0.3 S/m to about 30 S/m, about 0.3 S/m to about 40 S/m, about 0.3 S/m to about 50 S/m, about 0.3 S/m to about 60 S/m, about 0.5 S/m to about 1 S/m, about 0.5 S/m to about 2 S/m, about 0.5 S/m to about 5 S/m, about 0.5 S/m to about 10 S/m, about 0.5 S/m to about 20 S/m, about 0.5 S/m to about 30 S/m, about 0.5 S/m to about 40 S/m, about 0.5 S/m to about 50 S/m, about 0.5 S/m to about 60 S/m, about 1 S/m to about 2 S/m, about 1 S/m to about 5 S/m, about 1 S/m to about 10 S/m, about 1 S/m to about 20 S/m, about 1 S/m to about 30 S/m, about 1 S/m to about 40 S/m, about 1 S/m to about 50 S/m, about 1 S/m to about 60 S/m, about 2 S/m to about 5 S/m, about 2 S/m to about 10 S/m, about 2 S/m to about 20 S/m, about 2 S/m to about 30 S/m, about 2 S/m to about 40 S/m, about 2 S/m to about 50 S/m, about 2 S/m to about 60 S/m, about 5 S/m to about 10 S/m, about 5 S/m to about 20 S/m, about 5 S/m to about 30 S/m, about 5 S/m to about 40 S/m, about 5 S/m to about 50 S/m, about 5 S/m to about 60 S/m, about 10 S/m to about 20 S/m, about 10 S/m to about 30 S/m, about 10 S/m to about 40 S/m, about 10 S/m to about 50 S/m, about 10 S/m to about 60 S/m, about 20 S/m to about 30 S/m, about 20 S/m to about 40 S/m, about 20 S/m to about 50 S/m, about 20 S/m to about 60 S/m, about 30 S/m to about 40 S/m, about 30 S/m to about 50 S/m, about 30 S/m to about 60 S/m, about 40 S/m to about 50 S/m, about 40 S/m to about 60 S/m, or about 50 S/m to about 60 S/m. In some embodiments, the conductive carbon-based epoxy has a conductivity of about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m. In some embodiments, the conductive carbon-based epoxy has a conductivity of at least about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m. In some embodiments, the conductive carbon-based epoxy has a conductivity of at most about 0.15 S/m, about 0.3 S/m, about 0.5 S/m, about 1 S/m, about 2 S/m, about 5 S/m, about 10 S/m, about 20 S/m, about 30 S/m, about 40 S/m, about 50 S/m, or about 60 S/m.

In some embodiments, the conductive carbon-based epoxy has a sheet resistance which differs when the conductive carbon-based epoxy is bent at a convex angle of at most 180 degrees, by at most about 0.5%, 0.4%, 0.3%, or 0.2%.

In some embodiments, the conductive carbon-based epoxy has a sheet resistance which differs when the conductive carbon-based epoxy is bent at a concave angle of at most 180 degrees of at most about 0.5%, 0.4%, 0.3%, 0.2%, 0.15%, or 0.1%.

In some embodiments, the conductive carbon-based epoxy has a sheet resistance which differs when the conductive carbon-based epoxy is stretched under 20% strain by at most about 5%, 4%, 3,%, 2%, or 1%.

In some embodiments, the conductive carbon-based epoxy has a sheet resistance which differs when the conductive carbon-based epoxy is stretched under 50% strain by at most about 20%, 17%, 15%, 12%, or 10%.

In some embodiments, the conductive carbon-based epoxy further comprises a pigment, a colorant, a dye, or any combination thereof. In some embodiments, the conductive carbon-based epoxy comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof.

In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof.

In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black 5170, Color Black 5150, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Another aspect provided herein is a method of forming a conductive carbon-based glue comprising forming a carbon-based material and adding an adhesive agent to the carbon-based material.

In some embodiments, the carbon-based material comprises graphene, graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

In some embodiments, the carbon-based material comprises a percentage by weight of the adhesive agent of about 60% to about 99.9%. In some embodiments, the carbon-based material comprises a percentage by weight of the adhesive agent of at least about 60%. In some embodiments, the carbon-based material comprises a percentage by weight of the adhesive agent of at most about 99.9%. In some embodiments, the carbon-based material comprises a percentage by weight of the adhesive agent of about 60% to about 65%, about 60% to about 70%, about 60% to about 75%, about 60% to about 80%, about 60% to about 85%, about 60% to about 90%, about 60% to about 95%, about 60% to about 96%, about 60% to about 97%, about 60% to about 99%, about 60% to about 99.9%, about 65% to about 70%, about 65% to about 75%, about 65% to about 80%, about 65% to about 85%, about 65% to about 90%, about 65% to about 95%, about 65% to about 96%, about 65% to about 97%, about 65% to about 99%, about 65% to about 99.9%, about 70% to about 75%, about 70% to about 80%, about 70% to about 85%, about 70% to about 90%, about 70% to about 95%, about 70% to about 96%, about 70% to about 97%, about 70% to about 99%, about 70% to about 99.9%, about 75% to about 80%, about 75% to about 85%, about 75% to about 90%, about 75% to about 95%, about 75% to about 96%, about 75% to about 97%, about 75% to about 99%, about 75% to about 99.9%, about 80% to about 85%, about 80% to about 90%, about 80% to about 95%, about 80% to about 96%, about 80% to about 97%, about 80% to about 99%, about 80% to about 99.9%, about 85% to about 90%, about 85% to about 95%, about 85% to about 96%, about 85% to about 97%, about 85% to about 99%, about 85% to about 99.9%, about 90% to about 95%, about 90% to about 96%, about 90% to about 97%, about 90% to about 99%, about 90% to about 99.9%, about 95% to about 96%, about 95% to about 97%, about 95% to about 99%, about 95% to about 99.9%, about 96% to about 97%, about 96% to about 99%, about 96% to about 99.9%, about 97% to about 99%, about 97% to about 99.9%, or about 99% to about 99.9%. In some embodiments, the carbon-based material comprises a percentage by weight of the adhesive agent of about 60%, about 65%, about 70%, about 75%, about 80%, about 85%, about 90%, about 95%, about 96%, about 97%, about 99%, or about 99.9%. In some embodiments, the carbon-based material comprises a percentage by weight of the adhesive agent of at least about 60%, about 65%, about 70%, about 75%, about 80%, about 85%, about 90%, about 95%, about 96%, about 97%, about 99%, or about 99.9%. In some embodiments, the carbon-based material comprises a percentage by weight of the adhesive agent of at most about 60%, about 65%, about 70%, about 75%, about 80%, about 85%, about 90%, about 95%, about 96%, about 97%, about 99%, or about 99.9%.

In some embodiments, the carbon-based material comprises graphene, wherein a percentage by weight of the graphene in the carbon-based material is about 0.1% to about 10%. In some embodiments, the carbon-based material comprises graphene, wherein a percentage by weight of the graphene in the carbon-based material is at least about 0.1%. In some embodiments, the carbon-based material comprises graphene, wherein a percentage by weight of the graphene in the carbon-based material is at most about 10%. In some embodiments, the carbon-based material comprises graphene, wherein a percentage by weight of the graphene in the carbon-based material is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, the carbon-based material comprises graphene, wherein a percentage by weight of the graphene in the carbon-based material is about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at least about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at most about 0.1%, about 0.2%, about 0.5%, about 1%, about 2%, about 3%, about 4%, about 5%, about 6%, about 7%, about 8%, or about 10%.

In some embodiments, the carbon-based material comprises graphite powder, wherein a percentage by weight of the graphite powder in the carbon-based material is about 1% to about 40%. In some embodiments, the carbon-based material comprises graphite powder, wherein a percentage by weight of the graphite powder in the carbon-based material is at least about 1%. In some embodiments, the carbon-based material comprises graphite powder, wherein a percentage by weight of the graphite powder in the carbon-based material is at most about 40%. In some embodiments, the carbon-based material comprises graphite powder, wherein a percentage by weight of the graphite powder in the carbon-based material is about 1% to about 2%, about 1% to about 5%, about 1% to about 10%, about 1% to about 15%, about 1% to about 20%, about 1% to about 25%, about 1% to about 30%, about 1% to about 35%, about 1% to about 40%, about 2% to about 5%, about 2% to about 10%, about 2% to about 15%, about 2% to about 20%, about 2% to about 25%, about 2% to about 30%, about 2% to about 35%, about 2% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, the carbon-based material comprises graphite powder, wherein a percentage by weight of the graphite powder in the carbon-based material is about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at least about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at most about 1%, about 2%, about 5%, about 10%, about 15%, about 20%, about 25%, about 30%, about 35%, or about 40%.

In some embodiments, the adhesive agent comprises carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof. Some embodiments further comprise adding a conductive filler to the carbon-based material and the adhesive agent. In some embodiments, the conductive filler comprises silver. In some embodiments, the silver comprises silver nanoparticles, silver nanorods, silver nanowires, silver nanoflowers, silver nanofibers, silver nanoplatelets, silver nanoribbons, silver nanocubes, silver bipyramids, or any combination thereof. Some embodiments further comprise adding a thinner to the carbon-based material and the adhesive agent. In some embodiments, the thinner comprises butyl acetate, lacquer thinner, acetone, petroleum naphtha, mineral spirits, xylene, or any combination thereof.

Another aspect provided herein is a method of forming a conductive carbon-based epoxy comprising forming a resin comprising a carbon-based material and an adhesive agent and adding a hardener to the resin.

In some embodiments, the carbon-based material comprises graphene, graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

In some embodiments, the carbon-based material comprises a percentage by weight of the resin of about 60% to about 99.9%. In some embodiments, the carbon-based material comprises a percentage by weight of the resin of at least about 60%. In some embodiments, the carbon-based material comprises a percentage by weight of the resin of at most about 99.9%. In some embodiments, the carbon-based material comprises a percentage by weight of the resin of about 60% to about 65%, about 60% to about 70%, about 60% to about 75%, about 60% to about 80%, about 60% to about 85%, about 60% to about 90%, about 60% to about 95%, about 60% to about 96%, about 60% to about 97%, about 60% to about 99%, about 60% to about 99.9%, about 65% to about 70%, about 65% to about 75%, about 65% to about 80%, about 65% to about 85%, about 65% to about 90%, about 65% to about 95%, about 65% to about 96%, about 65% to about 97%, about 65% to about 99%, about 65% to about 99.9%, about 70% to about 75%, about 70% to about 80%, about 70% to about 85%, about 70% to about 90%, about 70% to about 95%, about 70% to about 96%, about 70% to about 97%, about 70% to about 99%, about 70% to about 99.9%, about 75% to about 80%, about 75% to about 85%, about 75% to about 90%, about 75% to about 95%, about 75% to about 96%, about 75% to about 97%, about 75% to about 99%, about 75% to about 99.9%, about 80% to about 85%, about 80% to about 90%, about 80% to about 95%, about 80% to about 96%, about 80% to about 97%, about 80% to about 99%, about 80% to about 99.9%, about 85% to about 90%, about 85% to about 95%, about 85% to about 96%, about 85% to about 97%, about 85% to about 99%, about 85% to about 99.9%, about 90% to about 95%, about 90% to about 96%, about 90% to about 97%, about 90% to about 99%, about 90% to about 99.9%, about 95% to about 96%, about 95% to about 97%, about 95% to about 99%, about 95% to about 99.9%, about 96% to about 97%, about 96% to about 99%, about 96% to about 99.9%, about 97% to about 99%, about 97% to about 99.9%, or about 99% to about 99.9%. In some embodiments, the carbon-based material comprises a percentage by weight of the resin of about 60%, about 65%, about 70%, about 75%, about 80%, about 85%, about 90%, about 95%, about 96%, about 97%, about 99%, or about 99.9%. In some embodiments, the carbon-based material comprises a percentage by weight of the resin of at least about 60%, about 65%, about 70%, about 75%, about 80%, about 85%, about 90%, about 95%, about 96%, about 97%, about 99%, or about 99.9%. In some embodiments, the carbon-based material comprises a percentage by weight of the resin of at most about 60%, about 65%, about 70%, about 75%, about 80%, about 85%, about 90%, about 95%, about 96%, about 97%, about 99%, or about 99.9%.

In some embodiments, the carbon-based material comprises graphene, wherein a percentage by weight of the graphene in the carbon-based material is about 0.1% to about 10%. In some embodiments, the carbon-based material comprises graphene, wherein a percentage by weight of the graphene in the carbon-based material is at least about 0.1%. In some embodiments, the carbon-based material comprises graphene, wherein a percentage by weight of the graphene in the carbon-based material is at most about 10%. In some embodiments, the carbon-based material comprises graphene, wherein a percentage by weight of the graphene in the carbon-based material is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, the carbon-based material comprises graphene, wherein a percentage by weight of the graphene in the carbon-based material is about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at least about 0.1%, about 0.2%, about 0.5%, about 1%, about 2%, about 3%, about 4%, about 5%, about 6%, about 7%, about 8%, or about 10%. In some embodiments, the carbon-based material comprises graphene, wherein a percentage by weight of the graphene in the carbon-based material is at most about 0.1%, about 0.2%, about 0.5%, about 1%, about 2%, about 3%, about 4%, about 5%, about 6%, about 7%, about 8%, or about 10%.

In some embodiments, the carbon-based material comprises graphite powder, wherein a percentage by weight of the graphite powder in the carbon-based material is about 1% to about 40%. In some embodiments, the carbon-based material comprises graphite powder, wherein a percentage by weight of the graphite powder in the carbon-based material is at least about 1%. In some embodiments, the carbon-based material comprises graphite powder, wherein a percentage by weight of the graphite powder in the carbon-based material is at most about 40%. In some embodiments, the carbon-based material comprises graphite powder, wherein a percentage by weight of the graphite powder in the carbon-based material is about 1% to about 2%, about 1% to about 5%, about 1% to about 10%, about 1% to about 15%, about 1% to about 20%, about 1% to about 25%, about 1% to about 30%, about 1% to about 35%, about 1% to about 40%, about 2% to about 5%, about 2% to about 10%, about 2% to about 15%, about 2% to about 20%, about 2% to about 25%, about 2% to about 30%, about 2% to about 35%, about 2% to about 40%, about 5% to about 10%, about 5% to about 15%, about 5% to about 20%, about 5% to about 25%, about 5% to about 30%, about 5% to about 35%, about 5% to about 40%, about 10% to about 15%, about 10% to about 20%, about 10% to about 25%, about 10% to about 30%, about 10% to about 35%, about 10% to about 40%, about 15% to about 20%, about 15% to about 25%, about 15% to about 30%, about 15% to about 35%, about 15% to about 40%, about 20% to about 25%, about 20% to about 30%, about 20% to about 35%, about 20% to about 40%, about 25% to about 30%, about 25% to about 35%, about 25% to about 40%, about 30% to about 35%, about 30% to about 40%, or about 35% to about 40%. In some embodiments, the carbon-based material comprises graphite powder, wherein a percentage by weight of the graphite powder in the carbon-based material is about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at least about 1%, about 2%, about 5%, about 10%, about 15%, about 20%, about 25%, about 30%, about 35%, or about 40%. In some embodiments, the carbon-based material comprises graphite powder, wherein a percentage by weight of the graphite powder in the carbon-based material is at most about 1%, about 2%, about 5%, about 10%, about 15%, about 20%, about 25%, about 30%, about 35%, or about 40%.

In some embodiments, the adhesive agent comprises carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof. Some embodiments further comprise adding a conductive filler to the resin and the hardener. In some embodiments, the conductive filler comprises silver. In some embodiments, the silver comprises silver nanoparticles, silver nanorods, silver nanowires, silver nanoflowers, silver nanofibers, silver nanoplatelets, silver nanoribbons, silver nanocubes, silver bipyramids, or any combination thereof. Some embodiments further comprise adding a thinner to the resin and the hardener. In some embodiments, the thinner comprises butyl acetate, lacquer thinner, acetone, petroleum naphtha, mineral spirits, xylene, or any combination thereof.

In some embodiments, the method of forming a conductive carbon-based epoxy further comprises adding a pigment, a colorant, a dye, or any combination thereof. In some embodiments, the method of forming a conductive carbon-based epoxy further comprises adding at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof.

In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof.

In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black S170, Color Black S150, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Another aspect provided herein is a method of forming silver nanowires comprising: heating a solvent; adding a catalyst solution and a polymer solution to the glycol to form a first solution; injecting a silver-based solution into the first solution to form a second solution; centrifuging the second solution; and washing the second solution with a washing solution to extract the silver nanowires.

In some embodiments, the solvent comprises a glycol. In some embodiments the glycol comprises ethylene glycol, polyethylene glycol 200, polyethylene glycol 400, propylene glycol, or any combination thereof.

In some embodiments, the solvent comprises a polymer solution. In some embodiments, the polymer solution comprises a polymer comprising polyvinyl pyrrolidone, sodium dodecyl sulfonate, vitamin B2, poly(vinyl alcohol), dextrin, poly(methyl vinyl ether), or any combination thereof.

In some embodiments, the polymer has a molecular weight of about 10,000 to about 40,000. In some embodiments, the polymer has a molecular weight of at least about 10,000. In some embodiments, the polymer has a molecular weight of at most about 40,000. In some embodiments, the polymer has a molecular weight of about 10,000 to about 12,500, about 10,000 to about 15,000, about 10,000 to about 17,500, about 10,000 to about 20,000, about 10,000 to about 22,500, about 10,000 to about 25,000, about 10,000 to about 27,500, about 10,000 to about 30,000, about 10,000 to about 35,000, about 10,000 to about 40,000, about 12,500 to about 15,000, about 12,500 to about 17,500, about 12,500 to about 20,000, about 12,500 to about 22,500, about 12,500 to about 25,000, about 12,500 to about 27,500, about 12,500 to about 30,000, about 12,500 to about 35,000, about 12,500 to about 40,000, about 15,000 to about 17,500, about 15,000 to about 20,000, about 15,000 to about 22,500, about 15,000 to about 25,000, about 15,000 to about 27,500, about 15,000 to about 30,000, about 15,000 to about 35,000, about 15,000 to about 40,000, about 17,500 to about 20,000, about 17,500 to about 22,500, about 17,500 to about 25,000, about 17,500 to about 27,500, about 17,500 to about 30,000, about 17,500 to about 35,000, about 17,500 to about 40,000, about 20,000 to about 22,500, about 20,000 to about 25,000, about 20,000 to about 27,500, about 20,000 to about 30,000, about 20,000 to about 35,000, about 20,000 to about 40,000, about 22,500 to about 25,000, about 22,500 to about 27,500, about 22,500 to about 30,000, about 22,500 to about 35,000, about 22,500 to about 40,000, about 25,000 to about 27,500, about 25,000 to about 30,000, about 25,000 to about 35,000, about 25,000 to about 40,000, about 27,500 to about 30,000, about 27,500 to about 35,000, about 27,500 to about 40,000, about 30,000 to about 35,000, about 30,000 to about 40,000, or about 35,000 to about 40,000. In some embodiments, the polymer has a molecular weight of about 10,000, about 12,500, about 15,000, about 17,500, about 20,000, about 22,500, about 25,000, about 27,500, about 30,000, about 35,000, or about 40,000. In some embodiments, the polymer has a molecular weight of at least about 10,000, about 12,500, about 15,000, about 17,500, about 20,000, about 22,500, about 25,000, about 27,500, about 30,000, about 35,000, or about 40,000. In some embodiments, the polymer has a molecular weight of at most about 10,000, about 12,500, about 15,000, about 17,500, about 20,000, about 22,500, about 25,000, about 27,500, about 30,000, about 35,000, or about 40,000.

In some embodiments, the polymer solution has a concentration of about 0.075 M to about 0.25 M. In some embodiments, the polymer solution has a concentration of at least about 0.075 M. In some embodiments, the polymer solution has a concentration of at most about 0.25 M. In some embodiments, the polymer solution has a concentration of about 0.075 M to about 0.1 M, about 0.075 M to about 0.125 M, about 0.075 M to about 0.15 M, about 0.075 M to about 0.175 M, about 0.075 M to about 0.2 M, about 0.075 M to about 0.225 M, about 0.075 M to about 0.25 M, about 0.1 M to about 0.125 M, about 0.1 M to about 0.15 M, about 0.1 M to about 0.175 M, about 0.1 M to about 0.2 M, about 0.1 M to about 0.225 M, about 0.1 M to about 0.25 M, about 0.125 M to about 0.15 M, about 0.125 M to about 0.175 M, about 0.125 M to about 0.2 M, about 0.125 M to about 0.225 M, about 0.125 M to about 0.25 M, about 0.15 M to about 0.175 M, about 0.15 M to about 0.2 M, about 0.15 M to about 0.225 M, about 0.15 M to about 0.25 M, about 0.175 M to about 0.2 M, about 0.175 M to about 0.225 M, about 0.175 M to about 0.25 M, about 0.2 M to about 0.225 M, about 0.2 M to about 0.25 M, or about 0.225 M to about 0.25 M. In some embodiments, the polymer solution has a concentration of about 0.075 M, about 0.1 M, about 0.125 M, about 0.15 M, about 0.175 M, about 0.2 M, about 0.225 M, or about 0.25 M. In some embodiments, the polymer solution has a concentration of at least about 0.075 M, about 0.1 M, about 0.125 M, about 0.15 M, about 0.175 M, about 0.2 M, about 0.225 M, or about 0.25 M. In some embodiments, the polymer solution has a concentration of at most about 0.075 M, about 0.1 M, about 0.125 M, about 0.15 M, about 0.175 M, about 0.2 M, about 0.225 M, or about 0.25 M.

In some embodiments, the solvent is heated to a temperature of about 75° C. to about 300° C. In some embodiments, the solvent is heated to a temperature of at least about 75° C. In some embodiments, the solvent is heated to a temperature of at most about 300° C. In some embodiments, the solvent is heated to a temperature of about 75° C. to about 100° C., about 75° C. to about 125° C., about 75° C. to about 150° C., about 75° C. to about 175° C., about 75° C. to about 200° C., about 75° C. to about 225° C., about 75° C. to about 250° C., about 75° C. to about 275° C., about 75° C. to about 300° C., about 100° C. to about 125° C., about 100° C. to about 150° C., about 100° C. to about 175° C., about 100° C. to about 200° C., about 100° C. to about 225° C., about 100° C. to about 250° C., about 100° C. to about 275° C., about 100° C. to about 300° C., about 125° C. to about 150° C., about 125° C. to about 175° C., about 125° C. to about 200° C., about 125° C. to about 225° C., about 125° C. to about 250° C., about 125° C. to about 275° C., about 125° C. to about 300° C., about 150° C. to about 175° C., about 150° C. to about 200° C., about 150° C. to about 225° C., about 150° C. to about 250° C., about 150° C. to about 275° C., about 150° C. to about 300° C., about 175° C. to about 200° C., about 175° C. to about 225° C., about 175° C. to about 250° C., about 175° C. to about 275° C., about 175° C. to about 300° C., about 200° C. to about 225° C., about 200° C. to about 250° C., about 200° C. to about 275° C., about 200° C. to about 300° C., about 225° C. to about 250° C., about 225° C. to about 275° C., about 225° C. to about 300° C., about 250° C. to about 275° C., about 250° C. to about 300° C., or about 275° C. to about 300° C. In some embodiments, the solvent is heated to a temperature of about 75° C., about 100° C., about 125° C., about 150° C., about 175° C., about 200° C., about 225° C., about 250° C., about 275° C., or about 300° C. In some embodiments, the solvent is heated to a temperature of at least about 75° C., about 100° C., about 125° C., about 150° C., about 175° C., about 200° C., about 225° C., about 250° C., about 275° C., or about 300° C. In some embodiments, the solvent is heated to a temperature of at most about 75° C., about 100° C., about 125° C., about 150° C., about 175° C., about 200° C., about 225° C., about 250° C., about 275° C., or about 300° C.

In some embodiments, the solvent is heated for a period of time of about 30 minutes to about 120 minutes. In some embodiments, the solvent is heated for a period of time of at least about 30 minutes. In some embodiments, the solvent is heated for a period of time of at most about 120 minutes. In some embodiments, the solvent is heated for a period of time of about 30 minutes to about 40 minutes, about 30 minutes to about 50 minutes, about 30 minutes to about 60 minutes, about 30 minutes to about 70 minutes, about 30 minutes to about 80 minutes, about 30 minutes to about 90 minutes, about 30 minutes to about 100 minutes, about 30 minutes to about 110 minutes, about 30 minutes to about 120 minutes, about 40 minutes to about 50 minutes, about 40 minutes to about 60 minutes, about 40 minutes to about 70 minutes, about 40 minutes to about 80 minutes, about 40 minutes to about 90 minutes, about 40 minutes to about 100 minutes, about 40 minutes to about 110 minutes, about 40 minutes to about 120 minutes, about 50 minutes to about 60 minutes, about 50 minutes to about 70 minutes, about 50 minutes to about 80 minutes, about 50 minutes to about 90 minutes, about 50 minutes to about 100 minutes, about 50 minutes to about 110 minutes, about 50 minutes to about 120 minutes, about 60 minutes to about 70 minutes, about 60 minutes to about 80 minutes, about 60 minutes to about 90 minutes, about 60 minutes to about 100 minutes, about 60 minutes to about 110 minutes, about 60 minutes to about 120 minutes, about 70 minutes to about 80 minutes, about 70 minutes to about 90 minutes, about 70 minutes to about 100 minutes, about 70 minutes to about 110 minutes, about 70 minutes to about 120 minutes, about 80 minutes to about 90 minutes, about 80 minutes to about 100 minutes, about 80 minutes to about 110 minutes, about 80 minutes to about 120 minutes, about 90 minutes to about 100 minutes, about 90 minutes to about 110 minutes, about 90 minutes to about 120 minutes, about 100 minutes to about 110 minutes, about 100 minutes to about 120 minutes, or about 110 minutes to about 120 minutes. In some embodiments, the solvent is heated for a period of time of about 30 minutes, about 40 minutes, about 50 minutes, about 60 minutes, about 70 minutes, about 80 minutes, about 90 minutes, about 100 minutes, about 110 minutes, or about 120 minutes. In some embodiments, the solvent is heated for a period of time of at least about 30 minutes, about 40 minutes, about 50 minutes, about 60 minutes, about 70 minutes, about 80 minutes, about 90 minutes, about 100 minutes, about 110 minutes, or about 120 minutes. In some embodiments, the solvent is heated for a period of time of at most about 30 minutes, about 40 minutes, about 50 minutes, about 60 minutes, about 70 minutes, about 80 minutes, about 90 minutes, about 100 minutes, about 110 minutes, or about 120 minutes.

In some embodiments, the solvent is stirred while being heated. In some embodiments, the stirring is performed by a magnetic stir bar.

In some embodiments, the stirring is performed at a rate of about 100 rpm to about 400 rpm. In some embodiments, the stirring is performed at a rate of at least about 100 rpm. In some embodiments, the stirring is performed at a rate of at most about 400 rpm. In some embodiments, the stirring is performed at a rate of about 100 rpm to about 125 rpm, about 100 rpm to about 150 rpm, about 100 rpm to about 175 rpm, about 100 rpm to about 200 rpm, about 100 rpm to about 225 rpm, about 100 rpm to about 250 rpm, about 100 rpm to about 275 rpm, about 100 rpm to about 300 rpm, about 100 rpm to about 350 rpm, about 100 rpm to about 400 rpm, about 125 rpm to about 150 rpm, about 125 rpm to about 175 rpm, about 125 rpm to about 200 rpm, about 125 rpm to about 225 rpm, about 125 rpm to about 250 rpm, about 125 rpm to about 275 rpm, about 125 rpm to about 300 rpm, about 125 rpm to about 350 rpm, about 125 rpm to about 400 rpm, about 150 rpm to about 175 rpm, about 150 rpm to about 200 rpm, about 150 rpm to about 225 rpm, about 150 rpm to about 250 rpm, about 150 rpm to about 275 rpm, about 150 rpm to about 300 rpm, about 150 rpm to about 350 rpm, about 150 rpm to about 400 rpm, about 175 rpm to about 200 rpm, about 175 rpm to about 225 rpm, about 175 rpm to about 250 rpm, about 175 rpm to about 275 rpm, about 175 rpm to about 300 rpm, about 175 rpm to about 350 rpm, about 175 rpm to about 400 rpm, about 200 rpm to about 225 rpm, about 200 rpm to about 250 rpm, about 200 rpm to about 275 rpm, about 200 rpm to about 300 rpm, about 200 rpm to about 350 rpm, about 200 rpm to about 400 rpm, about 225 rpm to about 250 rpm, about 225 rpm to about 275 rpm, about 225 rpm to about 300 rpm, about 225 rpm to about 350 rpm, about 225 rpm to about 400 rpm, about 250 rpm to about 275 rpm, about 250 rpm to about 300 rpm, about 250 rpm to about 350 rpm, about 250 rpm to about 400 rpm, about 275 rpm to about 300 rpm, about 275 rpm to about 350 rpm, about 275 rpm to about 400 rpm, about 300 rpm to about 350 rpm, about 300 rpm to about 400 rpm, or about 350 rpm to about 400 rpm. In some embodiments, the stirring is performed at a rate of about 100 rpm, about 125 rpm, about 150 rpm, about 175 rpm, about 200 rpm, about 225 rpm, about 250 rpm, about 275 rpm, about 300 rpm, about 350 rpm, or about 400 rpm. In some embodiments, the stirring is performed at a rate of at least about 100 rpm, about 125 rpm, about 150 rpm, about 175 rpm, about 200 rpm, about 225 rpm, about 250 rpm, about 275 rpm, about 300 rpm, about 350 rpm, or about 400 rpm. In some embodiments, the stirring is performed at a rate of at most about 100 rpm, about 125 rpm, about 150 rpm, about 175 rpm, about 200 rpm, about 225 rpm, about 250 rpm, about 275 rpm, about 300 rpm, about 350 rpm, or about 400 rpm.

In some embodiments, the catalyst solution comprises a catalyst comprising (a chloride) $CuCl_2$, CuCl, NaCl, $PtCl_2$, AgCl, $FeCl_2$, $FeCl_3$, tetrapropylammonium chloride, tetrapropylammonium bromide, or any combination thereof.

In some embodiments, the catalyst solution has a concentration of about 2 mM to about 8 mM. In some embodiments, the catalyst solution has a concentration of at least about 2 mM. In some embodiments, the catalyst solution has a concentration of at most about 8 mM. In some embodiments, the catalyst solution has a concentration of about 2 mM to about 2.5 mM, about 2 mM to about 3 mM, about 2 mM to about 3.5 mM, about 2 mM to about 4 mM, about 2 mM to about 4.5 mM, about 2 mM to about 5 mM, about 2 mM to about 5.5 mM, about 2 mM to about 6 mM, about 2 mM to about 6.5 mM, about 2 mM to about 7 mM, about 2 mM to about 8 mM, about 2.5 mM to about 3 mM, about 2.5 mM to about 3.5 mM, about 2.5 mM to about 4 mM, about 2.5 mM to about 4.5 mM, about 2.5 mM to about 5 mM, about 2.5 mM to about 5.5 mM, about 2.5 mM to about 6 mM, about 2.5 mM to about 6.5 mM, about 2.5 mM to about 7 mM, about 2.5 mM to about 8 mM, about 3 mM to about 3.5 mM, about 3 mM to about 4 mM, about 3 mM to about 4.5 mM, about 3 mM to about 5 mM, about 3 mM to about 5.5 mM, about 3 mM to about 6 mM, about 3 mM to about 6.5 mM, about 3 mM to about 7 mM, about 3 mM to about 8 mM, about 3.5 mM to about 4 mM, about 3.5 mM to about 4.5 mM, about 3.5 mM to about 5 mM, about 3.5 mM to about 5.5 mM, about 3.5 mM to about 6 mM, about 3.5 mM to about 6.5 mM, about 3.5 mM to about 7 mM, about 3.5 mM to about 8 mM, about 4 mM to about 4.5 mM, about 4 mM to about 5 mM, about 4 mM to about 5.5 mM, about 4 mM to about 6 mM, about 4 mM to about 6.5 mM, about 4 mM to about 7 mM, about 4 mM to about 8 mM, about 4.5 mM to about 5 mM, about 4.5 mM to about 5.5 mM, about 4.5 mM to about 6 mM, about 4.5 mM to about 6.5 mM, about 4.5 mM to about 7 mM, about 4.5 mM to about 8 mM, about 5 mM to about 5.5 mM, about 5 mM to about 6 mM, about 5 mM to about 6.5 mM, about 5 mM to about 7 mM, about 5 mM to about 8 mM, about 5.5 mM to about 6 mM, about 5.5 mM to about 6.5 mM, about 5.5 mM to about 7 mM, about 5.5 mM to about 8 mM, about 6 mM to about 6.5 mM, about 6 mM to about 7 mM, about 6 mM to about 8 mM, about 6.5 mM to about 7 mM, about 6.5 mM to about 8 mM, or about 7 mM to about 8 mM. In some embodiments, the catalyst solution has a concentration of about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM. In some embodiments, the catalyst solution has a concentration of at least about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM. In some embodiments, the catalyst solution has a concentration of at most about 2 mM, about 2.5 mM, about 3 mM, about 3.5 mM, about 4 mM, about 4.5 mM, about 5 mM, about 5.5 mM, about 6 mM, about 6.5 mM, about 7 mM, or about 8 mM.

In some embodiments, the volume of the solvent is greater than the volume of the catalyst solution by a factor of about 75 to about 250. In some embodiments, the volume of the solvent is greater than the volume of the catalyst solution by a factor of at least about 75. In some embodiments, the volume of the solvent is greater than the volume of the catalyst solution by a factor of at most about 250. In some embodiments, the volume of the solvent is greater than the volume of the catalyst solution by a factor of about 75 to about 100, about 75 to about 125, about 75 to about 150, about 75 to about 175, about 75 to about 200, about 75 to about 225, about 75 to about 250, about 100 to about 125, about 100 to about 150, about 100 to about 175, about 100 to about 200, about 100 to about 225, about 100 to about 250, about 125 to about 150, about 125 to about 175, about 125 to about 200, about 125 to about 225, about 125 to about 250, about 150 to about 175, about 150 to about 200, about 150 to about 225, about 150 to about 250, about 175 to about 200, about 175 to about 225, about 175 to about 250, about 200 to about 225, about 200 to about 250, or about 225 to about 250. In some embodiments, the volume of the solvent is greater than the volume of the catalyst solution by a factor of about 75, about 100, about 125, about 150, about 175, about 200, about 225, or about 250. In some embodiments, the volume of the solvent is greater than the volume of the catalyst solution by a factor of at least about 75, about 100, about 125, about 150, about 175, about 200, about 225, or about 250. In some embodiments, the volume of the solvent is greater than the volume of the catalyst solution by a factor of at most about 75, about 100, about 125, about 150, about 175, about 200, about 225, or about 250.

In some embodiments, the volume of the solvent is greater than the volume of the polymer solution by a factor of about 1.5 to about 6.5. In some embodiments, the volume of the solvent is greater than the volume of the polymer solution by a factor of at least about 1.5. In some embodiments, the volume of the solvent is greater than the volume of the polymer solution by a factor of at most about 6.5. In some embodiments, the volume of the solvent is greater than the volume of the polymer solution by a factor of about 1.5 to about 2, about 1.5 to about 2.5, about 1.5 to about 3, about 1.5 to about 3.5, about 1.5 to about 4, about 1.5 to about 4.5, about 1.5 to about 5, about 1.5 to about 5.5, about 1.5 to about 6, about 1.5 to about 6.5, about 2 to about 2.5, about 2 to about 3, about 2 to about 3.5, about 2 to about 4, about 2 to about 4.5, about 2 to about 5, about 2 to about 5.5, about 2 to about 6, about 2 to about 6.5, about 2.5 to about 3, about 2.5 to about 3.5, about 2.5 to about 4, about 2.5 to about 4.5, about 2.5 to about 5, about 2.5 to about 5.5, about 2.5 to about 6, about 2.5 to about 6.5, about 3 to about 3.5, about 3 to about 4, about 3 to about 4.5, about 3 to about 5, about 3 to about 5.5, about 3 to about 6, about 3 to about 6.5, about 3.5 to about 4, about 3.5 to about 4.5, about 3.5 to about 5, about 3.5 to about 5.5, about 3.5 to about 6, about 3.5 to about 6.5, about 4 to about 4.5, about 4 to about 5, about 4 to about 5.5, about 4 to about 6, about 4 to about 6.5, about 4.5 to about 5, about 4.5 to about 5.5, about 4.5 to about 6, about 4.5 to about 6.5, about 5 to about 5.5, about 5 to about 6, about 5 to about 6.5, about 5.5 to about 6, about 5.5 to about 6.5, or about 6 to about 6.5. In some embodiments, the volume of the solvent is greater than the volume of the polymer solution by a factor of about 1.5, about 2, about 2.5, about 3, about 3.5, about 4, about 4.5, about 5, about 5.5, about 6, or about 6.5. In some embodiments, the volume of the solvent is greater than the volume of the polymer solution by a factor of at least about 1.5, about 2, about 2.5, about 3, about 3.5, about 4, about 4.5, about 5, about 5.5, about 6, or about 6.5. In some embodiments, the volume of the solvent is greater than the volume of the polymer solution by a factor of at most about 1.5, about 2, about 2.5, about 3, about 3.5, about 4, about 4.5, about 5, about 5.5, about 6, or about 6.5

In some embodiments, the silver-based solution comprises a silver-based material comprising $AgNO_3$.

In some embodiments, the silver-based solution has a concentration of about 0.05 M to about 0.2 M. In some embodiments, the silver-based solution has a concentration of at least about 0.05 M. In some embodiments, the silver-based solution has a concentration of at most about 0.2 M. In some embodiments, the silver-based solution has a concentration of about 0.05 M to about 0.075 M, about 0.05 M to about 0.1 M, about 0.05 M to about 0.125 M, about 0.05 M to about 0.15 M, about 0.05 M to about 0.175 M, about 0.05 M to about 0.2 M, about 0.075 M to about 0.1 M, about 0.075 M to about 0.125 M, about 0.075 M to about 0.15 M, about 0.075 M to about 0.175 M, about 0.075 M to about 0.2 M, about 0.1 M to about 0.125 M, about 0.1 M to about 0.15 M, about 0.1 M to about 0.175 M, about 0.1 M to about 0.2 M, about 0.125 M to about 0.15 M, about 0.125 M to about 0.175 M, about 0.125 M to about 0.2 M, about 0.15 M to about 0.175 M, about 0.15 M to about 0.2 M, or about 0.175 M to about 0.2 M. In some embodiments, the silver-based solution has a concentration of about 0.05 M, about 0.075 M, about 0.1 M, about 0.125 M, about 0.15 M, about 0.175 M, or about 0.2 M.

In some embodiments, the volume of the solvent is greater than the volume of the silver-based solution by a factor of about 1.5 to about 6.5. In some embodiments, the volume of the solvent is greater than the volume of the silver-based solution by a factor of at least about 1.5. In some embodiments, the volume of the solvent is greater than the volume of the silver-based solution by a factor of at most about 6.5. In some embodiments, the volume of the solvent is greater than the volume of the silver-based solution by a factor of about 1.5 to about 2, about 1.5 to about 2.5, about 1.5 to about 3, about 1.5 to about 3.5, about 1.5 to about 4, about 1.5 to about 4.5, about 1.5 to about 5, about 1.5 to about 5.5, about 1.5 to about 6, about 1.5 to about 6.5, about 2 to about 2.5, about 2 to about 3, about 2 to about 3.5, about 2 to about 4, about 2 to about 4.5, about 2 to about 5, about 2 to about 5.5, about 2 to about 6, about 2 to about 6.5, about 2.5 to about 3, about 2.5 to about 3.5, about 2.5 to about 4, about 2.5 to about 4.5, about 2.5 to about 5, about 2.5 to about 5.5, about 2.5 to about 6, about 2.5 to about 6.5, about 3 to about 3.5, about 3 to about 4, about 3 to about 4.5, about 3 to about 5, about 3 to about 5.5, about 3 to about 6, about 3 to about 6.5, about 3.5 to about 4, about 3.5 to about 4.5, about 3.5 to about 5, about 3.5 to about 5.5, about 3.5 to about 6, about 3.5 to about 6.5, about 4 to about 4.5, about 4 to about 5, about 4 to about 5.5, about 4 to about 6, about 4 to about 6.5, about 4.5 to about 5, about 4.5 to about 5.5, about 4.5 to about 6, about 4.5 to about 6.5, about 5 to about 5.5, about 5 to about 6, about 5 to about 6.5, about 5.5 to about 6, about 5.5 to about 6.5, or about 6 to about 6.5. In some embodiments, the volume of the solvent is greater than the volume of the silver-based solution by a factor of about 1.5, about 2, about 2.5, about 3, about 3.5, about 4, about 4.5, about 5, about 5.5, about 6, or about 6.5. In some embodiments, the volume of the solvent is greater than the volume of the silver-based solution by a factor of at least about 1.5, about 2, about 2.5, about 3, about 3.5, about 4, about 4.5, about 5, about 5.5, about 6, or about 6.5. In some embodiments, the volume of the solvent is greater than the volume of the silver-based solution by a factor of at most about 1.5, about 2, about 2.5, about 3, about 3.5, about 4, about 4.5, about 5, about 5.5, about 6, or about 6.5.

In some embodiments, the silver-based solution is injected into the first solution over a period of time of about 1 second to about 900 seconds. In some embodiments, the silver-based solution is injected into the first solution over a period of time of at least about 1 second. In some embodiments, the silver-based solution is injected into the first solution over a period of time of at most about 900 seconds. In some embodiments, the silver-based solution is injected into the first solution over a period of time of about 1 second to about 2 seconds, about 1 second to about 5 seconds, about 1 second to about 10 seconds, about 1 second to about 50 seconds, about 1 second to about 100 seconds, about 1 second to about 200 seconds, about 1 second to about 300 seconds, about 1 second to about 400 seconds, about 1 second to about 600 seconds, about 1 second to about 800 seconds, about 1 second to about 900 seconds, about 2 seconds to about 5 seconds, about 2 seconds to about 10 seconds, about 2 seconds to about 50 seconds, about 2 seconds to about 100 seconds, about 2 seconds to about 200 seconds, about 2 seconds to about 300 seconds, about 2 seconds to about 400 seconds, about 2 seconds to about 600 seconds, about 2 seconds to about 800 seconds, about 2 seconds to about 900 seconds, about 5 seconds to about 10 seconds, about 5 seconds to about 50 seconds, about 5 seconds to about 100 seconds, about 5 seconds to about 200 seconds, about 5 seconds to about 300 seconds, about 5 seconds to about 400 seconds, about 5 seconds to about 600 seconds, about 5 seconds to about 800 seconds, about 5 seconds to about 900 seconds, about 10 seconds to about 50 seconds, about 10 seconds to about 100 seconds, about 10 seconds to about 200 seconds, about 10 seconds to about 300 seconds, about 10 seconds to about 400 seconds, about 10 seconds to about 600 seconds, about 10 seconds to about 800 seconds, about 10 seconds to about 900 seconds, about 50 seconds to about 100 seconds, about 50 seconds to about 200 seconds, about 50 seconds to about 300 seconds, about 50 seconds to about 400 seconds, about 50 seconds to about 600 seconds, about 50 seconds to about 800 seconds, about 50 seconds to about 900 seconds, about 100 seconds to about 200 seconds, about 100 seconds to about 300 seconds, about 100 seconds to about 400 seconds, about 100 seconds to about 600 seconds, about 100 seconds to about 800 seconds, about 100 seconds to about 900 seconds, about 200 seconds to about 300 seconds, about 200 seconds to about 400 seconds, about 200 seconds to about 600 seconds, about 200 seconds to about 800 seconds, about 200 seconds to about 900 seconds, about 300 seconds to about 400 seconds, about 300 seconds to about 600 seconds, about 300 seconds to about 800 seconds, about 300 seconds to about 900 seconds, about 400 seconds to about 600 seconds, about 400 seconds to about 800 seconds, about 400 seconds to about 900 seconds, about 600 seconds to about 800 seconds, about 600 seconds to about 900 seconds, or about 800 seconds to about 900 seconds. In some embodiments, the silver-based solution is injected into the first solution over a period of time of about 1 second, about 2 seconds, about 5 seconds, about 10 seconds, about 50 seconds, about 100 seconds, about 200 seconds, about 300 seconds, about 400 seconds, about 600 seconds, about 800 seconds, or about 900 seconds. In some embodiments, the silver-based solution is injected into the first solution over a period of time of at least about 1 second, about 2 seconds, about 5 seconds, about 10 seconds, about 50 seconds, about 100 seconds, about 200 seconds, about 300 seconds, about 400 seconds, about 600 seconds, about 800 seconds, or about 900 seconds. In some embodiments, the silver-based solution is injected into the first solution over a period of time of at most about 1 second, about 2 seconds, about 5 seconds, about 10 seconds, about 50 seconds, about 100 seconds, about 200 seconds, about 300 seconds, about 400 seconds, about 600 seconds, about 800 seconds, or about 900 seconds.

Some embodiments further comprise heating the second solution before the process of centrifuging the second solution.

In some embodiments, the heating of the second solution occurs over a period of time of about 30 minutes to about 120 minutes. In some embodiments, the heating of the second solution occurs over a period of time of at least about 30 minutes. In some embodiments, the heating of the second solution occurs over a period of time of at most about 120 minutes. In some embodiments, the heating of the second solution occurs over a period of time of about 30 minutes to about 40 minutes, about 30 minutes to about 50 minutes, about 30 minutes to about 60 minutes, about 30 minutes to about 70 minutes, about 30 minutes to about 80 minutes, about 30 minutes to about 90 minutes, about 30 minutes to about 100 minutes, about 30 minutes to about 110 minutes, about 30 minutes to about 120 minutes, about 40 minutes to about 50 minutes, about 40 minutes to about 60 minutes, about 40 minutes to about 70 minutes, about 40 minutes to about 80 minutes, about 40 minutes to about 90 minutes, about 40 minutes to about 100 minutes, about 40 minutes to about 110 minutes, about 40 minutes to about 120 minutes, about 50 minutes to about 60 minutes, about 50 minutes to about 70 minutes, about 50 minutes to about 80 minutes, about 50 minutes to about 90 minutes, about 50 minutes to about 100 minutes, about 50 minutes to about 110 minutes, about 50 minutes to about 120 minutes, about 60 minutes to about 70 minutes, about 60 minutes to about 80 minutes, about 60 minutes to about 90 minutes, about 60 minutes to about 100 minutes, about 60 minutes to about 110 minutes, about 60 minutes to about 120 minutes, about 70 minutes to about 80 minutes, about 70 minutes to about 90 minutes, about 70 minutes to about 100 minutes, about 70 minutes to about 110 minutes, about 70 minutes to about 120 minutes, about 80 minutes to about 90 minutes, about 80 minutes to about 100 minutes, about 80 minutes to about 110 minutes, about 80 minutes to about 120 minutes, about 90 minutes to about 100 minutes, about 90 minutes to about 110 minutes, about 90 minutes to about 120 minutes, about 100 minutes to about 110 minutes, about 100 minutes to about 120 minutes, or about 110 minutes to about 120 minutes. In some embodiments, the heating of the second solution occurs over a period of time of about 30 minutes, about 40 minutes, about 50 minutes, about 60 minutes, about 70 minutes, about 80 minutes, about 90 minutes, about 100 minutes, about 110 minutes, or about 120 minutes. In some embodiments, the heating of the second solution occurs over a period of time of at least about 30 minutes, about 40 minutes, about 50 minutes, about 60 minutes, about 70 minutes, about 80 minutes, about 90 minutes, about 100 minutes, about 110 minutes, or about 120 minutes. In some embodiments, the heating of the second solution occurs over a period of time of at most about 30 minutes, about 40 minutes, about 50 minutes, about 60 minutes, about 70 minutes, about 80 minutes, about 90 minutes, about 100 minutes, about 110 minutes, or about 120 minutes.

In some embodiments, the centrifuging occurs at a speed of about 1,500 rpm to about 6,000 rpm. In some embodiments, the centrifuging occurs at a speed of at least about 1,500 rpm. In some embodiments, the centrifuging occurs at a speed of at most about 6,000 rpm. In some embodiments, the centrifuging occurs at a speed of about 1,500 rpm to about 2,000 rpm, about 1,500 rpm to about 2,500 rpm, about 1,500 rpm to about 3,000 rpm, about 1,500 rpm to about 3,500 rpm, about 1,500 rpm to about 4,000 rpm, about 1,500 rpm to about 4,500 rpm, about 1,500 rpm to about 5,000 rpm, about 1,500 rpm to about 5,500 rpm, about 1,500 rpm to about 6,000 rpm, about 2,000 rpm to about 2,500 rpm, about 2,000 rpm to about 3,000 rpm, about 2,000 rpm to about 3,500 rpm, about 2,000 rpm to about 4,000 rpm, about 2,000 rpm to about 4,500 rpm, about 2,000 rpm to about 5,000 rpm, about 2,000 rpm to about 5,500 rpm, about 2,000 rpm to about 6,000 rpm, about 2,500 rpm to about 3,000 rpm, about 2,500 rpm to about 3,500 rpm, about 2,500 rpm to about 4,000 rpm, about 2,500 rpm to about 4,500 rpm, about 2,500 rpm to about 5,000 rpm, about 2,500 rpm to about 5,500 rpm, about 2,500 rpm to about 6,000 rpm, about 3,000 rpm to about 3,500 rpm, about 3,000 rpm to about 4,000 rpm, about 3,000 rpm to about 4,500 rpm, about 3,000 rpm to about 5,000 rpm, about 3,000 rpm to about 5,500 rpm, about 3,000 rpm to about 6,000 rpm, about 3,500 rpm to about 4,000 rpm, about 3,500 rpm to about 4,500 rpm, about 3,500 rpm to about 5,000 rpm, about 3,500 rpm to about 5,500 rpm, about 3,500 rpm to about 6,000 rpm, about 4,000 rpm to about 4,500 rpm, about 4,000 rpm to about 5,000 rpm, about 4,000 rpm to about 5,500 rpm, about 4,000 rpm to about 6,000 rpm, about 4,500 rpm to about 5,000 rpm, about 4,500 rpm to about 5,500 rpm, about 4,500 rpm to about 6,000 rpm, about 5,000 rpm to about 5,500 rpm, about 5,000 rpm to about 6,000 rpm, or about 5,500 rpm to about 6,000 rpm. In some embodiments, the centrifuging occurs at a speed of about 1,500 rpm, about 2,000 rpm, about 2,500 rpm, about 3,000 rpm, about 3,500 rpm, about 4,000 rpm, about 4,500 rpm, about 5,000 rpm, about 5,500 rpm, or about 6,000 rpm. In some embodiments, the centrifuging occurs at a speed of at least about 1,500 rpm, about 2,000 rpm, about 2,500 rpm, about 3,000 rpm, about 3,500 rpm, about 4,000 rpm, about 4,500 rpm, about 5,000 rpm, about 5,500 rpm, or about 6,000 rpm. In some embodiments, the centrifuging occurs at a speed of at most about 1,500 rpm, about 2,000 rpm, about 2,500 rpm, about 3,000 rpm, about 3,500 rpm, about 4,000 rpm, about 4,500 rpm, about 5,000 rpm, about 5,500 rpm, or about 6,000 rpm.

In some embodiments, the centrifuging occurs over a period of time of about 10 minutes to about 40 minutes. In some embodiments, the centrifuging occurs over a period of time of at least about 10 minutes. In some embodiments, the centrifuging occurs over a period of time of at most about 40 minutes. In some embodiments, the centrifuging occurs over a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 15 minutes to about 20 minutes, about 15 minutes to about 25 minutes, about 15 minutes to about 30 minutes, about 15 minutes to about 35 minutes, about 15 minutes to about 40 minutes, about 20 minutes to about 25 minutes, about 20 minutes to about 30 minutes, about 20 minutes to about 35 minutes, about 20 minutes to about 40 minutes, about 25 minutes to about 30 minutes, about 25 minutes to about 35 minutes, about 25 minutes to about 40 minutes, about 30 minutes to about 35 minutes, about 30 minutes to about 40 minutes, or about 35 minutes to about 40 minutes. In some embodiments, the centrifuging occurs over a period of time of about 10 minutes, about 15 minutes, about 20 minutes, about 25 minutes, about 30 minutes, about 35 minutes, or about 40 minutes. In some embodiments, the centrifuging occurs over a period of time of at least about 10 minutes, about 15 minutes, about 20 minutes, about 25 minutes, about 30 minutes, about 35 minutes, or about 40 minutes. In some embodiments, the centrifuging occurs over a period of time of at most about 10 minutes, about 15 minutes, about 20 minutes, about 25 minutes, about 30 minutes, about 35 minutes, or about 40 minutes.

Some embodiments further comprise cooling the second solution before the process of centrifuging the second solution. In some embodiments, the second solution is cooled to room temperature. In some embodiments, the washing solution comprises ethanol, acetone, water, or any combination thereof.

In some embodiments, washing the second solution comprises a plurality of washing cycles comprising about two cycles to about six cycles. In some embodiments, washing the second solution comprises a plurality of washing cycles comprising at least about two cycles. In some embodiments, washing the second solution comprises a plurality of washing cycles comprising at most about six cycles. In some embodiments, washing the second solution comprises a plurality of washing cycles comprising about two cycles to about three cycles, about two cycles to about four cycles, about two cycles to about five cycles, about two cycles to about six cycles, about three cycles to about four cycles, about three cycles to about five cycles, about three cycles to about six cycles, about four cycles to about five cycles, about four cycles to about six cycles, or about five cycles to about six cycles. In some embodiments, washing the second solution comprises a plurality of washing cycles comprising about two cycles, about three cycles, about four cycles, about five cycles, or about six cycles.

Some embodiments further comprise dispersing the silver nanowires in a dispersing solution. In some embodiments, the dispersing solution comprises ethanol, acetone, and water, or any combination thereof.

In some embodiments, the method is performed in open air. In some embodiments, the method is performed in a solvothermal chamber. In some embodiments, the method is performed under high pressure.

Another aspect provided herein is a conductive ink. The conductive ink may comprise a conductive additive. The conductive additive may comprise a carbon-based conductive additive, a silver-based conductive additive, or both. The conductive ink may comprise a conductive carbon-based ink. The conductive ink may comprise a conductive silver-based ink. The conductive carbon-based ink may comprise a conductive graphene-based ink. The conductive graphene-based ink may comprise: a binder solution comprising: a binder and a first solvent; a reduced graphene oxide dispersion comprising reduced graphene oxide, and a second solvent; a third solvent; a conductive additive; a surfactant; and a defoamer.

In some embodiments, the conductive ink further comprises a pigment, a colorant, a dye, or any combination thereof. In some embodiments, the conductive ink comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof.

In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof.

In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black S170, Color Black S150, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

In some embodiments, at least one of the first solvent, the second solvent, and the third solvent comprises water and an organic solvent. In some embodiments, the organic solvent comprises ethanol, isopropyl alcohol, N-methyl-2-pyrrolidone, cyclohexanone, terpineol, 3-methoxy-3-methyl-1-butanol, 4-hydroxyl-4-methyl-pentan-2-one, methyl isobutyl ketone, or any combination thereof.

In some embodiments, a percentage by mass of at least one of the first solvent, the second solvent, and the third solvent in the conductive ink is about 1% to about 99%. In some embodiments, a percentage by mass of at least one of the first solvent, the second solvent, and the third solvent in the conductive ink is at least about 1%. In some embodiments, a percentage by mass of at least one of the first solvent, the second solvent, and the third solvent in the conductive ink is at most about 99%. In some embodiments, a percentage by mass of at least one of the first solvent, the second solvent, and the third solvent in the conductive ink is about 1% to about 2%, about 1% to about 5%, about 1% to about 10%, about 1% to about 20%, about 1% to about 30%, about 1% to about 40%, about 1% to about 50%, about 1% to about 60%, about 1% to about 70%, about 1% to about 80%, about 1% to about 99%, about 2% to about 5%, about 2% to about 10%, about 2% to about 20%, about 2% to about 30%, about 2% to about 40%, about 2% to about 50%, about 2% to about 60%, about 2% to about 70%, about 2% to about 80%, about 2% to about 99%, about 5% to about 10%, about 5% to about 20%, about 5% to about 30%, about 5% to about 40%, about 5% to about 50%, about 5% to about 60%, about 5% to about 70%, about 5% to about 80%, about 5% to about 99%, about 10% to about 20%, about 10% to about 30%, about 10% to about 40%, about 10% to about 50%, about 10% to about 60%, about 10% to about 70%, about 10% to about 80%, about 10% to about 99%, about 20% to about 30%, about 20% to about 40%, about 20% to about 50%, about 20% to about 60%, about 20% to about 70%, about 20% to about 80%, about 20% to about 99%, about 30% to about 40%, about 30% to about 50%, about 30% to about 60%, about 30% to about 70%, about 30% to about 80%, about 30% to about 99%, about 40% to about 50%, about 40% to about 60%, about 40% to about 70%, about 40% to about 80%, about 40% to about 99%, about 50% to about 60%, about 50% to about 70%, about 50% to about 80%, about 50% to about 99%, about 60% to about 70%, about 60% to about 80%, about 60% to about 99%, about 70% to about 80%, about 70% to about 99%, or about 80% to about 99%. In some embodiments, a percentage by mass of at least one of the first solvent, the second solvent, and the third solvent in the conductive ink is about 1%, about 2%, about 5%, about 10%, about 20%, about 30%, about 40%, about 50%, about 60%, about 70%, about 80%, or about 99%. In some embodiments, a percentage by mass of at least one of the first solvent, the second solvent, and the third solvent in the conductive ink is at least about 1%, about 2%, about 5%, about 10%, about 20%, about 30%, about 40%, about 50%, about 60%, about 70%, or about 80%. In some embodiments, a percentage by mass of at least one of the first solvent, the second solvent, and the third solvent in the conductive ink is at most about 2%, about 5%, about 10%, about 20%, about 30%, about 40%, about 50%, about 60%, about 70%, about 80%, or about 99%.

In some embodiments, the binder solution comprises a binder and a first solvent. In some embodiments, the binder comprises a polymer. In some embodiments, the polymer comprises a synthetic polymer. In some embodiments, the synthetic polymer comprises carboxymethyl cellulose, polyvinylidene fluoride, poly(vinyl alcohol), poly(vinyl pyrrolidone), poly(ethylene oxide), ethyl cellulose, or any combination thereof. In some embodiments, the binder is a dispersant. In some embodiments, the binder comprises carboxymethyl cellulose, polyvinylidene fluoride, poly(vinyl alcohol), poly(vinyl pyrrolidone), poly(ethylene oxide), ethyl cellulose, or any combination thereof.

In some embodiments, a percentage by mass of the binder solution in the conductive ink is about 0.5% to about 99%. In some embodiments, a percentage by mass of the binder solution in the conductive ink is at least about 0.5%. In some embodiments, a percentage by mass of the binder solution in the conductive ink is at most about 99%. In some embodiments, a percentage by mass of the binder solution in the conductive ink is about 0.5% to about 1%, about 0.5% to about 2%, about 0.5% to about 5%, about 0.5% to about 10%, about 0.5% to about 20%, about 0.5% to about 30%, about 0.5% to about 40%, about 0.5% to about 50%, about 0.5% to about 70%, about 0.5% to about 90%, about 0.5% to about 99%, about 1% to about 2%, about 1% to about 5%, about 1% to about 10%, about 1% to about 20%, about 1% to about 30%, about 1% to about 40%, about 1% to about 50%, about 1% to about 70%, about 1% to about 90%, about 1% to about 99%, about 2% to about 5%, about 2% to about 10%, about 2% to about 20%, about 2% to about 30%, about 2% to about 40%, about 2% to about 50%, about 2% to about 70%, about 2% to about 90%, about 2% to about 99%, about 5% to about 10%, about 5% to about 20%, about 5% to about 30%, about 5% to about 40%, about 5% to about 50%, about 5% to about 70%, about 5% to about 90%, about 5% to about 99%, about 10% to about 20%, about 10% to about 30%, about 10% to about 40%, about 10% to about 50%, about 10% to about 70%, about 10% to about 90%, about 10% to about 99%, about 20% to about 30%, about 20% to about 40%, about 20% to about 50%, about 20% to about 70%, about 20% to about 90%, about 20% to about 99%, about 30% to about 40%, about 30% to about 50%, about 30% to about 70%, about 30% to about 90%, about 30% to about 99%, about 40% to about 50%, about 40% to about 70%, about 40% to about 90%, about 40% to about 99%, about 50% to about 70%, about 50% to about 90%, about 50% to about 99%, about 70% to about 90%, about 70% to about 99%, or about 90% to about 99%. In some embodiments, a percentage by mass of the binder solution in the conductive ink is at most about 99%. In some embodiments, a percentage by mass of the binder solution in the conductive ink is about 0.5%, about 1%, about 2%, about 5%, about 10%, about 20%, about 30%, about 40%, about 50%, about 70%, about 90%, or about 99%. In some embodiments, a percentage by mass of the binder solution in the conductive ink is at least about 0.5%, about 1%, about 2%, about 5%, about 10%, about 20%, about 30%, about 40%, about 50%, about 60%, about 70%, about 80%, about 90%, about 95%, or about 99%. Alternatively or in combination, in some embodiments, a percentage by mass of the binder solution in the conductive ink is no more than about 0.5%, about 1%, about 2%, about 5%, about 10%, about 20%, about 30%, about 40%, about 50%, about 60%, about 70%, about 80%, about 90%, about 95%, or about 99%.

In some embodiments, a concentration of the binder solution is about 0.5% to about 2%. In some embodiments, a concentration of the binder solution is at least about 0.5%. In some embodiments, a concentration of the binder solution is at most about 2%. In some embodiments, a concentration of the binder solution is about 0.5% to about 0.625%, about 0.5% to about 0.75%, about 0.5% to about 0.875%, about 0.5% to about 1%, about 0.5% to about 1.25%, about 0.5% to about 1.5%, about 0.5% to about 1.75%, about 0.5% to about 2%, about 0.625% to about 0.75%, about 0.625% to about 0.875%, about 0.625% to about 1%, about 0.625% to about 1.25%, about 0.625% to about 1.5%, about 0.625% to about 1.75%, about 0.625% to about 2%, about 0.75% to about 0.875%, about 0.75% to about 1%, about 0.75% to about 1.25%, about 0.75% to about 1.5%, about 0.75% to about 1.75%, about 0.75% to about 2%, about 0.875% to about 1%, about 0.875% to about 1.25%, about 0.875% to about 1.5%, about 0.875% to about 1.75%, about 0.875% to about 2%, about 1% to about 1.25%, about 1% to about 1.5%, about 1% to about 1.75%, about 1% to about 2%, about 1.25% to about 1.5%, about 1.25% to about 1.75%, about 1.25% to about 2%, about 1.5% to about 1.75%, about 1.5% to about 2%, or about 1.75% to about 2%. In some embodiments, a concentration of the binder solution is about 0.5%, about 0.625%, about 0.75%, about 0.875%, about 1%, about 1.25%, about 1.5%, about 1.75%, or about 2%. In some embodiments, a concentration of the binder solution is at least about 0.5%, about 0.625%, about 0.75%, about 0.875%, about 1%, about 1.25%, about 1.5%, about 1.75%, or about 2%. In some embodiments, a concentration of the binder solution is no more than about 0.5%, about 0.625%, about 0.75%, about 0.875%, about 1%, about 1.25%, about 1.5%, about 1.75%, or about 2%.

In some embodiments, the reduced graphene oxide dispersion comprises reduced graphene oxide (RGO) and a second solvent.

In some embodiments, a percentage by mass of the RGO dispersion in the conductive ink is about 0.25% to about 1%. In some embodiments, a percentage by mass of the RGO dispersion in the conductive ink is at least about 0.25%. In some embodiments, a percentage by mass of the RGO dispersion in the conductive ink is at most about 1%. In some embodiments, a percentage by mass of the RGO dispersion in the conductive ink is about 0.25% to about 0.375%, about 0.25% to about 0.5%, about 0.25% to about 0.625%, about 0.25% to about 0.75%, about 0.25% to about 1%, about 0.375% to about 0.5%, about 0.375% to about 0.625%, about 0.375% to about 0.75%, about 0.375% to about 1%, about 0.5% to about 0.625%, about 0.5% to about 0.75%, about 0.5% to about 1%, about 0.625% to about 0.75%, about 0.625% to about 1%, or about 0.75% to about 1%. In some embodiments, a percentage by mass of the RGO dispersion in the conductive ink is about 0.25%, about 0.375%, about 0.5%, about 0.625%, about 0.75%, or about 1%. In some embodiments, a percentage by mass of the RGO dispersion in the conductive ink is at least about 0.25%, about 0.375%, about 0.5%, about 0.625%, about 0.75%, or about 1%. In some embodiments, a percentage by mass of the RGO dispersion in the conductive ink is no more than about 0.25%, about 0.375%, about 0.5%, about 0.625%, about 0.75%, or about 1%.

In some embodiments, a concentration by mass of the RGO in the RGO dispersion is about 3% to about 12%. In some embodiments, a concentration by mass of the RGO in the RGO dispersion is at least about 3%. In some embodiments, a concentration by mass of the RGO in the RGO dispersion is at most about 12%. In some embodiments, a concentration by mass of the RGO in the RGO dispersion is about 3% to about 4%, about 3% to about 5%, about 3% to about 6%, about 3% to about 7%, about 3% to about 8%, about 3% to about 9%, about 3% to about 10%, about 3% to about 11%, about 3% to about 12%, about 4% to about 5%, about 4% to about 6%, about 4% to about 7%, about 4% to about 8%, about 4% to about 9%, about 4% to about 10%, about 4% to about 11%, about 4% to about 12%, about 5% to about 6%, about 5% to about 7%, about 5% to about 8%, about 5% to about 9%, about 5% to about 10%, about 5% to about 11%, about 5% to about 12%, about 6% to about 7%, about 6% to about 8%, about 6% to about 9%, about 6% to about 10%, about 6% to about 11%, about 6% to about 12%, about 7% to about 8%, about 7% to about 9%, about 7% to about 10%, about 7% to about 11%, about 7% to about 12%, about 8% to about 9%, about 8% to about 10%, about 8% to about 11%, about 8% to about 12%, about 9% to about 10%, about 9% to about 11%, about 9% to about 12%, about 10% to about 11%, about 10% to about 12%, or about 11% to about 12%. In some embodiments, a concentration by mass of the RGO in the RGO dispersion is about 3%, about 4%, about 5%, about 6%, about 7%, about 8%, about 9%, about 10%, about 11%, or about 12%. In some embodiments, a concentration by mass of the RGO in the RGO dispersion is at least about 3%, about 4%, about 5%, about 6%, about 7%, about 8%, about 9%, about 10%, about 11%, or about 12%. In some embodiments, a concentration by mass of the RGO in the RGO dispersion is no more than about 3%, about 4%, about 5%, about 6%, about 7%, about 8%, about 9%, about 10%, about 11%, or about 12%.

In some embodiments, a percentage by mass of the RGO in the conductive ink is about 0.1% to about 99%. In some embodiments, a percentage by mass of the RGO in the conductive ink is at least about 0.1%. In some embodiments, a percentage by mass of the RGO in the conductive ink is at most about 99%. In some embodiments, a percentage by mass of the RGO in the conductive ink is about 0.1% to about 0.2%, about 0.1% to about 0.5%, about 0.1% to about 1%, about 0.1% to about 10%, about 0.1% to about 20%, about 0.1% to about 40%, about 0.1% to about 60%, about 0.1% to about 80%, about 0.1% to about 90%, about 0.1% to about 99%, about 0.2% to about 0.5%, about 0.2% to about 1%, about 0.2% to about 10%, about 0.2% to about 20%, about 0.2% to about 40%, about 0.2% to about 60%, about 0.2% to about 80%, about 0.2% to about 90%, about 0.2% to about 99%, about 0.5% to about 1%, about 0.5% to about 10%, about 0.5% to about 20%, about 0.5% to about 40%, about 0.5% to about 60%, about 0.5% to about 80%, about 0.5% to about 90%, about 0.5% to about 99%, about 1% to about 10%, about 1% to about 20%, about 1% to about 40%, about 1% to about 60%, about 1% to about 80%, about 1% to about 90%, about 1% to about 99%, about 10% to about 20%, about 10% to about 40%, about 10% to about 60%, about 10% to about 80%, about 10% to about 90%, about 10% to about 99%, about 20% to about 40%, about 20% to about 60%, about 20% to about 80%, about 20% to about 90%, about 20% to about 99%, about 40% to about 60%, about 40% to about 80%, about 40% to about 90%, about 40% to about 99%, about 60% to about 80%, about 60% to about 90%, about 60% to about 99%, about 80% to about 90%, about 80% to about 99%, or about 90% to about 99%. In some embodiments, a percentage by mass of the RGO in the conductive ink is about 0.1%, about 0.2%, about 0.5%, about 1%, about 10%, about 20%, about 40%, about 60%, about 80%, about 90%, or about 99%. In some embodiments, a percentage by mass of the RGO in the conductive ink is at least about 0.1%, about 0.2%, about 0.5%, about 1%, about 10%, about 20%, about 40%, about 60%, about 80%, about 90%, or about 99%. In some embodiments, a percentage by mass of the RGO in the conductive ink is no more than about 0.1%, about 0.2%, about 0.5%, about 1%, about 10%, about 20%, about 40%, about 60%, about 80%, about 90%, or about 99%.

In some embodiments, the conductive additive comprises a carbon-based material. In some embodiments, the carbon-based material comprises a paracrystalline carbon. In some embodiments, the paracrystalline carbon comprises carbon black, acetylene black, channel black, furnace black, lamp black, thermal black, or any combination thereof.

In some embodiments, the conductive additive comprises silver. In some embodiments, the silver comprises silver nanoparticles, silver nanorods, silver nanowires, silver nanoflowers, silver nanofibers, silver nanoplatelets, silver nanoribbons, silver nanocubes, silver bipyramids, or any combination thereof.

In some embodiments, a percentage by mass of the conductive additive in the conductive ink is about 2% to about 99%. In some embodiments, a percentage by mass of the conductive additive in the conductive ink is at least about 2%. In some embodiments, a percentage by mass of the conductive additive in the conductive ink is at most about 99%. In some embodiments, a percentage by mass of the conductive additive in the conductive ink is about 2% to about 5%, about 2% to about 10%, about 2% to about 20%, about 2% to about 30%, about 2% to about 40%, about 2% to about 50%, about 2% to about 60%, about 2% to about 70%, about 2% to about 80%, about 2% to about 90%, about 2% to about 99%, about 5% to about 10%, about 5% to about 20%, about 5% to about 30%, about 5% to about 40%, about 5% to about 50%, about 5% to about 60%, about 5% to about 70%, about 5% to about 80%, about 5% to about 90%, about 5% to about 99%, about 10% to about 20%, about 10% to about 30%, about 10% to about 40%, about 10% to about 50%, about 10% to about 60%, about 10% to about 70%, about 10% to about 80%, about 10% to about 90%, about 10% to about 99%, about 20% to about 30%, about 20% to about 40%, about 20% to about 50%, about 20% to about 60%, about 20% to about 70%, about 20% to about 80%, about 20% to about 90%, about 20% to about 99%, about 30% to about 40%, about 30% to about 50%, about 30% to about 60%, about 30% to about 70%, about 30% to about 80%, about 30% to about 90%, about 30% to about 99%, about 40% to about 50%, about 40% to about 60%, about 40% to about 70%, about 40% to about 80%, about 40% to about 90%, about 40% to about 99%, about 50% to about 60%, about 50% to about 70%, about 50% to about 80%, about 50% to about 90%, about 50% to about 99%, about 60% to about 70%, about 60% to about 80%, about 60% to about 90%, about 60% to about 99%, about 70% to about 80%, about 70% to about 90%, about 70% to about 99%, about 80% to about 90%, about 80% to about 99%, or about 90% to about 99%. In some embodiments, a percentage by mass of the conductive additive in the conductive ink is about 2%, about 5%, about 10%, about 20%, about 30%, about 40%, about 50%, about 60%, about 70%, about 80%, about 90%, or about 99%. In some embodiments, a percentage by mass of the conductive additive in the conductive ink is at least about 2%, about 5%, about 10%, about 20%, about 30%, about 40%, about 50%, about 60%, about 70%, about 80%, about 90%, or about 99%. In some embodiments, a percentage by mass of the conductive additive in the conductive ink is no more than about 2%, about 5%, about 10%, about 20%, about 30%, about 40%, about 50%, about 60%, about 70%, about 80%, about 90%, or about 99%.

Some embodiments further comprise a surfactant. In some embodiments, the surfactant comprises an acid, a nonionic surfactant, or any combination thereof. In some embodiments, the acid comprises perfluorooctanoic acid, perfluorooctane sulfonate, perfluorohexane sulfonic acid, perfluorononanoic acid, perfluorodecanoic acid, or any combination thereof. In some embodiments, the nonionic surfactant comprises a polyethylene glycol alkyl ether, a octaethylene glycol monododecyl ether, a pentaethylene glycol monododecyl ether, a polypropylene glycol alkyl ether, a glucoside alkyl ether, decyl glucoside, lauryl glucoside, octyl glucoside, a polyethylene glycol octylphenyl ether, dodecyldimethylamine oxide, a polyethylene glycol alkylphenyl ether, a polyethylene glycol octylphenyl ether, Triton X-100, polyethylene glycol alkylphenyl ether, nonoxynol-9, a glycerol alkyl ester polysorbate, sorbitan alkyl ester, polyethoxylated tallow amine, Dynol 604, or any combination thereof.

In some embodiments, high quantities of water in water-based conductive inks increase the surface tension of the ink. In some applications, such as in inkjet printing, however, a low, controlled surface tension and viscosity is required to maintain consistent jetting through the printhead nozzles. In some embodiments, the addition of a surfactant reduces the surface tension of an ink because as the surfactant units move to the water/air interface, their relative force of attraction weakens as the non-polar surfactant heads become exposed.

In some embodiments, a percentage by mass of the surfactant in the conductive ink is about 0.5% to about 10%. In some embodiments, a percentage by mass of the surfactant in the conductive ink is at least about 0.5%. In some embodiments, a percentage by mass of the surfactant in the conductive ink is at most about 10%. In some embodiments, a percentage by mass of the surfactant in the conductive ink is about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10%, or about 9% to about 10%. In some embodiments, a percentage by mass of the surfactant in the conductive ink is about 0.5%, about 1%, about 2%, about 3%, about 4%, about 5%, about 6%, about 7%, about 8%, about 9%, or about 10%. In some embodiments, a percentage by mass of the surfactant in the conductive ink is at least about 0.5%, about 1%, about 2%, about 3%, about 4%, about 5%, about 6%, about 7%, about 8%, about 9%, or about 10%. In some embodiments, a percentage by mass of the surfactant in the conductive ink is no more than about 0.5%, about 1%, about 2%, about 3%, about 4%, about 5%, about 6%, about 7%, about 8%, about 9%, or about 10%.

Some embodiments further comprise a defoamer, wherein the defoamer comprises an insoluble oil, a silicone, a glycol, a stearate, an organic solvent, Surfynol DF-1100, alkyl polyacrylate, or any combination thereof. In some embodiments, the insoluble oil comprises mineral oil, vegetable oil, white oil, or any combination thereof. In some embodiments, the silicone comprises polydimethylsiloxane, silicone glycol, a fluorosilicone, or any combination thereof. In some embodiments, the glycol comprises polyethylene glycol, ethylene glycol, propylene glycol, or any combination thereof. In some embodiments, the stearate comprises glycol stearate, stearin, or any combination thereof. In some embodiments, the organic solvent comprises ethanol, isopropyl alcohol, N-methyl-2-pyrrolidone, cyclohexanone, terpineol, 3-methoxy-3-methyl-1-butanol, 4-hydroxyl-4-methyl-pentan-2-one, methyl isobutyl ketone, or any combination thereof.

In some embodiments, a percentage by mass of the defoamer in the conductive ink is about 0.5% to about 10%. In some embodiments, a percentage by mass of the defoamer in the conductive ink is at least about 0.5%. In some embodiments, a percentage by mass of the defoamer in the conductive ink is at most about 10%. In some embodiments, a percentage by mass of the defoamer in the conductive ink is about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10%, or about 9% to about 10%. In some embodiments, a percentage by mass of the defoamer in the conductive ink is about 0.5%, about 1%, about 2%, about 3%, about 4%, about 5%, about 6%, about 7%, about 8%, about 9%, or about 10%. In some embodiments, a percentage by mass of the defoamer in the conductive ink is at least about 0.5%, about 1%, about 2%, about 3%, about 4%, about 5%, about 6%, about 7%, about 8%, about 9%, or about 10%. In some embodiments, a percentage by mass of the defoamer in the conductive ink is no more than about 0.5%, about 1%, about 2%, about 3%, about 4%, about 5%, about 6%, about 7%, about 8%, about 9%, or about 10%.

In some embodiments, the solid matter content by mass of the conductive ink is about 2.5% to about 10.5%. In some embodiments, the solid matter content by mass of the conductive ink is at least about 2.5%. In some embodiments, the solid matter content by mass of the conductive ink is at most about 10.5%. In some embodiments, the solid matter content by mass of the conductive ink is about 2.5% to about 3.5%, about 2.5% to about 4.5%, about 2.5% to about 5.5%, about 2.5% to about 6.5%, about 2.5% to about 7.5%, about 2.5% to about 8.5%, about 2.5% to about 9.5%, about 2.5% to about 10.5%, about 3.5% to about 4.5%, about 3.5% to about 5.5%, about 3.5% to about 6.5%, about 3.5% to about 7.5%, about 3.5% to about 8.5%, about 3.5% to about 9.5%, about 3.5% to about 10.5%, about 4.5% to about 5.5%, about 4.5% to about 6.5%, about 4.5% to about 7.5%, about 4.5% to about 8.5%, about 4.5% to about 9.5%, about 4.5% to about 10.5%, about 5.5% to about 6.5%, about 5.5% to about 7.5%, about 5.5% to about 8.5%, about 5.5% to about 9.5%, about 5.5% to about 10.5%, about 6.5% to about 7.5%, about 6.5% to about 8.5%, about 6.5% to about 9.5%, about 6.5% to about 10.5%, about 7.5% to about 8.5%, about 7.5% to about 9.5%, about 7.5% to about 10.5%, about 8.5% to about 9.5%, about 8.5% to about 10.5%, or about 9.5% to about 10.5%. In some embodiments, the solid matter content by mass of the conductive ink is about 2.5%, about 3.5%, about 4.5%, about 5.5%, about 6.5%, about 7.5%, about 8.5%, about 9.5%, or about 10.5%. In some embodiments, the solid matter content by mass of the conductive ink is at least about 2.5%, about 3.5%, about 4.5%, about 5.5%, about 6.5%, about 7.5%, about 8.5%, about 9.5%, or about 10.5%. In some embodiments, the solid matter content by mass of the conductive ink is no more than about 2.5%, about 3.5%, about 4.5%, about 5.5%, about 6.5%, about 7.5%, about 8.5%, about 9.5%, or about 10.5%.

In some embodiments, the viscosity of the conductive ink is about 10 centipoise to about 10,000 centipoise. In some embodiments, the viscosity of the conductive ink is at least about 10 centipoise. In some embodiments, the viscosity of the conductive ink is at most about 10,000 centipoise. In some embodiments, the viscosity of the conductive ink is about 10 centipoise to about 20 centipoise, about 10 centipoise to about 50 centipoise, about 10 centipoise to about 100 centipoise, about 10 centipoise to about 200 centipoise, about 10 centipoise to about 500 centipoise, about 10 centipoise to about 1,000 centipoise, about 10 centipoise to about 2,000 centipoise, about 10 centipoise to about 5,000 centipoise, about 10 centipoise to about 10,000 centipoise, about 20 centipoise to about 50 centipoise, about 20 centipoise to about 100 centipoise, about 20 centipoise to about 200 centipoise, about 20 centipoise to about 500 centipoise, about 20 centipoise to about 1,000 centipoise, about 20 centipoise to about 2,000 centipoise, about 20 centipoise to about 5,000 centipoise, about 20 centipoise to about 10,000 centipoise, about 50 centipoise to about 100 centipoise, about 50 centipoise to about 200 centipoise, about 50 centipoise to about 500 centipoise, about 50 centipoise to about 1,000 centipoise, about 50 centipoise to about 2,000 centipoise, about 50 centipoise to about 5,000 centipoise, about 50 centipoise to about 10,000 centipoise, about 100 centipoise to about 200 centipoise, about 100 centipoise to about 500 centipoise, about 100 centipoise to about 1,000 centipoise, about 100 centipoise to about 2,000 centipoise, about 100 centipoise to about 5,000 centipoise, about 100 centipoise to about 10,000 centipoise, about 200 centipoise to about 500 centipoise, about 200 centipoise to about 1,000 centipoise, about 200 centipoise to about 2,000 centipoise, about 200 centipoise to about 5,000 centipoise, about 200 centipoise to about 10,000 centipoise, about 500 centipoise to about 1,000 centipoise, about 500 centipoise to about 2,000 centipoise, about 500 centipoise to about 5,000 centipoise, about 500 centipoise to about 10,000 centipoise, about 1,000 centipoise to about 2,000 centipoise, about 1,000 centipoise to about 5,000 centipoise, about 1,000 centipoise to about 10,000 centipoise, about 2,000 centipoise to about 5,000 centipoise, about 2,000 centipoise to about 10,000 centipoise, or about 5,000 centipoise to about 10,000 centipoise. In some embodiments, the viscosity of the conductive ink is about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the conductive ink is at least about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise. In some embodiments, the viscosity of the conductive ink is no more than about 10 centipoise, about 20 centipoise, about 50 centipoise, about 100 centipoise, about 200 centipoise, about 500 centipoise, about 1,000 centipoise, about 2,000 centipoise, about 5,000 centipoise, or about 10,000 centipoise.

In some embodiments, the conductive ink has a viscosity of about 2,300 centipoise to about 2,400 centipoise. In some embodiments, the conductive ink has a viscosity of at least about 2,300 centipoise. In some embodiments, the conductive ink has a viscosity of at most about 2,400 centipoise. In some embodiments, the conductive ink has a viscosity of about 2,300 centipoise to about 2,310 centipoise, about 2,300 centipoise to about 2,320 centipoise, about 2,300 centipoise to about 2,330 centipoise, about 2,300 centipoise to about 2,340 centipoise, about 2,300 centipoise to about 2,350 centipoise, about 2,300 centipoise to about 2,360 centipoise, about 2,300 centipoise to about 2,370 centipoise, about 2,300 centipoise to about 2,380 centipoise, about 2,300 centipoise to about 2,390 centipoise, about 2,300 centipoise to about 2,400 centipoise, about 2,310 centipoise to about 2,320 centipoise, about 2,310 centipoise to about 2,330 centipoise, about 2,310 centipoise to about 2,340 centipoise, about 2,310 centipoise to about 2,350 centipoise, about 2,310 centipoise to about 2,360 centipoise, about 2,310 centipoise to about 2,370 centipoise, about 2,310 centipoise to about 2,380 centipoise, about 2,310 centipoise to about 2,390 centipoise, about 2,310 centipoise to about 2,400 centipoise, about 2,320 centipoise to about 2,330 centipoise, about 2,320 centipoise to about 2,340 centipoise, about 2,320 centipoise to about 2,350 centipoise, about 2,320 centipoise to about 2,360 centipoise, about 2,320 centipoise to about 2,370 centipoise, about 2,320 centipoise to about 2,380 centipoise, about 2,320 centipoise to about 2,390 centipoise, about 2,320 centipoise to about 2,400 centipoise, about 2,330 centipoise to about 2,340 centipoise, about 2,330 centipoise to about 2,350 centipoise, about 2,330 centipoise to about 2,360 centipoise, about 2,330 centipoise to about 2,370 centipoise, about 2,330 centipoise to about 2,380 centipoise, about 2,330 centipoise to about 2,390 centipoise, about 2,330 centipoise to about 2,400 centipoise, about 2,340 centipoise to about 2,350 centipoise, about 2,340 centipoise to about 2,360 centipoise, about 2,340 centipoise to about 2,370 centipoise, about 2,340 centipoise to about 2,380 centipoise, about 2,340 centipoise to about 2,390 centipoise, about 2,340 centipoise to about 2,400 centipoise, about 2,350 centipoise to about 2,360 centipoise, about 2,350 centipoise to about 2,370 centipoise, about 2,350 centipoise to about 2,380 centipoise, about 2,350 centipoise to about 2,390 centipoise, about 2,350 centipoise to about 2,400 centipoise, about 2,360 centipoise to about 2,370 centipoise, about 2,360 centipoise to about 2,380 centipoise, about 2,360 centipoise to about 2,390 centipoise, about 2,360 centipoise to about 2,400 centipoise, about 2,370 centipoise to about 2,380 centipoise, about 2,370 centipoise to about 2,390 centipoise, about 2,370 centipoise to about 2,400 centipoise, about 2,380 centipoise to about 2,390 centipoise, about 2,380 centipoise to about 2,400 centipoise, or about 2,390 centipoise to about 2,400 centipoise. In some embodiments, the conductive ink has a viscosity of about 2,300 centipoise, about 2,310 centipoise, about 2,320 centipoise, about 2,330 centipoise, about 2,340 centipoise, about 2,350 centipoise, about 2,360 centipoise, about 2,370 centipoise, about 2,380 centipoise, about 2,390 centipoise, or about 2,400 centipoise.

In some embodiments, the density of the conductive ink at a temperature of about 20° C. is about 2.5 g/cm$^3$ to about 10.5 g/cm$^3$. In some embodiments, the density of the conductive ink at a temperature of about 20° C. is at least about 2.5 g/cm$^3$. In some embodiments, the density of the conductive ink at a temperature of about 20° C. is at most about 10.5 g/cm$^3$. In some embodiments, the density of the conductive ink at a temperature of about 20° C. is about 2.5 g/cm$^3$ to about 3.5 g/cm$^3$, about 2.5 g/cm$^3$ to about 4.5 g/cm$^3$, about 2.5 g/cm$^3$ to about 5.5 g/cm$^3$, about 2.5 g/cm$^3$ to about 6.5 g/cm$^3$, about 2.5 g/cm$^3$ to about 7.5 g/cm$^3$, about 2.5 g/cm$^3$ to about 8.5 g/cm$^3$, about 2.5 g/cm$^3$ to about 9.5 g/cm$^3$, about 2.5 g/cm$^3$ to about 10.5 g/cm$^3$, about 3.5 g/cm$^3$ to about 4.5 g/cm$^3$, about 3.5 g/cm$^3$ to about 5.5 g/cm$^3$, about 3.5 g/cm$^3$ to about 6.5 g/cm$^3$, about 3.5 g/cm$^3$ to about 7.5 g/cm$^3$, about 3.5 g/cm$^3$ to about 8.5 g/cm$^3$, about 3.5 g/cm$^3$ to about 9.5 g/cm$^3$, about 3.5 g/cm$^3$ to about 10.5 g/cm$^3$, about 4.5 g/cm$^3$ to about 5.5 g/cm$^3$, about 4.5 g/cm$^3$ to about 6.5 g/cm$^3$, about 4.5 g/cm$^3$ to about 7.5 g/cm$^3$, about 4.5 g/cm$^3$ to about 8.5 g/cm$^3$, about 4.5 g/cm$^3$ to about 9.5 g/cm$^3$, about 4.5 g/cm$^3$ to about 10.5 g/cm$^3$, about 5.5 g/cm$^3$ to about 6.5 g/cm$^3$, about 5.5 g/cm$^3$ to about 7.5 g/cm$^3$, about 5.5 g/cm$^3$ to about 8.5 g/cm$^3$, about 5.5 g/cm$^3$ to about 9.5 g/cm$^3$, about 5.5 g/cm$^3$ to about 10.5 g/cm$^3$, about 6.5 g/cm$^3$ to about 7.5 g/cm$^3$, about 6.5 g/cm$^3$ to about 8.5 g/cm$^3$, about 6.5 g/cm$^3$ to about 9.5 g/cm$^3$, about 6.5 g/cm$^3$ to about 10.5 g/cm$^3$, about 7.5 g/cm$^3$ to about 8.5 g/cm$^3$, about 7.5 g/cm$^3$ to about 9.5 g/cm$^3$, about 7.5 g/cm$^3$ to about 10.5 g/cm$^3$, about 8.5 g/cm$^3$ to about 9.5 g/cm$^3$, about 8.5 g/cm$^3$ to about 10.5 g/cm$^3$, or about 9.5 g/cm$^3$ to about 10.5 g/cm$^3$. In some embodiments, the density of the conductive ink at a temperature of about 20° C. is at most about 10.5 g/cm$^3$. In some embodiments, the density of the conductive ink at a temperature of about 20° C. is about 2.5 g/cm$^3$, about 3.5 g/cm$^3$, about 4.5 g/cm$^3$, about 5.5 g/cm$^3$, about 6.5 g/cm$^3$, about 7.5 g/cm$^3$, about 8.5 g/cm$^3$, about 9.5 g/cm$^3$, or about 10.5 g/cm$^3$. In some embodiments, the density of the conductive ink at a temperature of at least about 20° C. is about 2.5 g/cm$^3$, about 3.5 g/cm$^3$, about 4.5 g/cm$^3$, about 5.5 g/cm$^3$, about 6.5 g/cm$^3$, about 7.5 g/cm$^3$, about 8.5 g/cm$^3$, about 9.5 g/cm$^3$, or about 10.5 g/cm$^3$. In some embodiments, the density of the conductive ink at a temperature of no more than about 20° C. is about 2.5 g/cm$^3$, about 3.5 g/cm$^3$, about 4.5 g/cm$^3$, about 5.5 g/cm$^3$, about 6.5 g/cm$^3$, about 7.5 g/cm$^3$, about 8.5 g/cm$^3$, about 9.5 g/cm$^3$, or about 10.5 g/cm$^3$.

Optionally, in some embodiments the conductive ink has a surface area of about 40 m$^2$/g to about 2,400 m$^2$/g. Optionally, in some embodiments the conductive ink has a surface area of at least about 40 m$^2$/g. Optionally, in some embodiments the conductive ink has a surface area of at most about 2,400 m$^2$/g. Optionally, in some embodiments the conductive ink has a surface area of about 40 m$^2$/g to about 80 m$^2$/g, about 40 m$^2$/g to about 120 m$^2$/g, about 40 m$^2$/g to about 240 m$^2$/g, about 40 m$^2$/g to about 480 m$^2$/g, about 40 m$^2$/g to about 1,000 m$^2$/g, about 40 m$^2$/g to about 1,400 m$^2$/g, about 40 m$^2$/g to about 1,800 m$^2$/g, about 40 m$^2$/g to about 2,200 m$^2$/g, about 40 m$^2$/g to about 2,400 m$^2$/g, about 80 m$^2$/g to about 120 m$^2$/g, about 80 m$^2$/g to about 240 m$^2$/g, about 80 m$^2$/g to about 480 m$^2$/g, about 80 m$^2$/g to about 1,000 m$^2$/g, about 80 m$^2$/g to about 1,400 m$^2$/g, about 80 m$^2$/g to about 1,800 m$^2$/g, about 80 m$^2$/g to about 2,200 m$^2$/g, about 80 m$^2$/g to about 2,400 m$^2$/g, about 120 $m^2/g$ to about 240 $m^2/g$, about 120 $m^2/g$ to about 480 $m^2/g$, about 120 $m^2/g$ to about 1,000 $m^2/g$, about 120 $m^2/g$ to about 1,400 $m^2/g$, about 120 $m^2/g$ to about 1,800 $m^2/g$, about 120 $m^2/g$ to about 2,200 $m^2/g$, about 120 $m^2/g$ to about 2,400 $m^2/g$, about 240 $m^2/g$ to about 480 $m^2/g$, about 240 $m^2/g$ to about 1,000 $m^2/g$, about 240 $m^2/g$ to about 1,400 $m^2/g$, about 240 $m^2/g$ to about 1,800 $m^2/g$, about 240 $m^2/g$ to about 2,200 $m^2/g$, about 240 $m^2/g$ to about 2,400 $m^2/g$, about 480 $m^2/g$ to about 1,000 $m^2/g$, about 480 $m^2/g$ to about 1,400 $m^2/g$, about 480 $m^2/g$ to about 1,800 $m^2/g$, about 480 $m^2/g$ to about 2,200 $m^2/g$, about 480 $m^2/g$ to about 2,400 $m^2/g$, about 1,000 $m^2/g$ to about 1,400 $m^2/g$, about 1,000 $m^2/g$ to about 1,800 $m^2/g$, about 1,000 $m^2/g$ to about 2,200 $m^2/g$, about 1,000 $m^2/g$ to about 2,400 $m^2/g$, about 1,400 $m^2/g$ to about 1,800 $m^2/g$, about 1,400 $m^2/g$ to about 2,200 $m^2/g$, about 1,400 $m^2/g$ to about 2,400 $m^2/g$, about 1,800 $m^2/g$ to about 2,200 $m^2/g$, about 1,800 $m^2/g$ to about 2,400 $m^2/g$, or about 2,200 $m^2/g$ to about 2,400 $m^2/g$. Optionally, in some embodiments the conductive ink has a surface area of about 40 $m^2/g$, about 80 $m^2/g$, about 120 $m^2/g$, about 240 $m^2/g$, about 480 $m^2/g$, about 1,000 $m^2/g$, about 1,400 $m^2/g$, about 1,800 $m^2/g$, about 2,200 $m^2/g$, or about 2,400 $m^2/g$. Optionally, in some embodiments the conductive ink has a surface area of at least about 40 $m^2/g$, about 80 $m^2/g$, about 120 $m^2/g$, about 240 $m^2/g$, about 480 $m^2/g$, about 1,000 $m^2/g$, about 1,400 $m^2/g$, about 1,800 $m^2/g$, about 2,200 $m^2/g$, or about 2,400 $m^2/g$. Optionally, in some embodiments the conductive ink has a surface area of no more than about 40 $m^2/g$, about 80 $m^2/g$, about 120 $m^2/g$, about 240 $m^2/g$, about 480 $m^2/g$, about 1,000 $m^2/g$, about 1,400 $m^2/g$, about 1,800 $m^2/g$, about 2,200 $m^2/g$, or about 2,400 $m^2/g$.

Optionally, in some embodiments the conductive ink has a conductivity of about 400 S/m to about 1,600 S/m. Optionally, in some embodiments the conductive ink has a conductivity of at least about 400 S/m. Optionally, in some embodiments the conductive ink has a conductivity of at most about 1,600 S/m. Optionally, in some embodiments the conductive ink has a conductivity of about 400 S/m to about 500 S/m, about 400 S/m to about 600 S/m, about 400 S/m to about 700 S/m, about 400 S/m to about 800 S/m, about 400 S/m to about 900 S/m, about 400 S/m to about 1,000 S/m, about 400 S/m to about 1,200 S/m, about 400 S/m to about 1,400 S/m, about 400 S/m to about 1,600 S/m, about 500 S/m to about 600 S/m, about 500 S/m to about 700 S/m, about 500 S/m to about 800 S/m, about 500 S/m to about 900 S/m, about 500 S/m to about 1,000 S/m, about 500 S/m to about 1,200 S/m, about 500 S/m to about 1,400 S/m, about 500 S/m to about 1,600 S/m, about 600 S/m to about 700 S/m, about 600 S/m to about 800 S/m, about 600 S/m to about 900 S/m, about 600 S/m to about 1,000 S/m, about 600 S/m to about 1,200 S/m, about 600 S/m to about 1,400 S/m, about 600 S/m to about 1,600 S/m, about 700 S/m to about 800 S/m, about 700 S/m to about 900 S/m, about 700 S/m to about 1,000 S/m, about 700 S/m to about 1,200 S/m, about 700 S/m to about 1,400 S/m, about 700 S/m to about 1,600 S/m, about 800 S/m to about 900 S/m, about 800 S/m to about 1,000 S/m, about 800 S/m to about 1,200 S/m, about 800 S/m to about 1,400 S/m, about 800 S/m to about 1,600 S/m, about 900 S/m to about 1,000 S/m, about 900 S/m to about 1,200 S/m, about 900 S/m to about 1,400 S/m, about 900 S/m to about 1,600 S/m, about 1,000 S/m to about 1,200 S/m, about 1,000 S/m to about 1,400 S/m, about 1,000 S/m to about 1,600 S/m, about 1,200 S/m to about 1,400 S/m, about 1,200 S/m to about 1,600 S/m, or about 1,400 S/m to about 1,600 S/m. Optionally, in some embodiments the conductive ink has a conductivity of about 400 S/m, about 500 S/m, about 600 S/m, about 700 S/m, about 800 S/m, about 900 S/m, about 1,000 S/m, about 1,200 S/m, about 1,400 S/m, or about 1,600 S/m. Optionally, in some embodiments the conductive ink has a conductivity of at least about 400 S/m, about 500 S/m, about 600 S/m, about 700 S/m, about 800 S/m, about 900 S/m, about 1,000 S/m, about 1,200 S/m, about 1,400 S/m, or about 1,600 S/m. Optionally, in some embodiments the conductive ink has a conductivity of no more than about 400 S/m, about 500 S/m, about 600 S/m, about 700 S/m, about 800 S/m, about 900 S/m, about 1,000 S/m, about 1,200 S/m, about 1,400 S/m, or about 1,600 S/m.

Optionally, in some embodiments the conductive ink has a C:O mass ratio of about 2:1 to about 40:1. Optionally, in some embodiments the conductive ink has a C:O mass ratio of at least about 2:1. Optionally, in some embodiments the conductive ink has a C:O mass ratio of at most about 40:1. Optionally, in some embodiments the conductive ink has a C:O mass ratio of about 2:1 to about 4:1, about 2:1 to about 6:1, about 2:1 to about 8:1, about 2:1 to about 10:1, about 2:1 to about 15:1, about 2:1 to about 20:1, about 2:1 to about 25:1, about 2:1 to about 30:1, about 2:1 to about 34:1, about 2:1 to about 40:1, about 4:1 to about 6:1, about 4:1 to about 8:1, about 4:1 to about 10:1, about 4:1 to about 15:1, about 4:1 to about 20:1, about 4:1 to about 25:1, about 4:1 to about 30:1, about 4:1 to about 34:1, about 4:1 to about 40:1, about 6:1 to about 8:1, about 6:1 to about 10:1, about 6:1 to about 15:1, about 6:1 to about 20:1, about 6:1 to about 25:1, about 6:1 to about 30:1, about 6:1 to about 34:1, about 6:1 to about 40:1, about 8:1 to about 10:1, about 8:1 to about 15:1, about 8:1 to about 20:1, about 8:1 to about 25:1, about 8:1 to about 30:1, about 8:1 to about 34:1, about 8:1 to about 40:1, about 10:1 to about 15:1, about 10:1 to about 20:1, about 10:1 to about 25:1, about 10:1 to about 30:1, about 10:1 to about 34:1, about 10:1 to about 40:1, about 15:1 to about 20:1, about 15:1 to about 25:1, about 15:1 to about 30:1, about 15:1 to about 34:1, about 15:1 to about 40:1, about 20:1 to about 25:1, about 20:1 to about 30:1, about 20:1 to about 34:1, about 20:1 to about 40:1, about 25:1 to about 30:1, about 25:1 to about 34:1, about 25:1 to about 40:1, about 30:1 to about 34:1, about 30:1 to about 40:1, or about 34:1 to about 40:1. Optionally, in some embodiments the conductive ink has a C:O mass ratio of about 2:1, about 4:1, about 6:1, about 8:1, about 10:1, about 15:1, about 20:1, about 25:1, about 30:1, about 34:1, or about 40:1. Optionally, in some embodiments the conductive ink has a C:O mass ratio of at least about 2:1, about 4:1, about 6:1, about 8:1, about 10:1, about 15:1, about 20:1, about 25:1, about 30:1, about 34:1, or about 40:1. Optionally, in some embodiments the conductive ink has a C:O mass ratio of no more than about 2:1, about 4:1, about 6:1, about 8:1, about 10:1, about 15:1, about 20:1, about 25:1, about 30:1, about 34:1, or about 40:1.

In some embodiments, the conductive ink is a conductive graphene hydrate.

In some embodiments, the graphene ink has a resistivity when dry of about 0.01 ohm/sq/mil to about 60 ohms/sq/mil. In some embodiments, the graphene ink has a resistivity when dry of at least about 0.01 ohm/sq/mil. In some embodiments, the graphene ink has a resistivity when dry of at most about 60 ohms/sq/mil. In some embodiments, the graphene ink has a resistivity when dry of about 0.01 ohm/sq/mil to about 0.05 ohm/sq/mil, about 0.01 ohm/sq/mil to about 0.1 ohm/sq/mil, about 0.01 ohm/sq/mil to about 0.5 ohm/sq/mil, about 0.01 ohm/sq/mil to about 1 ohm/sq/mil, about 0.01 ohm/sq/mil to about 5 ohms/sq/mil, about 0.01 ohm/sq/mil to about 10 ohms/sq/mil, about 0.01 ohm/sq/mil to about 20 ohms/sq/mil, about 0.01 ohm/sq/mil to about 30 ohms/sq/mil, about 0.01 ohm/sq/mil to about 40 ohms/sq/mil, about 0.01 ohm/sq/mil to about 50 ohms/sq/mil, about 0.01 ohm/sq/mil to about 60 ohms/sq/mil, about 0.05 ohm/sq/mil to about 0.1 ohm/sq/mil, about 0.05 ohm/sq/mil to about 0.5 ohm/sq/mil, about 0.05 ohm/sq/mil to about 1 ohm/sq/mil, about 0.05 ohm/sq/mil to about 5 ohms/sq/mil, about 0.05 ohm/sq/mil to about 10 ohms/sq/mil, about 0.05 ohm/sq/mil to about 20 ohms/sq/mil, about 0.05 ohm/sq/mil to about 30 ohms/sq/mil, about 0.05 ohm/sq/mil to about 40 ohms/sq/mil, about 0.05 ohm/sq/mil to about 50 ohms/sq/mil, about 0.05 ohm/sq/mil to about 60 ohms/sq/mil, about 0.1 ohm/sq/mil to about 0.5 ohm/sq/mil, about 0.1 ohm/sq/mil to about 1 ohm/sq/mil, about 0.1 ohm/sq/mil to about 5 ohms/sq/mil, about 0.1 ohm/sq/mil to about 10 ohms/sq/mil, about 0.1 ohm/sq/mil to about 20 ohms/sq/mil, about 0.1 ohm/sq/mil to about 30 ohms/sq/mil, about 0.1 ohm/sq/mil to about 40 ohms/sq/mil, about 0.1 ohm/sq/mil to about 50 ohms/sq/mil, about 0.1 ohm/sq/mil to about 60 ohms/sq/mil, about 0.5 ohm/sq/mil to about 1 ohm/sq/mil, about 0.5 ohm/sq/mil to about 5 ohms/sq/mil, about 0.5 ohm/sq/mil to about 10 ohms/sq/mil, about 0.5 ohm/sq/mil to about 20 ohms/sq/mil, about 0.5 ohm/sq/mil to about 30 ohms/sq/mil, about 0.5 ohm/sq/mil to about 40 ohms/sq/mil, about 0.5 ohm/sq/mil to about 50 ohms/sq/mil, about 0.5 ohm/sq/mil to about 60 ohms/sq/mil, about 1 ohm/sq/mil to about 5 ohms/sq/mil, about 1 ohm/sq/mil to about 10 ohms/sq/mil, about 1 ohm/sq/mil to about 20 ohms/sq/mil, about 1 ohm/sq/mil to about 30 ohms/sq/mil, about 1 ohm/sq/mil to about 40 ohms/sq/mil, about 1 ohm/sq/mil to about 50 ohms/sq/mil, about 1 ohm/sq/mil to about 60 ohms/sq/mil, about 5 ohms/sq/mil to about 10 ohms/sq/mil, about 5 ohms/sq/mil to about 20 ohms/sq/mil, about 5 ohms/sq/mil to about 30 ohms/sq/mil, about 5 ohms/sq/mil to about 40 ohms/sq/mil, about 5 ohms/sq/mil to about 50 ohms/sq/mil, about 5 ohms/sq/mil to about 60 ohms/sq/mil, about 10 ohms/sq/mil to about 20 ohms/sq/mil, about 10 ohms/sq/mil to about 30 ohms/sq/mil, about 10 ohms/sq/mil to about 40 ohms/sq/mil, about 10 ohms/sq/mil to about 50 ohms/sq/mil, about 10 ohms/sq/mil to about 60 ohms/sq/mil, about 20 ohms/sq/mil to about 30 ohms/sq/mil, about 20 ohms/sq/mil to about 40 ohms/sq/mil, about 20 ohms/sq/mil to about 50 ohms/sq/mil, about 20 ohms/sq/mil to about 60 ohms/sq/mil, about 30 ohms/sq/mil to about 40 ohms/sq/mil, about 30 ohms/sq/mil to about 50 ohms/sq/mil, about 30 ohms/sq/mil to about 60 ohms/sq/mil, about 40 ohms/sq/mil to about 50 ohms/sq/mil, about 40 ohms/sq/mil to about 60 ohms/sq/mil, or about 50 ohms/sq/mil to about 60 ohms/sq/mil. In some embodiments, the graphene ink has a resistivity when dry of about 0.01 ohms/sq/mil, about 0.05 ohms/sq/mil, about 0.1 ohm/sq/mil, about 0.5 ohm/sq/mil, about 1 ohm/sq/mil, about 5 ohms/sq/mil, about 10 ohms/sq/mil, about 20 ohms/sq/mil, about 30 ohms/sq/mil, about 40 ohms/sq/mil, about 50 ohms/sq/mil, or about 60 ohms/sq/mil. In some embodiments, the graphene ink has a resistivity when dry of at least about 0.01 ohm/sq/mil, about 0.05 ohm/sq/mil, about 0.1 ohm/sq/mil, about 0.5 ohm/sq/mil, about 1 ohm/sq/mil, about 5 ohm/sq/mil, about 10 ohms/sq/mil, about 20 ohms/sq/mil, about 30 ohms/sq/mil, about 40 ohms/sq/mil, about 50 ohms/sq/mil, or about 60 ohms/sq/mil. In some embodiments, the graphene ink has a resistivity when dry of at most about 0.01 ohm/sq/mil, about 0.05 ohm/sq/mil, about 0.1 ohm/sq/mil, about 0.5 ohm/sq/mil, about 1 ohm/sq/mil, about 5 ohms/sq/mil, about 10 ohms/sq/mil, about 20 ohms/sq/mil, about 30 ohms/sq/mil, about 40 ohms/sq/mil, about 50 ohms/sq/mil, or about 60 ohms/sq/mil.

Those skilled in the art will recognize improvements and modifications to the present disclosure. All such improvements and modifications are considered within the scope of the concepts disclosed herein.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
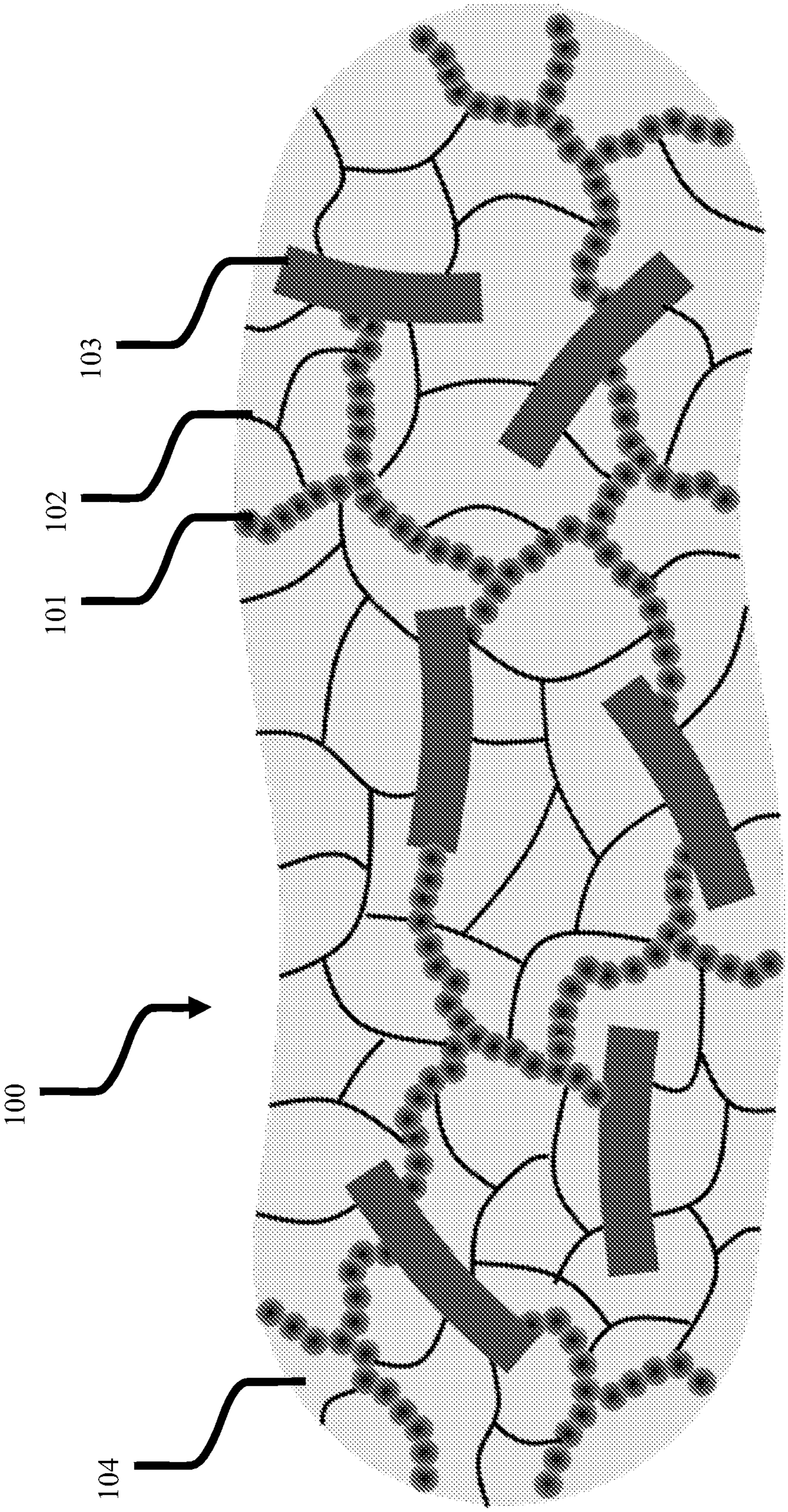
FIG. 1 displays an exemplary illustration of the structure of a conductive dispersion, according to one or more embodiments described herein.

Certain aspects of the present disclosure relate to conductive adhesives and inks comprising carbon-based and silver-based materials, such as graphene and graphene/carbon composites, that exhibit excellent conductivity, thermal properties, durability, low curing temperatures, mechanical flexibility, and reduced environmental impact.

Although lead-based soldering materials are currently used to electrically connect two or more components, such products may be toxic and not environmentally friendly.

Alternative conductive materials, (e.g., graphene and silver), however, provide equal or greater efficacy without the dangers and side effects of current solder. Unlike toxic lead solders, conductive adhesives and inks made with graphene are carbon-based and thus non-toxic and are environmentally friendly as curing is performed at room temperature. Such conductive adhesives and inks may employ additives to enable various uses and improved electrical properties.

In some existing methods of electronics manufacturing, a lead-based solder is applied to attach and bond the different electronic components together or to a printed circuit board. However, worldwide regulations have been put in place to limit the use of lead because of its health and environmental impact. Additionally, lead-based soldering has limited patterning resolution that may not satisfy the decreasing scales of the components in modern electronics packaging. Further, lead-based solder may be too brittle and nondurable to be used in flexible electronic devices. Finally, as lead-based solders must be heated to high temperatures during component adhesion to flow into all crevices before hardening, such materials may not be used to adhere heat-sensitive components.

Conductive adhesives are an alternative to lead-based solders and exhibit low curing temperatures and high thermal and mechanical stress resilience. As such, there is a current unmet need for lead-free conductive adhesives to improve the safety, speed, durability, and performance of integrated electrical products and methods of manufacturing for creating such conductive adhesives in an environmentally friendly manner.

Conductive Glues

Provided herein is a conductive glue comprising a conductive additive and an adhesive agent. The conductive additive may comprise a carbon-based material. The conductive additive may comprise a silver-based material. The conductive additive may comprise a carbon-based material and a silver-based material.

The silver-based additive may comprise a silver nanowire, a silver nanoparticle, or both. The silver-based additive may comprise a silver nanowire, and not a silver nanoparticle. The silver-based additive may comprise a silver nanoparticle, and not a silver nanowire. The silver-based additive may comprise a silver nanowire and a silver nanoparticle. Alternatively, the silver-based material may comprise silver nanorods, silver nanoflowers, silver nanofibers, silver nanoplatelets, silver nanoribbons, silver nanocubes, silver bipyramids, or any combination thereof. The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. The silver nanowire may have an average aspect ratio of about 250:1, 300:1, 350:1, 400:1, 450:1, 500:1, 600:1, 700:1, 800:1, 900:1, or 1000:1. The silver nanowire may have an average aspect ratio of at least about 250:1, 300:1, 350:1, 400:1, 450:1, 500:1, 600:1, 700:1, 800:1, 900:1, or 1000:1.

The carbon-based material may comprise two or more of a graphene nanoparticle, a graphene nanosheet, and a graphene microparticle. The carbon-based material may comprise a graphene nanoparticle and a graphene nanosheet. The carbon-based material may comprise a graphene nanoparticle and a graphene microparticle. The carbon-based material may comprise a graphene nanosheet and a graphene microparticle. The carbon-based material may comprise a graphene nanoparticle, a graphene nanosheet, and a graphene microparticle. FIG. 1 shows an exemplary diagram of a conductive glue 100 comprising a carbon-based material, wherein the carbon-based material comprises zero-dimensional nanoparticles 101 (displayed as dots), two-dimensional nanosheets 102 (displayed as lines), three-dimensional microparticles 103 (displayed as bars), and an adhesive agent 104. The zero-dimensional nanoparticles 101 may comprise carbon black nanoparticles. The two-dimensional nanosheets 102 may comprise graphene. The three-dimensional microparticles 103 may comprise graphene microparticles. In some embodiments, the carbon-based material and the adhesive agent self-assemble to establish sufficient percolation (interconnectivity) and hence electrical conductivity.

Alternatively, the carbon-based material may comprise graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

Alternatively, the silver-based material may comprise silver nanorods, silver nanoflowers, silver nanofibers, silver nanoplatelets, silver nanoribbons, silver nanocubes, silver bipyramids, or any combination thereof.

The adhesive agent may comprise carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof. In some embodiments the conductive glue further comprises a thinner. In some embodiments, the thinner comprises butyl acetate, lacquer thinner, acetone, petroleum naphtha, mineral spirits, xylene, or any combination thereof.

In some embodiments the conductive glue further comprises a pigment, a colorant, a dye, or any combination thereof. In some embodiments, the conductive carbon-based adhesive comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof. In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof. The yellow colorant may include Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black SI70, Color Black SI50, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Figure 2:
FIG. 2 displays an exemplary image of the conductive carbon-based glue, according to one or more embodiments described herein.
Figure 3:
FIG. 3 displays an exemplary image of a first packaging of the conductive carbon-based glue, according to one or more embodiments described herein.
Figure 4:
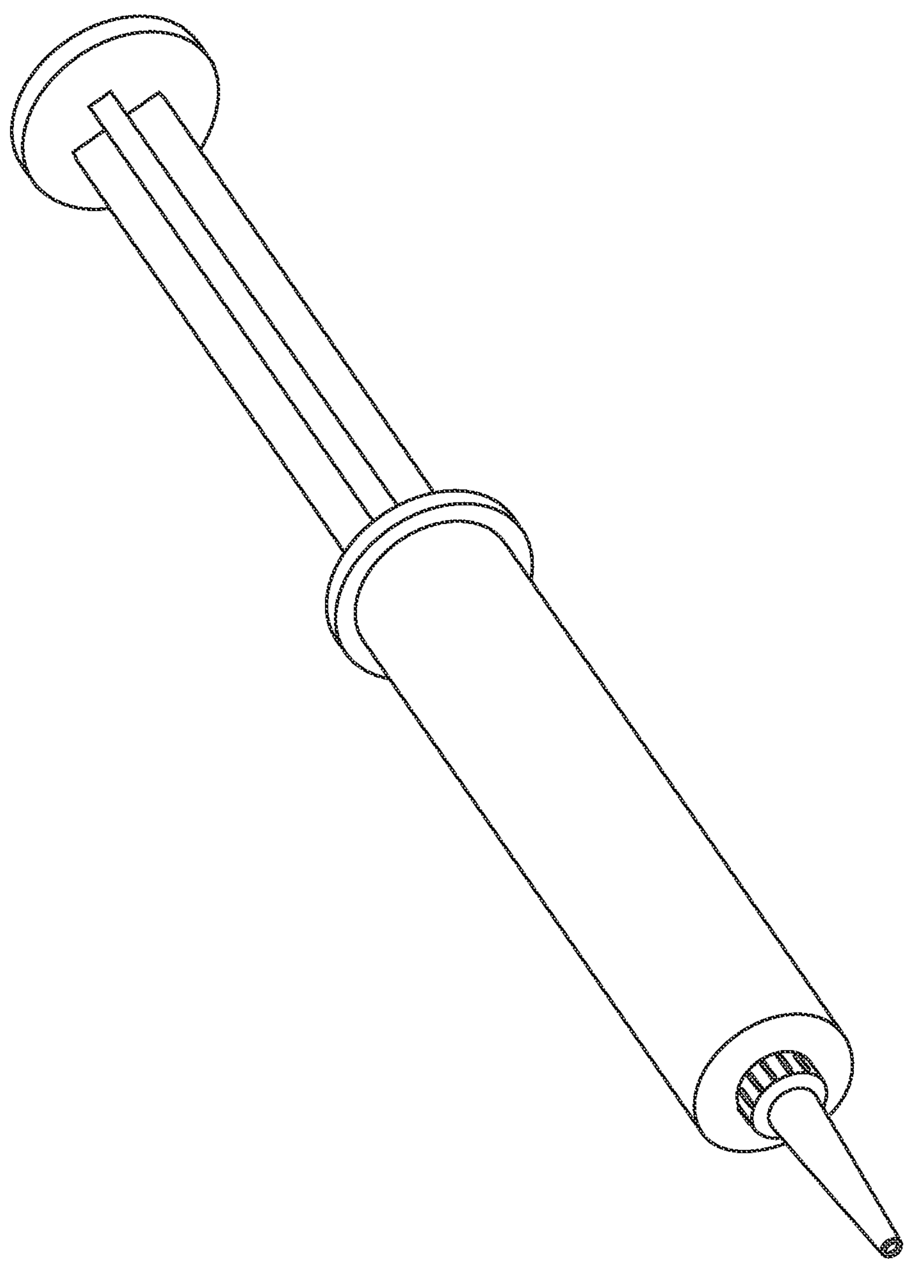
FIG. 4 displays an exemplary image of a second packaging of the conductive carbon-based glue, according to one or more embodiments described herein.

FIG. 2 shows an image of an exemplary conductive glue. As shown the conductive glue may be dark in color or may be pigmented to achieve a lighter color. Per FIG. 3 the conductive glue may be stored in a squeeze bottle, dispensed from the squeeze bottle, or both. Alternatively, per FIG. 4 the conductive glue may be stored in a syringe, dispensed from the syringe, or both. One of ordinary skill in the art would easily recognize that any container currently used for glue, epoxy, or other hardening substances may be employed to package and dispense the conductive glue of the present disclosure. Any such package of the conductive glue should allow an operator, a machine, or both to garner and/or dispense the conductive graphene. In some embodiments, the packaging of the conductive glue allows an operator to dispense quantities of the conductive glue into a dispensing machine. In some embodiments, the packaging of the conductive glue further comprises a mixing rod, a dispensing element, or any combination thereof.

Figure 5:
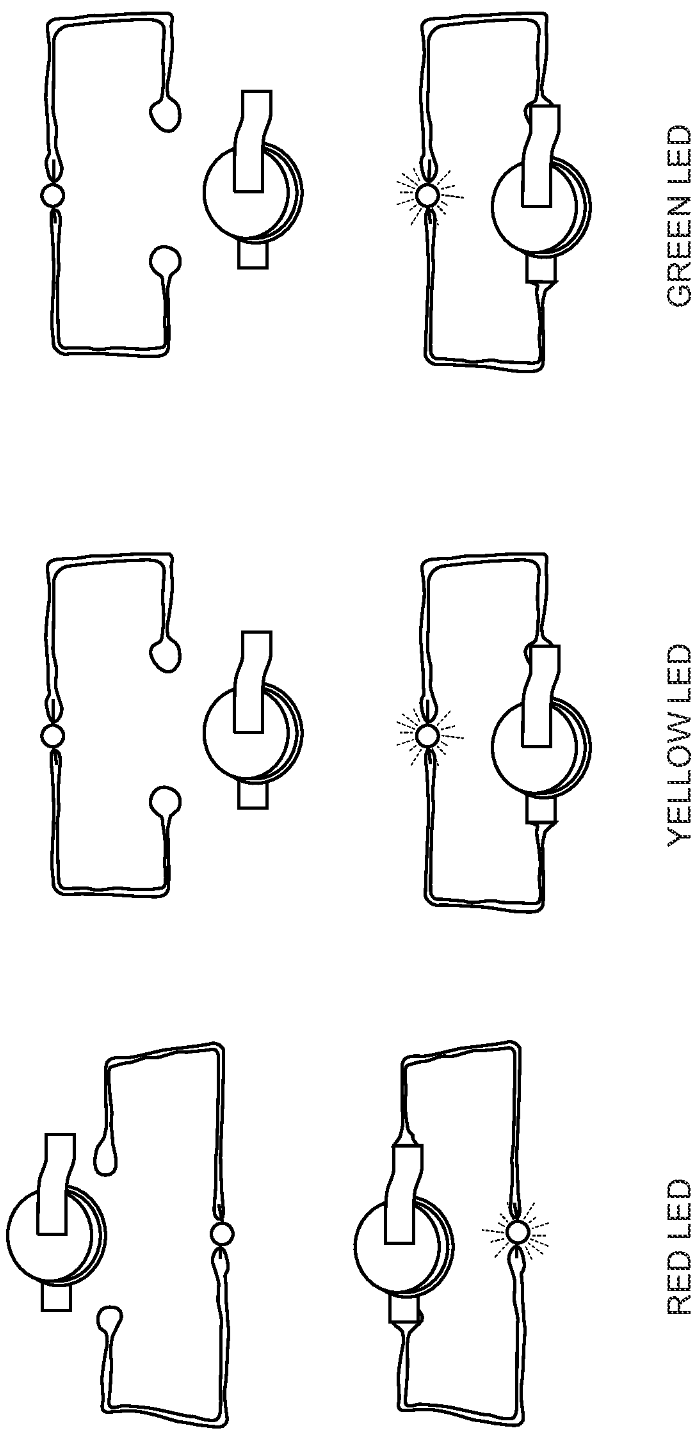
FIG. 5 displays an exemplary image of an electronic circuit comprising a battery powering different light-emitting diodes (LEDs) through wires formed by the conductive carbon-based glue deposited on paper, according to one or more embodiments described herein.
Figure 6:
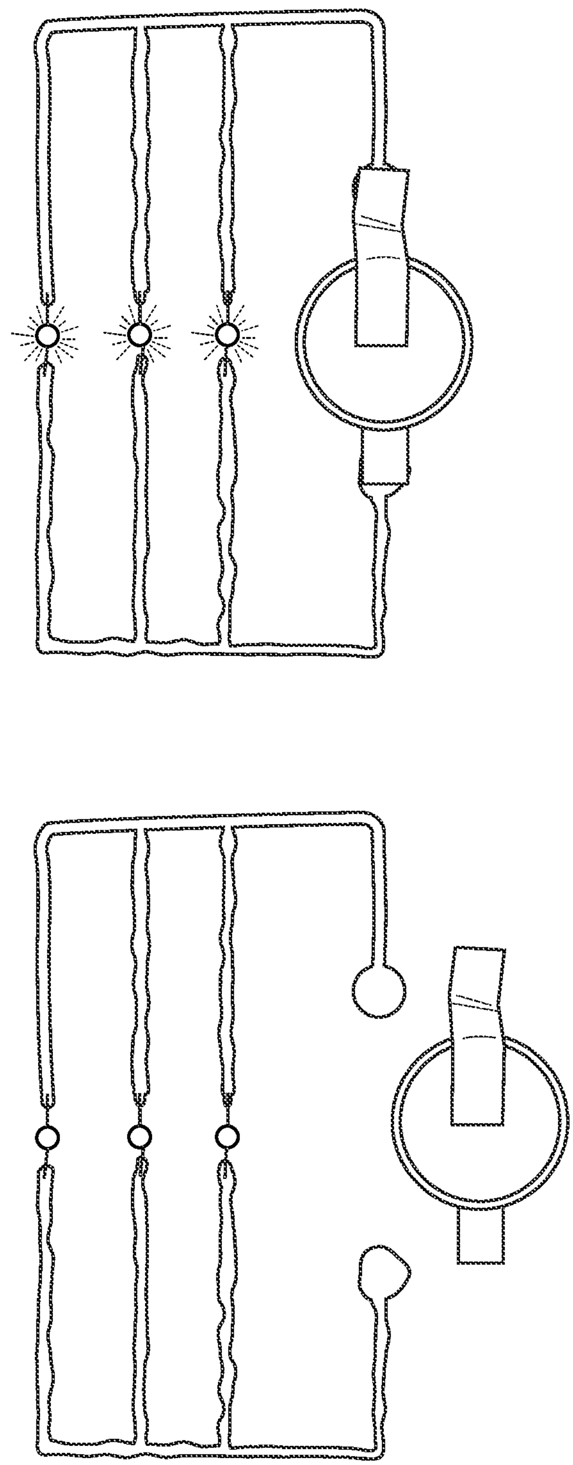
FIG. 6 displays an exemplary image of an electronic circuit wherein a battery simultaneously powers three different LEDs through wires formed by the conductive carbon-based glue deposited on paper, according to one or more embodiments described herein.
Figure 7:
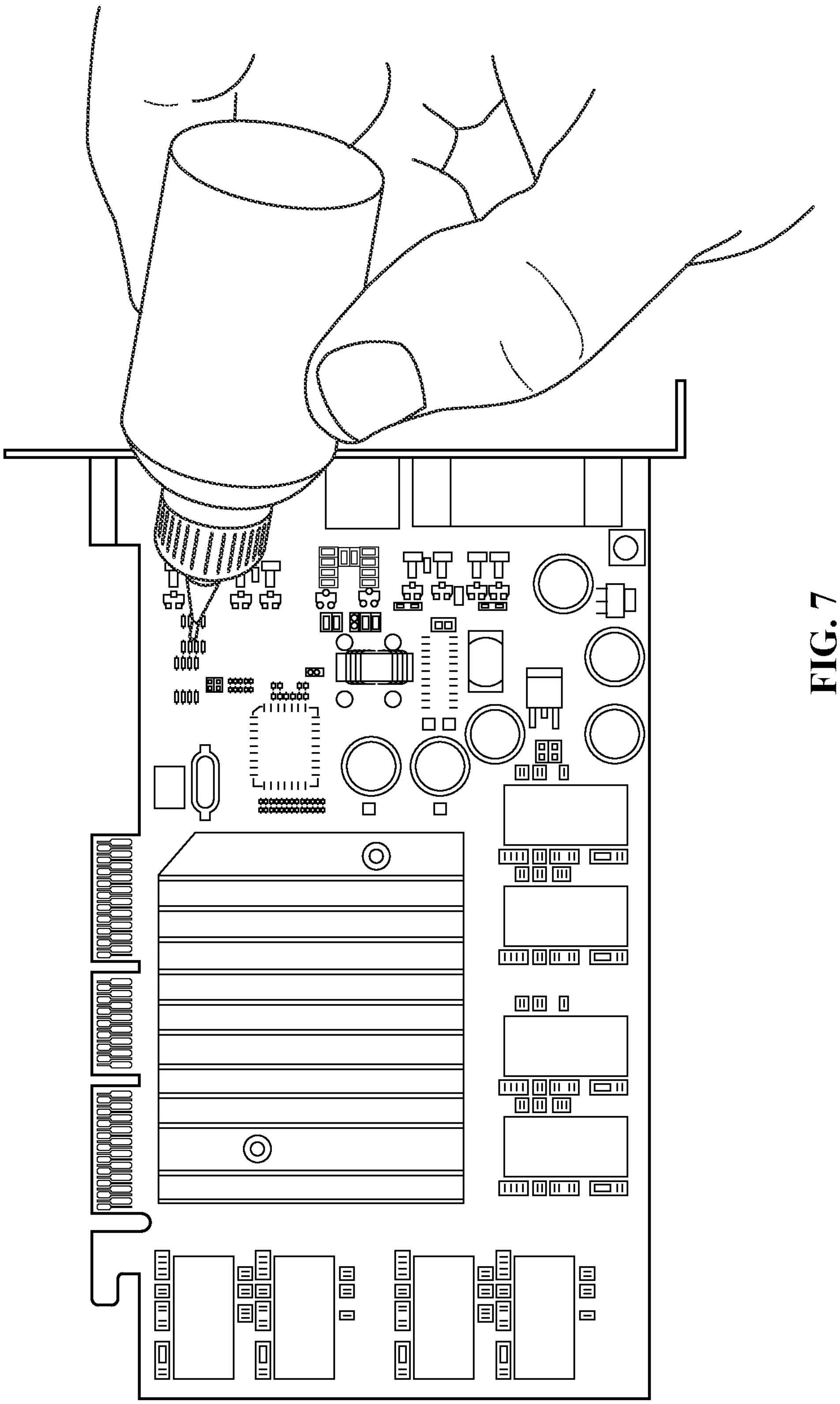
FIG. 7 displays an exemplary image of bonding an electronic component to a circuit board using the conductive carbon-based glue, according to one or more embodiments described herein.

Exemplary uses for the conductive glues disclosed herein are shown in FIGS. 5-7. Per FIG. 5 an exemplary conductive glue may be used to form an electronic circuit on a substrate between a battery and a light-emitting diode (LED) light. As seen per the top row, the LED light is unlit when the battery is disconnected. Connecting the battery terminals to a trace of the exemplary conductive glue, however, can power red, yellow, and green LEDs, from left to right, respectively. The substrate may comprise paper, wood, aluminum, silicone, or any other non-conducting or low-conducting material. Likewise per FIG. 6, a circuit formed by an exemplary conductive glue between a lithium coin cell battery can simultaneously light three LEDs in parallel (e.g., red, orange, and yellow). In some embodiments, a circuit formed by the conductive glue deposited on a substrate may form an electronic device such as a touch-sensitive device, a flexible device, a disconnection alert feature, or a shape-sensitive device. In some embodiments, the electronic device may be fine-tuned by altering a shape of the glue deposited on the substrate, a quantity of the glue deposited on the substrate or both.

Further per FIG. 7 the exemplary conductive glue may be used as an alternative to lead-based solder for bonding different electronic components to a circuit board. The bonding may occur at room temperature. As such, bonding may be performed by inserting one or more leads of an electrical component (e.g., an LED) into one or more holes or onto one or more pads within the motherboard, depositing the conductive glue between the one or more leads and the holes or pads, and allowing the conductive glue to dry. In some embodiments, the conductive glue is used in place of a harness and a cable to provide both electrical and mechanical coupling.

Methods of Forming Conductive Glues

Also provided herein is a method of forming a conductive glue comprising forming a conductive additive and adding an adhesive agent to the conductive additive. The conductive additive may comprise a carbon-based material. The conductive additive may comprise a silver-based material. The conductive additive may comprise a carbon-based material and a silver-based material.

In some embodiments, the carbon-based material comprises graphene, graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof. The silver-based material may comprise silver nanoparticles, silver nanorods, silver nanowires, silver nanoflowers, silver nanofibers, silver nanoplatelets, silver nanoribbons, silver nanocubes, silver bipyramids, or any combination thereof.

In some embodiments, the conductive glue comprises a percentage by weight of the adhesive agent of about 60% to about 99.9%. In some embodiments, the conductive glue comprises a percentage by weight of the conductive additive of about 0.1% to about 40%. In some embodiments, the conductive additive comprises graphene, wherein a percentage by weight of the graphene in the conductive glue is about 0.1% to about 10%. In some embodiments, the conductive additive comprises graphite powder and wherein a percentage by weight of the graphite powder in the conductive glue is about 1% to about 40%.

The adhesive agent may comprise carpenter's glue, wood glue, cyanoacrylate, contact cement, latex, library paste, mucilage, methyl cellulose, resorcinol resin, starch, butanone, dichloromethane acrylic, ethylene-vinyl, phenol formaldehyde resin, polyamide, polyester, polyethylene, polypropylene, polysulfide, polyurethane, polyvinyl acetate, aliphatic, polyvinyl alcohol, polyvinyl chloride, polyvinyl chloride emulsion, silicone, styrene acrylic, epichlorohydrin, an epoxide, or any combination thereof.

Some embodiments further comprise adding a thinner to the carbon-based material and the adhesive agent. In some embodiments, the thinner comprises butyl acetate, lacquer thinner, acetone, petroleum naphtha, mineral spirits, xylene, or any combination thereof. In some embodiments, the conductive glue comprises a percent by volume of the thinner of about 50% to about 99%.

Some embodiments further comprise adding a pigment, a colorant, a dye, or any combination thereof to the conductive additive and the adhesive. In some embodiments, the conductive adhesive comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof. In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof. The yellow colorant may include Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black SI70, Color Black SI50, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Conductive Glues: Performance

Figure 8A:
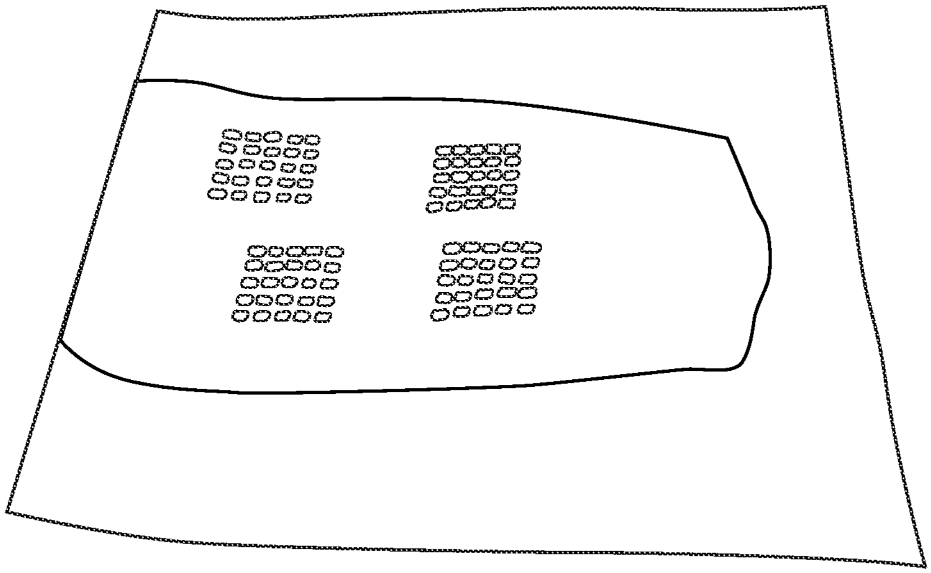
FIG. 8A displays an exemplary image of a film comprising the conductive carbon-based glue deposited on a flexible substrate, according to one or more embodiments described herein.
Figure 8B:
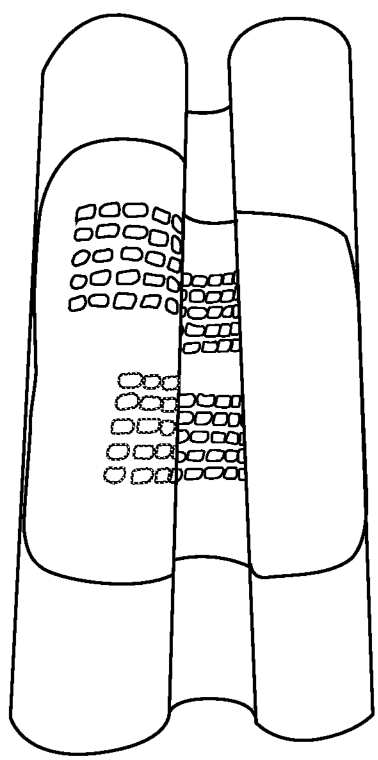
FIG. 8B displays an exemplary image of a folded film comprising the conductive carbon-based glue deposited on a flexible substrate, according to one or more embodiments described herein.

FIG. 8A is an image of a film comprising an exemplary conductive carbon-based glue deposited and dried on a flexible substrate (e.g., a clear flexible substrate). FIG. 8B is an image of a folded film comprising the exemplary conductive carbon-based glue deposited and dried on a flexible substrate. The ability of the dried conductive carbon-based glue to bend and warp with the flexible substrate indicates that the conductive carbon-based glue is capable of withstanding the compressive and tensile forces, enabling its use in flexible electronic devices. Further, such capabilities enable the use of the exemplary conductive carbon-based glue within non-flexible electronic devices under stress.

Figure 9:
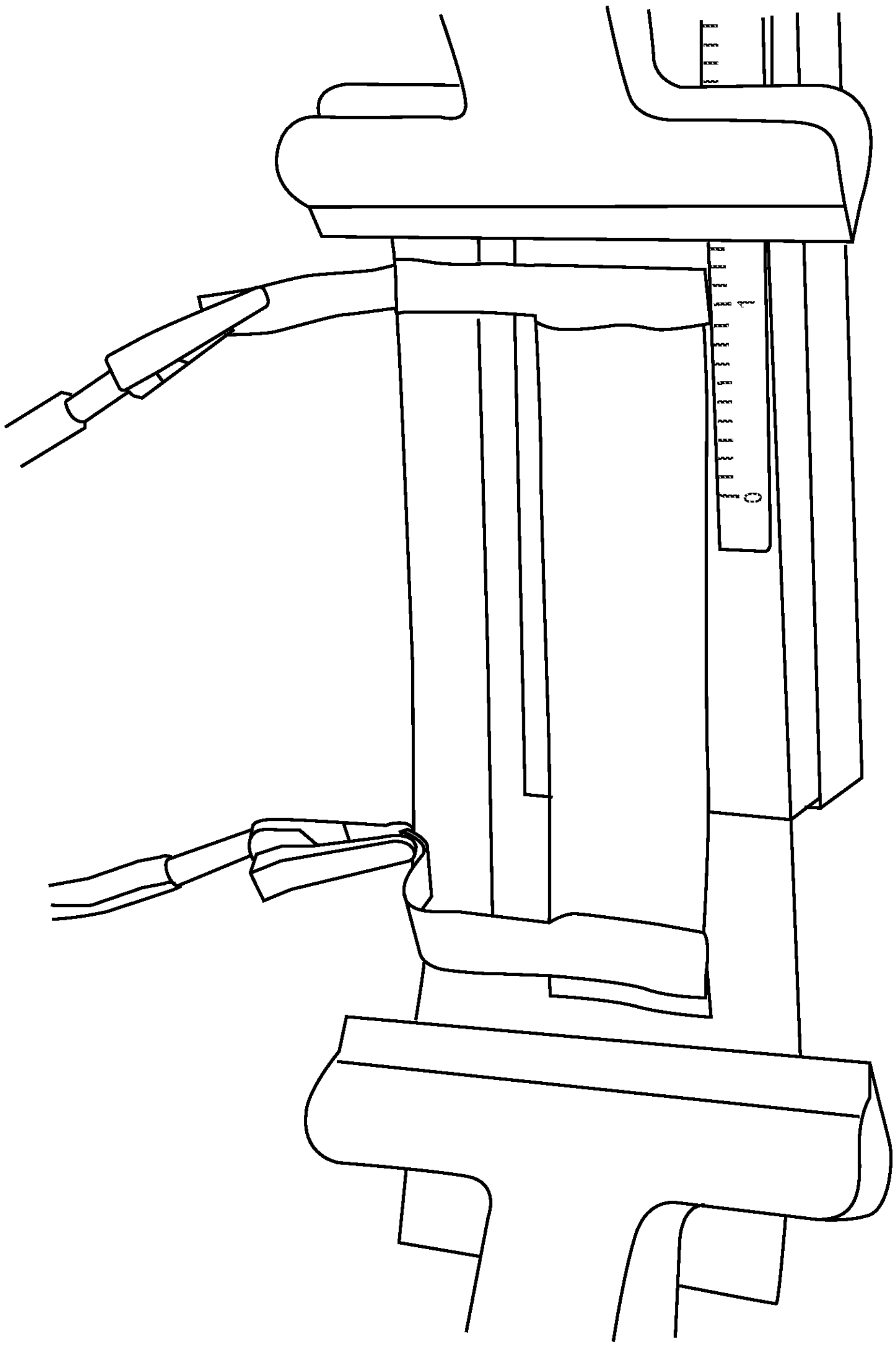
FIG. 9 displays an exemplary image of an exemplary apparatus for testing the electrical properties of the conductive carbon-based glue.

FIG. 9 is an exemplary image of an exemplary apparatus for testing the electrical properties of a sheet comprising the dried conductive carbon-based glue comprising contact pads formed of silver paste and copper tape. As shown, alligator clips may be used to connect the contact pads of the sheet to an electrochemical workstation for electrical performance characterization, and a ruler indicates the strain imparted on the exemplary sheet.

Figure 10:
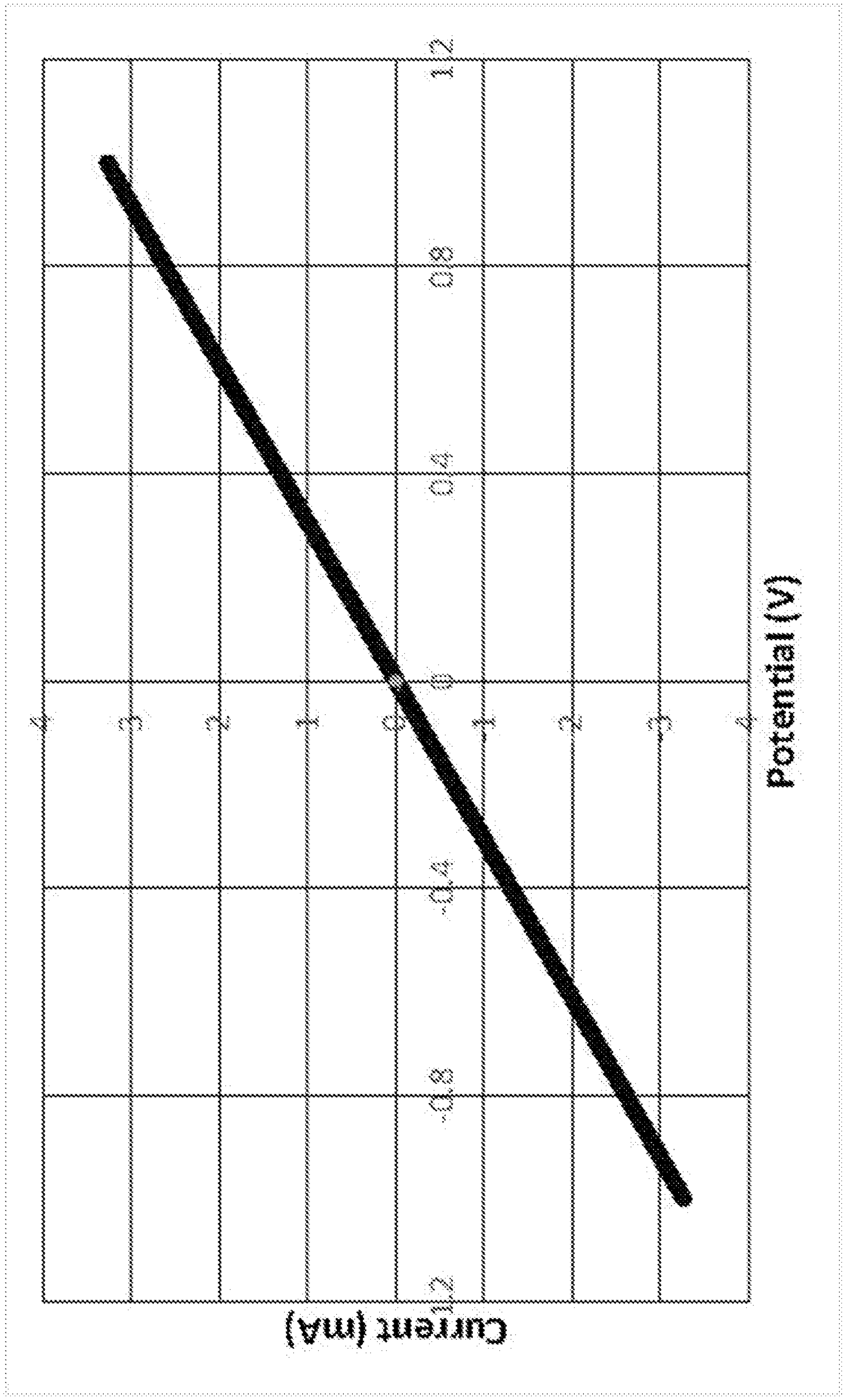
FIG. 10 displays a graph of the voltage-current curve of an exemplary conductive carbon-based glue, according to one or more embodiments described herein.
Figure 11:
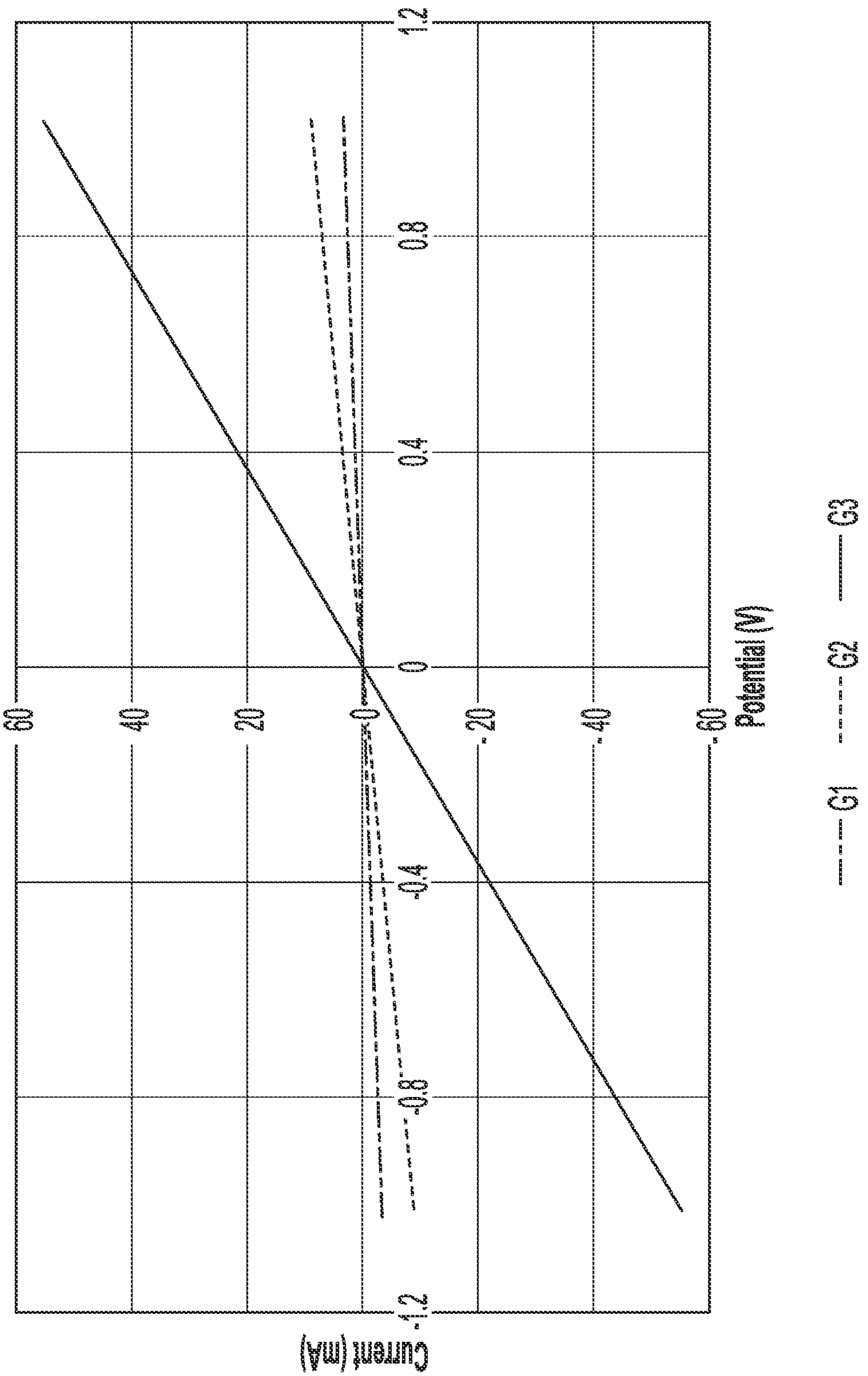
FIG. 11 displays a graph of the voltage-current curves of different exemplary conductive glue films made with different amounts of conductive additives, according to one or more embodiments described herein.

FIG. 10 is a graph of the voltage-current curve of an exemplary conductive carbon-based glue. As seen therein, the current increases from about −3 mA to about 3 mA as the voltage increases from about −1 V to about 1 V. FIG. 11 is a graph of the voltage-current curves of exemplary conductive glue films made with different amounts of the carbon-based conductive additive, wherein G1 has a greater quantity of the carbon-based material than G2, which has a greater quantity of the carbon-based material than G3. As shown, the current of the G1 sample increases from about −5 mA to about 5 mA as the voltage increases from about −1 V to about 1 V. As shown, the current of the G2 sample increases from about −10 mA to about 10 mA as the voltage increases from about −1 V to about 1 V. As shown, the current of the G3 sample increases from about −50 mA to about 55 mA as the voltage increases from about −1 V to about 1 V. In some embodiments, the conductive carbon-based glue has a conductivity of about 0.15 S/m to about 60 S/m.

Figure 12:
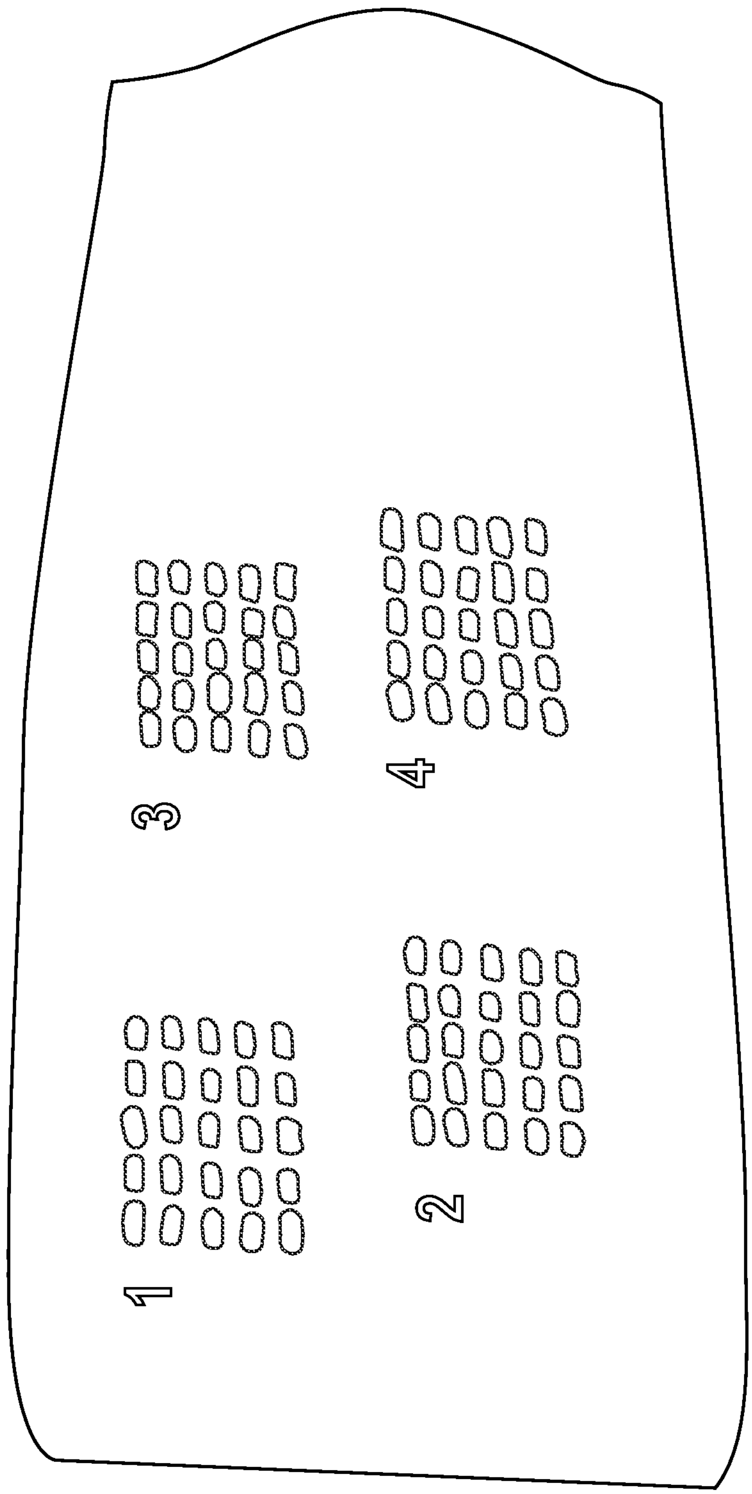
FIG. 12 displays an image of contact pads applied on an exemplary conductive carbon-based glue, according to one or more embodiments described herein.

FIG. 12 is an image of contact pads applied on an exemplary conductive carbon-based glue. In some embodiments, the contact pads comprise silver contact pads. In some embodiments, the contact pads are arranged in four arrays of 20 pads. The contact pads may be used to test the electrical performance of the exemplary film at multiple locations. As shown the contact pads are arranged into a first, a second, a third, and a fourth grid of contact pads, wherein each grid comprises an 5×5 array of individual contact pads.

Figure 13A:
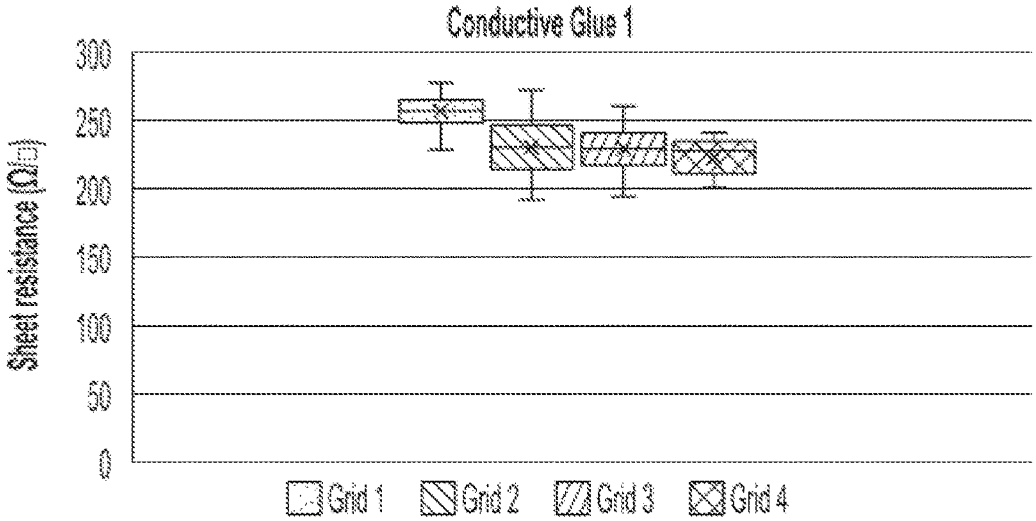
FIG. 13A displays a graph of the sheet resistance of an exemplary first conductive carbon-based glue.
Figure 13B:
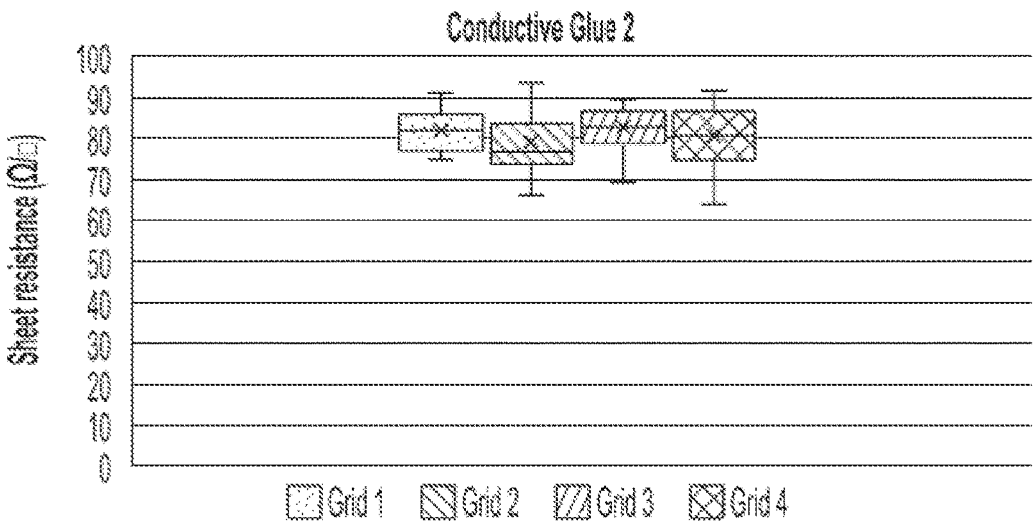
FIG. 13B displays a graph of the sheet resistance of an exemplary second conductive carbon-based glue.
Figure 13C:
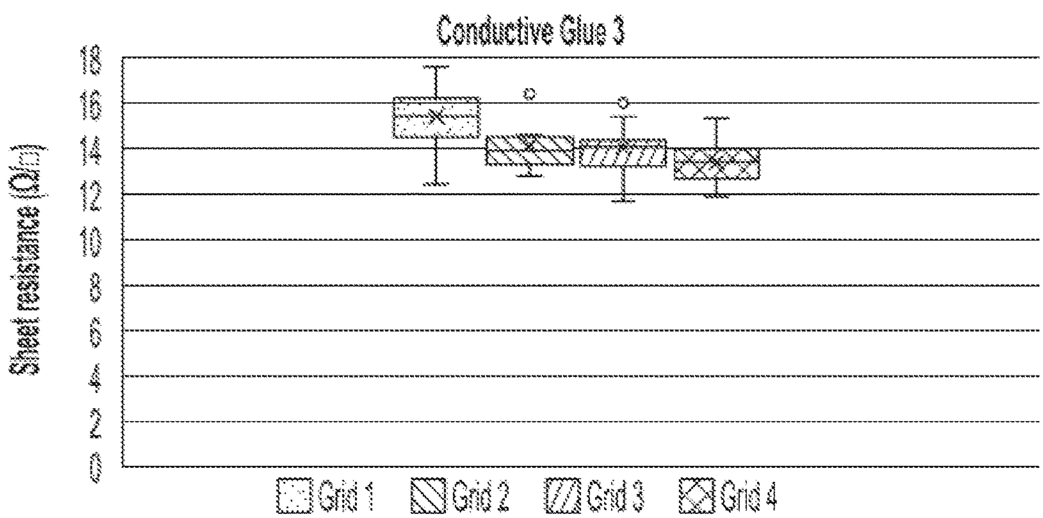
FIG. 13C displays a graph of the sheet resistance of an exemplary third conductive carbon-based glue.

FIGS. 13A-13C show the sheet resistance of exemplary conductive carbon-based glues with varying amounts of carbon-based materials. FIG. 13A is a graph of the sheet resistance of an exemplary first conductive carbon-based glue at four contact pad grids. As shown, the first grid exhibits a sheet resistance of about 250 ohm/sq to about 260 ohm/sq, the second grid exhibits a sheet resistance of about 210 ohm/sq to about 250 ohm/sq, the third grid exhibits a sheet resistance of about 225 ohm/sq to about 250 ohm/sq, and the fourth grid exhibits a sheet resistance of about 210 ohm/sq to about 240 ohm/sq. FIG. 13B is a graph of the sheet resistance of an exemplary second conductive carbon-based glue at four contact pad grids, wherein the second conductive carbon-based glue contains a smaller quantity of the carbon-based material than the first conductive carbon-based glue. As shown, the first grid exhibits a sheet resistance of about 75 ohm/sq to about 85 ohm/sq, the second grid exhibits a sheet resistance of about 72 ohm/sq to about 81 ohm/sq, the third grid exhibits a sheet resistance of about 77 ohm/sq to about 83 ohm/sq, and the fourth grid exhibits a sheet resistance of about 75 ohm/sq to about 88 ohm/sq. FIG. 13C is a graph of the sheet resistance of an exemplary third conductive carbon-based glue at four contact pad grids, wherein the third conductive carbon-based glue contains a smaller quantity of the carbon-based material than the second conductive carbon-based glue. As shown, the first grid exhibits a sheet resistance of about 15 ohm/sq to about 16 ohm/sq, the second grid exhibits a sheet resistance of about 13 ohm/sq to about 15 ohm/sq, the third grid exhibits a sheet resistance of about 13 ohm/sq to about 15 ohm/sq, and the fourth grid exhibits a sheet resistance of about 13 ohm/sq to about 14 ohm/sq.

Figure 14A:
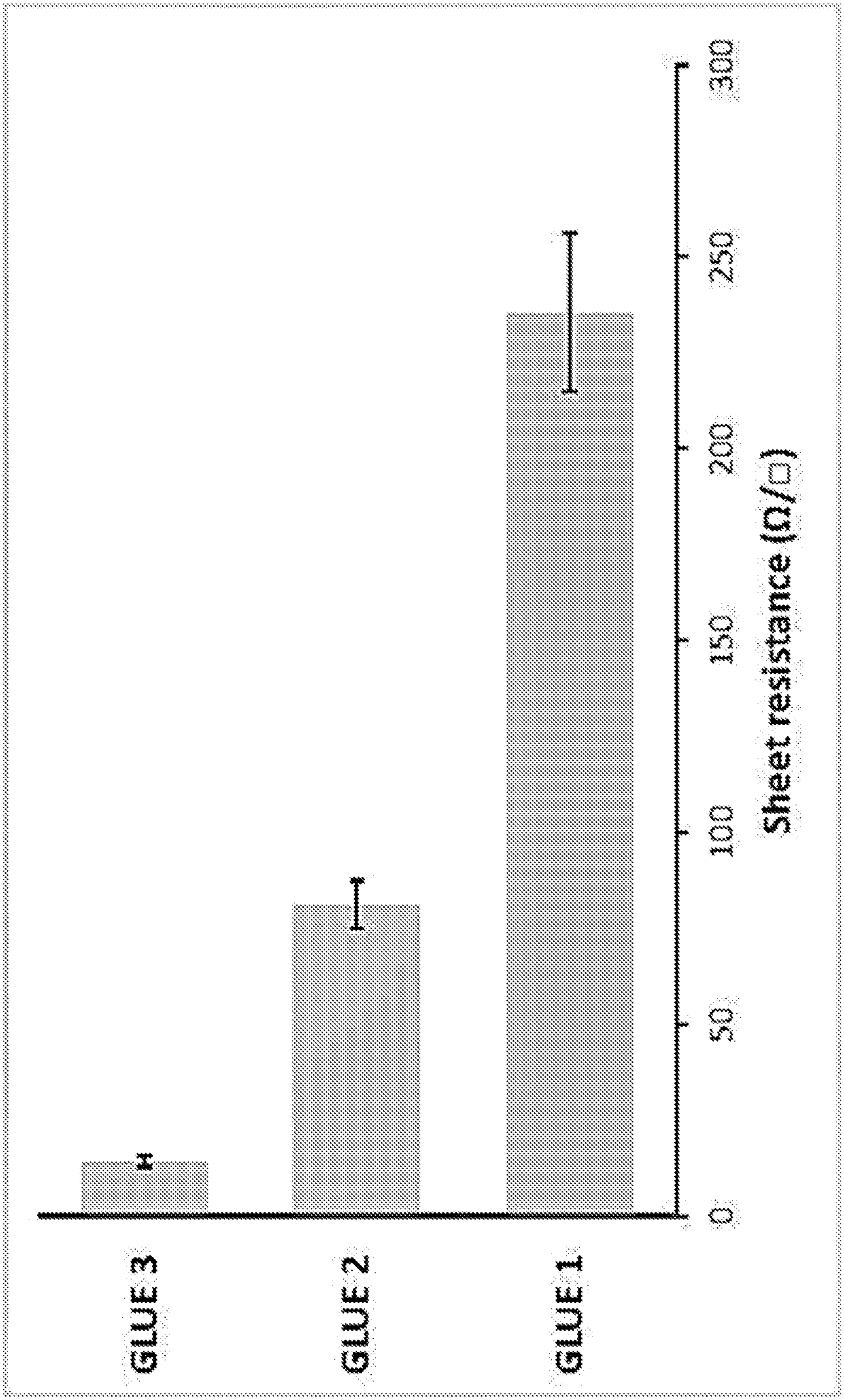
FIG. 14A displays a bar graph of the sheet resistance of exemplary conductive glues, according to one or more embodiments described herein.
Figure 14B:
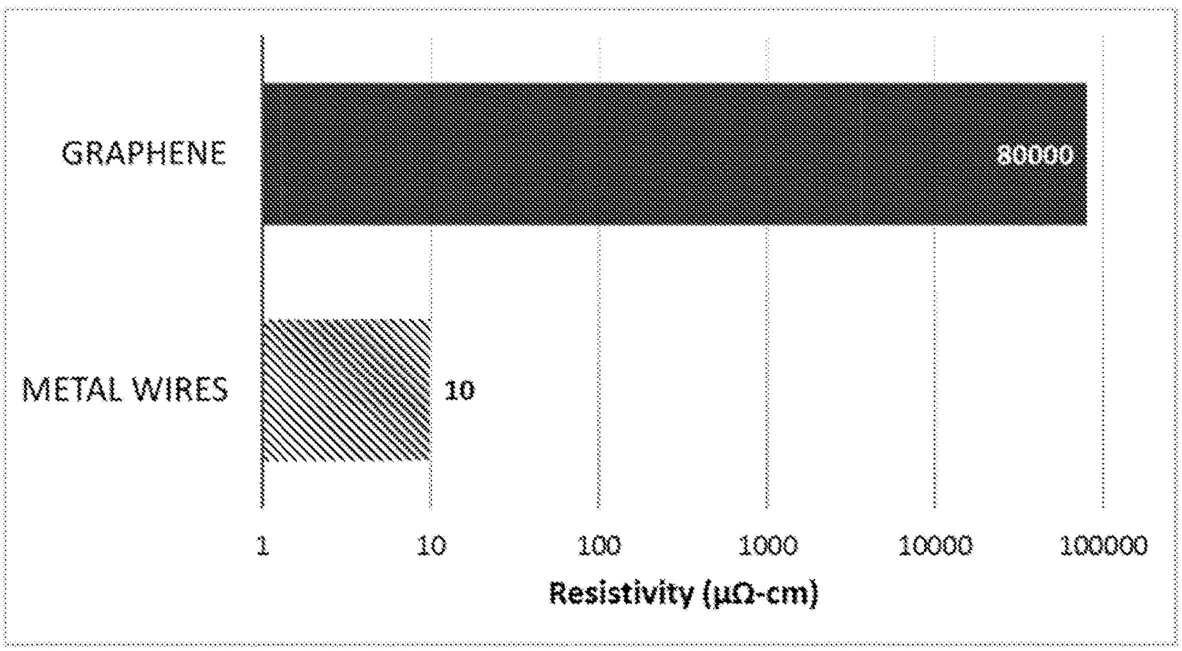
FIG. 14B displays a graph comparing the resistivity of graphene and metal wires, according to one or more embodiments described herein.

FIG. 14A is a bar graph comparing the sheet resistance of the first, second, and third exemplary conductive carbon-based glues when dried on a substrate. In this case, the first conductive carbon-based glue has a greater quantity of the carbon-based material than the second conductive carbon-based glue, which has a greater quantity of the carbon-based material than the third conductive carbon-based glue. As shown, increasing the quantity of the carbon-based material decreases the sheet resistance, whereby the first, second, and third conductive carbon-based glues exhibit sheet resistances of about 225 ohm/sq, 75 ohm/sq, and 10 ohm/sq, respectively. In some embodiments, the conductive carbon-based glue has a sheet resistivity of about 5 ohm/sq to about 500 ohm/sq. In some embodiments, the conductive carbon-based glue has a sheet resistance of about 0.3 ohm/sq/mil to about 2 ohm/sq/mil. FIG. 14B displays a graph comparing the resistivity of graphene and metal wires. As seen, the use of graphene allows for glues, epoxies, and inks with greater electrical properties because of its high resistivity of about 8,000 μΩ/cm versus the 10 μΩ/cm resistivity of metal wires.

Figure 15A:
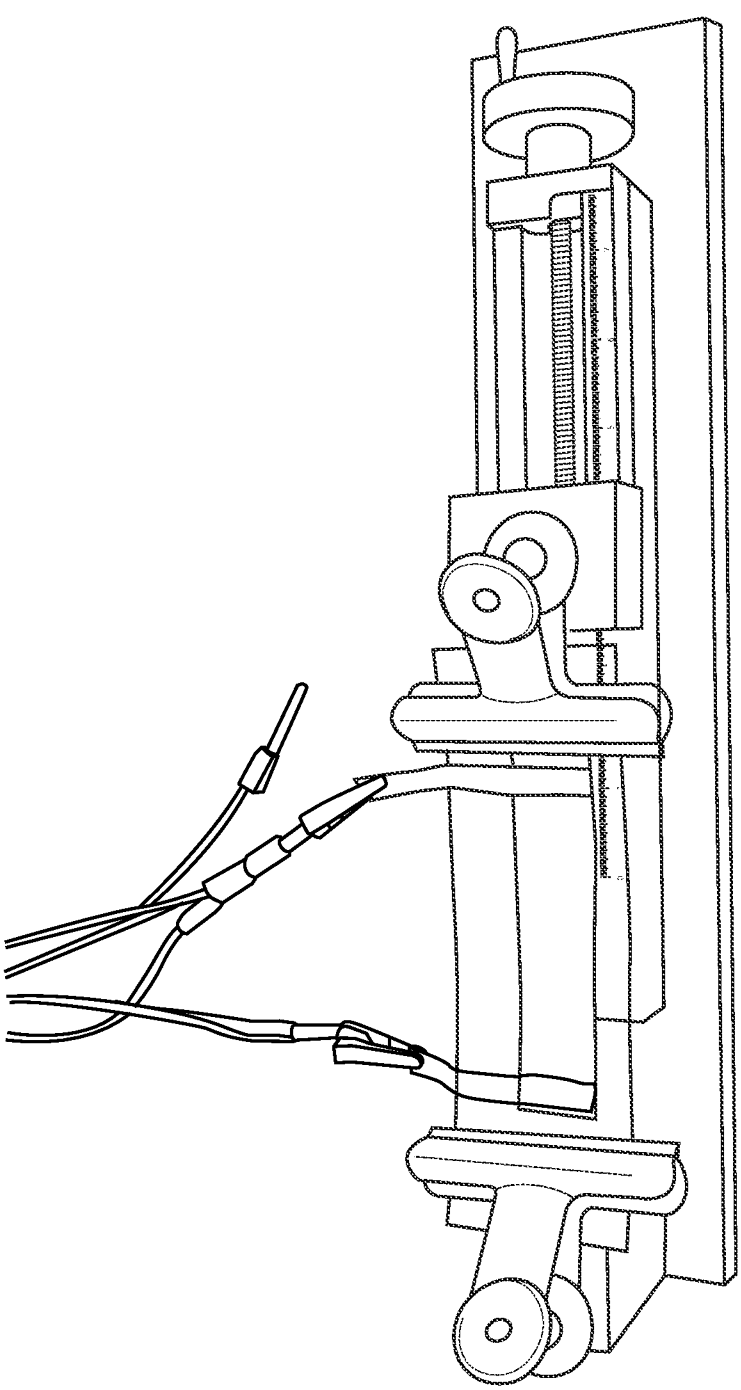
FIG. 15A displays an image of an exemplary apparatus for testing the electrical properties of a film comprising an exemplary conductive carbon-based glue under different bending angles, according to one or more embodiments described herein.
Figure 15B:
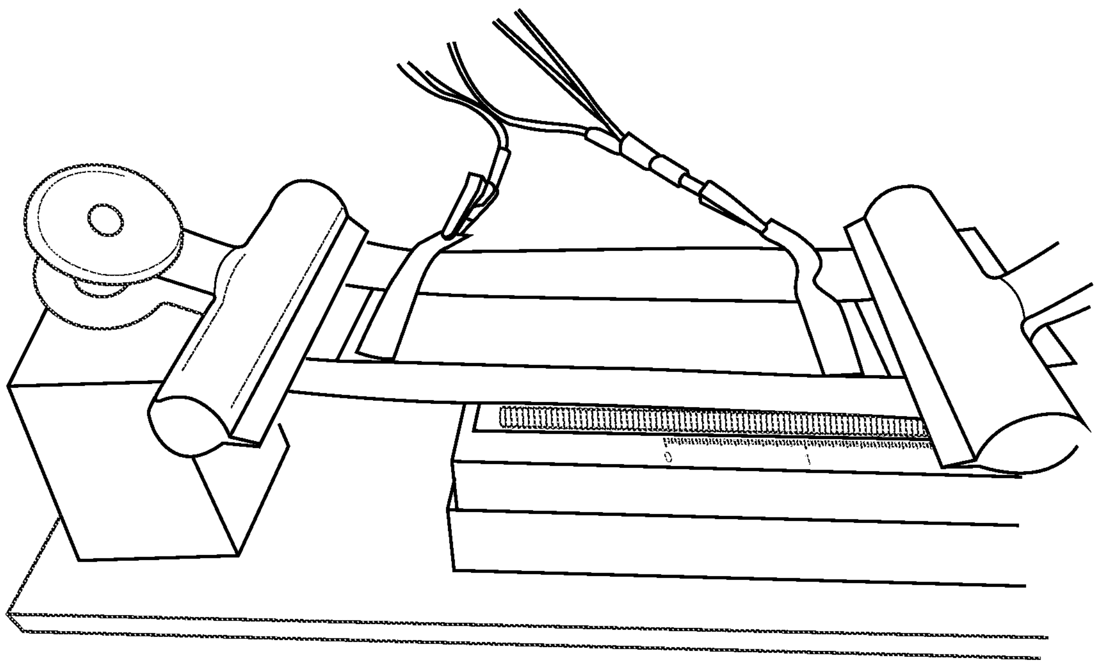
FIG. 15B displays an image of an exemplary apparatus for testing the electrical properties of an unbent film comprising an exemplary conductive carbon-based glue, according to one or more embodiments described herein.
Figure 15C:
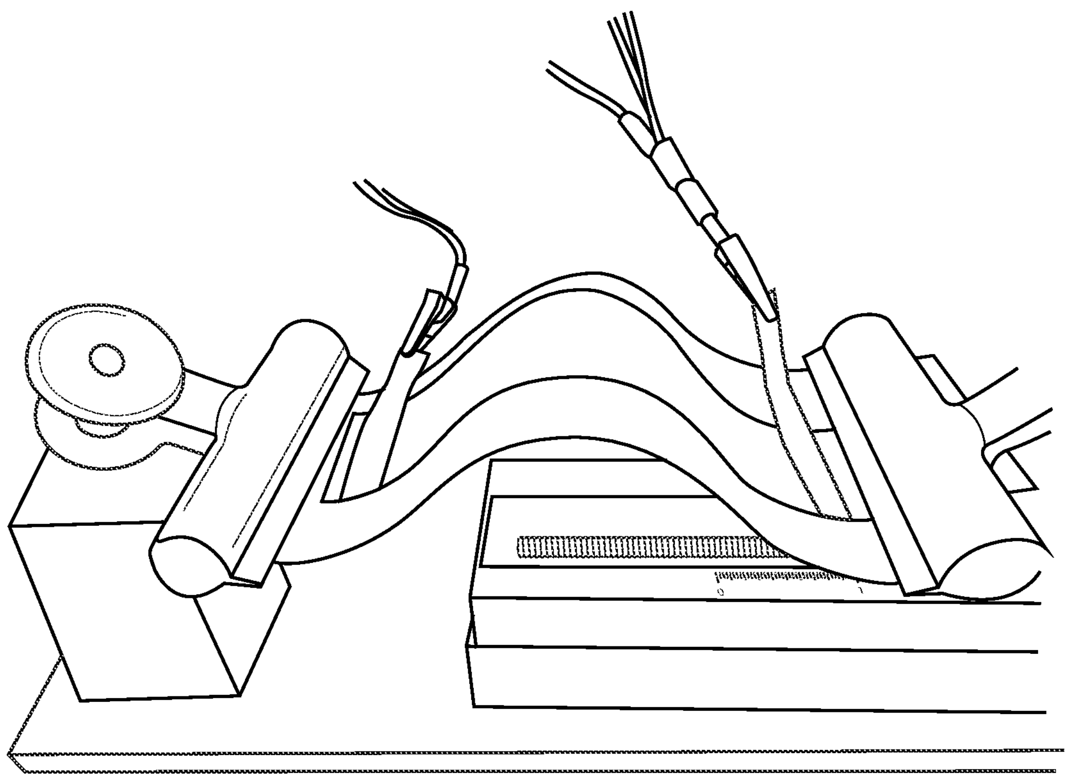
FIG. 15C displays an image of an exemplary apparatus for testing the electrical properties of a bent film comprising an exemplary conductive graphene glue, according to one or more embodiments described herein.
Figure 16A:
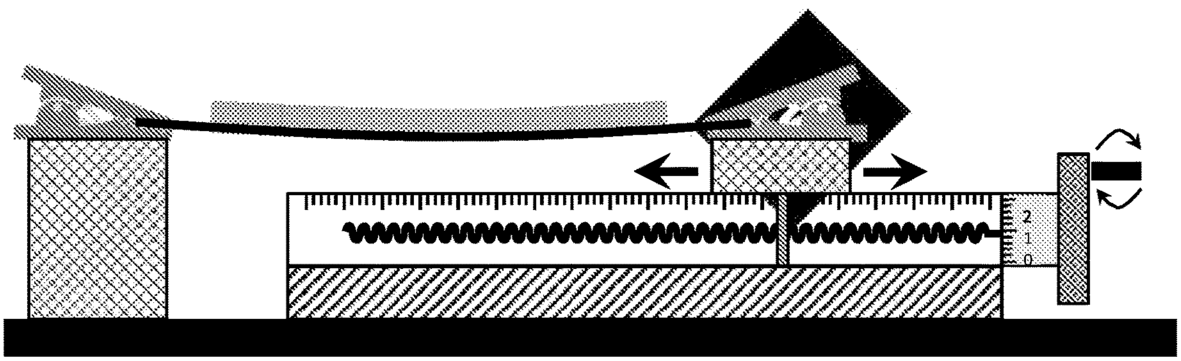
FIG. 16A displays an illustration of an exemplary apparatus for testing the electrical properties of an unbent film comprising a conductive carbon-based glue, according to one or more embodiments described herein.
Figure 16B:
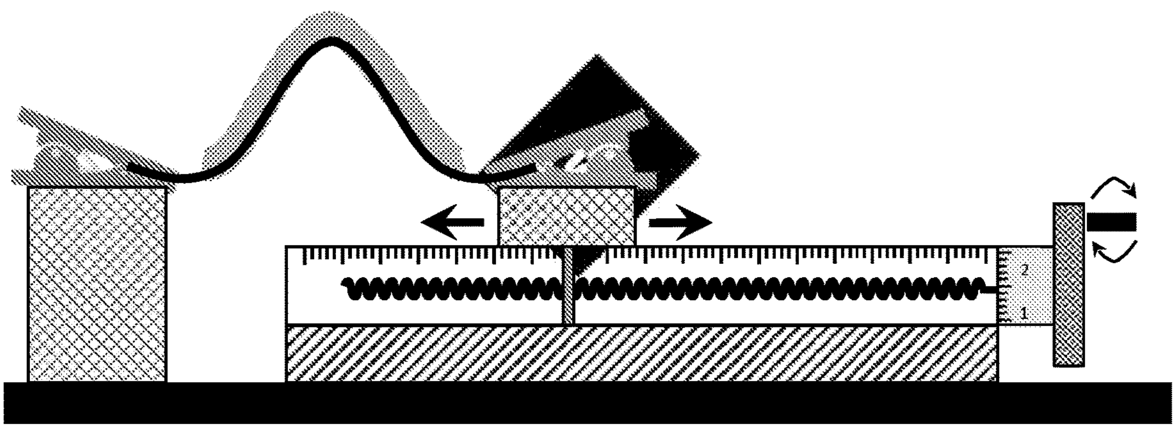
FIG. 16B displays an illustration of an exemplary apparatus for testing the electrical properties of a bent film comprising a conductive carbon-based glue, according to one or more embodiments described herein.

FIGS. 15A-15C show an exemplary apparatus for testing the electrical properties of the conductive carbon-based glue dried on a substrate when under different bending angles. FIG. 15A is an image of an exemplary apparatus for testing the electrical properties of a film comprising an exemplary conductive carbon-based glue under different bending angles. FIG. 15B is an image of an exemplary apparatus for testing the electrical properties of a film comprising an exemplary conductive carbon-based glue, wherein the film is in an unbent state. FIG. 15C is an image of an exemplary apparatus for testing the electrical properties of a film comprising an exemplary conductive graphene, wherein the film is in a bent state. FIG. 16A is an illustration of the exemplary apparatus for testing the electrical properties of a film in an unbent state. FIG. 16B is an illustration of an exemplary apparatus for testing the electrical properties of a film in a bent state.

Figure 17A:
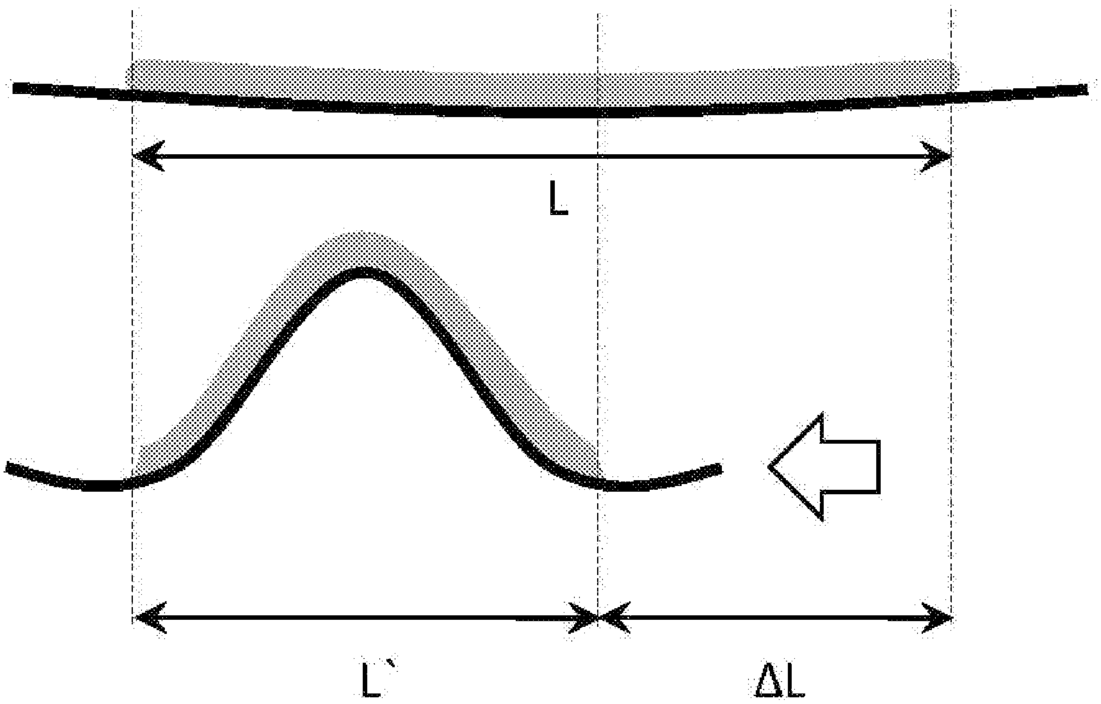
FIG. 17A displays an illustration of a film comprising a conductive carbon-based glue being convexly bent, according to one or more embodiments described herein.
Figure 17B:
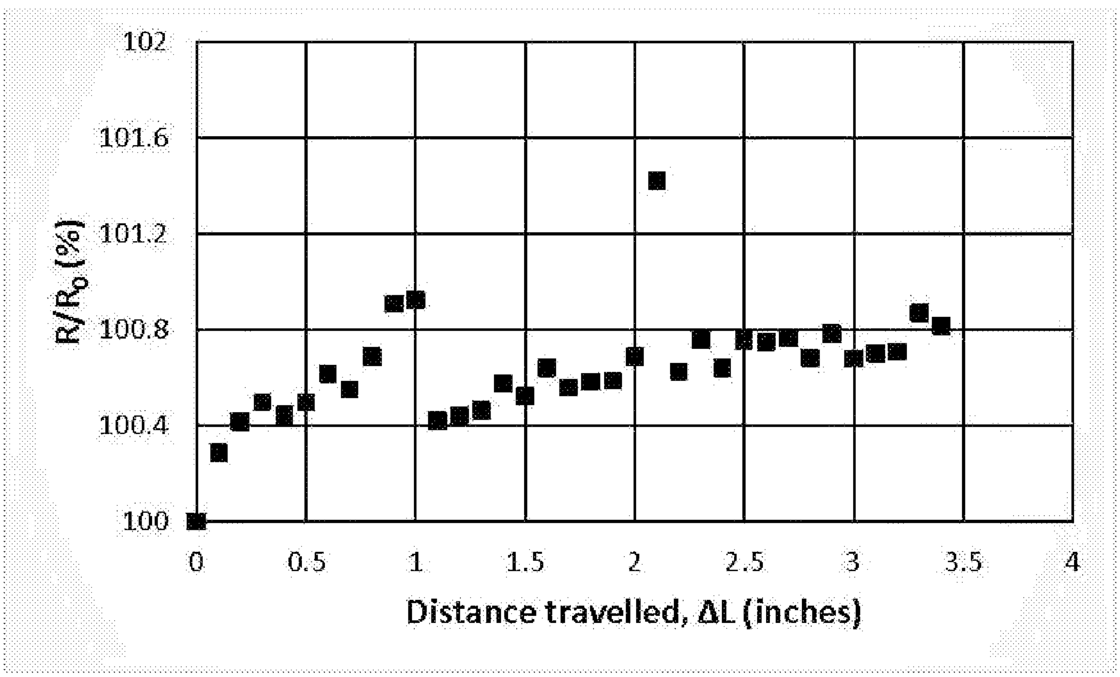
FIG. 17B displays an exemplary graph showing the relationship between the convex bending distance and the resistance change for an exemplary film comprising a conductive carbon-based glue.

FIG. 17A is an illustration of a film comprising a dried conductive carbon-based glue being convexly bent, wherein L=length of the film, ΔL=the distance travelled by the non-stationary end of the film, and L'=the end-to-end distance of the bent film. In one example, L=3.4, wherein the film is bent at about 180 degrees with ΔL=L=3.4. FIG. 17B is an exemplary graph showing the relationship between the convex bending distance and the resistance change for an exemplary film comprising a conductive carbon-based glue. As shown, FIG. 17B displays a Y-axis delineating R/Ro percentage values from 100% to 102% in increments of 0.4%, and an X-axis delineating ΔL values from 0 to 4 inches in increments of 0.5 inch. Thus, the relationship between resistance change and distance traveled appears generally flat. In some embodiments, the conductive carbon-based glue has a sheet resistance difference between a flat position and a position with a convex bend angle of at most 180 degrees, of at most about 6%, 5%, 4%, 3%, 2%, or 1%. In some embodiments, the conductive carbon-based glue has a sheet resistance difference between a flat position and a position with a convex bend angle of at most 180 degrees, of at most about 1.5%. Such a low change in sheet resistance implies that the carbon-based glues described herein can be used in flexible electronics without experiencing functionality loss.

Figure 18A:
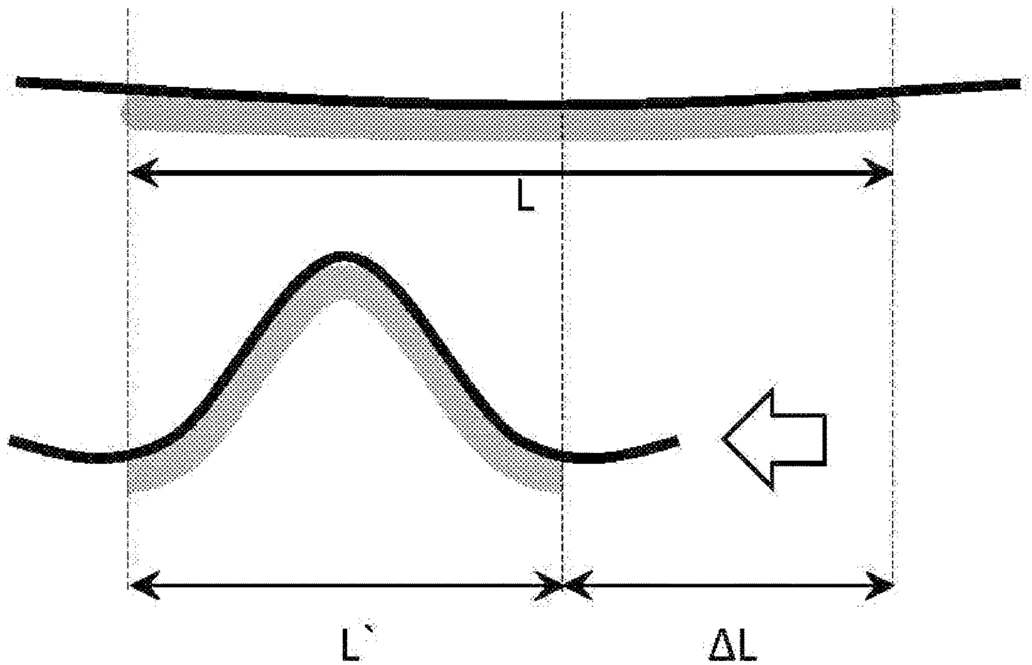
FIG. 18A displays an illustration of a film comprising a conductive carbon-based glue being concavely bent, according to one or more embodiments described herein.
Figure 18B:
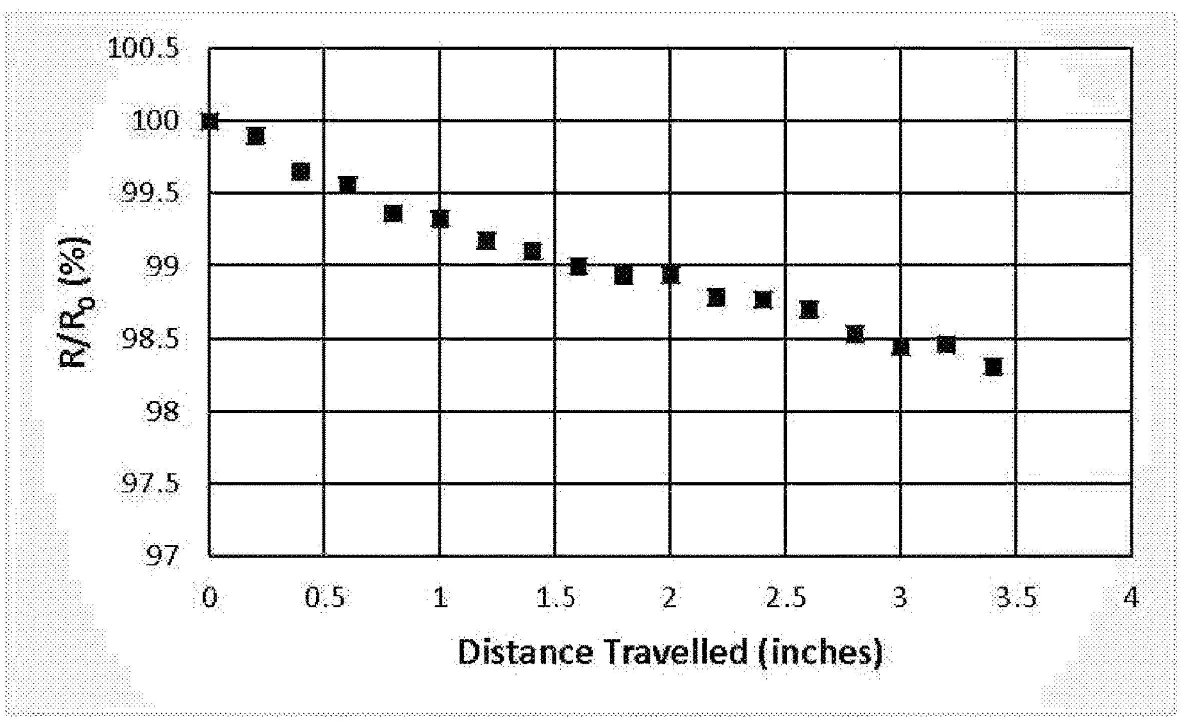
FIG. 18B displays an exemplary graph showing the relationship between the concave bending distance and the resistance change for an exemplary film comprising a conductive carbon-based glue.

FIG. 18A is an illustration of a dried film comprising a conductive carbon-based glue being concavely bent, wherein L=length of the film, ΔL=the distance travelled by the non-stationary end of the film, and L'=the end-to-end distance of the bent film. FIG. 18B is an exemplary graph showing the relationship between the concave bending distance and the resistance change for an exemplary film comprising a conductive carbon-based glue. As shown, FIG. 18B displays a Y-axis delineating R/Ro percentage values from 100% to 102% in increments of 0.4%, and an X-axis delineating ΔL values from 0 to 4 inches in increments of 0.5 inch. Thus FIG. 18B may imply a negative correlation between distance traveled and resistance change. In some embodiments, the conductive carbon-based glue has a sheet resistance difference between a flat position and a position with a concave bend angle of at most 180 degrees of at most about 6%, 5%, 4%, 3%, 2%, or 1%. In some embodiments, the conductive carbon-based glue has a sheet resistance difference between a flat position and a position with a concave bend angle of at most 180 degrees of at most about 2%. Such a low change in sheet resistance further implies that the carbon-based glues described herein may be used in flexible electronics without experiencing functionality loss.

Figure 19A:
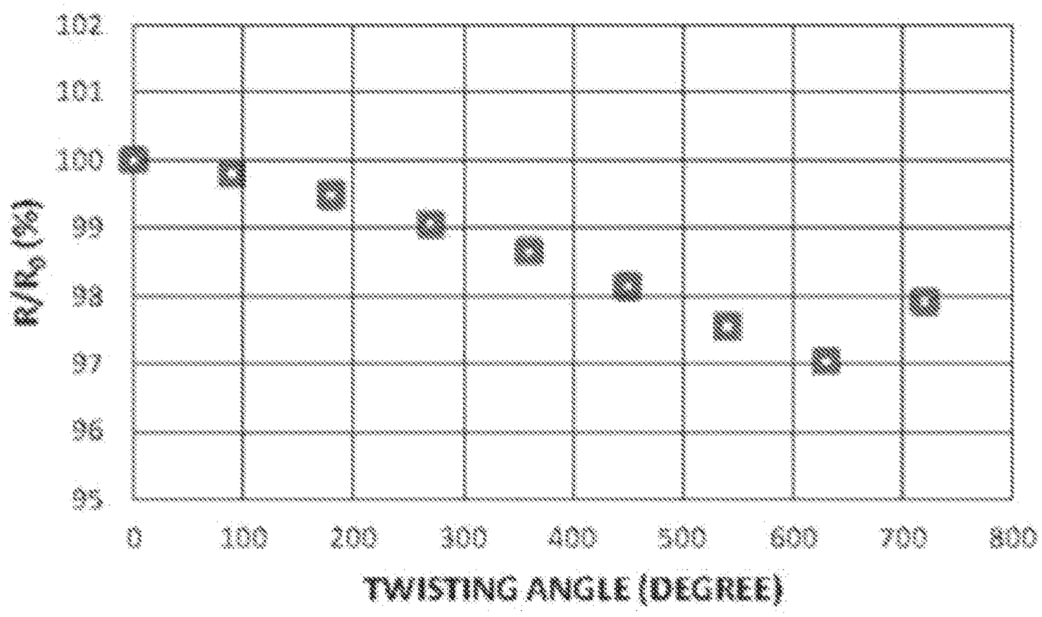
FIG. 19A displays an exemplary graph showing the relationship between the twisting angle and the resistance change for an exemplary conductive carbon-based glue film comprising a conductive carbon-based glue, according to one or more embodiments described herein.

FIG. 19A is a graph showing the relationship between the twisting angle (from 0 degrees to 800 degrees in 100 degree increments) and the resistance change (from 95% to 102% in 1% increments) for an exemplary dried film comprising conductive carbon-based glue, whereby the resistance decreases by less than 6%, 5%, 4%, 3%, or 2% when twisted. In some embodiments, the resistance change for an exemplary conductive carbon-based glue film comprising a conductive carbon-based glue is less than 3% when twisted. In some embodiments, the conductive carbon-based glue has a sheet resistance difference between a flat position and a position with a twist angle of at most 800 degrees of at most about 10%, 9%, 8%, 7%, 6%, 5%, 4%, 3%, or 2%. In some embodiments, the conductive carbon-based glue has a sheet resistance difference between a flat position and a position with a twist angle of at most 800 degrees of at most about 3%. This low sheet resistance delta shows that the carbon-based glues described herein may be used in flexible electronics without reduced electrical functionality.

Figure 19B:
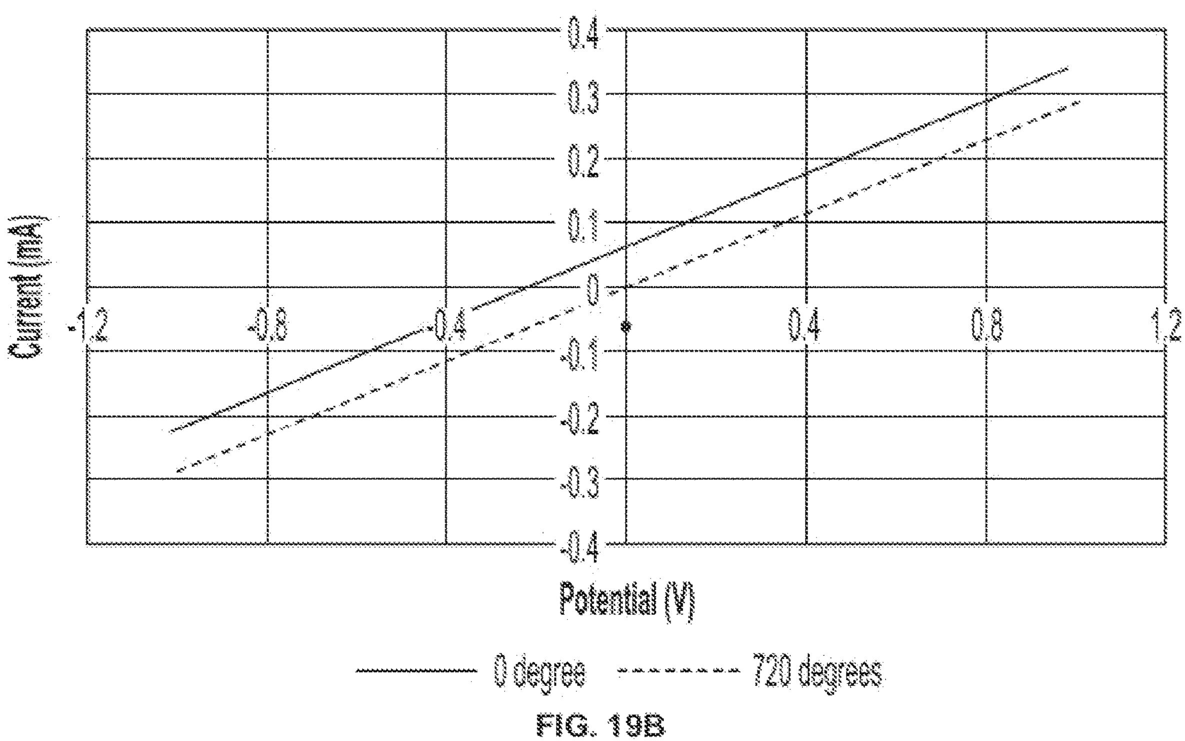
FIG. 19B displays an exemplary current-voltage graph of an exemplary film comprising a conductive carbon-based glue twisted at 0 degrees and 720 degrees.
Figure 20:
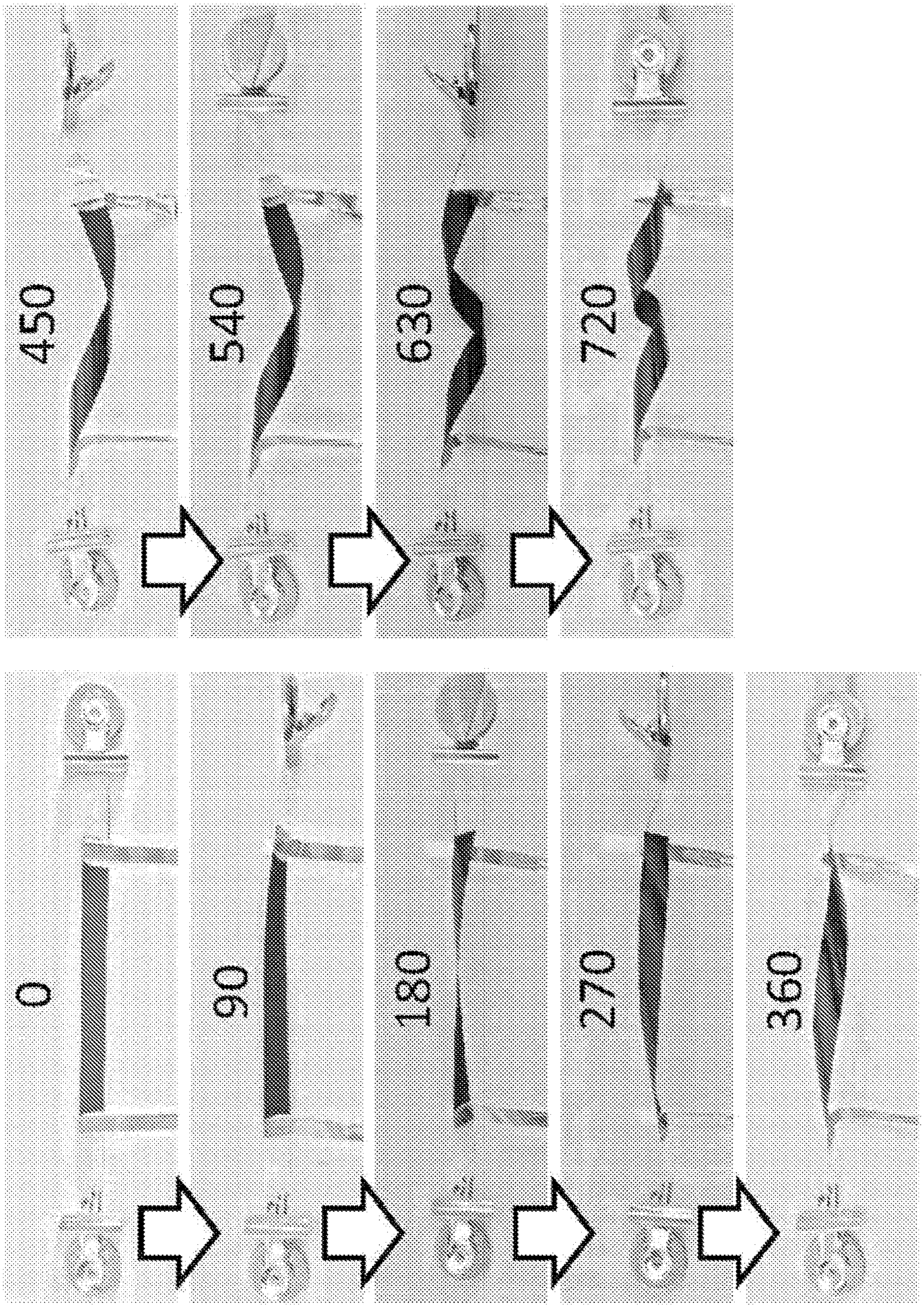
FIG. 20 displays images of an exemplary film comprising a conductive carbon-based glue at different twist angles, according to one or more embodiments described herein.

FIG. 19B is a current-voltage graph of an exemplary film comprising a dried conductive carbon-based glue on a substrate that is twisted at 0 degrees and 720 degrees. The graph shows an X-axis having values from −1.2 V to 1.2 V in 0.2 V increments, and a Y-axis having values from −0.4 mA to 0.4 mA in increments of 0.1 mA. As shown, the film twisted at 720 degrees exhibits a lower current at the same voltages than the film twisted at 0 degrees by about 0.05 mA. FIG. 20 displays images of an exemplary film comprising a conductive carbon-based glue at twist angles of 0, 90, 180, 270, 360, 450, 540, 630, and 720 degrees.

Figure 21:
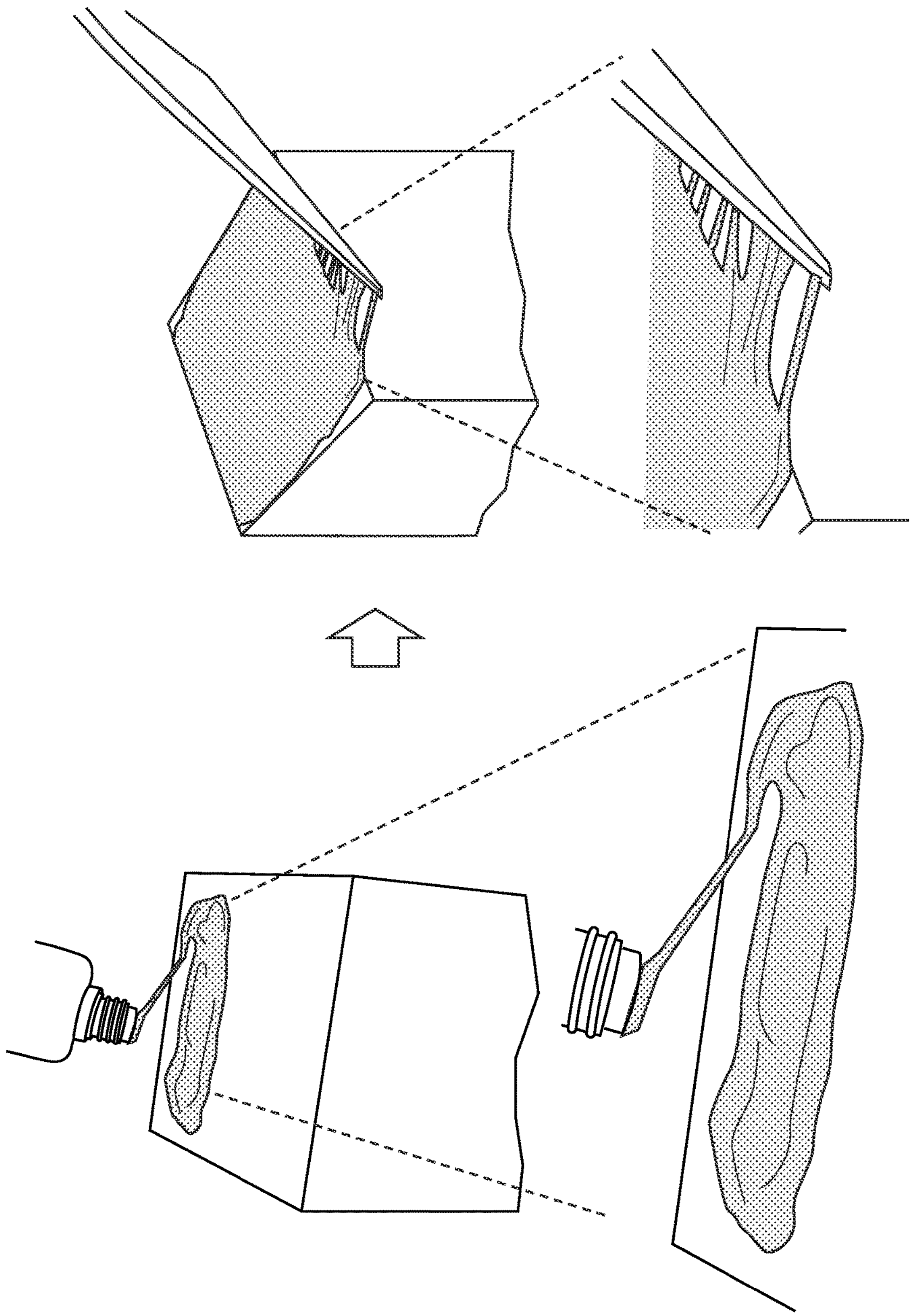
FIG. 21 displays images of the preparation of an exemplary conductive carbon-based glue sample for tensile strength testing.
Figure 22A:
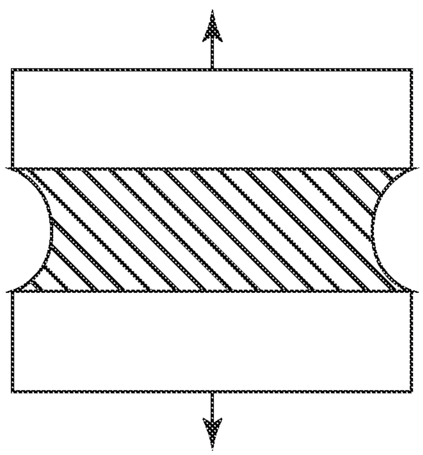
FIG. 22A displays an illustration of tensile strength, according to one or more embodiments described herein.
Figure 22B:
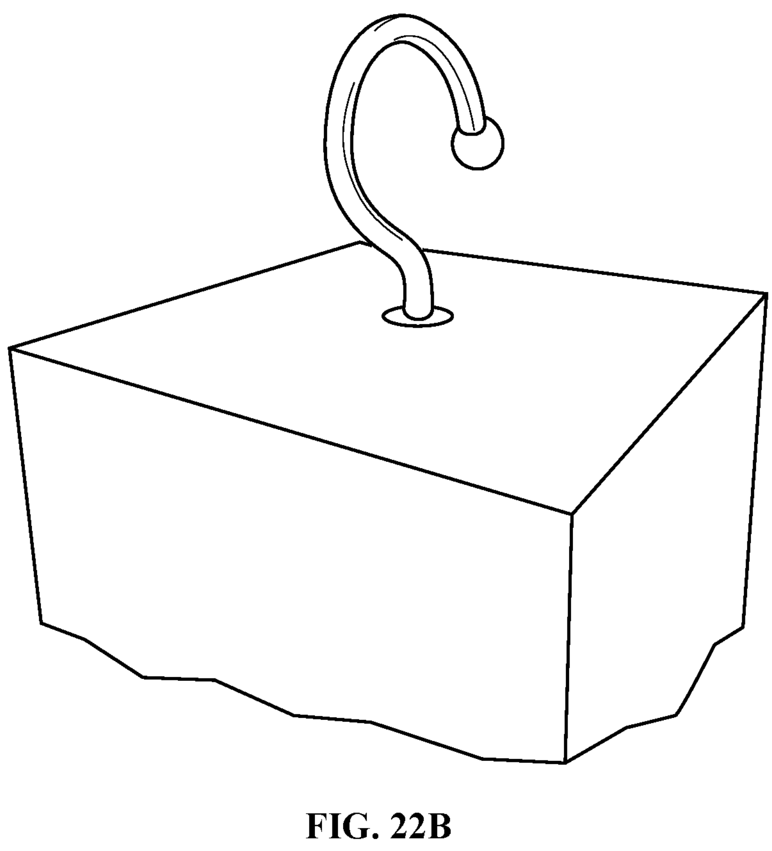
FIG. 22B displays an image of the tensile hook of a prepared tensile strength testing sample of an exemplary conductive carbon-based glue.
Figure 22C:
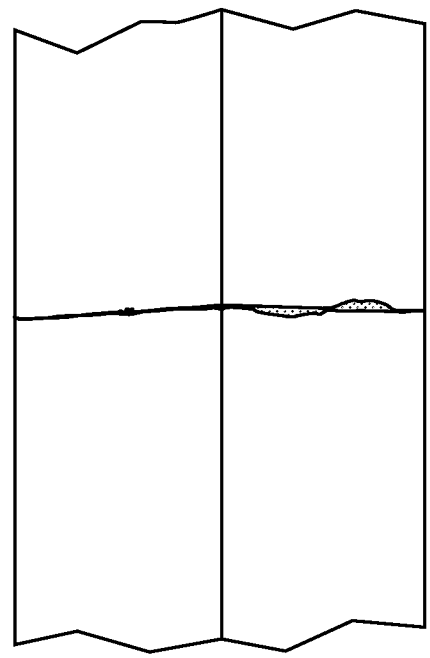
FIG. 22C displays an image of the adhered joint of a prepared tensile strength testing sample of an exemplary conductive carbon-based glue.

The strength of an adhesive may be defined by its tensile strength or bond strength. In some embodiments, the tensile strength of an adhesive is measured by preparing exemplary samples and adhering two blocks together using the adhesive and applying a force to pull apart the blocks at room temperature. FIG. 21 displays images of the preparation of an exemplary conductive carbon-based glue sample for tensile strength testing. In some embodiments, the adhesive is applied on wood with a squeegee. FIG. 22A is an illustration of an adhesive connecting two blocks and under tensile stress. FIG. 22B is an image of the tensile hook of a prepared tensile strength testing sample of an exemplary conductive carbon-based glue. FIG. 22C is an image of the adhered joint of a prepared tensile strength testing sample of an exemplary conductive carbon-based glue. In some embodiments, the tensile strength testing sample is prepared by applying the adhesive to a piece of wood, clamping the piece of wood to another piece of wood, allowing the conductive carbon-based glue to cure overnight, and attaching threaded hooks to each end of the tensile strength testing sample. In some embodiments, the conductive carbon-based glue has a shear strength of at least about 30 MPa, 25 MPa, 20 MPa, 10 MPa, or 5 MPa.

Figure 23A:
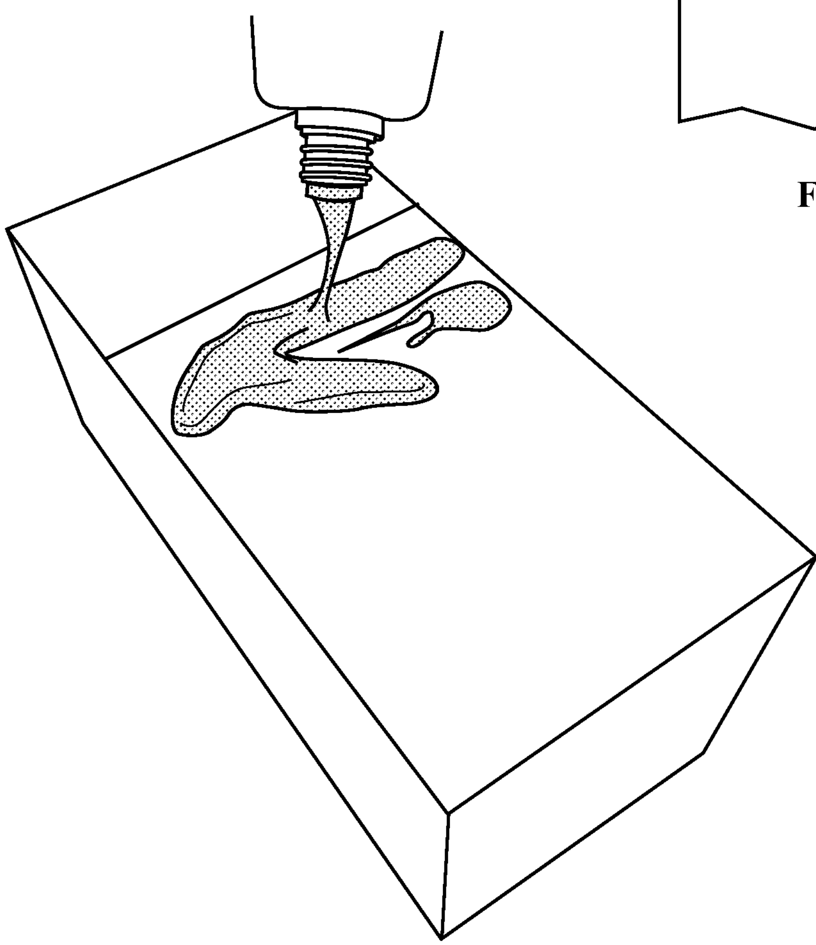
FIG. 23A displays a first image of the preparation of an exemplary conductive carbon-based glue sample for shear strength testing.
Figure 23B:
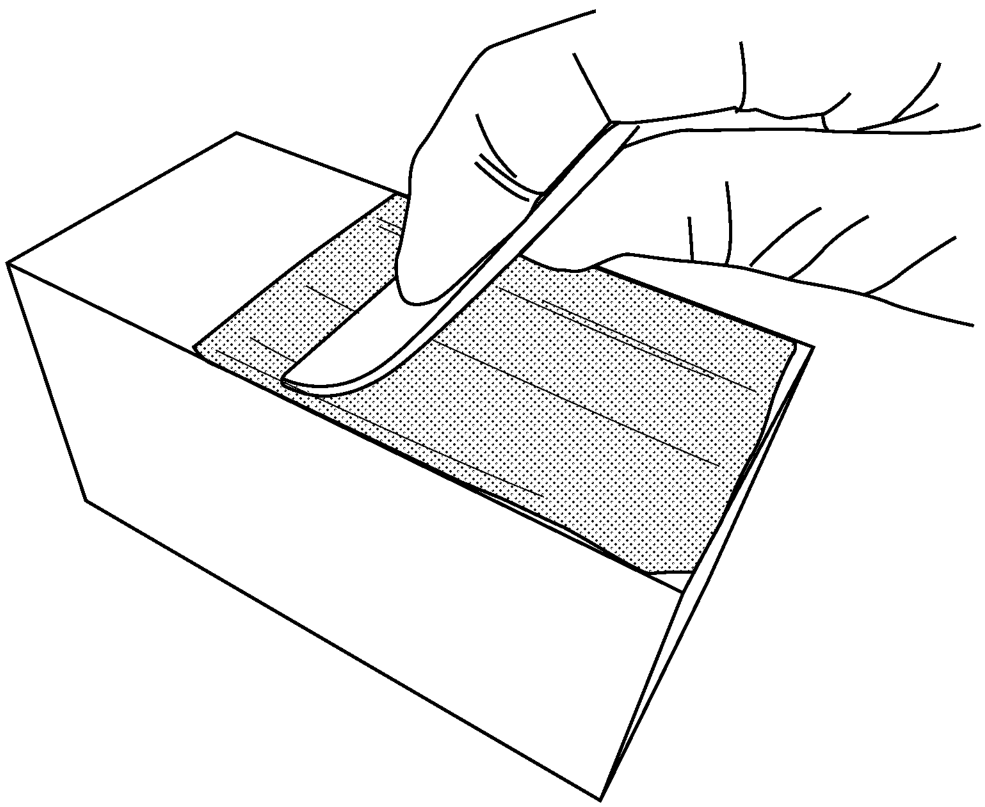
FIG. 23B displays a second image of the preparation of an exemplary conductive carbon-based glue sample for shear strength testing.

In some embodiments, the strength of an adhesive is defined by its shear strength or bond strength. In some embodiments, the shear strength of an adhesive is measured by preparing exemplary samples, adhering two blocks together using the adhesive and applying a shear force to pull apart the blocks in a direction parallel to the glued face at room temperature. FIG. 23A is a first image of the preparation of an exemplary conductive carbon-based glue sample for shear strength testing. FIG. 23B is a second image of the preparation of an exemplary conductive carbon-based glue sample for shear strength testing.

Figure 24A:
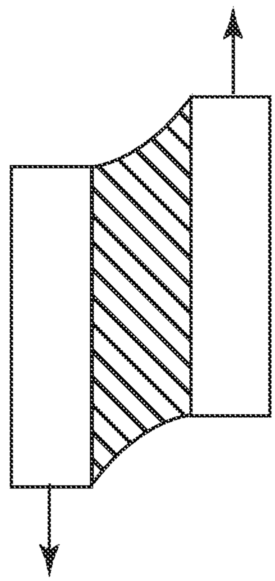
FIG. 24A displays an illustration of shear strength, according to one or more embodiments described herein.
Figure 24B:
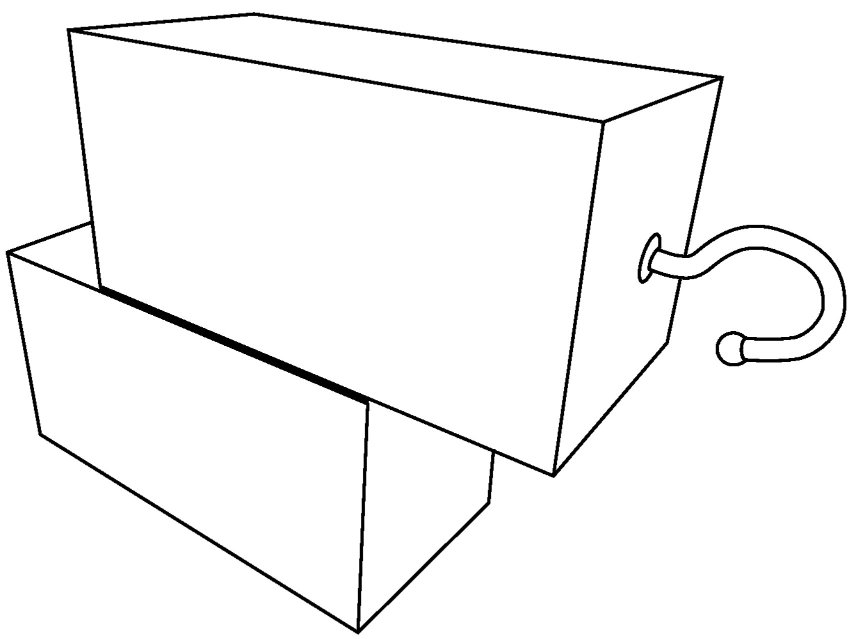
FIG. 24B displays an image of the adhered joint of a prepared shear strength testing sample of an exemplary conductive carbon-based glue.
Figure 25A:
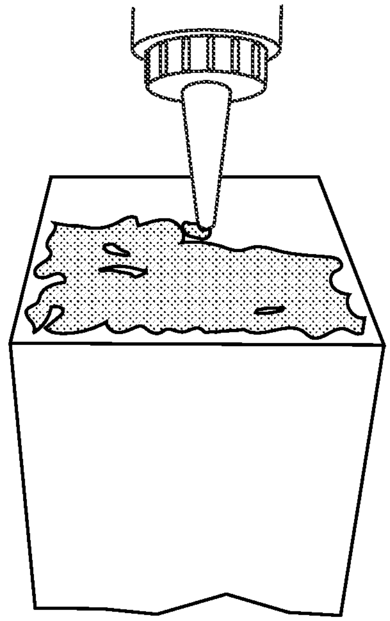
FIG. 25A displays a first image of the preparation of an exemplary glue tensile strength testing sample without conductive graphene.
Figure 25B:
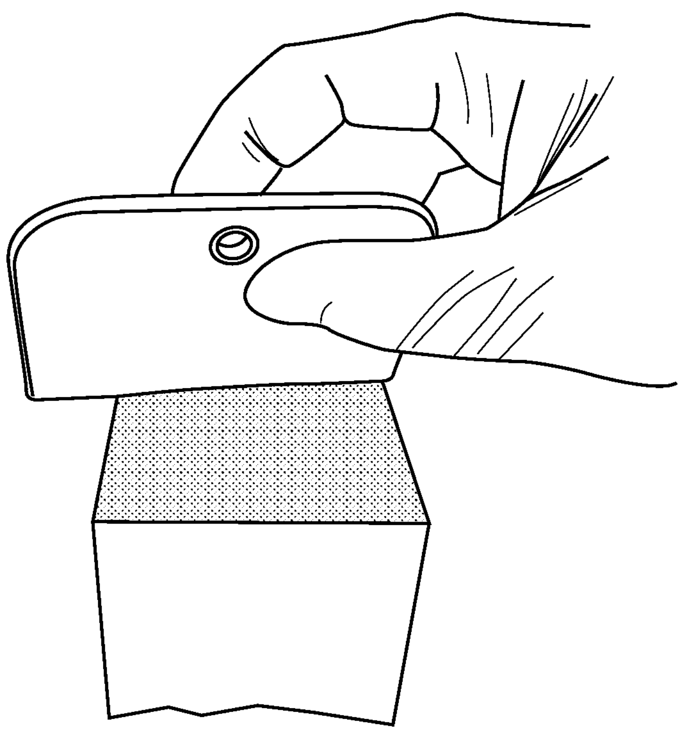
FIG. 25B displays a second image of the preparation of an exemplary glue tensile strength testing sample without conductive graphene, according to one or more embodiments described herein.
Figure 26:
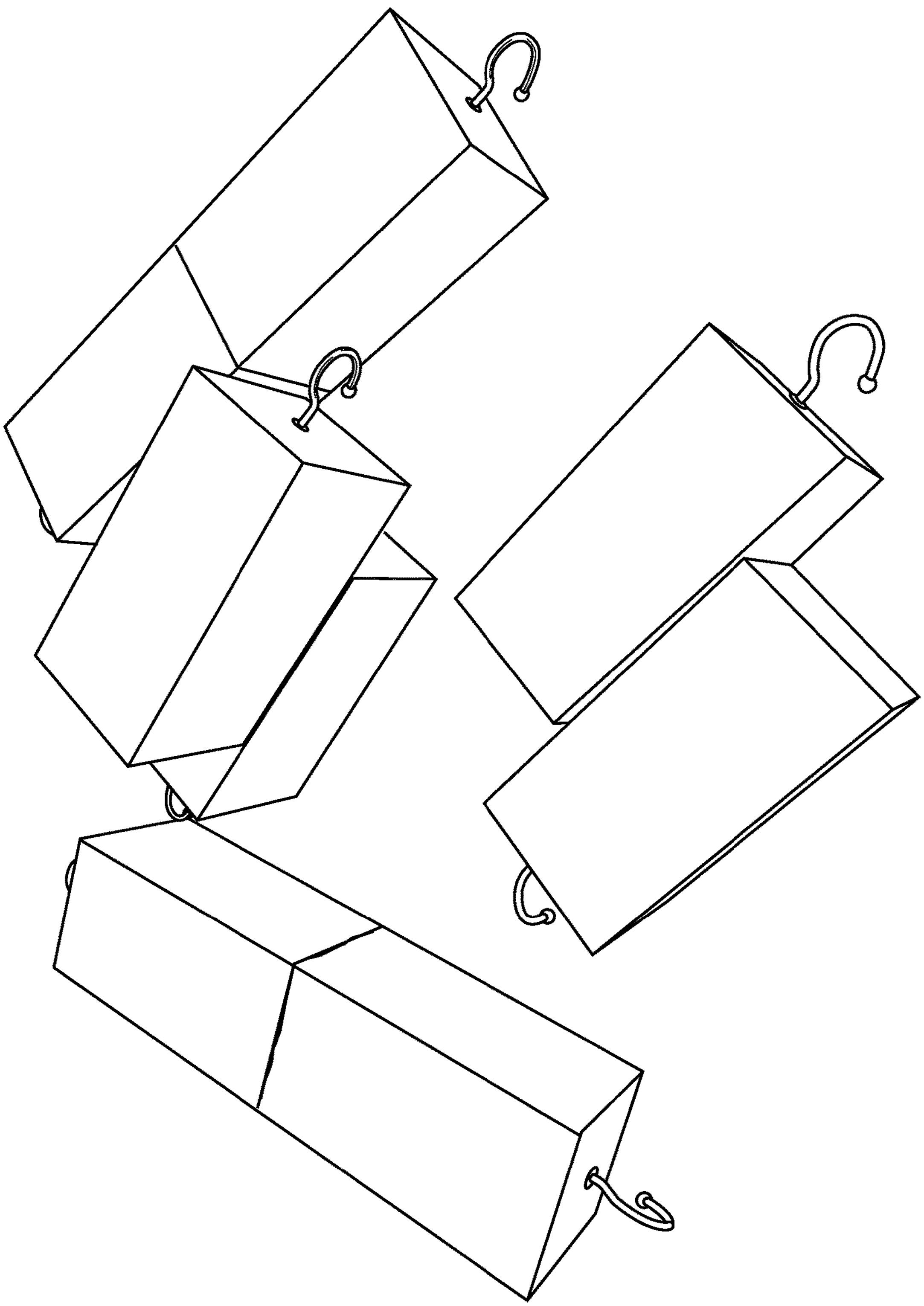
FIG. 26 displays an image of the prepared tensile and shear stress samples of an exemplary conductive carbon-based glue and an exemplary glue without conductive graphene, according to one or more embodiments described herein.
Figure 27:
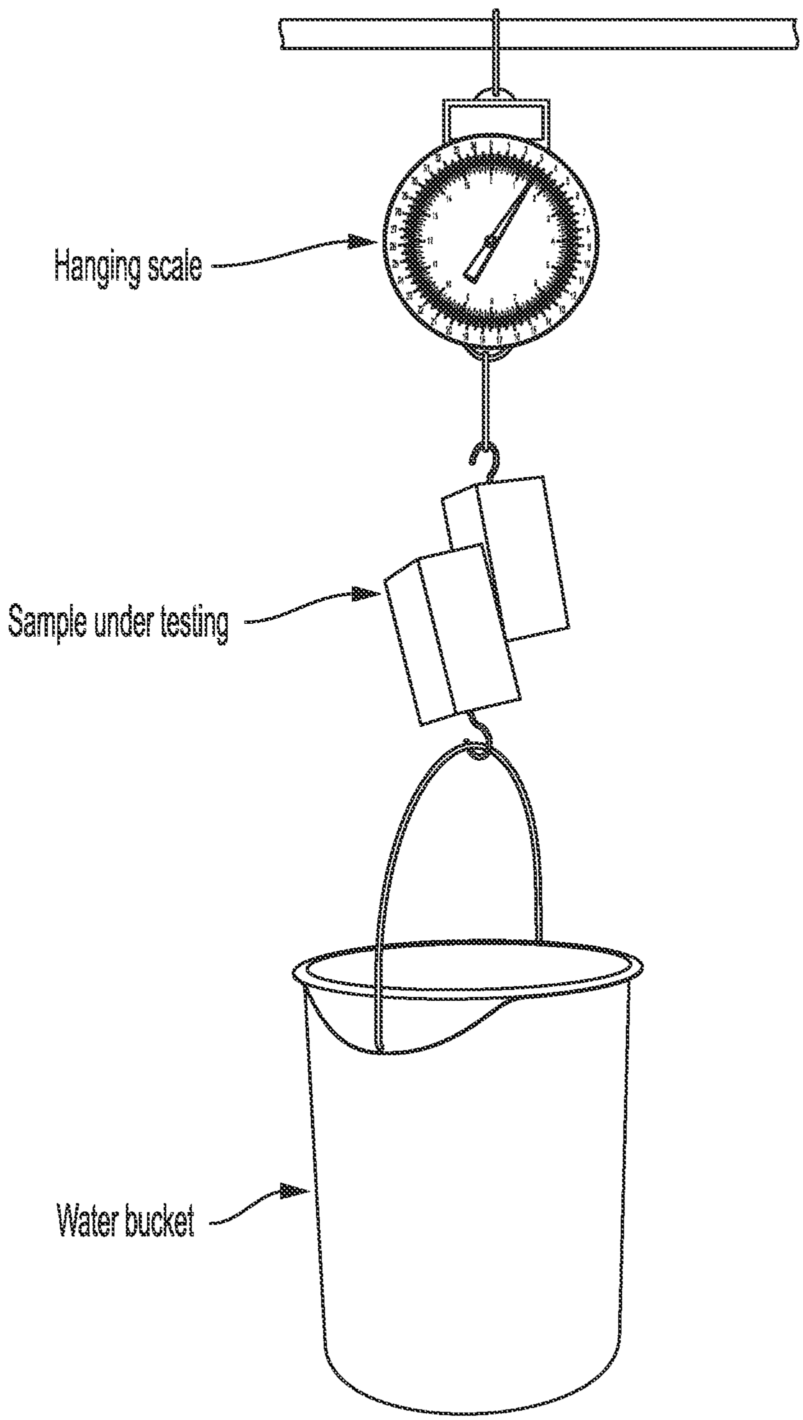
FIG. 27 displays a first image of the tensile and sheer stress testing apparatus, according to one or more embodiments described herein.
Figure 28:
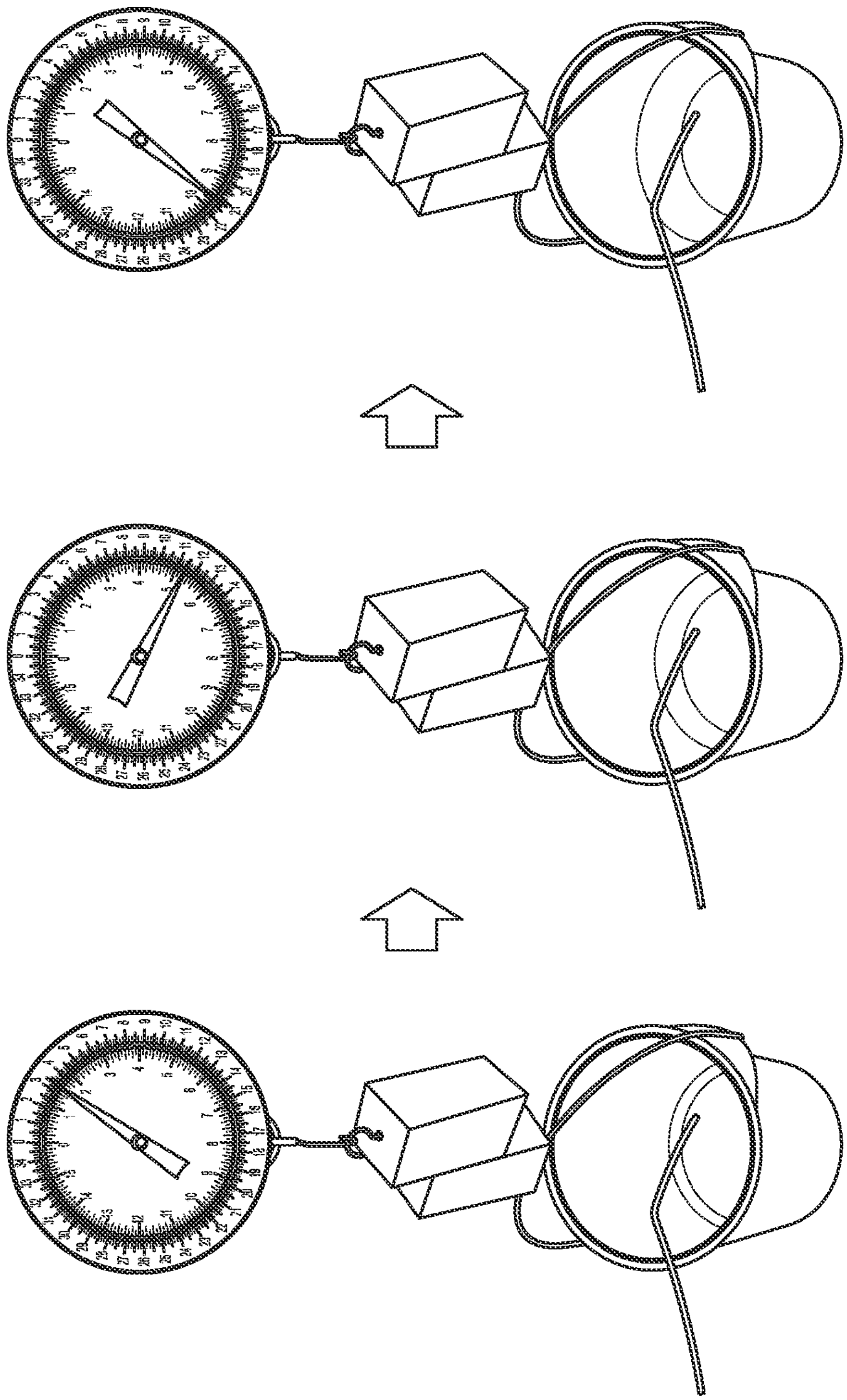
FIG. 28 displays a second image of the tensile and sheer stress testing apparatus, according to one or more embodiments described herein.

FIG. 24A is an illustration of shear strength. FIG. 24B is an image of the adhered joint of a prepared shear strength testing sample of an exemplary conductive carbon-based glue. FIG. 25A is a first image of the preparation of an exemplary glue tensile strength testing sample without conductive graphene. FIG. 25B is a second image of the preparation of an exemplary glue tensile strength testing sample without conductive graphene. FIG. 26 is an image of the prepared tensile and shear stress samples of an exemplary conductive carbon-based glue and an exemplary glue without conductive graphene. FIG. 27 is a first image of the tensile and sheer stress testing apparatus comprising a hanging scale, a sample, and a water bucket, wherein water added to the water bucket increases the force on the sample. FIG. 28 is a second image of the tensile and sheer stress testing apparatus. In some embodiments, the conductive carbon-based glue has a shear strength of at least about 20 MPa, 15 MPa, 10 MPa, or 5 MPa.

As such, the conductive glues may be used for a variety of applications, such as for bonding, sauntering, splicing, bridging, short circuiting, printed electronics, flexible electronics, antenna formation, energy harvesting, composites, or any electrical formation or alteration procedure. The conductive glues may dry at room temperature and as such offer an alternative to conventional soldering where the use of high temperatures is not possible.

Conductive Epoxies

Currently available conductive epoxies require a conductive additive concentration by weight of about 80%-90% to achieve electrical percolation. This high concentration, however, reduces the bonding efficacy of the adhesive materials, which become brittle and weak when dry. Further, such high concentrations of often costly conductive additives (e.g., silver) are prohibitively expensive. By contrast, the conductive epoxies disclosed herein require lower conductive additive concentrations for electrical percolation and are thus more robust and economical.

Provided herein is a conductive epoxy comprising a conductive additive and an adhesive agent. The conductive epoxy may comprise a two-part epoxy. The conductive epoxy may be configured to bond a wide range of materials including, but not limited to, wood, plastics, metals, ceramics, fabrics, encapsulations, and electronic components. The conductive epoxy may be configured to bond two similar materials, two dissimilar materials, or both. The conductive carbon-based epoxy may be used as a versatile filler for gap bonding, surface repairs, and laminating.

The conductive additive may comprise a carbon-based material. The conductive additive may comprise a silver-based material. The conductive additive may comprise a carbon-based material and a silver-based material. In some embodiments at least a portion of the conductive additive is incorporated into the resin, the hardener, or both. In some embodiments at least a portion of the conductive additive is incorporated into the resin and not the hardener. In some embodiments at least a portion of the conductive additive is incorporated into the hardener and not the resin. In some embodiments, the concentration of the conductive additive within the conductive epoxy is about 0.5% to about 10%. In some embodiments, the concentration of the conductive additive within the conductive epoxy is about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10%, or about 9% to about 10%. In some embodiments, the concentration of the conductive additive within the conductive epoxy is about 0.5%, about 1%, about 2%, about 3%, about 4%, about 5%, about 6%, about 7%, about 8%, about 9%, or about 10%. In some embodiments, the concentration of the conductive additive within the conductive epoxy is at least about 0.5%, about 1%, about 2%, about 3%, about 4%, about 5%, about 6%, about 7%, about 8%, or about 9%. In some embodiments, the concentration of the conductive additive within the conductive epoxy is at most about 1%, about 2%, about 3%, about 4%, about 5%, about 6%, about 7%, about 8%, about 9%, or about 10%.

The silver-based additive may comprise a silver nanowire, a silver nanoparticle, or both. The silver-based additive may comprise a silver nanowire and not a silver nanoparticle. The silver-based additive may comprise a silver nanoparticle and not a silver nanowire. The silver-based additive may comprise a silver nanowire and a silver nanoparticle. Alternatively, the silver-based material may comprise silver nanorods, silver nanoflowers, silver nanofibers, silver nanoplatelets, silver nanoribbons, silver nanocubes, silver bipyramids, or any combination thereof. The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60

μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. The silver nanowire may have an average aspect ratio of about 250:1, 300:1, 350:1, 400:1, 450:1, 500:1, 600:1, 700:1, 800:1, 900:1, or 1000:1. The silver nanowire may have an average aspect ratio of at least about 250:1, 300:1, 350:1, 400:1, 450:1, 500:1, 600:1, 700:1, 800:1, 900:1, or 1000:1.

The carbon-based material may comprise two or more of a graphene nanoparticle, a graphene nanosheet, and a graphene microparticle. The carbon-based material may comprise a graphene nanoparticle and a graphene nanosheet. The carbon-based material may comprise a graphene nanoparticle and a graphene microparticle. The carbon-based material may comprise a graphene nanosheet and a graphene microparticle. The carbon-based material may comprise a graphene nanoparticle, a graphene nanosheet, and a graphene microparticle. Alternatively, the carbon-based material may comprise graphite powder, natural graphite, synthetic graphite, expanded graphite, carbon black, Timcal carbon super C45, Timcal carbon super C65, cabot carbon, carbon super P, acetylene black, furnace black, carbon nanotubes, vapor-grown carbon fibers, graphene oxide, or any combination thereof.

The adhesive agent may comprise a resin and a hardener. The hardener may comprise the graphene nanoparticle and the graphene nanosheet. The hardener may comprise the graphene nanoparticle and the graphene microparticle. The hardener may comprise the graphene nanosheet and the graphene microparticle. The hardener may comprise the graphene nanoparticle, the graphene nanosheet, and the graphene microparticle. The hardener may comprise the silver nanowire and the silver nanoparticle. The hardener may comprise the silver nanowire and not the silver microparticle. The hardener may comprise the silver microparticle and not the silver nanowire. The hardener may comprise the silver nanowire, the graphene nanoparticle, and the graphene nanosheet but not the silver nanoparticle. The hardener may comprise the silver nanowire, the graphene nanoparticle, and the graphene microparticle but not the silver nanoparticle. The hardener may comprise the silver nanowire, graphene nanosheet and the graphene microparticle but not the silver nanoparticle. The hardener may comprise the silver nanowire, graphene nanoparticle, the graphene nanosheet, and the graphene microparticle but not the silver nanoparticle. The hardener may comprise the silver nanoparticle, the graphene nanowire, and the graphene nanosheet but not the silver nanowire. The hardener may comprise the silver nanoparticle, the graphene nanowire, the graphene microparticle but not the silver nanowire. The hardener may comprise the silver nanoparticle, graphene nanosheet, and the graphene microparticle but not the silver nanowire. The hardener may comprise the silver nanoparticle, graphene nanowire, the graphene nanosheet, and the graphene microparticle but not the silver nanowire. In some embodiments, the conductive additive comprises a percentage by weight of the hardener of about 60% to about 99.9%. In some embodiments, the conductive additive comprises a percentage by weight of the resin of about 60% to about 99.9%.

The resin may comprise the graphene nanoparticle and the graphene nanosheet. The resin may comprise the graphene nanoparticle and the graphene microparticle. The resin may comprise the graphene nanosheet and the graphene microparticle. The resin may comprise the graphene nanoparticle, the graphene nanosheet, and the graphene microparticle. The resin may comprise the silver nanowire and the silver nanoparticle. The resin may comprise the silver nanowire and not the silver microparticle. The resin may comprise the silver microparticle and not the silver nanowire. The resin may comprise the silver nanowire, the graphene nanoparticle, and the graphene nanosheet but not the silver nanoparticle. The resin may comprise the silver nanowire, the graphene nanoparticle, and the graphene microparticle but not the silver nanoparticle. The resin may comprise the silver nanowire, graphene nanosheet, and the graphene microparticle but not the silver nanoparticle. The resin may comprise the silver nanowire, graphene nanoparticle, the graphene nanosheet, and the graphene microparticle but not the silver nanoparticle. The resin may comprise the silver nanoparticle, the graphene nanowire, and the graphene nanosheet but not the silver nanowire. The resin may comprise the silver nanoparticle, the graphene nanowire, the graphene microparticle but not the silver nanowire. The resin may comprise the silver nanoparticle, graphene nanosheet, and the graphene microparticle but not the silver nanowire. The resin may comprise the silver nanoparticle, graphene nanowire, the graphene nanosheet, and the graphene microparticle but not the silver nanowire.

Some embodiments further comprise a thinner to the resin and the hardener. In some embodiments, the thinner comprises butyl acetate, lacquer thinner, acetone, petroleum naphtha, mineral spirits, xylene, or any combination thereof.

In some embodiments, the conductive carbon-based epoxy further comprises a pigment, a colorant, a dye, or any combination thereof. In some embodiments, the conductive carbon-based epoxy comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof. In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof. In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black SI70, Color Black SI50, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Figure 29:
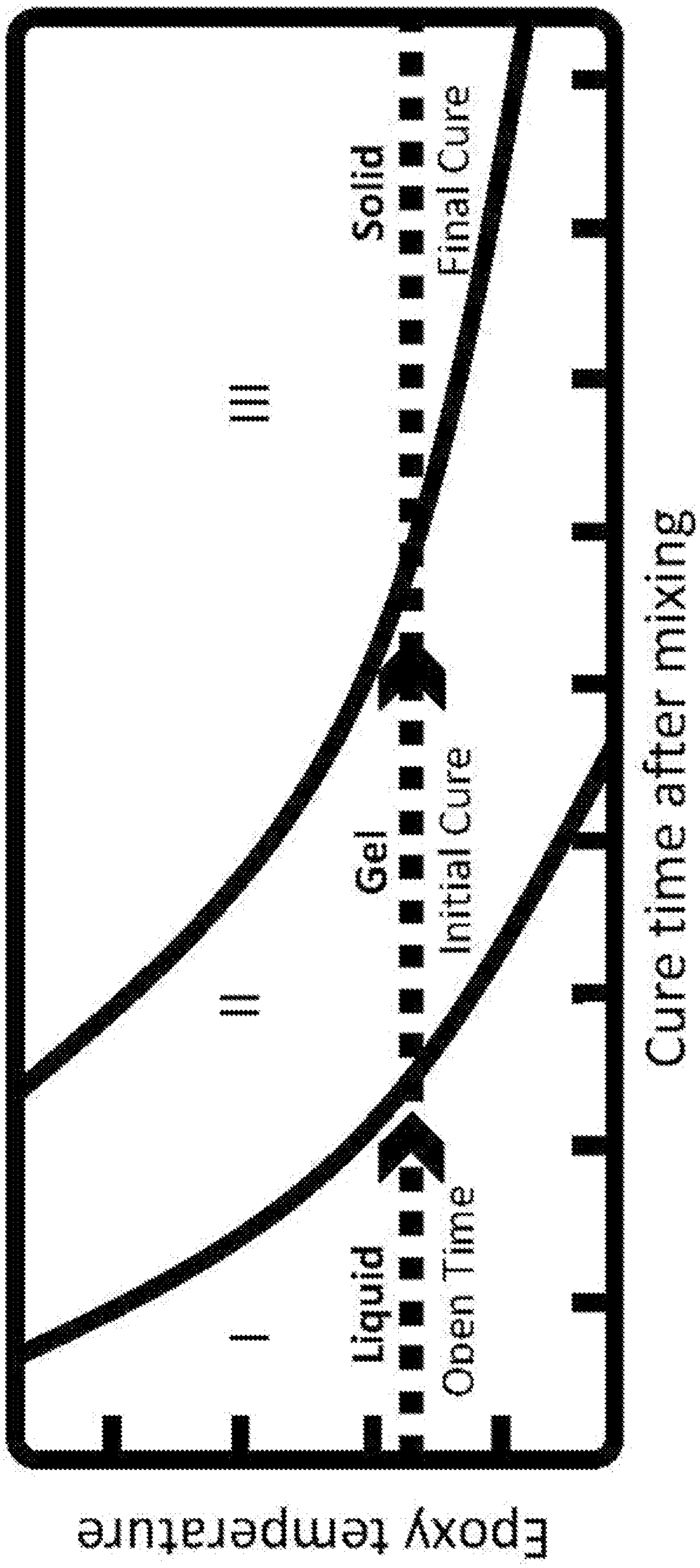
FIG. 29 displays a graph showing the relationship between temperature and cure time of an epoxy as it changes from a liquid state to a gel state and to a solid state, according to one or more embodiments described herein.

Epoxy currently has a wide range of applications, such as anti-corrosion coatings; within electronics components, biomedical devices, and paint brushes; and for structural support within aerospace components. Epoxy resins are low molecular weight pre-polymers or higher molecular weight polymers that contain at least two epoxide groups. Cross-linking agents, otherwise known as hardeners or curing agents, are necessary to promote cross-linking or curing of epoxy resins during the conversion of epoxy resins to hard, thermoset networks. Curing occurs either by homopolymerization initiated by a catalytic curing agent or by reacting resins with polyfunctional hardeners including amines, acids, acid anhydrides, phenols, alcohols, and thiols. The resulting thermosetting polymers have high mechanical properties and are resistant to acids and other chemical agents. Curing begins by a reaction between epoxy and hardener reactive groups to form larger and larger molecules. Throughout curing the molecular size increases and highly branched molecules are formed and develop. Gelation of the epoxy occurs when the branched structures extend throughout the whole sample, whereas prior to gelation, the sample is soluble, and whereas after the gel point, the network will not dissolve but may swell as it imbibes solvent. The gel initially formed may be weak and easily disrupted. To produce a structural material, cure has to continue until most of the sample is connected into the three-dimensional network so that the sol fraction becomes small, and for many cured products it has to be essentially zero. FIG. 29 shows that the mixed epoxy changes from a liquid state to a gel state to a solid state as it cures. The conductive epoxy may require mixing immediately before use for optimal bonding.

Another aspect provided herein is a method of forming a conductive epoxy comprising a conductive additive and an adhesive agent. The conductive epoxy may comprise a two-part epoxy comprising a resin and a hardener. At least one of the resin and the hardener may comprise the conductive additive. The conductive additive may comprise a carbon-based material. The conductive additive may comprise a silver-based material. The conductive additive may comprise a carbon-based material and a silver-based material.

In some embodiments, the carbon-based material comprises a percentage by weight of the resin of about 60% to about 99.9%. In some embodiments, the carbon-based material comprises graphene and wherein a percentage by weight of the graphene in the carbon-based material of about 0.1% to about 10%. In some embodiments, the carbon-based material comprises graphite powder and wherein a percentage by weight of the graphite powder in the carbon-based material of about 1% to about 40%. In some embodiments, the amounts of the hardener and the resin are mixed stoichiometrically.

Figure 30:
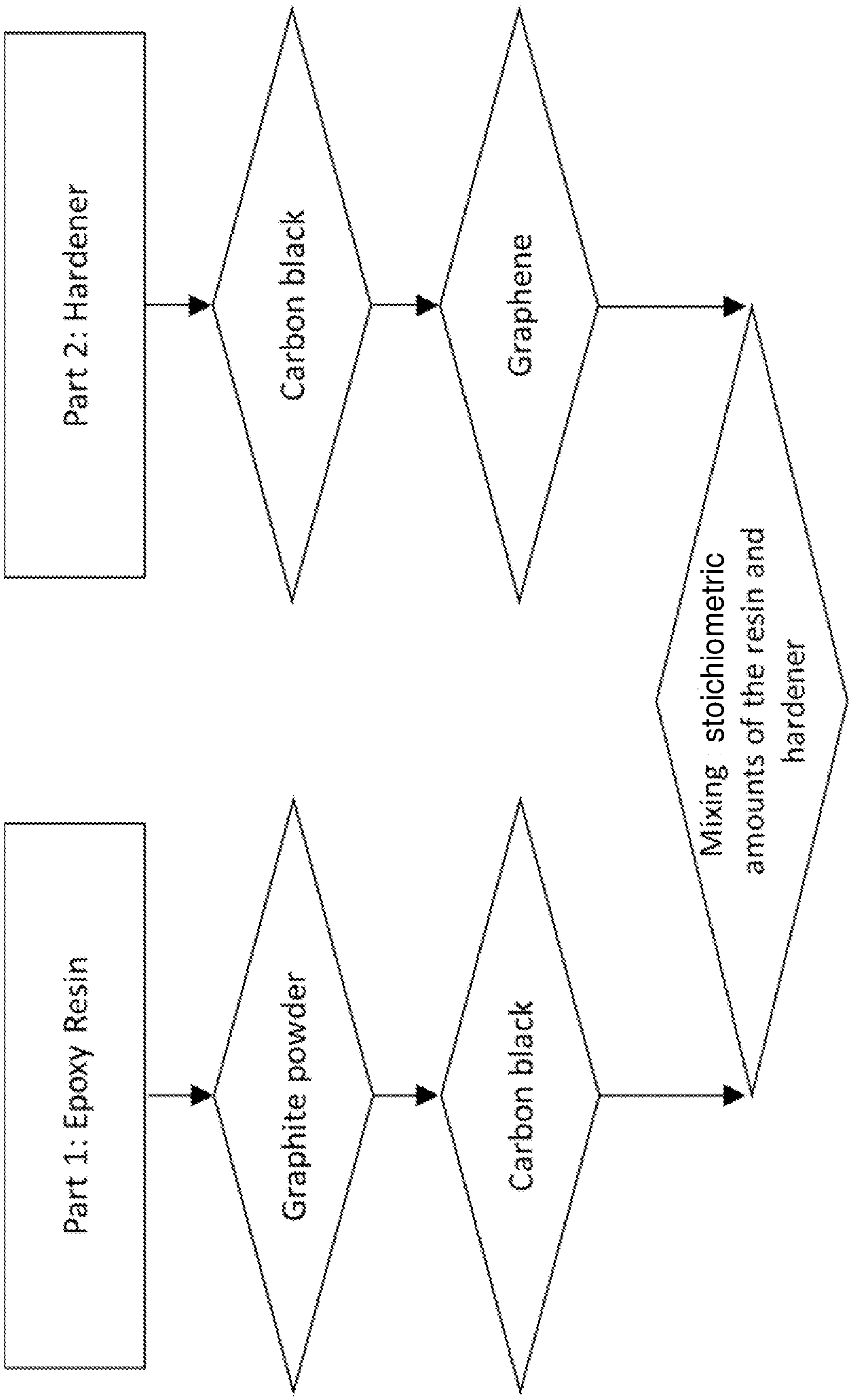
FIG. 30 displays a flowchart of an exemplary method for preparing a conductive carbon-based epoxy, according to one or more embodiments described herein.
Figure 31:
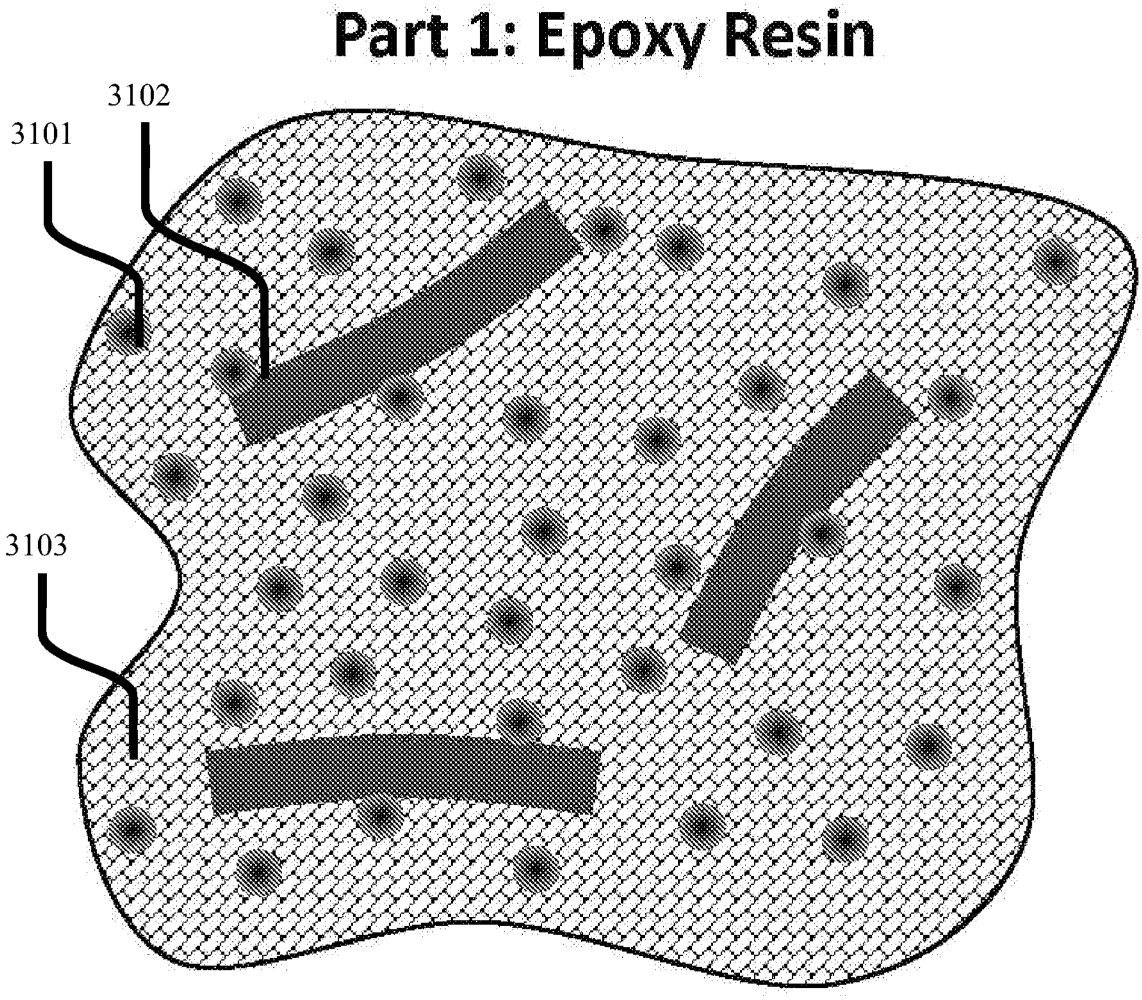
FIG. 31 displays an illustration of the composition of an exemplary resin, according to one or more embodiments described herein.
Figure 32:
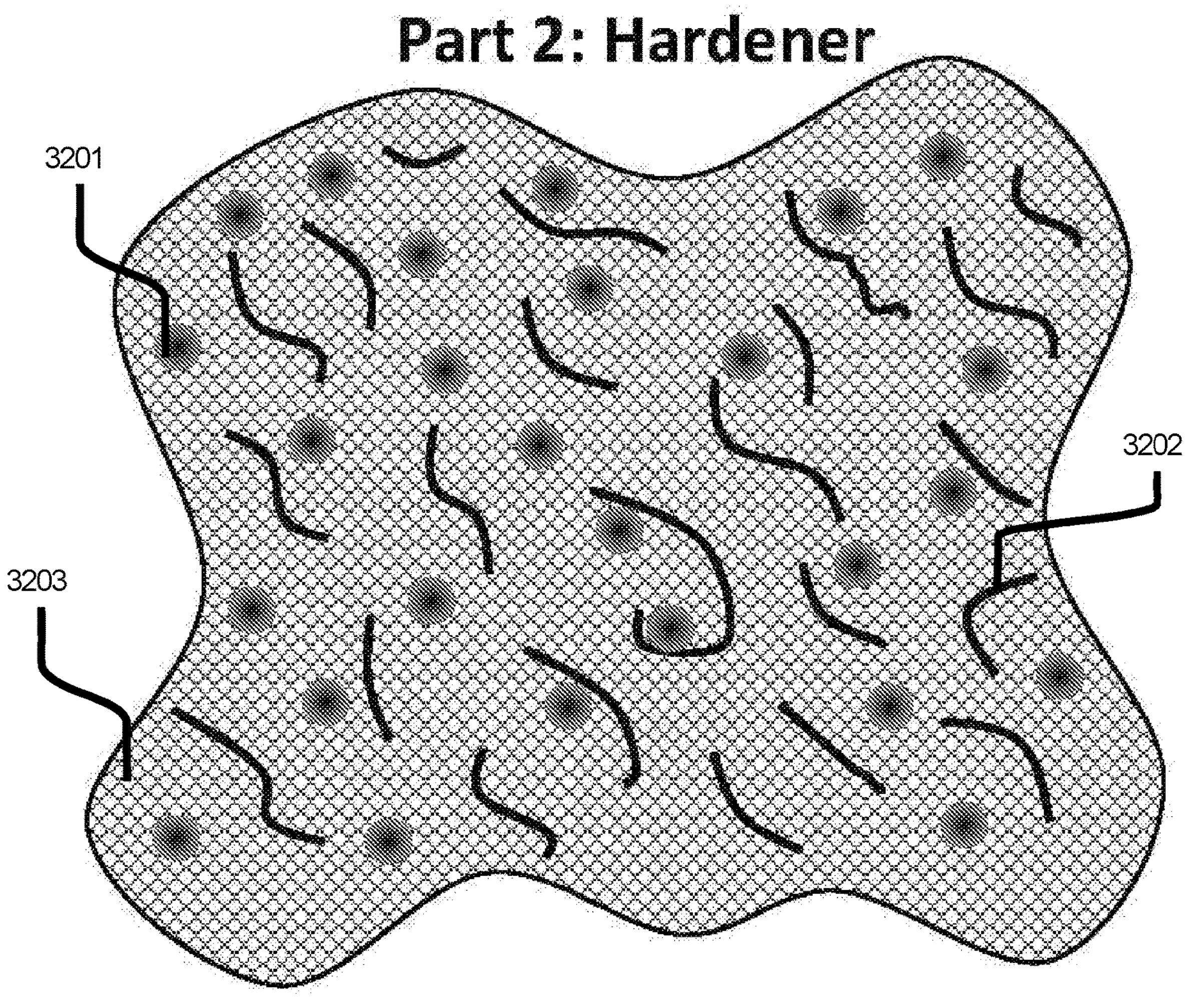
FIG. 32 displays an illustration of the composition of an exemplary hardener, according to one or more embodiments described herein.

FIG. 30 is a flowchart of a method for preparing an exemplary conductive carbon-based epoxy. FIG. 31 is an illustration of the composition of an exemplary resin. In some embodiments, the resin comprises zero-dimensional carbon black nanoparticles 3101, three-dimensional graphite microparticles 3102, and a base 3103. The zero-dimensional carbon black nanoparticles 3101 and the three-dimensional graphite microparticles 3102 may be of sufficient size and concentration to achieve the percolation threshold. FIG. 32 is an illustration of the composition of an exemplary hardener. In some embodiments, the hardener comprises zero-dimensional carbon black nanoparticle 3201, two-dimensional graphene nanosheets 3202, and a glue base 3203. The two-dimensional graphene nanosheets 3202 and zero-dimensional carbon black nanoparticles 3201 may be of sufficient size and concentration to achieve percolation.

Figure 33A:
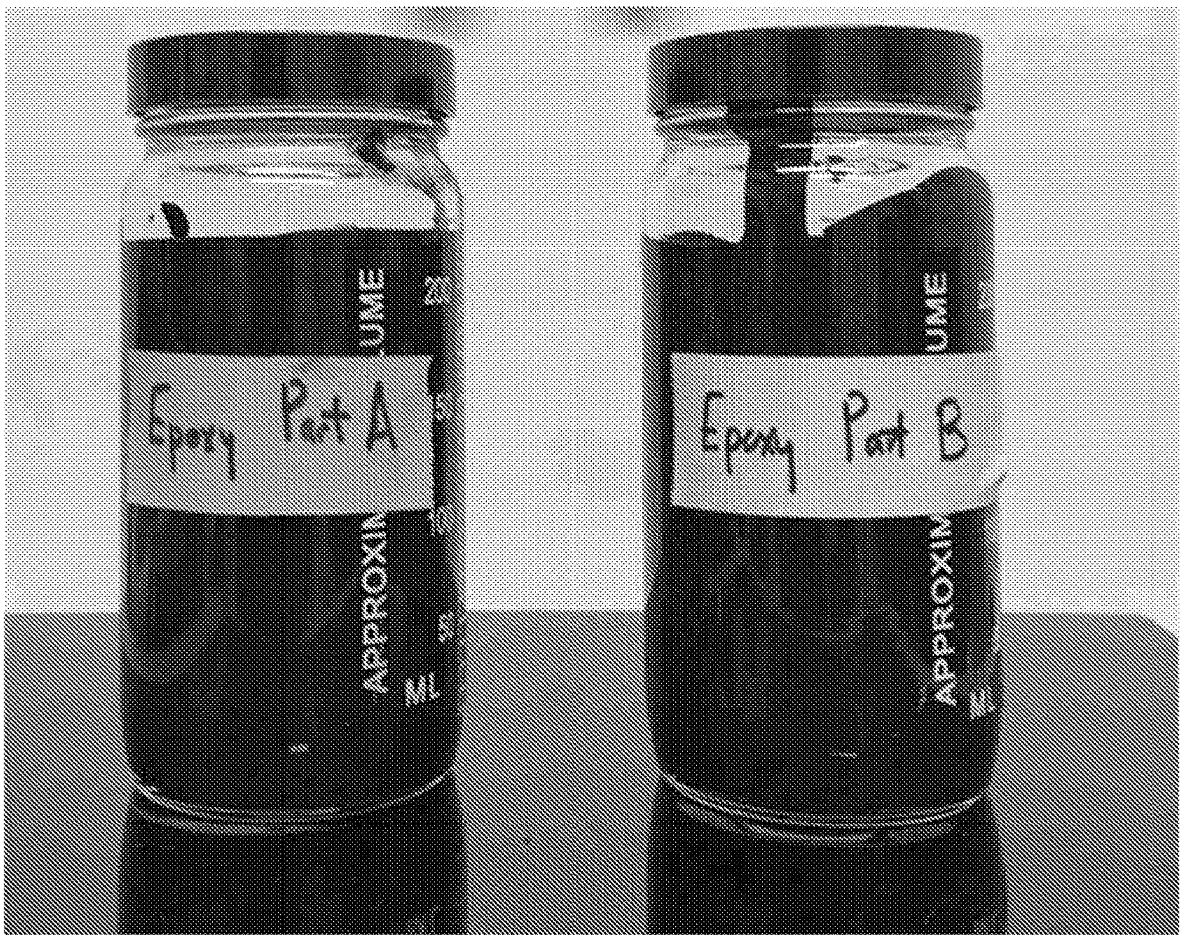
FIG. 33A displays an image of two parts of an exemplary conductive carbon-based epoxy, according to one or more embodiments described herein.
Figure 33B:
FIG. 33B displays an image of an exemplary dispensing and mixing packaging of a two-part conductive carbon-based epoxy comprising a resin and a hardener, according to one or more embodiments described herein.
Figure 33C:
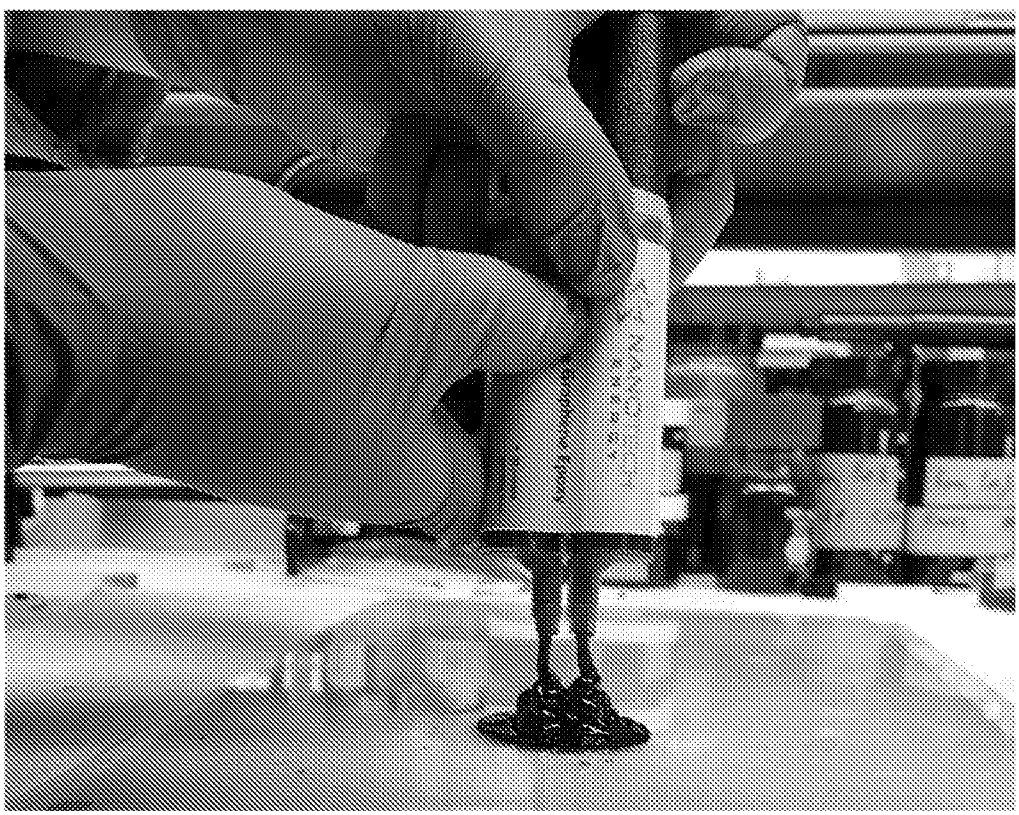
FIG. 33C displays an image of an exemplary dispensing and mixing of a conductive carbon-based epoxy, according to one or more embodiments described herein.
Figure 34:
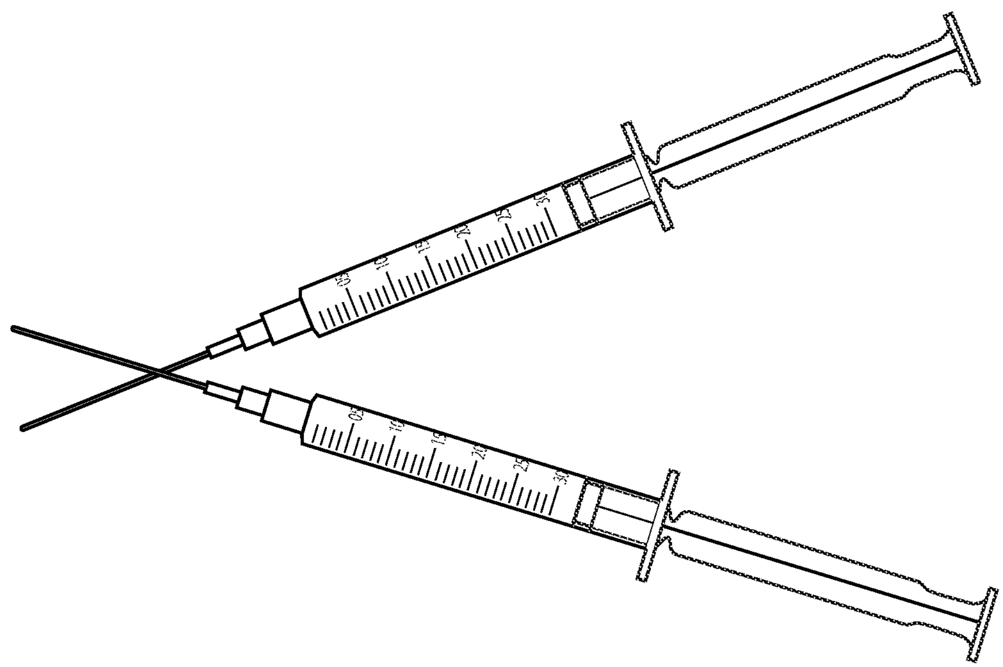
FIG. 34 displays another image of an exemplary dispensing and mixing packaging of a two-part conductive carbon-based epoxy comprising a resin and a hardener, according to one or more embodiments described herein.

FIG. 33A is an image showing the two parts of an exemplary conductive carbon-based epoxy. The two parts may comprise a resin and a hardener. In some embodiments, the resin, the hardener, or both have a high viscosity. In some embodiments, combining the two parts of the conductive epoxy initiates the hardening of the conductive epoxy. Per FIG. 33B, the two parts of the conductive epoxy may be packaged together, and per FIG. 33C, both parts are dispensed in equal amounts simultaneously. Alternatively, as seen in FIG. 34, the two parts of the conductive epoxy may be packaged separately. The separate packaging enables unequal dispensing amounts, consecutive dispensing, or both. In some embodiments, equal volumes of each part of the conductive carbon-based epoxy are dispensed simultaneously and mixed. In some embodiments, equal volumes of each part of the conductive carbon-based epoxy are dispensed consecutively and mixed. In some embodiments, dispensing equal amounts of each component of the conductive carbon-based epoxy is necessary for a complete cross-linking reaction. In some embodiments, the packaging of the conductive carbon-based epoxy allows an operator or a machine to garner and/or dispense specifically precise quantities of the conductive graphene. In some embodiments, the packaging of the conductive carbon-based epoxy allows an operator to dispense quantities of the conductive carbon-based epoxy into a dispensing machine. In some embodiments, the packaging of the conductive carbon-based epoxy further comprises a mixing rod, a dispensing element, or any combination thereof. One of ordinary skill in the art would easily recognize, however, that any container currently used for epoxy or other hardening substances may be employed to package and dispense the conductive carbon-based epoxy of the present disclosure.

Figure 35:
FIG. 35 displays an exemplary image of a substrate coated in an exemplary conductive carbon-based epoxy, according to one or more embodiments described herein.

In some embodiments, the conductive epoxy may be disposed and coated onto a rigid or flexible substrate. FIG. 35 is an exemplary image of a flexible substrate coated in an exemplary conductive carbon-based epoxy. In some embodiments, the conductive epoxy may be deposited on a substrate in the form of lines, shapes, or patterns thereof to form circuits and electronic devices (e.g., touch-sensitive devices, flexible devices, disconnection alert features, or shape-sensitive devices).

Also provided herein are methods and apparatus for forming a conductive silver-based epoxy. The method for forming a conductive silver-based epoxy may comprise heating an epoxy resin or an epoxy hardener, dispersing silver nanowires in the heated resin or hardener, stirring the silver nanowires in the heated resin or hardener, and heating the silver nanowires and the resin or hardener. The solvent may comprise acetone. The solvent may enable homogeneous dispersion of the silver nanowires into the epoxy insulating matrix. Stirring may comprise magnetic or mechanical stirring. The silver nanowires in the heated resin or hardener may be heated to a temperature of about 40° C. to about 60° C. The silver nanowires in the heated resin or hardener may be heated to a temperature of at least about 40° C. The silver nanowires in the heated resin or hardener may be heated to a temperature of at most about 60° C. The silver nanowires in the heated resin or hardener may be heated to a temperature of about 40° C., 45° C., 50° C., 55° C., 60° C., or any increment therein. The concentration of silver nanowires in the resin or hardener may be about 0.1% to about 10%. The concentration of silver nanowires in the resin or hardener may be at least about 0.1%. The concentration of silver nanowires in the resin or hardener may be at most about 10%. The concentration of silver nanowires in the resin or hardener may be about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any increment therein.

Figure 36A:
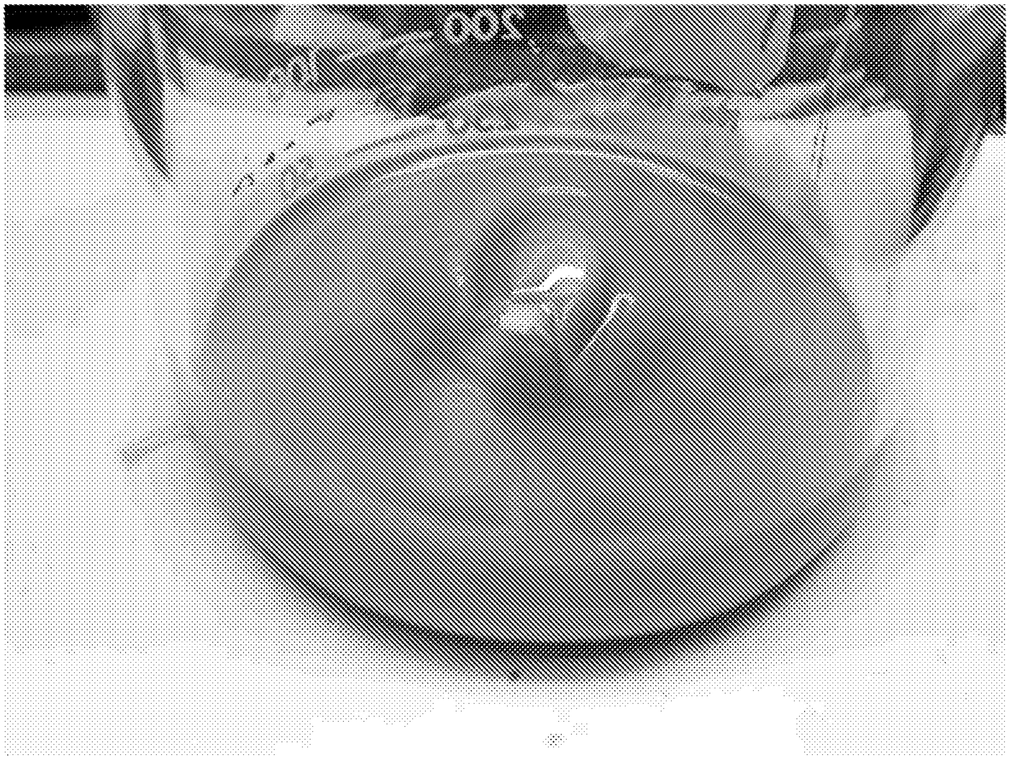
FIG. 36A displays a first image of an exemplary apparatus for forming a conductive carbon-based epoxy, according to one or more embodiments described herein.
Figure 36B:
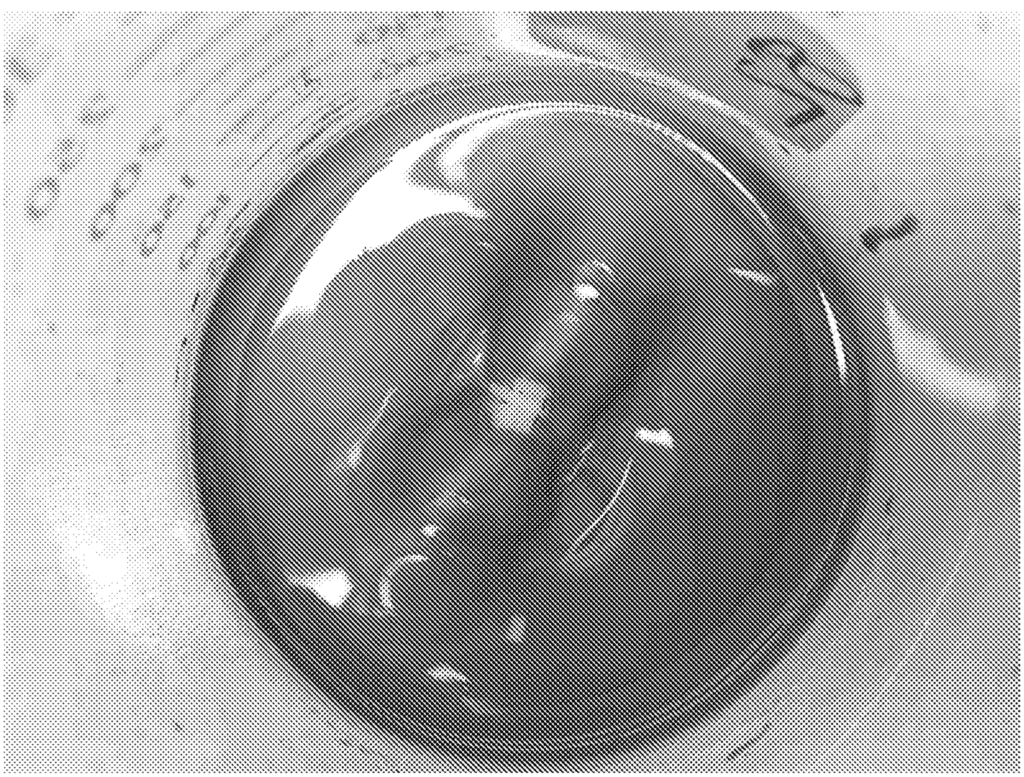
FIG. 36B displays a second image of an exemplary apparatus for forming a conductive carbon-based epoxy, according to one or more embodiments described herein.

FIG. 36A displays a first image of an exemplary apparatus for forming a conductive carbon-based epoxy. FIG. 36B displays a second image of an exemplary apparatus for forming a conductive carbon-based epoxy.

Conductive Epoxies: Performance

Figure 37A:
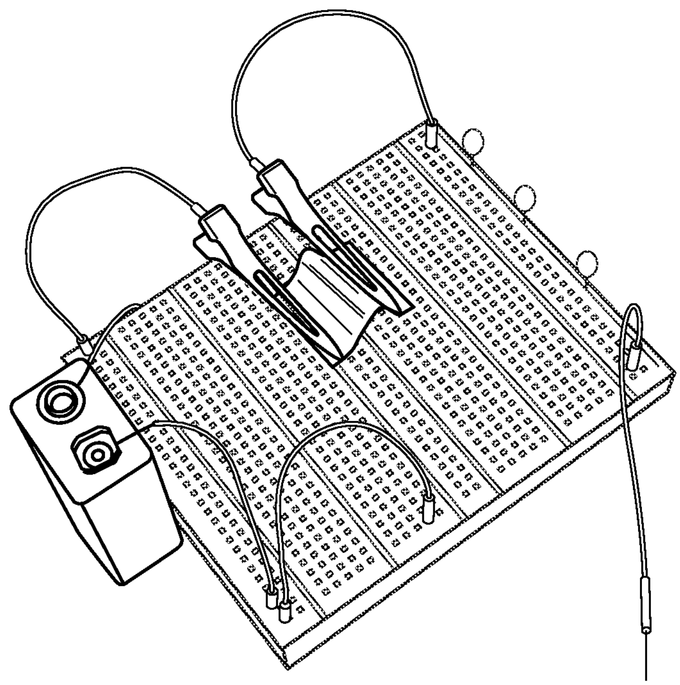
FIG. 37A displays an image of an open circuit comprising a battery, three LEDs, wires, and a film comprising an exemplary conductive carbon-based epoxy, according to one or more embodiments described herein.
Figure 37B:
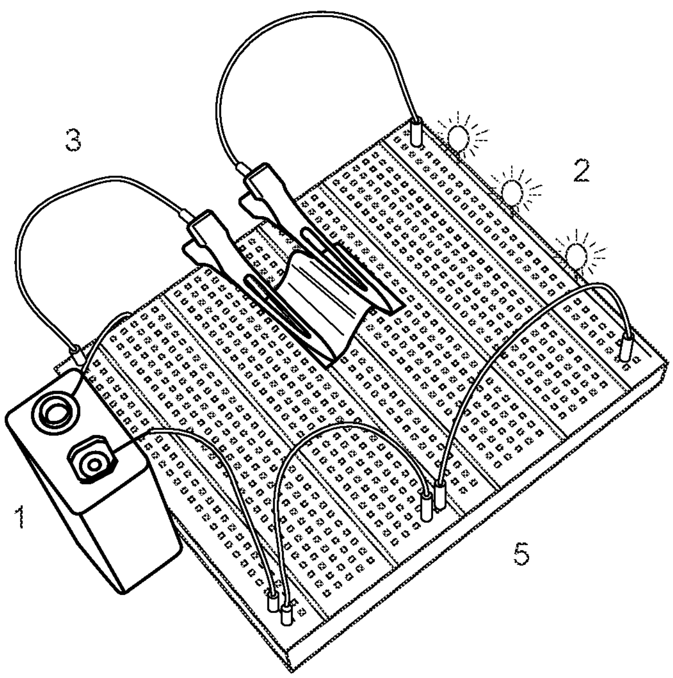
FIG. 37B displays an image of a closed circuit comprising a battery, three LEDs, wires, and a film comprising an exemplary conductive carbon-based epoxy, according to one or more embodiments described herein.

FIGS. 37A and 37B show images of open and closed circuits, respectively, comprising a battery (1), three LEDs (2), wires (3), and a film coated with an exemplary conductive carbon-based epoxy (4). In this case, the LEDs comprise a red, an orange, and a yellow LED, wherein copper wiring is used to connect the components, and wherein a breadboard (5) physically secures the components of the circuit. As such, the conductive carbon-based coating is capable of transmitting sufficient charge and voltage to power the three LED lights.

Figure 38:
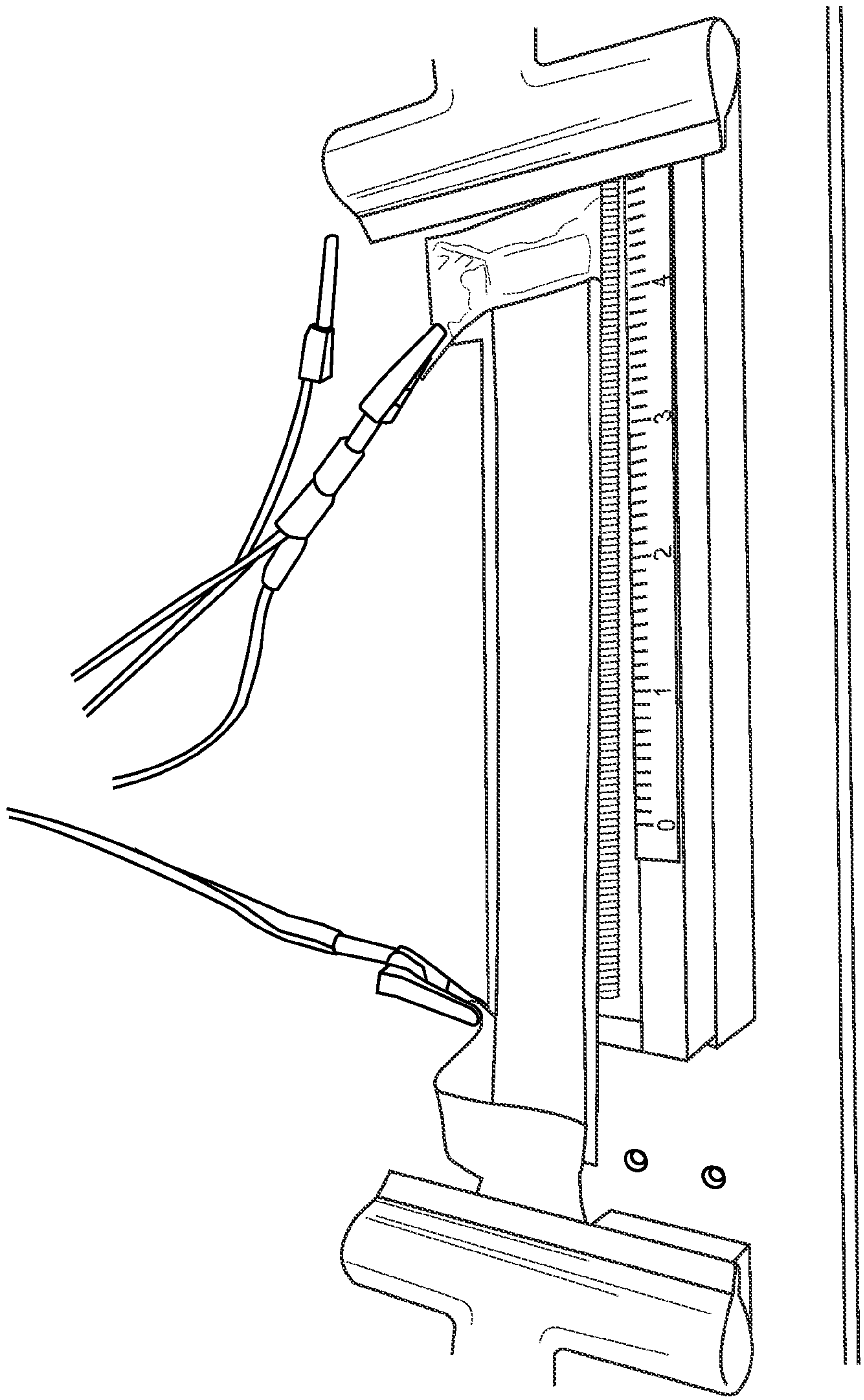
FIG. 38 displays an image of an apparatus for testing the electrical properties of an exemplary conductive carbon-based epoxy, according to one or more embodiments described herein.
Figure 39:
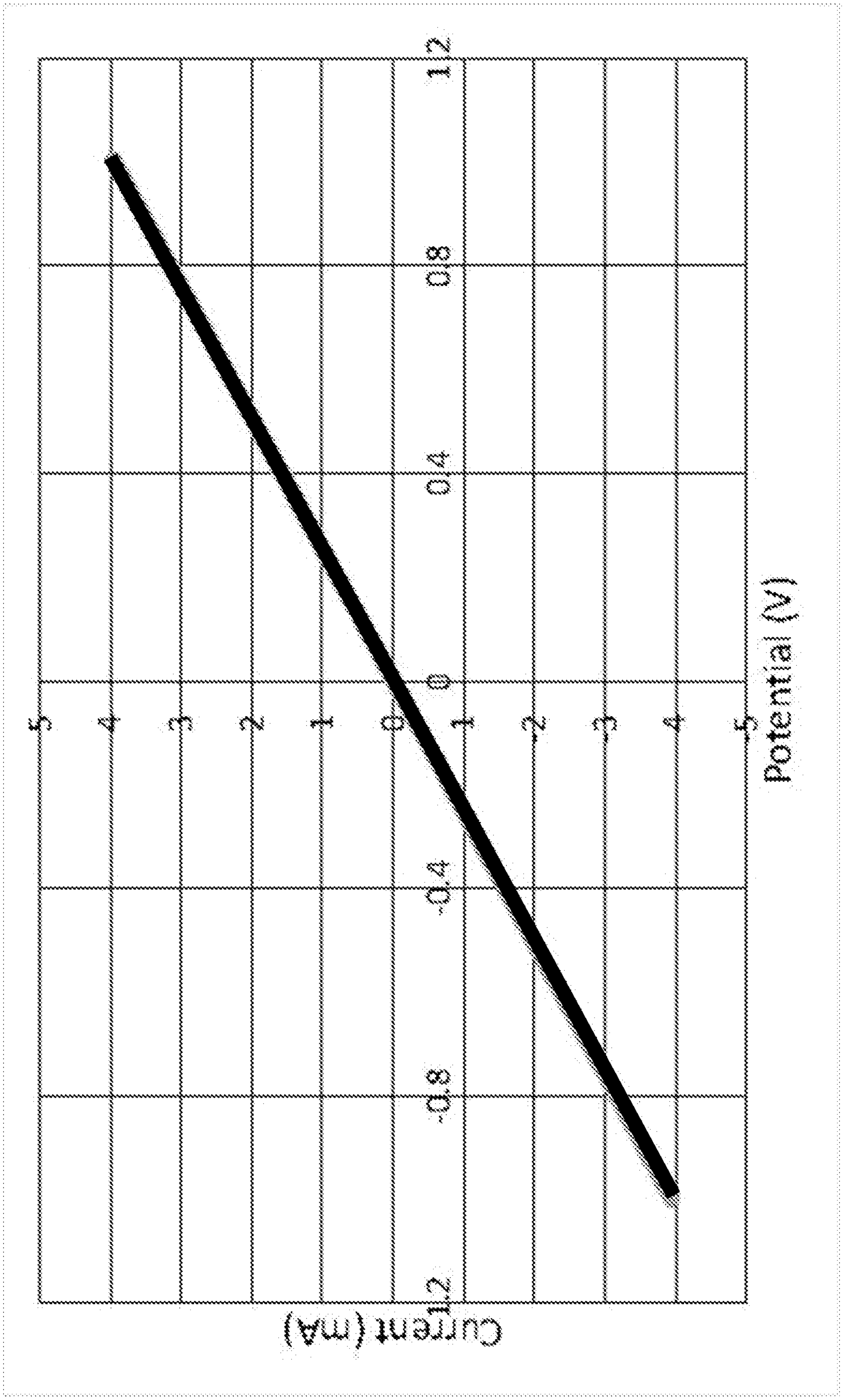
FIG. 39 displays a current-voltage graph of an exemplary conductive carbon-based epoxy, according to one or more embodiments described herein.
Figure 40A:
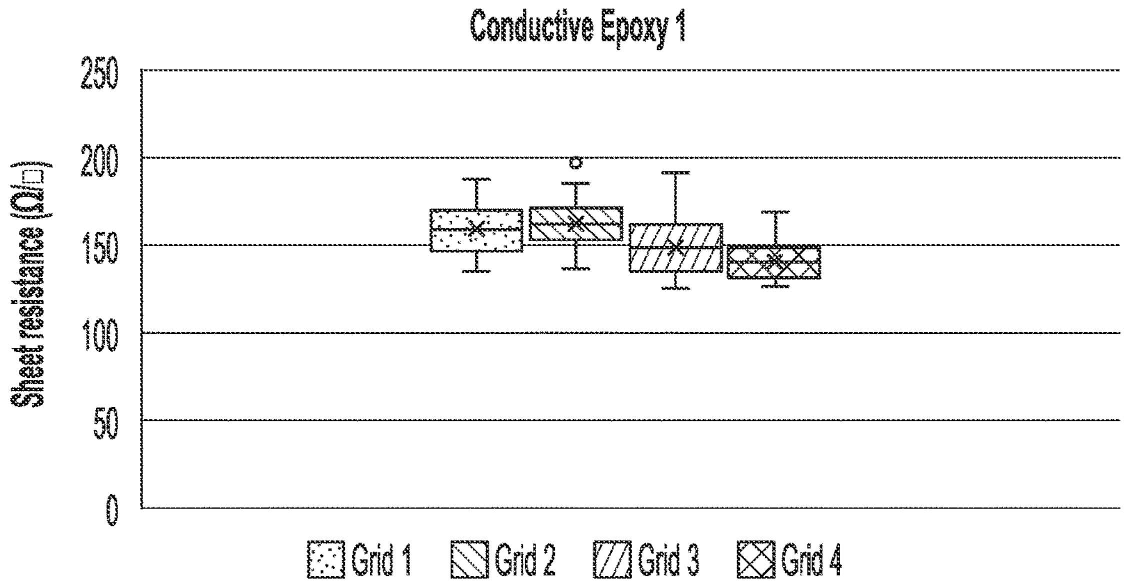
FIG. 40A displays a graph showing the sheet resistance in four locations of an exemplary conductive carbon-based epoxy, according to one or more embodiments described herein.
Figure 40B:
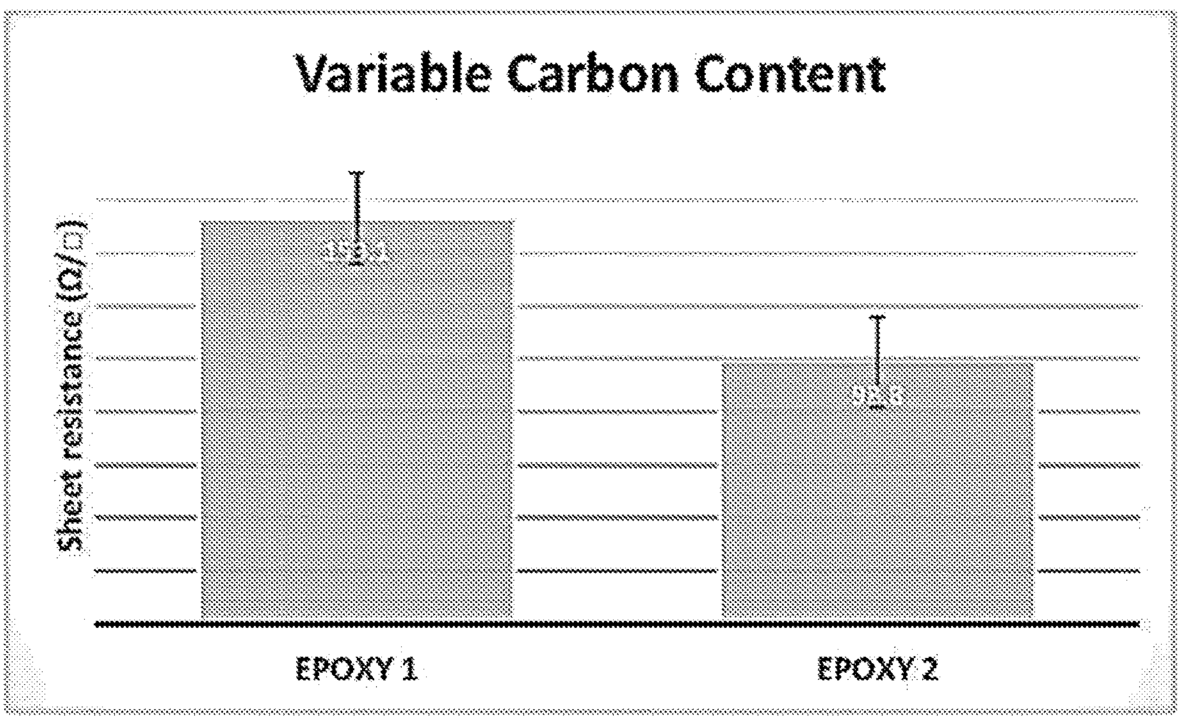
FIG. 40B displays a bar graph of the sheet resistance of two conductive graphene epoxies with different amounts of carbon additives, according to one or more embodiments described herein.

FIG. 38 is an image of an apparatus for testing the electrical properties of an exemplary conductive carbon-based epoxy that is coated on a substrate. FIG. 39 is a current-voltage graph of an exemplary conductive carbon-based epoxy coated onto a sheet of plastic, whereby the current increases from about −4 mA to about 4 mA as the voltage increases from about −1 V to about 1 V. FIG. 40A is a graph showing the sheet resistance in four locations of an exemplary dried conductive carbon-based epoxy having a thickness of about 241 μm. As shown, the sheet resistance of the exemplary dried conductive carbon-based epoxy has a sheet resistance at a first grid of about 145 ohm/sq to about 175 ohms/sq, at a second grid of about 150 ohm/sq to about 175 ohms/sq, at a third grid of about 140 ohm/sq to about 160 ohms/sq, and at a fourth grid of about 140 ohm/sq to about 150 ohms/sq. FIG. 40B is a bar graph of the sheet resistance of two conductive graphene epoxies with different amounts of carbon additives. As seen a first epoxy has a sheet resistance of about 153 ohms/sq, with a standard deviation of about 17 ohms/sq, and a second epoxy has a sheet resistance of about 99 ohms/sq, with a standard deviation of about 17 ohms/sq.

In some embodiments, the conductive carbon-based epoxy has a sheet resistance of about 50 ohm/sq to about 300 ohm/sq. In some embodiments, the conductive carbon-based epoxy has a sheet resistance of about 0.3 ohm/sq/mil to about 2 ohm/sq/mil. In some embodiments, the conductive carbon-based epoxy has a conductivity of about 0.15 S/m to about 60 S/m. In some embodiments, the conductive carbon-based epoxy has a conductivity of 31 S/m.

Figure 41A:
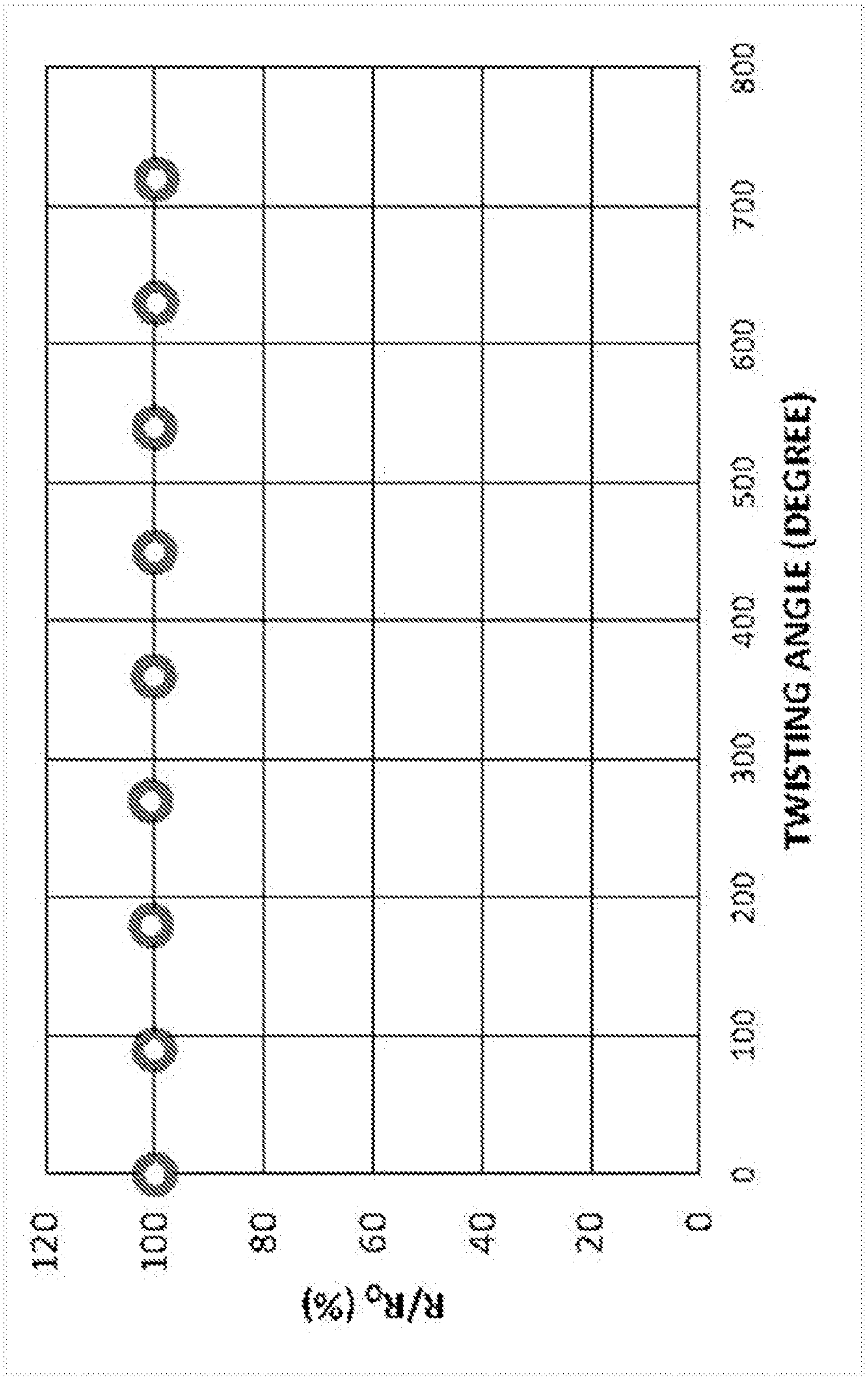
FIG. 41A displays a graph showing the relationship between the twist angle and the resistance change for an exemplary conductive carbon-based epoxy, according to one or more embodiments described herein.
Figure 41B:
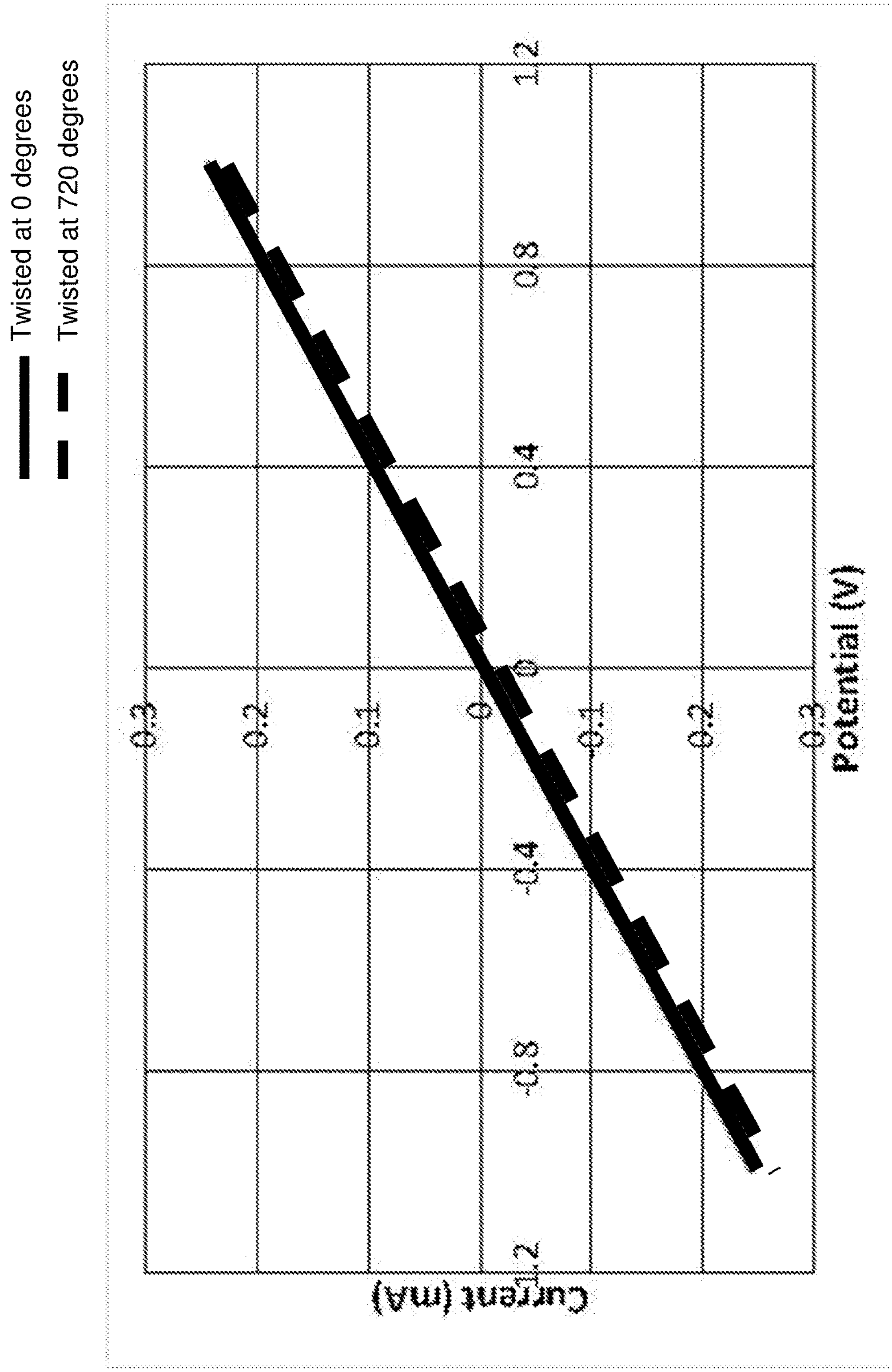
FIG. 41B displays a current-voltage graph for an exemplary conductive carbon-based epoxy twisted at 0 degrees and 720 degrees, according to one or more embodiments described herein.
Figure 42A:
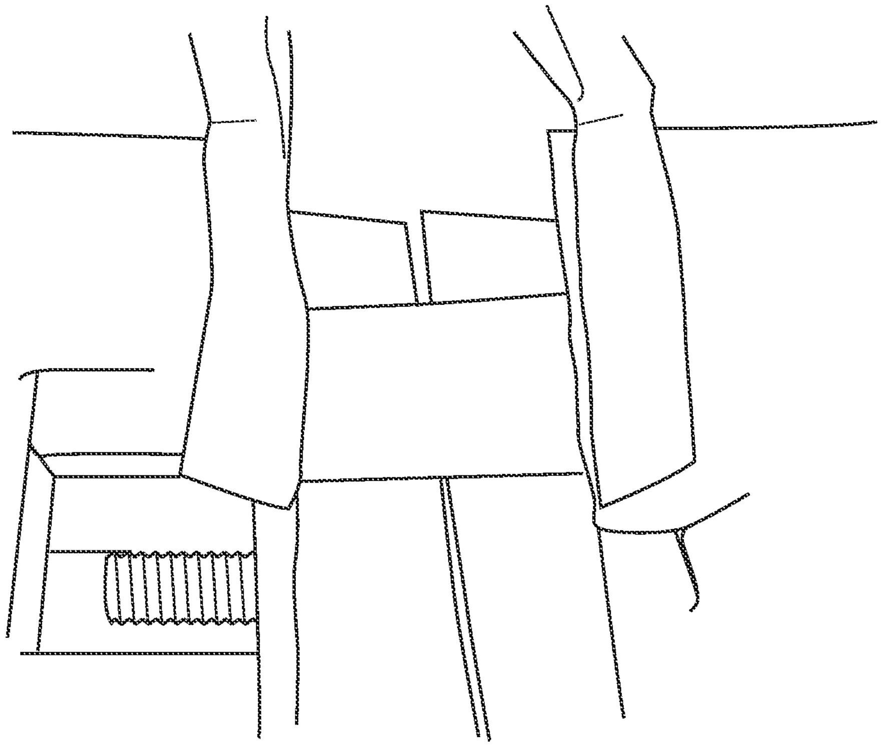
FIG. 42A displays an image of a testing apparatus for determining the resistance change of an exemplary conductive carbon-based epoxy with no tensile strain, according to one or more embodiments described herein.
Figure 42B:
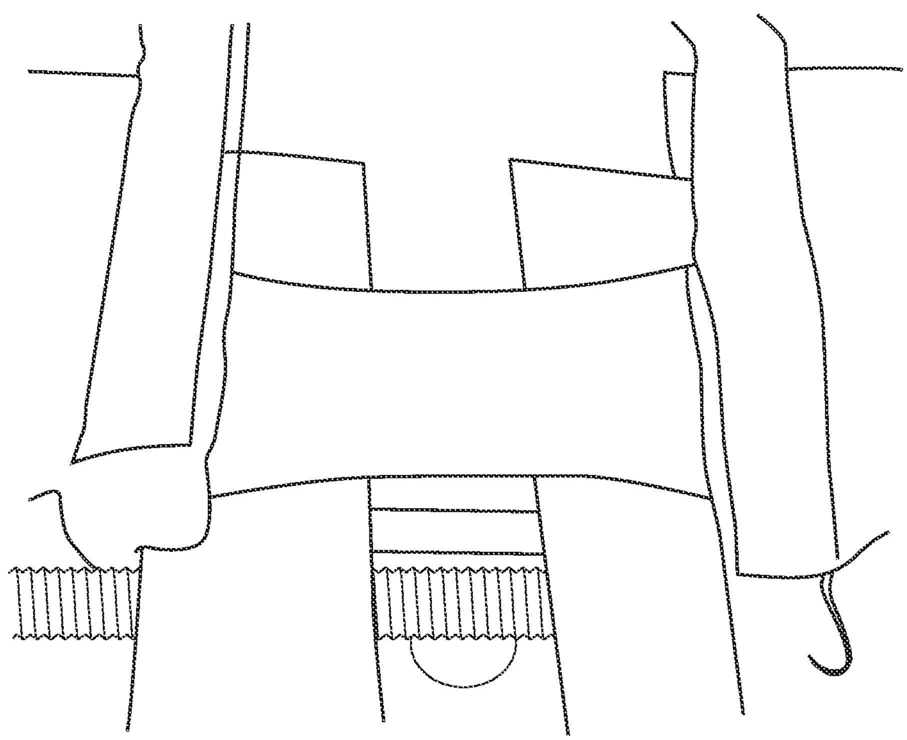
FIG. 42B displays an image of a testing apparatus for determining the resistance change of an exemplary conductive carbon-based epoxy with tensile strain, according to one or more embodiments described herein.

FIG. 41A is a graph of the relationship between the twist angle and the resistance change for a film with an exemplary conductive carbon-based epoxy. As shown, the resistance change remains within 5% while the film with an exemplary conductive carbon-based epoxy is twisted from 0 degrees to 720 degrees at 90 degree increments. Further, the current-voltage graph of FIG. 41B of an exemplary conductive carbon-based epoxy twisted at 0 degrees (solid) and 720 degrees (dashed), shows that the exemplary conductive graphene exhibits negligible electrical performance loss while twisted. FIG. 42A and FIG. 42B show that the exemplary conductive carbon-based epoxy is configured to be stretched to at least twice its original length without breaking. These results and images indicate the potential use of the conductive carbon-based epoxy for flexible electronics and devices.

Figure 43:
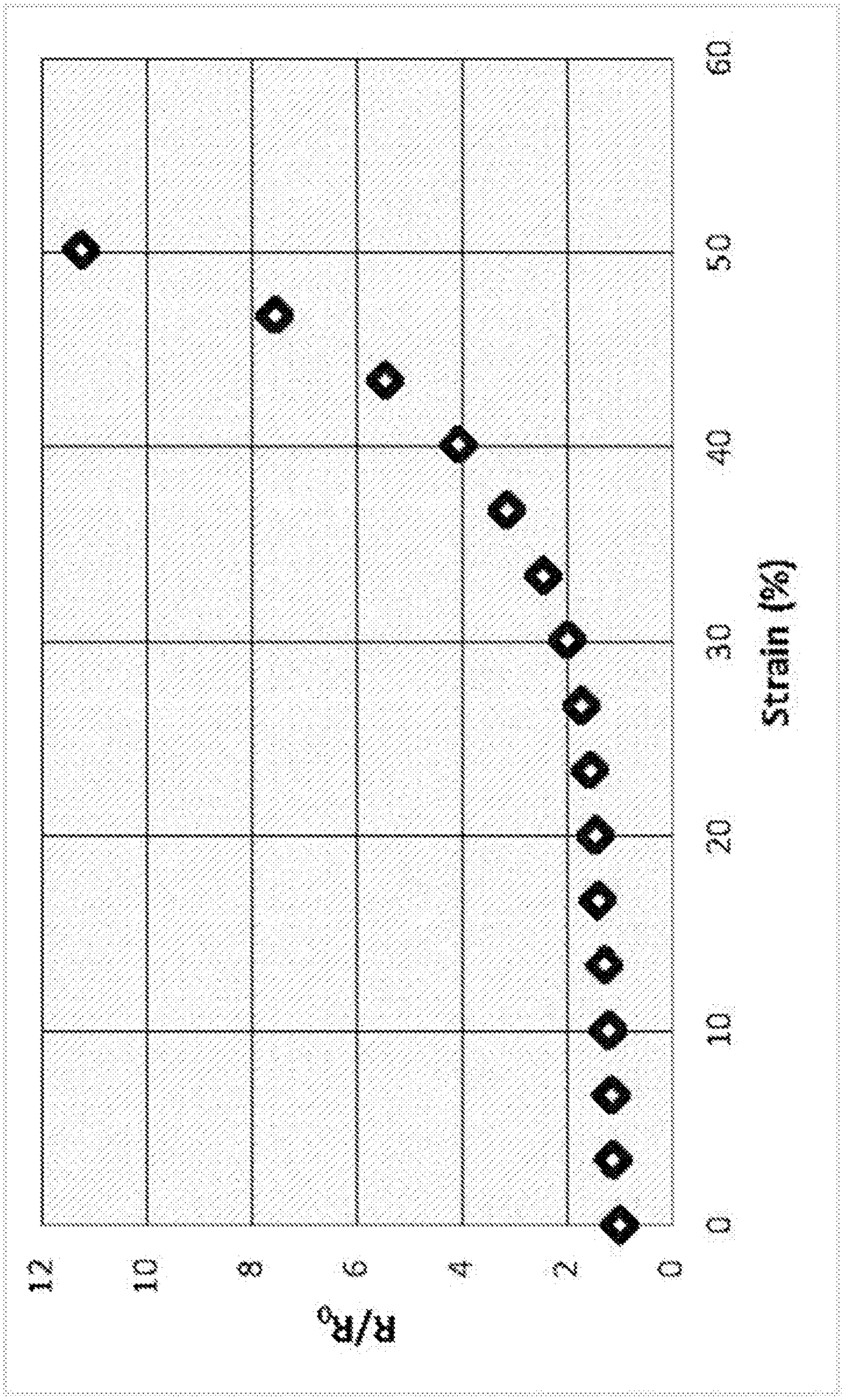
FIG. 43 displays a graph representing the relationship between tensile strain and resistance change for an exemplary conductive carbon-based epoxy, according to one or more embodiments described herein.

FIG. 43 is a graph representing the relationship between tensile strain and resistance change for an exemplary conductive carbon-based epoxy. As shown, the resistance change increases exponentially from about 1% at about 0% strain to about 11% at about 50% strain, whereby the resistance changes by only about 2% under a strain of about 30%, and about 4% under a strain of about 40%. Unlike traditional epoxies that are hard and inflexible, the graph in FIG. 43 indicates that the conductive carbon-based epoxy is elastic and able to stretch without breaking or losing its conductive abilities. In some embodiments, the conductive carbon-based epoxy has a sheet resistance that differs when the conductive carbon-based epoxy is stretched under 20% strain by at most about 5%, 4%, 3,%, 2%, or 1%. In some embodiments, the conductive carbon-based epoxy has a sheet resistance that differs when the conductive carbon-based epoxy is stretched under 50% strain by at most about 20%, 17%, 15%, 12%, 10%, or any increment therein.

Figure 44A:
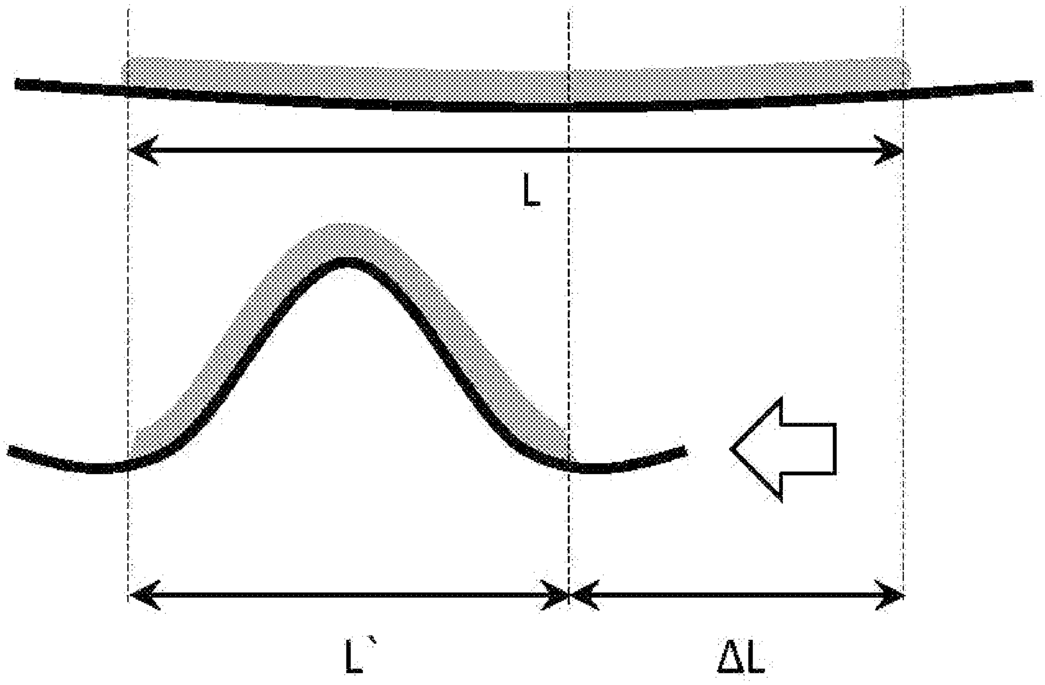
FIG. 44A displays an illustration of a film comprising a conductive carbon-based epoxy being convexly bent, according to one or more embodiments described herein.
Figure 44B:
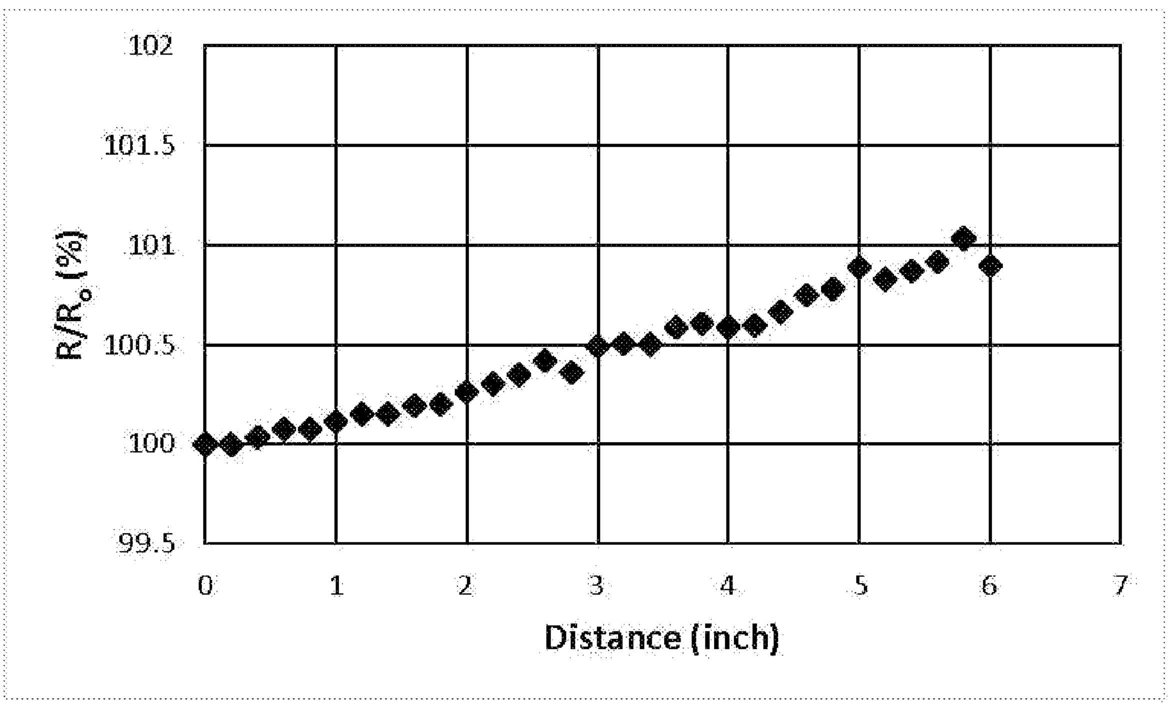
FIG. 44B displays a graph showing the relationship between the convex bending distance and the resistance change for a film comprising an exemplary conductive carbon-based epoxy.

FIG. 44A is an illustration of a film comprising a conductive carbon-based epoxy being convexly bent, wherein L=length of the film, ΔL=the distance travelled by the non-stationary end of the film, and L'=the end-to-end distance of the bent film. In one example, L=3.4, wherein the film is bent at about 180 degrees with ΔL=L=3.4. FIG. 44B is a graph showing the relationship between the convex bending distance (from 0 inches to 7 inches in 1 inch increments) and the resistance change (from 99.5% to 102% in 0.5% increments) for a film comprising an exemplary conductive carbon-based epoxy. In some embodiments, the conductive carbon-based epoxy has a sheet resistance that differs when the conductive carbon-based epoxy is bent at a convex angle of at most 180 degrees of at most about 0.5%, 0.4%, 0.3%, 0.2%, 0.15%, 0.1%, or any increment therein.

Figure 45A:
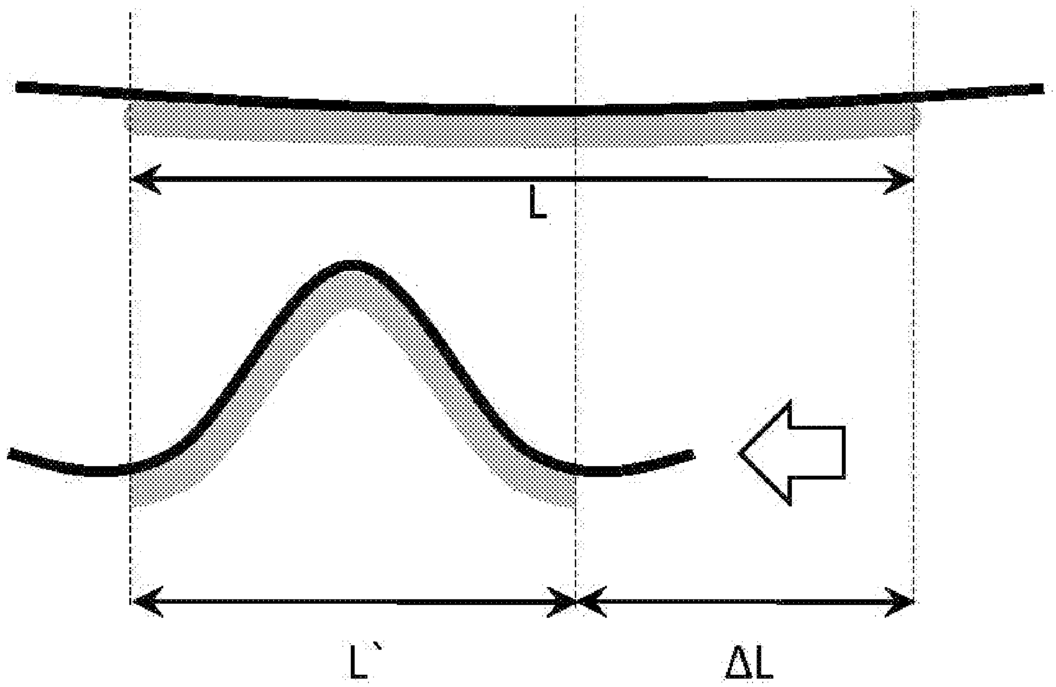
FIG. 45A displays an illustration of a film comprising a conductive carbon-based epoxy being concavely bent, according to one or more embodiments described herein.
Figure 45B:
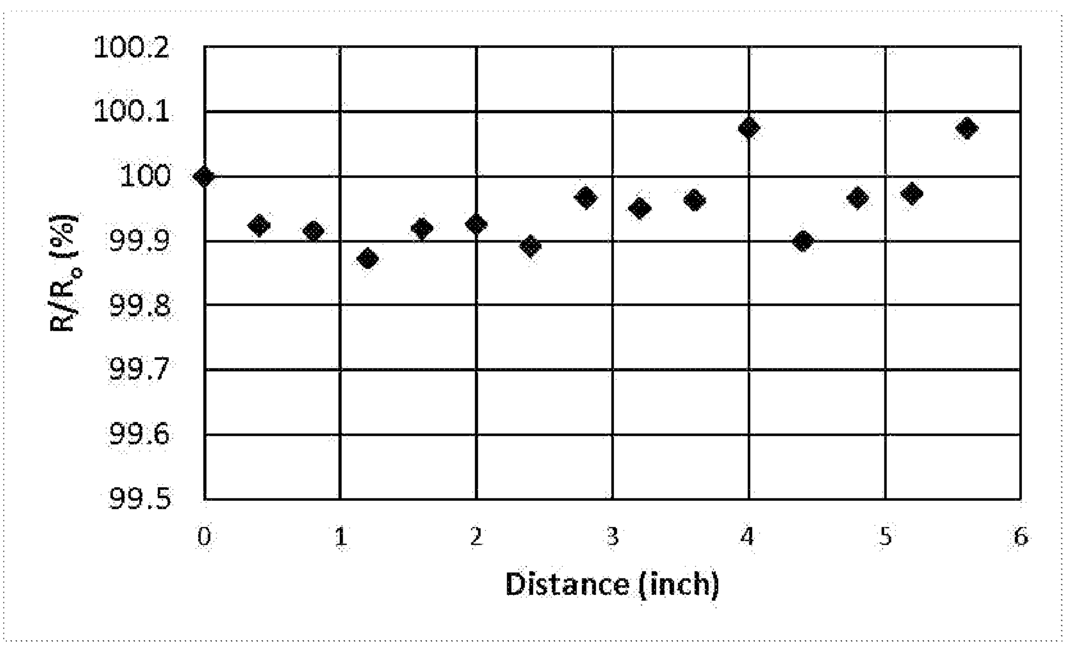
FIG. 45B displays an exemplary graph showing the relationship between the concave bending distance and the resistance change for a film comprising an exemplary conductive carbon-based epoxy.

FIG. 45A is an illustration of a film comprising a conductive carbon-based epoxy being concavely bent. FIG. 45B is an exemplary graph showing the relationship between the concave bending distance (from 0 inches to 7 inches in 1 inch increments) and the resistance change (from 99.5% to 102% in 0.5% increments) for a film comprising an exemplary conductive carbon-based epoxy. In some embodiments, the conductive carbon-based epoxy has a sheet resistance that differs when the conductive carbon-based epoxy is bent at a concave angle of at most 180 degrees by at most about 0.5%, 0.4%, 0.3%, 0.2%, or any increment therein.

In some embodiments, the conductive carbon-based epoxy is configured to cure at room temperature. In some embodiments, the conductive carbon-based epoxy starts to set in about 20 minutes and fully cures in about 24 hours. In some embodiments, the conductive carbon-based epoxy has a curing time in room temperature of about 12 hours to about 48 hours. In some embodiments, the conductive carbon-based epoxy has a curing time at a temperature of about 65° C. of about 10 minutes to about 40 minutes. In some embodiments, the conductive carbon-based epoxy has a curing time at a temperature of about 65° C. of about 10 minutes to about 40 minutes. In some embodiments, the conductive carbon-based epoxy is resistant to water and common solvents.

As such, the conductive epoxies may be used for a variety of applications, such as bonding, sauntering, splicing, bridging, short circuiting, printed electronics, flexible electronics, antenna formation, energy harvesting, composites, or any electrical formation or alteration procedure. The conductive epoxies may dry at room temperature and as such offer an alternative to conventional soldering where the use of high temperatures is not possible.

Conductive Inks

Provided herein are conductive inks comprising a conductive additive and a solvent. The conductive ink may comprise a carbon-based conductive ink or a silver-based conductive ink. The carbon-based conductive ink may comprise a graphene-based conductive ink.

The silver-based additive may comprise a silver nanowire, a silver nanoparticle, or both. The silver-based additive may comprise a silver nanowire and not a silver nanoparticle. The silver-based additive may comprise a silver nanoparticle and not a silver nanowire. The silver-based additive may comprise a silver nanowire and a silver nanoparticle. Alternatively, the silver-based material may comprise silver nanorods, silver nanoflowers, silver nanofibers, silver nanoplatelets, silver nanoribbons, silver nanocubes, silver bipyramids, or any combination thereof. The silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 25% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 50% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. At least about 75% of the silver nanowires may have a diameter of less than about 1 μm, about 0.9 μm, about 0.8 μm, about 0.7 μm, about 0.6 μm, about 0.5 μm, about 0.4 μm, about 0.3 μm, about 0.2 μm, about 0.1 μm, about 0.09 μm, about 0.08 μm, about 0.07 μm, about 0.06 μm, or about 0.05 μm. The silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 25% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 50% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. At least about 75% of the silver nanowires may have a length of greater than about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, or about 75 μm. The silver nanowire may have an average aspect ratio of about 250:1, 300:1, 350:1, 400:1, 450:1, 500:1, 600:1, 700:1, 800:1, 900:1, or 1000:1. The silver nanowire may have an average aspect ratio of at least about 250:1, 300:1, 350:1, 400:1, 450:1, 500:1, 600:1, 700:1, 800:1, 900:1, or 1000:1.

In some embodiments, the conductive ink comprises a percentage by weight of the conductive additive of about 0.1% to about 80%. In some embodiments, the conductive ink comprises a percentage by weight of the conductive additive of about 0.1% to about 0.2%, about 0.1% to about 0.5%, about 0.1% to about 1%, about 0.1% to about 1.5%, about 0.1% to about 2%, about 0.1% to about 2.5%, about 0.1% to about 5%, about 0.1% to about 10%, about 0.1% to about 20%, about 0.1% to about 40%, about 0.1% to about 80%, about 0.2% to about 0.5%, about 0.2% to about 1%, about 0.2% to about 1.5%, about 0.2% to about 2%, about 0.2% to about 2.5%, about 0.2% to about 5%, about 0.2% to about 10%, about 0.2% to about 20%, about 0.2% to about 40%, about 0.2% to about 80%, about 0.5% to about 1%, about 0.5% to about 1.5%, about 0.5% to about 2%, about 0.5% to about 2.5%, about 0.5% to about 5%, about 0.5% to about 10%, about 0.5% to about 20%, about 0.5% to about 40%, about 0.5% to about 80%, about 1% to about 1.5%, about 1% to about 2%, about 1% to about 2.5%, about 1% to about 5%, about 1% to about 10%, about 1% to about 20%, about 1% to about 40%, about 1% to about 80%, about 1.5% to about 2%, about 1.5% to about 2.5%, about 1.5% to about 5%, about 1.5% to about 10%, about 1.5% to about 20%, about 1.5% to about 40%, about 1.5% to about 80%, about 2% to about 2.5%, about 2% to about 5%, about 2% to about 10%, about 2% to about 20%, about 2% to about 40%, about 2% to about 80%, about 2.5% to about 5%, about 2.5% to about 10%, about 2.5% to about 20%, about 2.5% to about 40%, about 2.5% to about 80%, about 5% to about 10%, about 5% to about 20%, about 5% to about 40%, about 5% to about 80%, about 10% to about 20%, about 10% to about 40%, about 10% to about 80%, about 20% to about 40%, about 20% to about 80%, or about 40% to about 80%. In some embodiments, the conductive ink comprises a percentage by weight of the conductive additive of about 0.1%, about 0.2%, about 0.5%, about 1%, about 1.5%, about 2%, about 2.5%, about 5%, about 10%, about 20%, about 40%, or about 80%. In some embodiments, the conductive ink comprises a percentage by weight of the conductive additive of at least about 0.1%, about 0.2%, about 0.5%, about 1%, about 1.5%, about 2%, about 2.5%, about 5%, about 10%, about 20%, or about 40%. In some embodiments, the conductive ink comprises a percentage by weight of the conductive additive of at most about 0.2%, about 0.5%, about 1%, about 1.5%, about 2%, about 2.5%, about 5%, about 10%, about 20%, about 40%, or about 80%.

Small-scale silver particles may be greatly beneficial for printing techniques such as screen, gravure, flexographic, slot-dye, spray, and inkjet printing to produce electrical devices with high conductivity and enhanced flexibility.

The carbon-based material may comprise two or more of a graphene nanoparticle, a graphene nanosheet, and a graphene microparticle. The carbon-based material may comprise a graphene nanoparticle and a graphene nanosheet. The carbon-based material may comprise a graphene nanoparticle and a graphene microparticle. The carbon-based material may comprise a graphene nanosheet and a graphene microparticle. The carbon-based material may comprise a graphene nanoparticle, a graphene nanosheet, and a graphene microparticle. In some embodiments, the graphene nanoparticle, nanosheet, or microparticle has a size of about 0.5 μm to about 100 μm. In some embodiments, the graphene nanoparticle, nanosheet, or microparticle has a size of about 0.5 μm to about 1 μm, about 0.5 μm to about 5 μm, about 0.5 μm to about 10 μm, about 0.5 μm to about 20 μm, about 0.5 μm to about 30 μm, about 0.5 μm to about 40 μm, about 0.5 μm to about 50 μm, about 0.5 μm to about 60 μm, about 0.5 μm to about 70 μm, about 0.5 μm to about 80 μm, about 0.5 μm to about 100 μm, about 1 μm to about 5 μm, about 1 μm to about 10 μm, about 1 μm to about 20 μm, about 1 μm to about 30 μm, about 1 μm to about 40 μm, about 1 μm to about 50 μm, about 1 μm to about 60 μm, about 1 μm to about 70 μm, about 1 μm to about 80 μm, about 1 μm to about 100 μm, about 5 μm to about 10 μm, about 5 μm to about 20 μm, about 5 μm to about 30 μm, about 5 μm to about 40 μm, about 5 μm to about 50 μm, about 5 μm to about 60 μm, about 5 μm to about 70 μm, about 5 μm to about 80 μm, about 5 μm to about 100 μm, about 10 μm to about 20 μm, about 10 μm to about 30 μm, about 10 μm to about 40 μm, about 10 μm to about 50 μm, about 10 μm to about 60 μm, about 10 μm to about 70 μm, about 10 μm to about 80 μm, about 10 μm to about 100 μm, about 20 μm to about 30 μm, about 20 μm to about 40 μm, about 20 μm to about 50 μm, about 20 μm to about 60 μm, about 20 μm to about 70 μm, about 20 μm to about 80 μm, about 20 μm to about 100 μm, about 30 μm to about 40 μm, about 30 μm to about 50 μm, about 30 μm to about 60 μm, about 30 μm to about 70 μm, about 30 μm to about 80 μm, about 30 μm to about 100 μm, about 40 μm to about 50 μm, about 40 μm to about 60 μm, about 40 μm to about 70 μm, about 40 μm to about 80 μm, about 40 μm to about 100 μm, about 50 μm to about 60 μm, about 50 μm to about 70 μm, about 50 μm to about 80 μm, about 50 μm to about 100 μm, about 60 μm to about 70 μm, about 60 μm to about 80 μm, about 60 μm to about 100 μm, about 70 μm to about 80 μm, about 70 μm to about 100 μm, or about 80 μm to about 100 μm. In some embodiments, the graphene nanoparticle, nanosheet, or microparticle has a size of about 0.5 μm, about 1 μm, about 5 μm, about 10 μm, about 20 μm, about 30 μm, about 40 μm, about 50 μm, about 60 μm, about 70 μm, about 80 μm, or about 100 μm. In some embodiments, the graphene nanoparticle, nanosheet, or microparticle has a size of at least about 0.5 μm, about 1 μm, about 5 μm, about 10 μm, about 20 μm, about 30 μm, about 40 μm, about 50 μm, about 60 μm, about 70 μm, or about 80 μm. In some embodiments, the graphene nanoparticle, nanosheet, or microparticle has a size of at most about 1 μm, about 5 μm, about 10 μm, about 20 μm, about 30 μm, about 40 μm, about 50 μm, about 60 μm, about 70 μm, about 80 μm, or about 100 μm.

The solvent may comprise an oxygenated solvent, a hydrocarbon solvent, a halogenated solvent, or any combination thereof. The oxygenated solvent may comprise an alcohol, a glycol, an ether, a ketone, an ester, a glycol ether ester, or any combination thereof. The hydrocarbon solvent may comprise an aliphatic hydrocarbon, an aromatic hydrocarbon, or both. The halogenated solvent may comprise a chlorinated hydrocarbon. The solvent may comprise water, alcohol, acetone, ethanol, isopropyl alcohol, a hydrocarbon, or any combination thereof.

The conductive ink may further comprise one or more of a binder, a surfactant, and a defoamer. The binder may comprise a polymer solution. In some embodiments, the polymer solution comprises a polymer comprising polyvinyl pyrrolidone, sodium dodecyl sulfonate, vitamin B2, poly (vinyl alcohol), dextrin, poly(methyl vinyl ether), or any combination thereof. The binder my comprise a glycol comprising ethylene glycol, polyethylene glycol 200, polyethylene glycol 400, propylene glycol, or any combination thereof. In some embodiments, the binder has a molecular weight of about 10,000 to about 40,000. In some embodiments, a percentage by mass of the binder solution in the conductive ink is about 0.5% to about 99%. In some embodiments, a percentage by mass of the surfactant in the conductive ink is about 0.5% to about 10%. In some embodiments, a percentage by mass of the defoamer in the conductive ink is about 0.5% to about 10%.

In some embodiments, the binder comprises a polymer. In some embodiments, the polymer comprises a synthetic polymer. In some embodiments, the synthetic polymer comprises carboxymethyl cellulose, polyvinylidene fluoride, poly(vinyl alcohol), poly(vinyl pyrrolidone), poly(ethylene oxide), ethyl cellulose, or any combination thereof. In some embodiments, the binder is a dispersant. In some embodiments, the binder comprises carboxymethyl cellulose, polyvinylidene fluoride, poly(vinyl alcohol), poly(vinyl pyrrolidone), poly(ethylene oxide), ethyl cellulose, or any combination thereof. In some embodiments, the surfactant comprises an acid, a nonionic surfactant, or any combination thereof. In some embodiments, the acid comprises perfluorooctanoic acid, perfluorooctane sulfonate, perfluorohexane sulfonic acid, perfluorononanoic acid, perfluorodecanoic acid, or any combination thereof. In some embodiments, the nonionic surfactant comprises a polyethylene glycol alkyl ether, a octaethylene glycol monododecyl ether, a pentaethylene glycol monododecyl ether, a polypropylene glycol alkyl ether, a glucoside alkyl ether, decyl glucoside, lauryl glucoside, octyl glucoside, a polyethylene glycol octylphenyl ether, dodecyldimethylamine oxide, a polyethylene glycol alkylphenyl ether, a polyethylene glycol octylphenyl ether, Triton X-100, polyethylene glycol alkylphenyl ether, nonoxynol-9, a glycerol alkyl ester polysorbate, sorbitan alkyl ester, polyethoxylated tallow amine, Dynol 604, or any combination thereof. The defoamer comprises an insoluble oil, a silicone, a glycol, a stearate, an organic solvent, Surfynol DF-1100, alkyl polyacrylate, or any combination thereof. In some embodiments, the insoluble oil comprises mineral oil, vegetable oil, white oil, or any combination thereof. In some embodiments, the silicone comprises polydimethylsiloxane, silicone glycol, a fluorosilicone, or any combination thereof. In some embodiments, the glycol comprises polyethylene glycol, ethylene glycol, propylene glycol, or any combination thereof. In some embodiments, the stearate comprises glycol stearate, stearin, or any combination thereof. In some embodiments, the organic solvent comprises ethanol, isopropyl alcohol, N-methyl-2-pyrrolidone, cyclohexanone, terpineol, 3-methoxy-3-methyl-1-butanol, 4-hydroxyl-4-methyl-pentan-2-one, methyl isobutyl ketone, or any combination thereof.

In some embodiments, the conductive graphene ink further comprises a pigment, a colorant, a dye, or any combination thereof. In some embodiments, the conductive graphene ink comprises at least one, at least two, at least three, at least four, or at least five colorants, dyes, pigments, or a combination thereof. In some embodiments, the pigment comprises a metal-based or metallic pigment. In some embodiments, the metallic pigment is a gold, silver, titanium, aluminum, tin, zinc, mercury, manganese, lead, iron, iron oxide, copper, cobalt, cadmium, chromium, arsenic, bismuth, antimony, or barium pigment. In some embodiments, the colorant comprises at least one metallic pigment. In some embodiments, the colorant comprises a silver metallic colorant. In some embodiments, the silver metallic colorant comprises silver nanoparticles, silver nanorods, silver nanowires, silver nanoflowers, silver nanofibers, silver nanoplatelets, silver nanoribbons, silver nanocubes, silver bipyramids, or a combination thereof. In some embodiments, a colorant is selected from a pigment and/or dye that is red, yellow, magenta, green, cyan, violet, black, or brown, or a combination thereof. In some embodiments, a pigment is blue, brown, cyan, green, violet, magenta, red, yellow, or a combination thereof. In some embodiments, a dye is blue, brown, cyan, green, violet, magenta, red, yellow, or a combination thereof. In some embodiments, a yellow colorant includes Pigment Yellow 1, 2, 3, 4, 5, 6, 7, 10, 11, 12, 13, 14, 15, 16, 17, 23, 65, 74, 83, 93, 110, 128, 151, 155, or a combination thereof. In some embodiments, a black colorant includes Color Black SI70, Color Black SI50, Color Black FW1, Color Black FW18, Acid Black 1, 11, 52, 172, 194, 210, 234, or a combination thereof. In some embodiments, a red or magenta colorant includes Pigment Red 1-10, 12, 18, 21, 23, 37, 38, 39, 40, 41, 48, 90, 112, 122, or a combination thereof. In some embodiments, a cyan or violet colorant includes Pigment Blue 15, 17, 22, Pigment Violet 1, 2, 3, 5, 19, 23, or a combination thereof. In some embodiments, an orange colorant includes Pigment Orange 48 and/or 49. In some embodiments, a violet colorant includes Pigment Violet 19 and/or 42.

Figure 46:
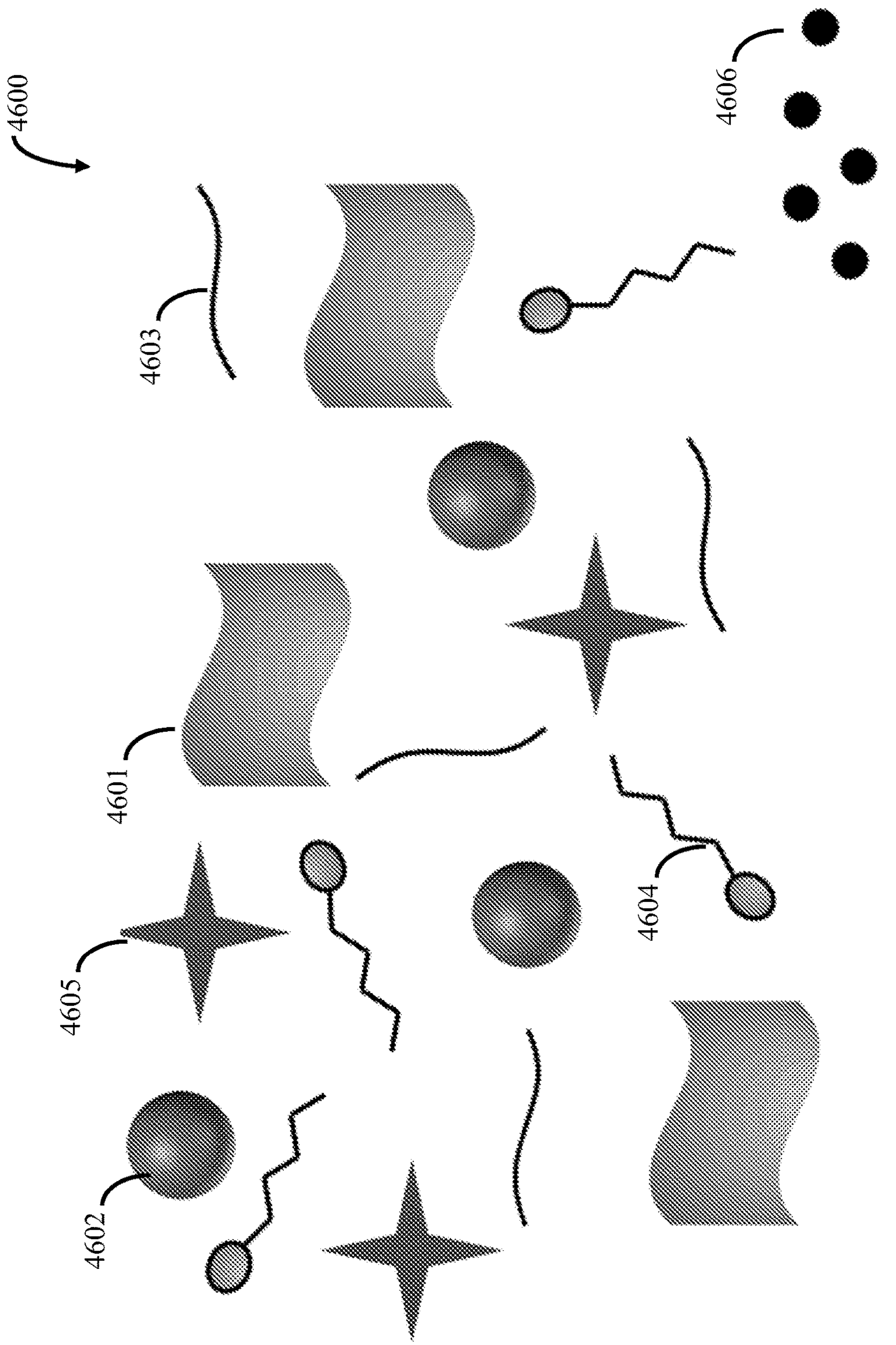
FIG. 46 shows an image of an exemplary conductive ink, according to one or more embodiments described herein.

FIG. 46 shows a diagram of an exemplary conductive ink comprising a conductive graphene ink 4600. As shown, the conductive graphene ink 4600 comprises a graphene sheet 4601, a carbon particle 4602, a binder 4603, a surfactant 4604, a defoamer 4605, and a first solvent 4606. Interconnected particle chains formed by the conductive additives within the conductive inks enable electrical current conduction, while isolated carbon particle chains prevent percolation from being achieved. Embedding the carbon particle chains within conductive graphene sheets through van der Waals forces, however, enable percolation by forming a continuous conductive graphene ink.

Figure 47:
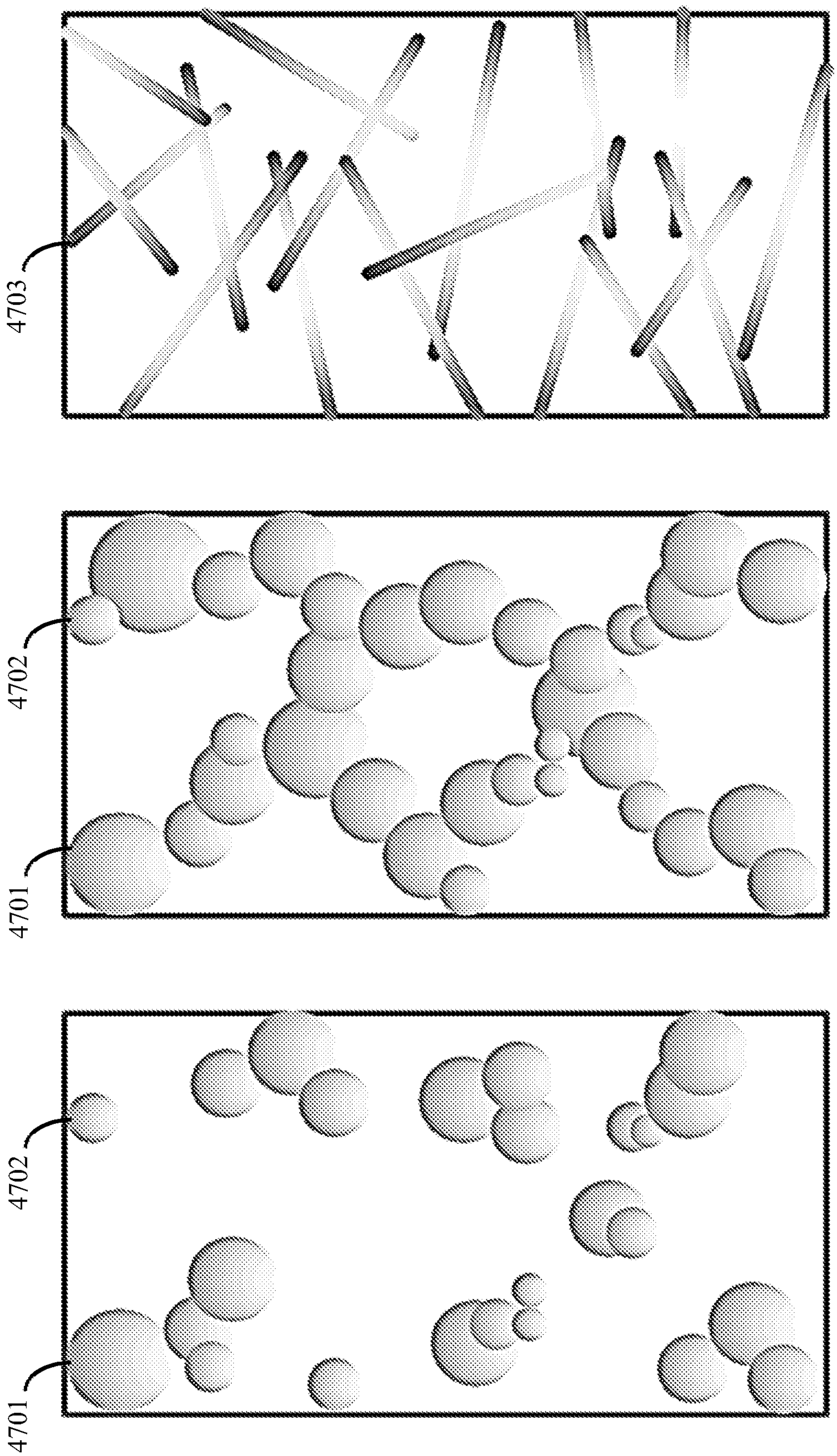
FIG. 47 displays an illustration of silver nanostructures and microstructures below percolation, with a percolation threshold of 15%, and with a percolation threshold of less than 1%, according to one or more embodiments described herein.

FIG. 47 is an illustration of a first, second, and third silver-based conductive ink, wherein from left to right the first conductive ink is below percolation, the second conductive ink has a percolation threshold of 15%, and the third conductive ink has a percolation threshold of less than 1%. As seen, the silver nanostructures 4702 and microstructures 4701 in the first conductive ink are not all interconnected to transmit electricity and thus do not achieve percolation. Conversely, a higher concentration of about 15% of the silver nanostructures 4702 and microstructures 4701 within the second conductive enables interconnection and percolation. However, the implantation of nanowires 4703 in the third conductive ink enables percolation with a lower concentration of the silver additive. This lower concentration reduces the amount of the conductive additive required to establish electrical connection in the final matrix and thus reduces the cost of the conductive ink. The percolation threshold may strongly depend on the aspect ratio (length-to-diameter) of the filler particles. As such, the methods and compositions herein employ specific component quantities, orders of operation, time periods, and temperatures to ensure a low percolation threshold.

Specific fluidic properties of the conductive inks herein may enable its use in various printing applications, such as in inkjet printing, which requires a low controlled surface tension and viscosity to maintain consistent jetting through the printhead nozzles. The surface tension of the ink may be increased by increasing the quantity of the solvent. In some applications, a surfactant may be included within the ink to reduce the surface tension by reducing the relative force of attraction as the surfactant units move to the water/air interface and the non-polar surfactant heads become exposed. A specific ink viscosity is important for many applications. For example, a viscosity of greater than about 1000 mPa·s may be ideal for ink for screen printing, wherein a viscosity lower than 20 mPa·s may be ideal for inkjet printing. In some embodiments, the viscosity of the conductive graphene ink may be controlled by the amount of at least one of the solvent and binder used, wherein lower quantities of the solvent and higher quantities of the binder yield lower viscosities.

In some embodiments, the conductive ink has a viscosity of about 0.5 cps to about 40 cps. In some embodiments, the conductive ink has a viscosity of about 0.5 cps to about 1 cps, about 0.5 cps to about 2 cps, about 0.5 cps to about 4 cps, about 0.5 cps to about 6 cps, about 0.5 cps to about 8 cps, about 0.5 cps to about 10 cps, about 0.5 cps to about 15 cps, about 0.5 cps to about 20 cps, about 0.5 cps to about 25 cps, about 0.5 cps to about 30 cps, about 0.5 cps to about 40 cps, about 1 cps to about 2 cps, about 1 cps to about 4 cps, about 1 cps to about 6 cps, about 1 cps to about 8 cps, about 1 cps to about 10 cps, about 1 cps to about 15 cps, about 1 cps to about 20 cps, about 1 cps to about 25 cps, about 1 cps to about 30 cps, about 1 cps to about 40 cps, about 2 cps to about 4 cps, about 2 cps to about 6 cps, about 2 cps to about 8 cps, about 2 cps to about 10 cps, about 2 cps to about 15 cps, about 2 cps to about 20 cps, about 2 cps to about 25 cps, about 2 cps to about 30 cps, about 2 cps to about 40 cps, about 4 cps to about 6 cps, about 4 cps to about 8 cps, about 4 cps to about 10 cps, about 4 cps to about 15 cps, about 4 cps to about 20 cps, about 4 cps to about 25 cps, about 4 cps to about 30 cps, about 4 cps to about 40 cps, about 6 cps to about 8 cps, about 6 cps to about 10 cps, about 6 cps to about 15 cps, about 6 cps to about 20 cps, about 6 cps to about 25 cps, about 6 cps to about 30 cps, about 6 cps to about 40 cps, about 8 cps to about 10 cps, about 8 cps to about 15 cps, about 8 cps to about 20 cps, about 8 cps to about 25 cps, about 8 cps to about 30 cps, about 8 cps to about 40 cps, about 10 cps to about 15 cps, about 10 cps to about 20 cps, about 10 cps to about 25 cps, about 10 cps to about 30 cps, about 10 cps to about 40 cps, about 15 cps to about 20 cps, about 15 cps to about 25 cps, about 15 cps to about 30 cps, about 15 cps to about 40 cps, about 20 cps to about 25 cps, about 20 cps to about 30 cps, about 20 cps to about 40 cps, about 25 cps to about 30 cps, about 25 cps to about 40 cps, or about 30 cps to about 40 cps. In some embodiments, the conductive ink has a viscosity of about 0.5 cps, about 1 cps, about 2 cps, about 4 cps, about 6 cps, about 8 cps, about 10 cps, about 15 cps, about 20 cps, about 25 cps, about 30 cps, or about 40 cps. In some embodiments, the conductive ink has a viscosity of at least about 0.5 cps, about 1 cps, about 2 cps, about 4 cps, about 6 cps, about 8 cps, about 10 cps, about 15 cps, about 20 cps, about 25 cps, or about 30 cps. In some embodiments, the conductive ink has a viscosity of at most about 1 cps, about 2 cps, about 4 cps, about 6 cps, about 8 cps, about 10 cps, about 15 cps, about 20 cps, about 25 cps, about 30 cps, or about 40 cps.

Figure 48:
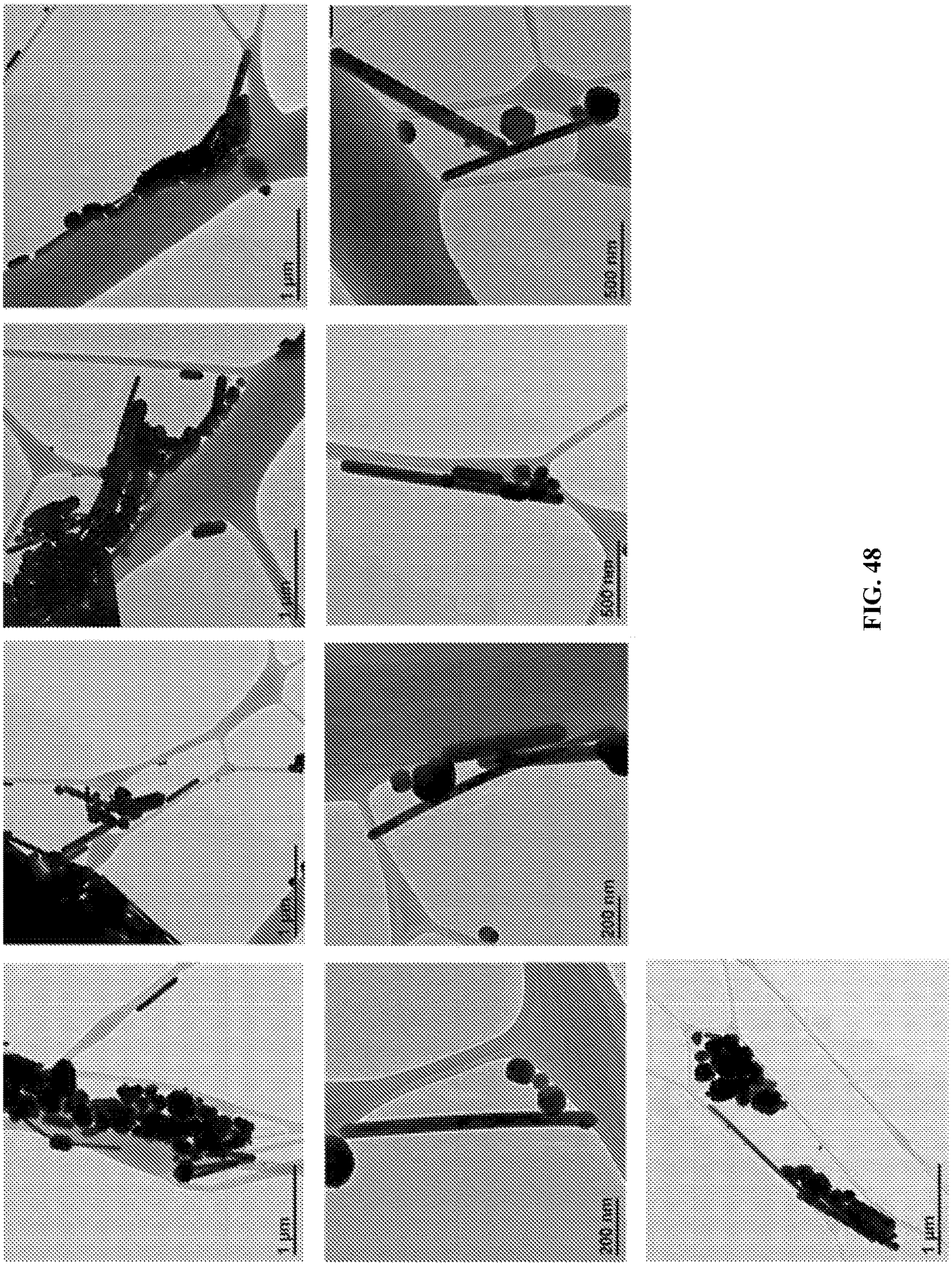
FIG. 48 displays transmission electron microscope (TEM) images of exemplary silver nanowires and nanoparticles, according to one or more embodiments described herein.
Figure 49:
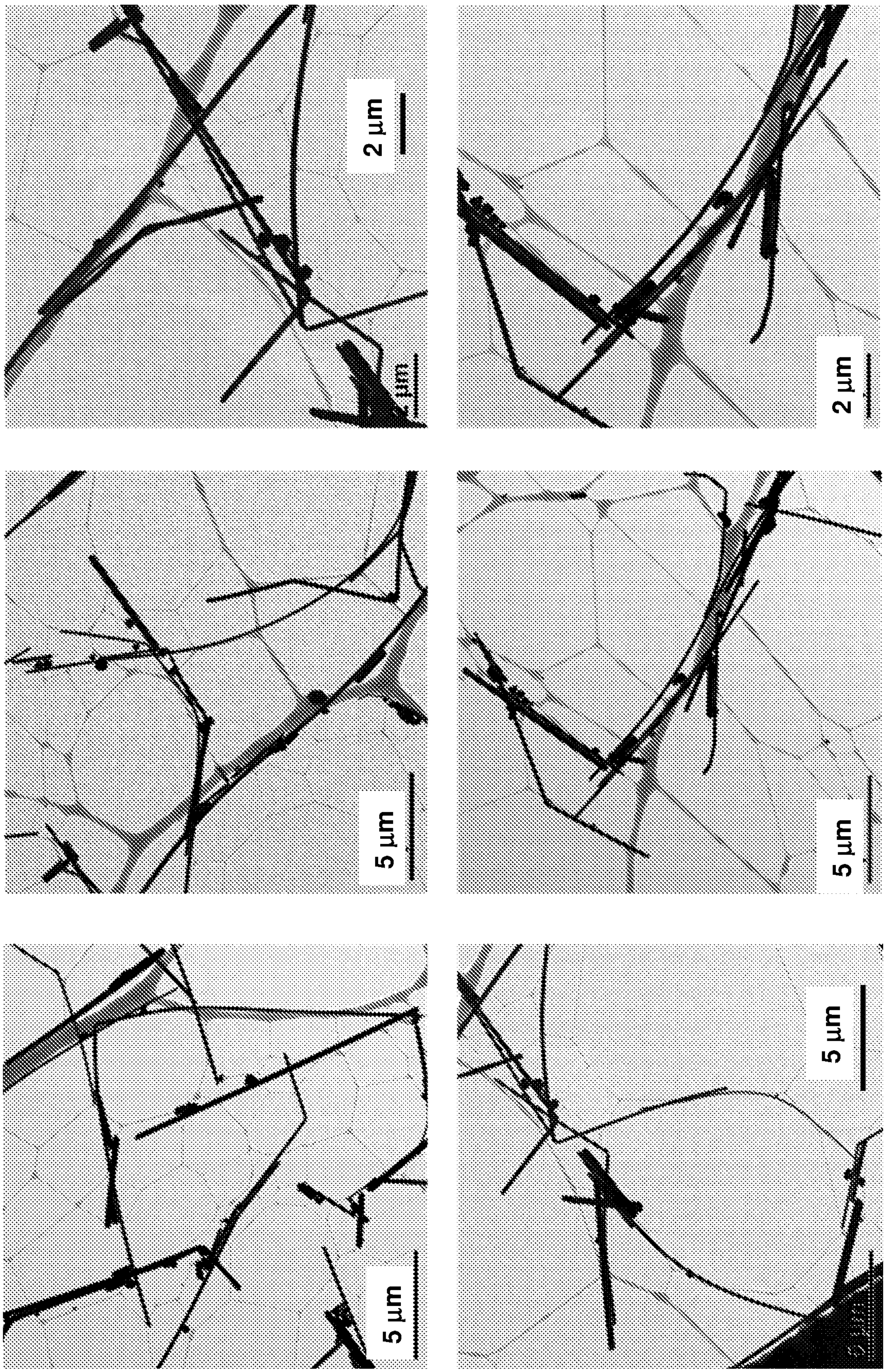
FIG. 49 displays TEM images of exemplary long silver nanowires and nanoparticles, according to one or more embodiments described herein.

FIG. 48 displays transmission electron microscope (TEM) images of exemplary silver nanowires and nanoparticles formed with a solvent comprising a polymer solution. As seen, the scale of the images shown from left to right at the top row is 1 μm, 1 μm, 1 μm, and 1 μm; at the middle row is 200 μm, 200 μm, 500 μm, and 500 μm and; at the bottom row is 1 μm. FIG. 49 displays images of silver dispersions formed with a solvent comprising a glycol and a solvent comprising a polymer solution, left and right, respectively. As seen, the scale of the images shown at the left and center column is 5 μm and at the right column is 2 μm.

Figure 50A:
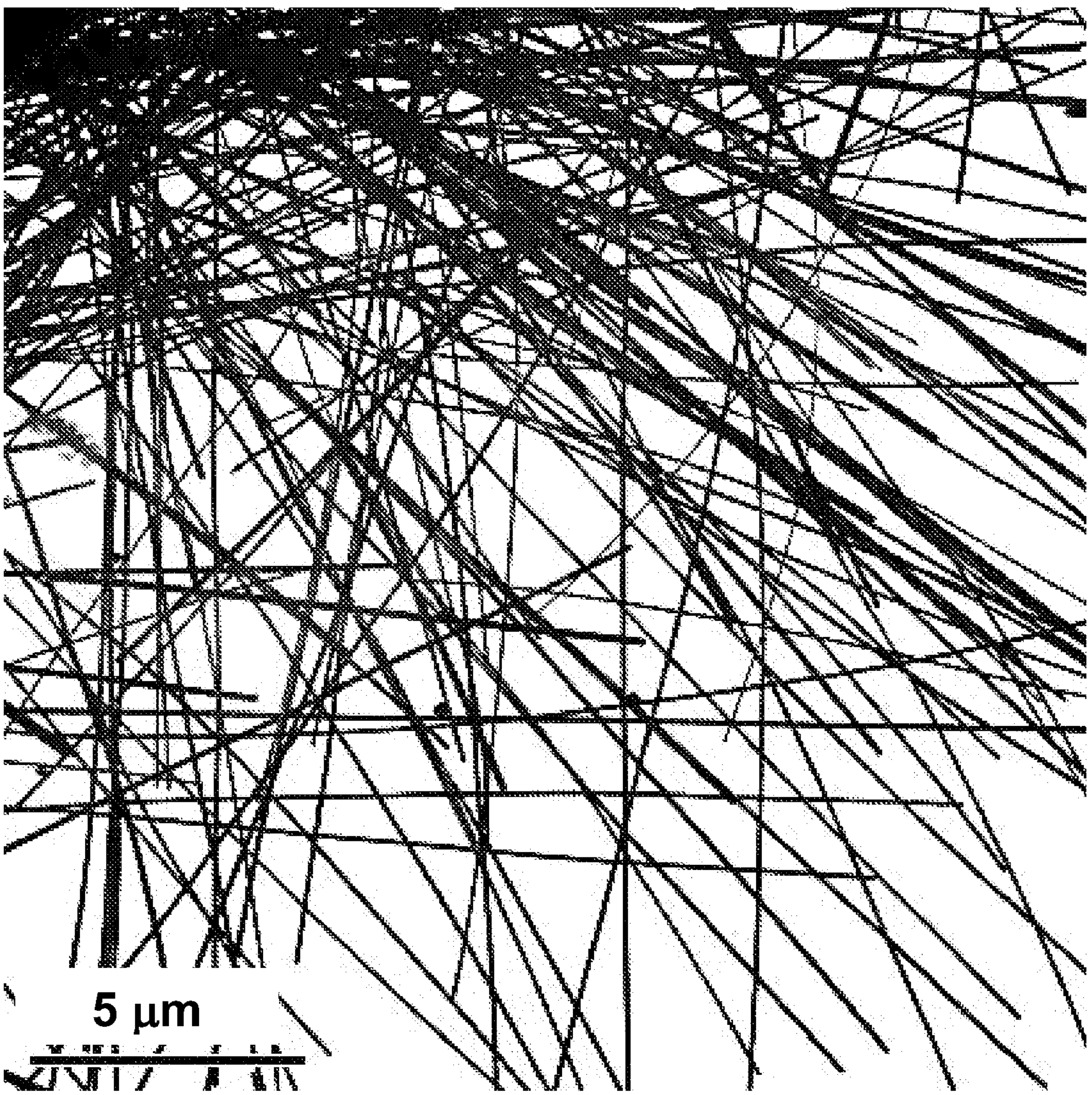
FIG. 50A displays a first TEM image of exemplary silver nanowires, according to one or more embodiments described herein.
Figure 50B:
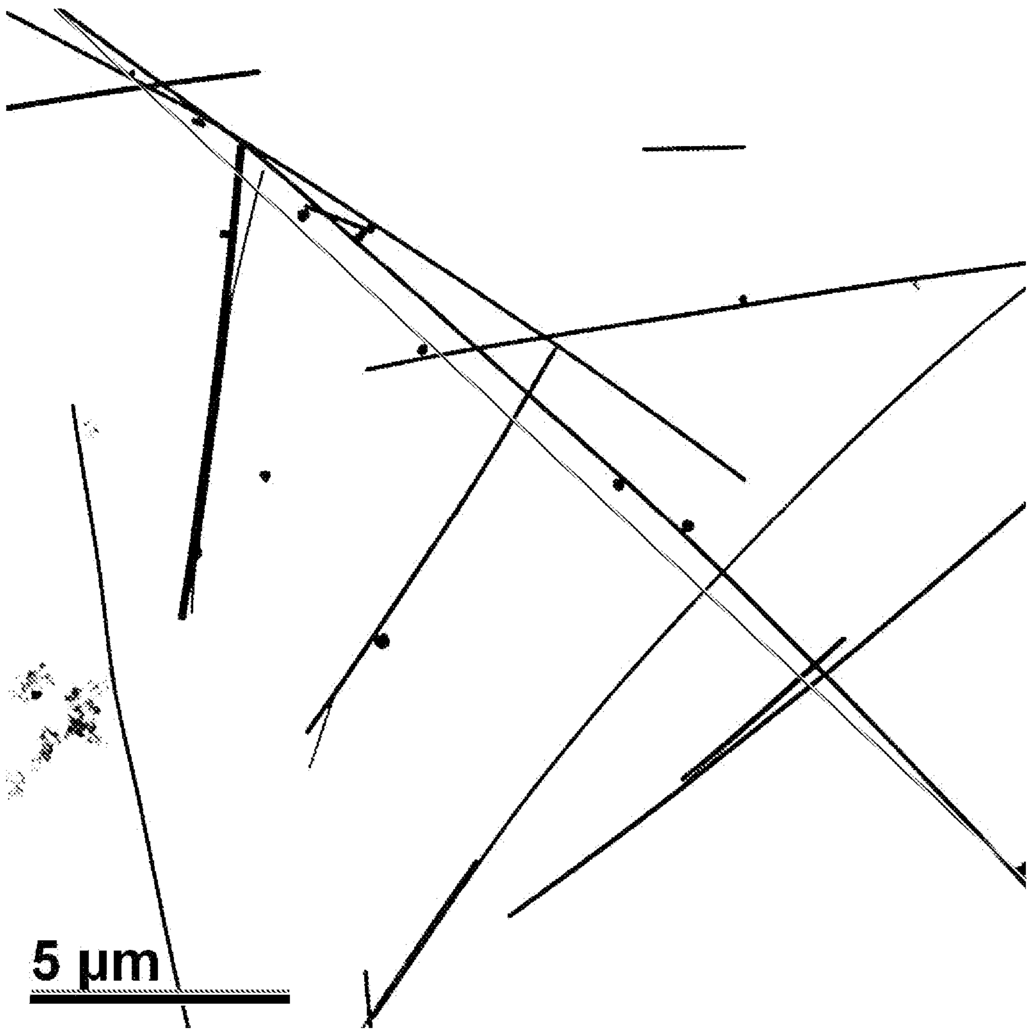
FIG. 50B displays a second TEM image of exemplary silver nanowires, according to one or more embodiments described herein.

FIGS. 50A and 50B display TEM images of the microscopic structures of the exemplary silver nanowires and nanoparticles. The silver nanowires formed by the methods herein may have a diameter of less than 1 μm, 0.9 μm, 0.8 μm, 0.7 μm, 0.6 μm, 0.5 μm, 0.4 μm, 0.3 μm, 0.2 μm, 0.1 μm, 0.09 μm, 0.08 μm, 0.07 μm, 0.06 μm, or 0.05 μm. The silver nanowires formed by the methods herein may have a length of greater than 10 μm, 15 μm, 20 μm, 25 μm, 30 μm, 35 μm, 40 μm, 45 μm, 50 μm, 55 μm, 60 μm, 65 μm, 70 μm, or 75 μm. As shown per FIG. 50B the aspect ratio of the silver nanowires disclosed herein and produced by the methods taught herein may be used to form conductive inks with a high transparency of about 80% to about 95% and which achieve percolation. The transparency of the silver-nanowire-based and silver-nanoparticle-based inks herein may be about 70%, 75%, 80%, 85%, 90%, 95%, or any increment therein. The transparency of the silver-nanowire-based and silver-nanoparticle-based inks herein may be at least about 70%, 75%, 80%, 85%, 90%, or 95%. Such a high transparency enables the use of the silver-nanowire-based and silver-nanoparticle-based inks herein as conductive elements in optoelectronic devices.

Methods of Forming Conductive Inks

Another aspect provided herein is a method of forming silver nanowires comprising: heating a solvent; adding a catalyst solution and a binder to the solvent to form a first solution; injecting a silver-based solution into the first solution to form a second solution; centrifuging the second solution; and washing the second solution with a washing solution to extract the silver nanowires. The silver nanowires formed by the methods herein may be implemented into any of the disclosed silver-based glues, epoxies, and inks, the disclosed carbon-based glues, epoxies, and inks, or both. The methods herein are capable of producing a conductive graphene ink that, when coated on a substrate, forms a thin consistent layer with a low lateral thickness.

In some embodiments, the volume of the solvent is greater than the volume of the silver-based solution by a factor of about 1.5 to about 6.5. In some embodiments, the solvent is heated to a temperature of about 75° C. to about 300° C. In some embodiments, the solvent is heated for a period of time of about 30 minutes to about 120 minutes. In some embodiments, the solvent is stirred while being heated. In some embodiments, the stirring is performed by a magnetic stir bar. In some embodiments, the stirring is performed at a rate of about 100 rpm to about 400 rpm.

In some embodiments, the catalyst solution comprises a catalyst comprising (a chloride) $CuCl_2$, CuCl, NaCl, $PtCl_2$, AgCl, $FeCl_2$, $FeCl_3$, tetrapropylammonium chloride, tetrapropylammonium bromide, or any combination thereof. In some embodiments, the catalyst solution has a concentration of about 2 mM to about 8 mM. In some embodiments, the volume of the solvent is greater than the volume of the catalyst solution by a factor of about 75 to about 250.

In some embodiments, the silver-based solution comprises a silver-based material comprising $AgNO_3$. In some embodiments, the silver-based solution has a concentration of about 0.05 M to about 0.2 M. In some embodiments, the volume of the solvent is greater than the volume of the silver-based solution by a factor of about 1.5 to about 6.5. In some embodiments, the silver-based solution is injected into the first solution over a period of time of about 1 second to about 900 seconds.

Some embodiments further comprise heating the second solution before the process of centrifuging the second solution. In some embodiments, the heating of the second solution occurs over a period of time of about 30 minutes to about 120 minutes. In some embodiments, the centrifuging occurs at a speed of about 1,500 rpm to about 6,000 rpm. In some embodiments, the centrifuging occurs over a period of time of about 10 minutes to about 40 minutes.

Some embodiments further comprise cooling the second solution before the process of centrifuging the second solution. In some embodiments, the second solution is cooled to room temperature. In some embodiments, the washing solution comprises ethanol, acetone, water, or any combination thereof.

In some embodiments, washing the second solution comprises a plurality of washing cycles comprising about two cycles to about six cycles. Some embodiments further comprise dispersing the silver nanowires in a dispersing solution. In some embodiments, the dispersing solution comprises ethanol, acetone, and water, or any combination thereof.

FIGS. 51A-51E show an exemplary apparatus 5100 for forming silver nanowires, silver nanostructures, and silver microstructures comprising an injector 5101, a stirrer (within the reaction chamber and not shown), a heater 5103 and a reaction chamber 5104. The injector 5101 may be configured to inject the silver-based solution into the first solution in the reaction chamber 5104. The injector 5101 may be configured to inject the silver-based solution into the first solution in the reaction chamber 5104 over a set period of time. The period of time may be about 1 second to about 900 seconds. The heater 5103 may be configured to heat the solvent in the reaction chamber 5104. The heater 5103 may heat the solvent and the first solution in the reaction chamber 5104. The heater 5103 may be configured to heat the solvent, the first solution, and the second solution in the reaction chamber 5104. The heater 5103 may be configured to heat the solvent, the first solution, the second solution, or any combination thereof to a temperature of about 75° C. to about 300° C. The heater 5103 may be configured to heat the solvent, the first solution, the second solution, or any combination thereof for a period of time of about 30 minutes to about 120 minutes. In some embodiments, the stirrer is configured to stir the solvent, the first solution, the second solution, or any combination thereof in the reaction chamber 5104. In some embodiments, the stirrer is configured to stir the solvent, the first solution, the second solution, or any combination thereof at a rate of about 100 rpm to about 400 rpm. In some embodiments, the stirrer comprises a magnetic stir bar. In some embodiments, the stirrer and the heater 5103 are configured to simultaneously heat and stir the solvent, the first solution, the second solution, or any combination thereof. The injector 5101 may be configured to inject the silver-based solution into the first solution in the reaction chamber 5104 while the stirrer stirs the first solution, the second solution, or any combination thereof, and/or while the heater 5103 heats the first solution, the second solution, or any combination thereof. The apparatus 5100 may further comprise a thermometer 5102 to monitor the temperature of the fluids within the reaction chamber 5104.

Figure 51A:
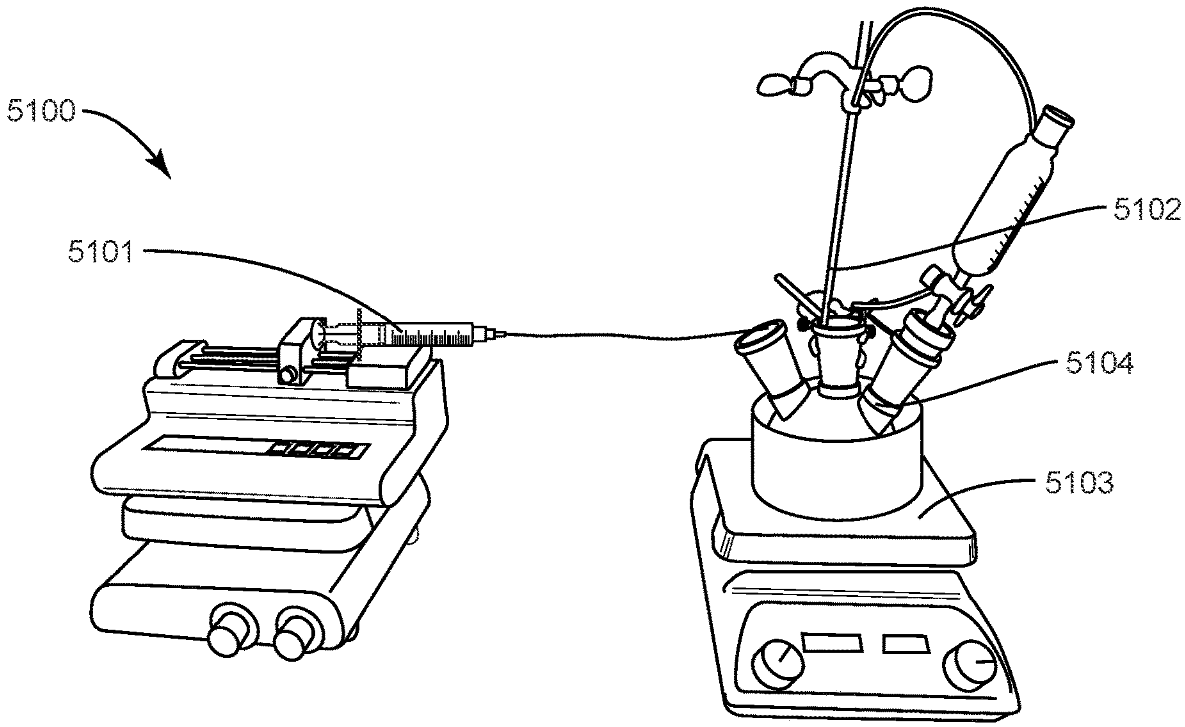
FIG. 51A displays a first image of an exemplary apparatus for forming silver nanowires, according to one or more embodiments described herein.
Figure 51B:
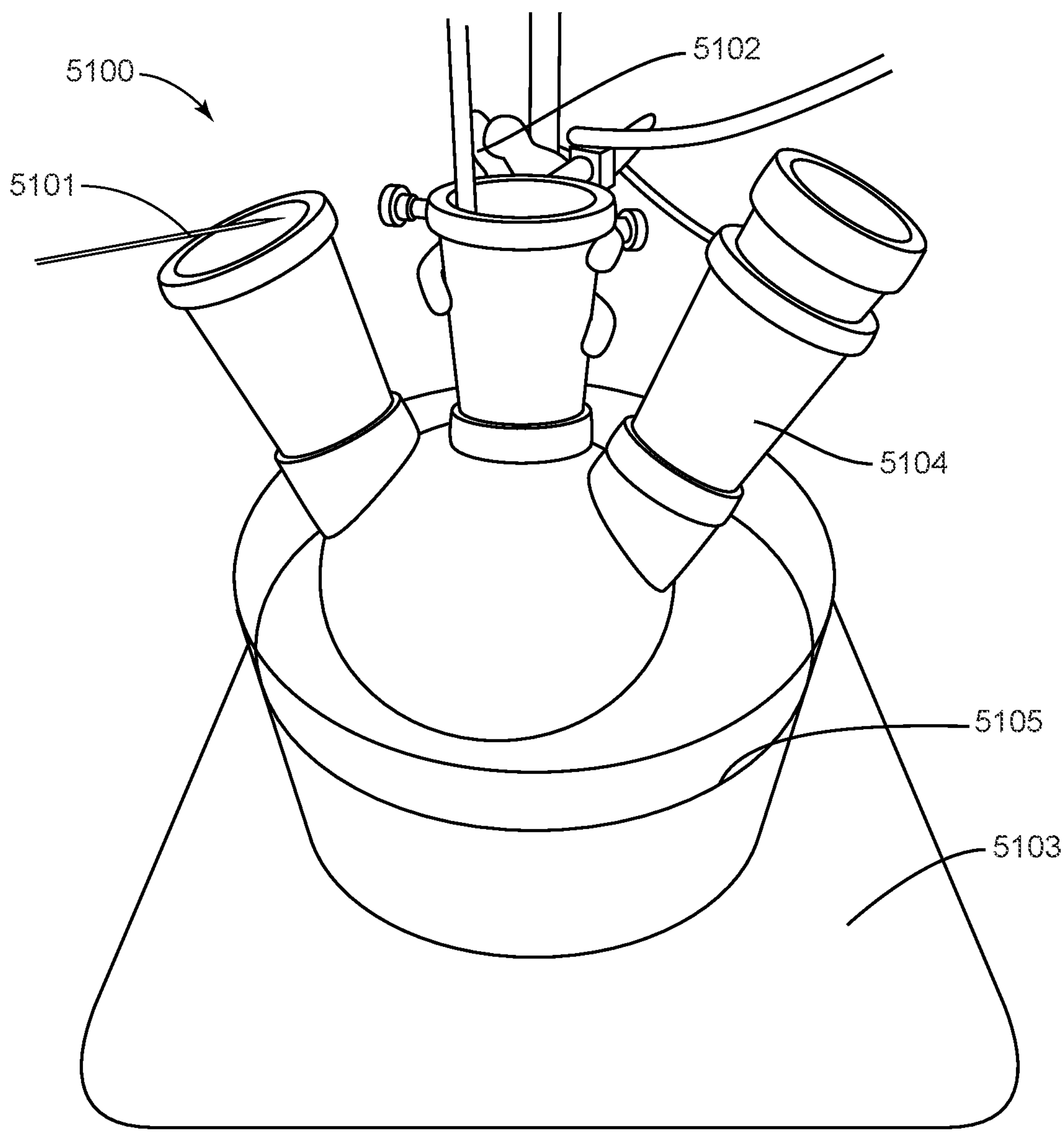
FIG. 51B displays a second image of an exemplary apparatus for forming silver nanowires, according to one or more embodiments described herein.
Figure 51C:
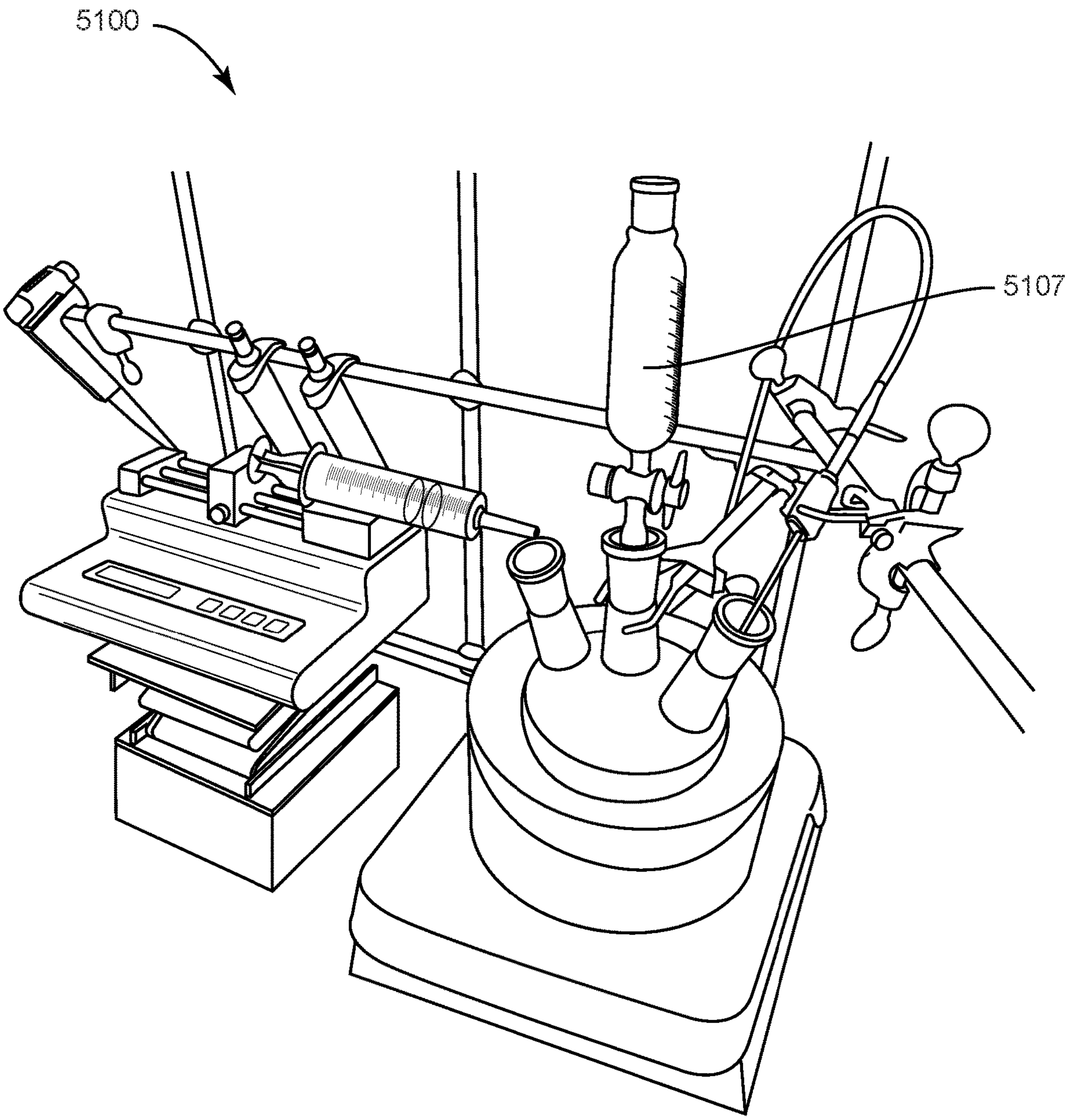
FIG. 51C displays a third image of an exemplary apparatus for forming silver nanowires, according to one or more embodiments described herein.
Figure 51D:
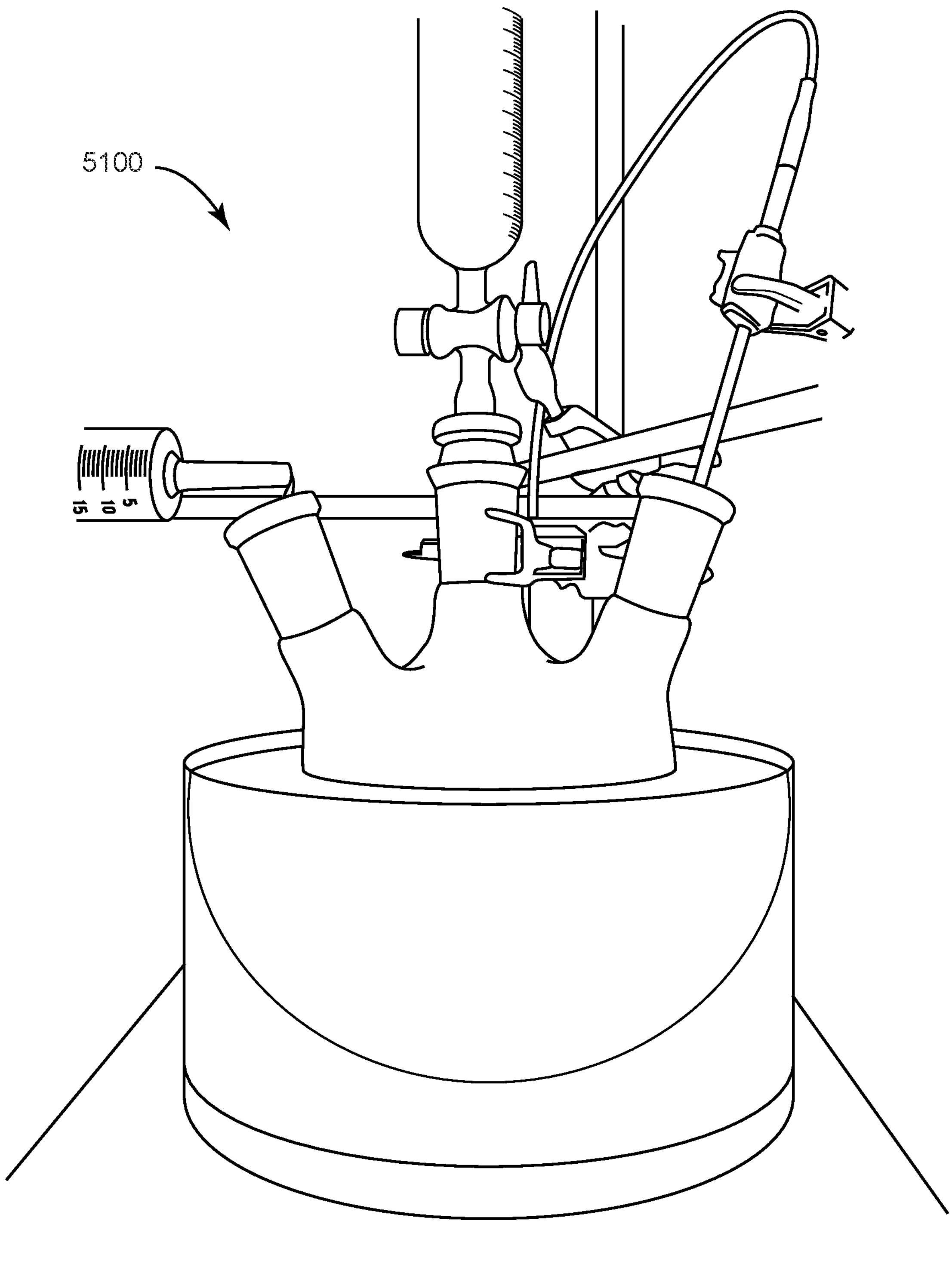
FIG. 51D displays a fourth image of an exemplary apparatus for forming silver nanowires, according to one or more embodiments described herein.
Figure 51E:
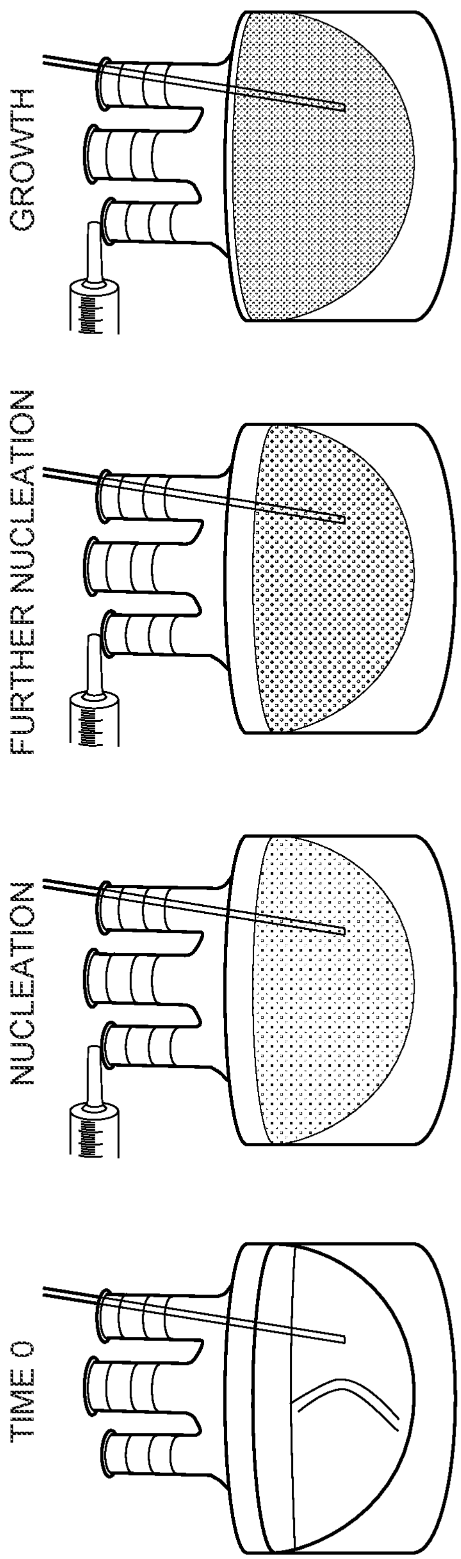
FIG. 51E displays a fifth image of an exemplary apparatus for forming silver nanowires, according to one or more embodiments described herein.

As seen in FIG. 51B, the reaction chamber 5104 may be configured to receive the silver-based solution from the injector 5101 and to receive the stirrer. Further, the heater 5103 may comprise a bath 5105 to evenly and consistently provide heat to the reaction chamber 5104. The bath 5105 may comprise a water bath, an oil bath, or both. In some embodiments, per FIG. 51C, the apparatus further comprises an addition funnel 5107 for adding fluids, solids, or both to the reaction chamber 5104. FIG. 51E shows exemplary images the silver nanowires during, from left to right, initiation, nucleation, further nucleation, and growth. Nucleation may be performed by adjusting the amount of heat provided by the heater 5103 as the small silver nuclei from the silver-based solution grow to form the nanowires. The heater 5103 may heat the fluid in the reaction chamber 5104 to a reaction temperature of 120° C. to induce nucleation and to a temperature of about 160° C. for the initiation of catalysis and the formation of silver nanowires.

Figure 52A:
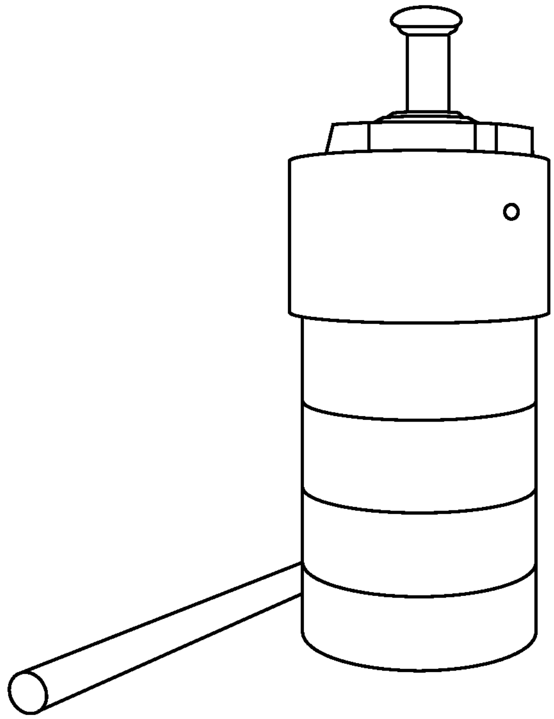
FIG. 52A displays an image of an exemplary sealed solvothermal chamber for forming silver nanoparticles.
Figure 52B:
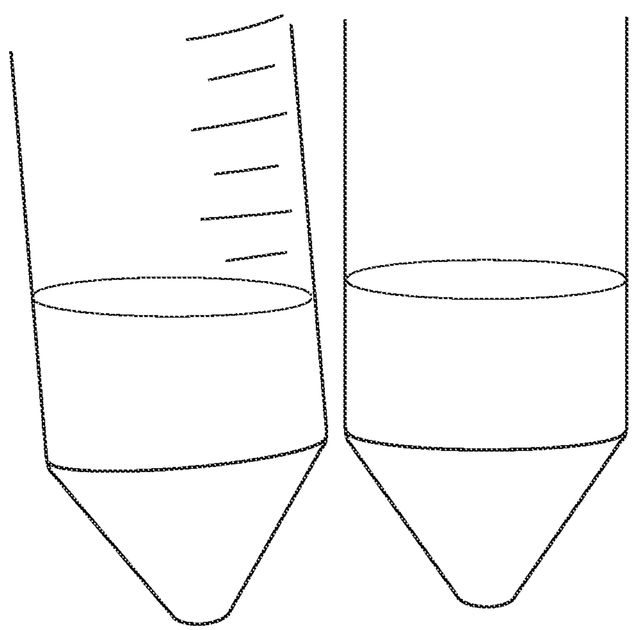
FIG. 52B displays an image of an exemplary silver dispersions formed within the solvothermal chamber by the methods according to the present disclosure.
Figure 53:
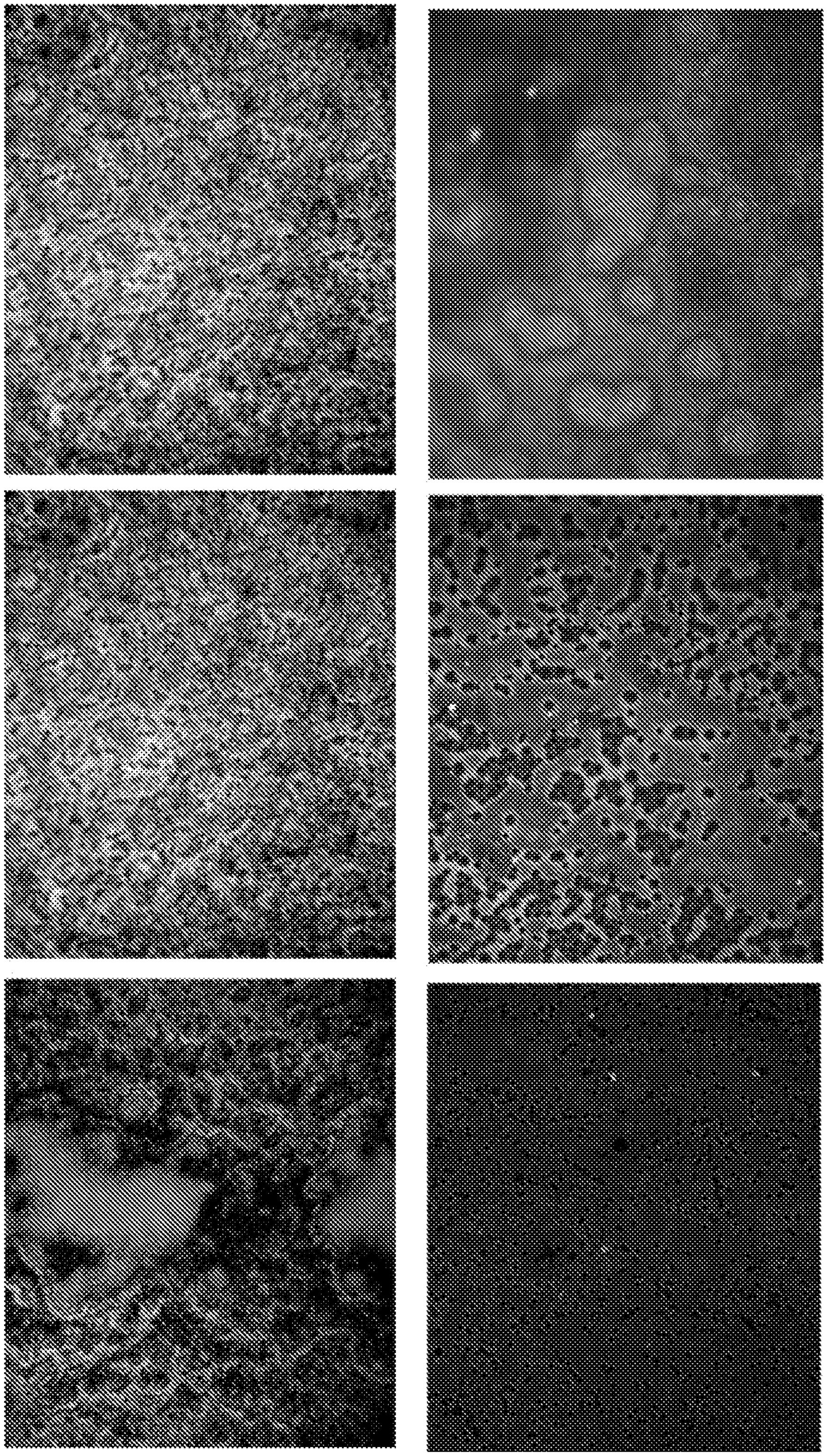
FIG. 53 displays optical microscope images of an exemplary film comprising gas and silver produced within the solvothermal chamber by the methods according to the present disclosure.

In some embodiments, the method is performed in open air. In some embodiments, the method is performed in a solvothermal chamber (e.g., an autoclave). In some embodiments, the method is performed under high pressure. Use of a solvothermal chamber may allow for precise control over the size, shape distribution, and crystallinity of the nanoparticles or nanostructures. FIG. 52A displays an image of an exemplary sealed solvothermal chamber for forming silver nanoparticles. FIG. 52B displays an image of an exemplary silver dispersions formed within the solvothermal chamber by the methods herein. FIG. 53 displays optical microscope images of an exemplary film comprising gas and silver produced within the solvothermal chamber by the methods herein.

The binder may dictate the viscosity of the first solution and thus the mechanical and electrical performance characteristics of the conductive graphene ink and the graphene films formed thereby. The increased viscosity may slow and/or reduce the growth rate of silver particles to nanostructures. In some embodiments, the binder comprises a polymer solution. In some embodiments, the polymer solution comprises a glycol. In some embodiments, the glycol comprises ethylene glycol, polyethylene glycol 200, polyethylene glycol 400, propylene glycol, or any combination thereof. In some embodiments, the polymer solution comprises a polymer comprising polyvinyl pyrrolidone, sodium dodecyl sulfonate, vitamin B2, poly(vinyl alcohol), dextrin, poly(methyl vinyl ether), or any combination thereof. In some embodiments, the polymer of the polymer solution has a molecular weight of about 10,000 to about 40,000. In some embodiments, the polymer solution has a concentration of about 0.075 M to about 0.25 M.

Figure 54:
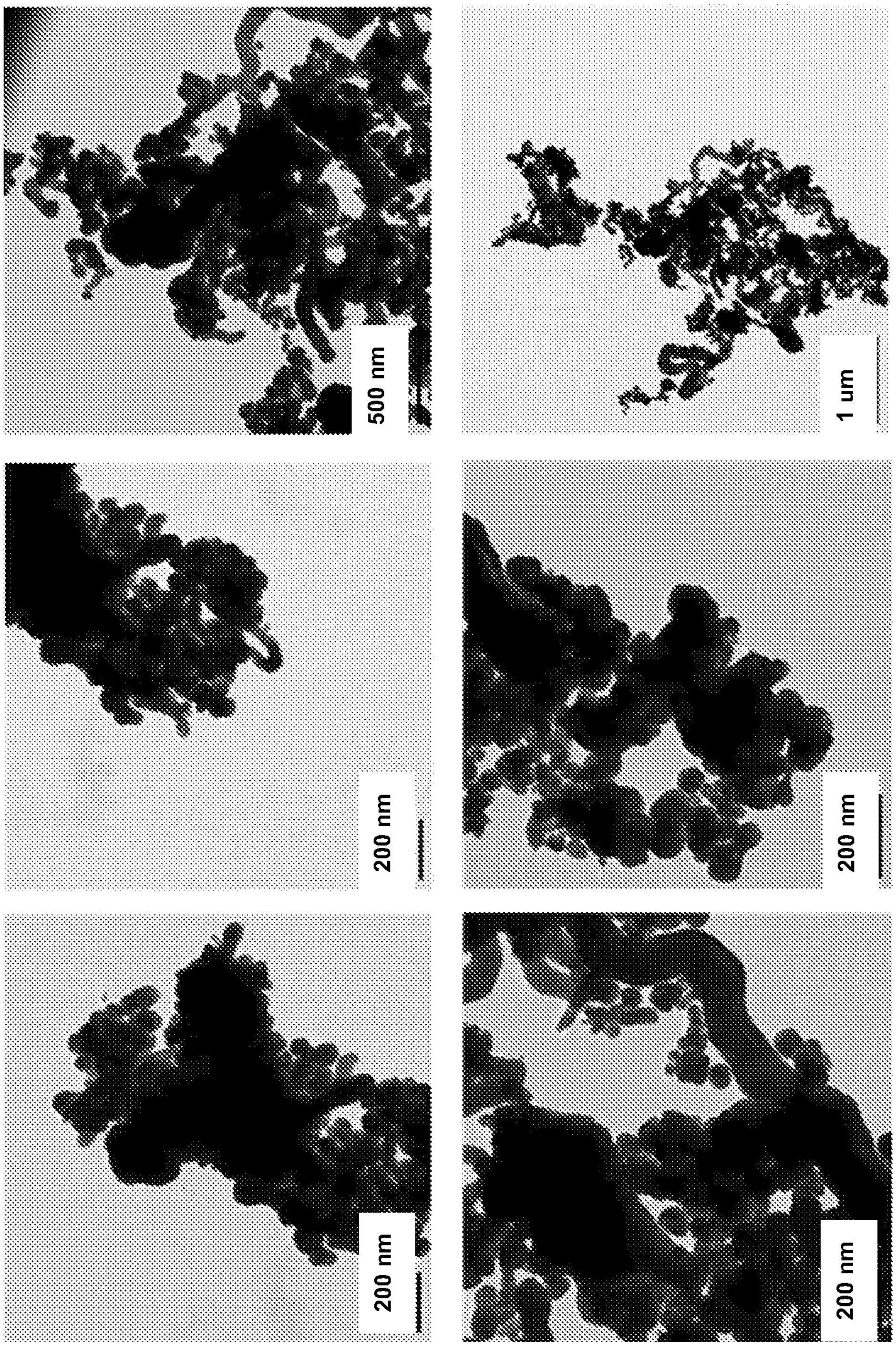
FIG. 54 displays TEM images of exemplary silver nanowires and nanoparticles formed with a binder.
Figure 55:
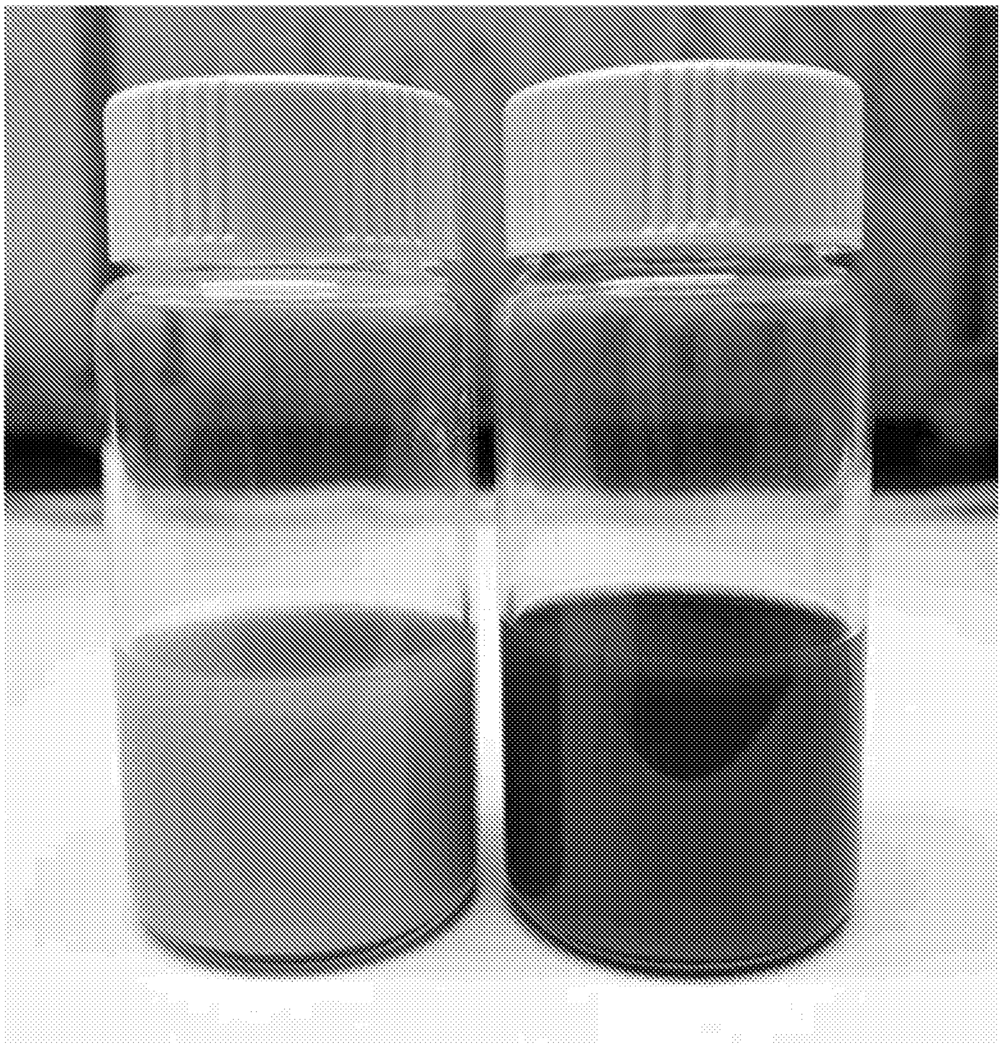
FIG. 55 displays images of silver dispersions formed with and without a binder.

FIG. 54 displays TEM images of exemplary silver nanowires and nanoparticles formed with a binder. As seen, the scale of the images in the left and middle rows is 200 nm, the scale of the top right image is 500 nm, and the scale of the bottom right image is 1 μm. FIG. 55 displays images of silver dispersions formed with and without a binder.

Figure 56:
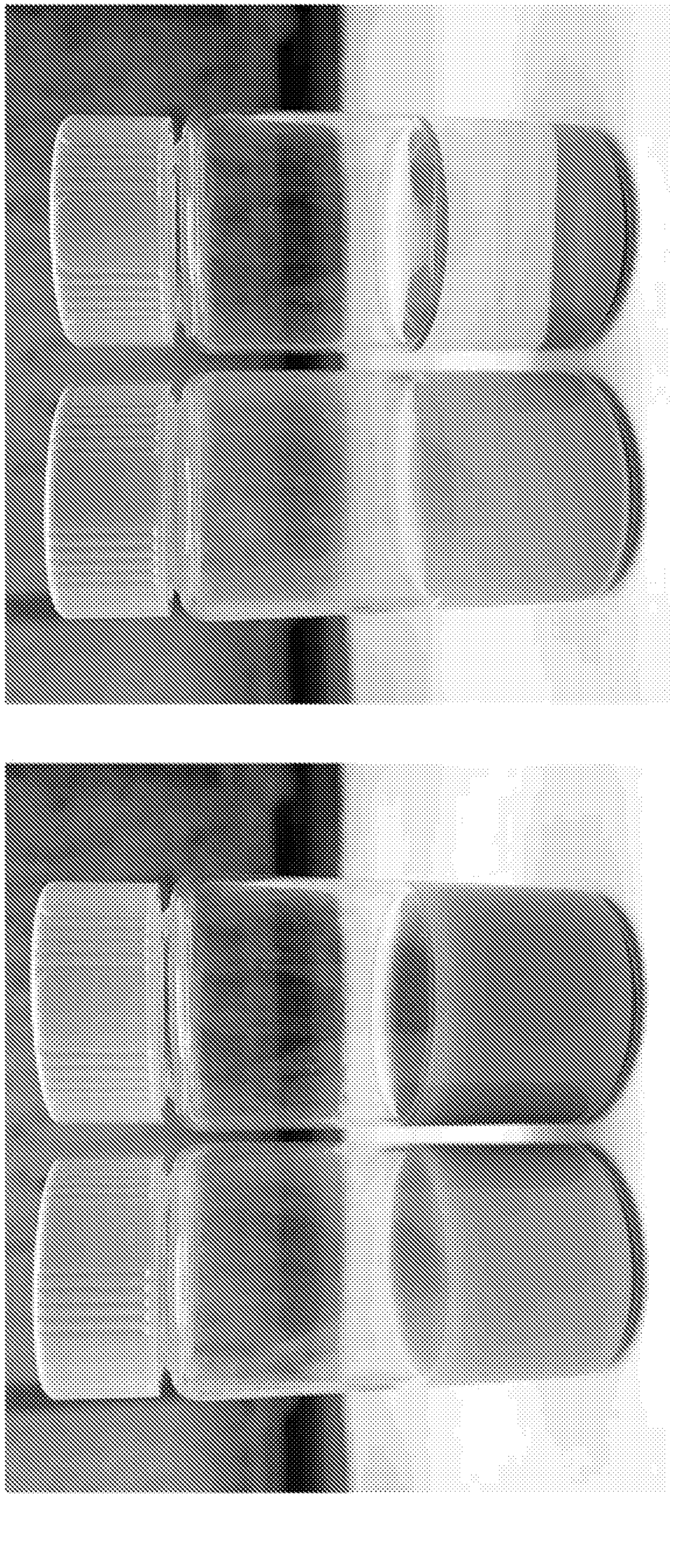
FIG. 56 displays images of exemplary stable and non-stable silver dispersions, whereby the silver dispersion on the left remains stable after one week, while the silver dispersion on the right separates into a solution and a precipitate.
Figure 57:
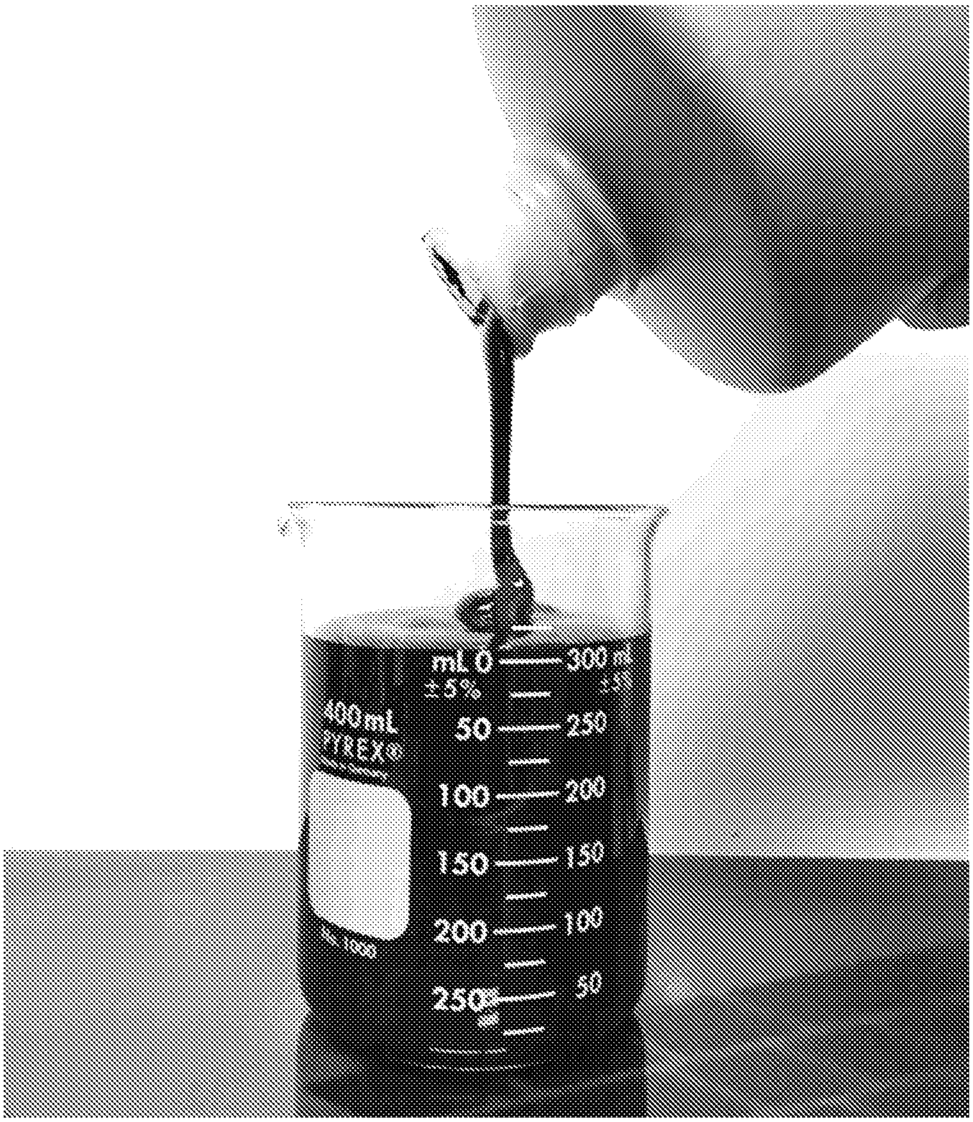
FIG. 57 displays an image of an exemplary conductive ink, according to one or more embodiments described herein.

FIG. 56 displays images of exemplary stable and non-stable silver dispersions, whereby the silver dispersion on the left remains stable after one week, while the silver dispersion on the right separates into a solution and a precipitate. In some embodiments, mixing the reactants slowly during the process of silver nanowire formation enables a more stable dispersion and a longer shelf life. Lower separation between the solution and the precipitate enables longer storage without the necessity to remix the ink solution and enables printing and deposition with greater visual and electrochemical uniformity. FIG. 57 displays an image of an exemplary conductive ink.

Conductive Inks: Performance

Figure 58:
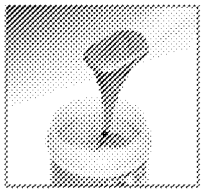
FIG. 58 displays a chart comparing the exemplary inks of the current disclosure against currently available conductive inks, according to one or more embodiments described herein.
Figure 58:
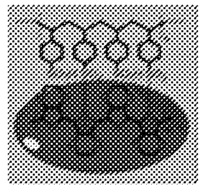
Figure 58:
Figure 58:
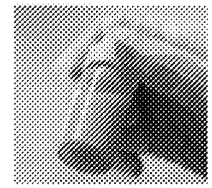
Figure 58:
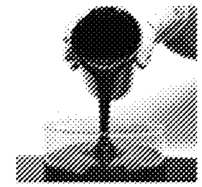

As seen in FIG. 58, the inks comprising silver-based and graphene-based additives herein form inks that have several performance and application advantages. First, the interconnected particle chains of the silver-based and graphene-based additives herein enable percolation at low additive concentrations and increased surface areas for charge storage and/or dissipation. Second, the mechanical properties of the specific binders, solvents, or both in the disclosed inks enable specific viscosities for improved deposition and/or printing and allow for the formation of thin, consistent layer with a low lateral thickness. Further, the specific binders, solvents, and additives described herein enable low-cost and environmentally friendly production of high-performance conductive inks. By contrast, alternative conducting inks comprising, for instance, copper particles, conductive polymers (such as poly(3,4-ethylenedioxythiophene) polystyrene sulfonate), carbon nanotubes, and carbon black may be unstable, may not provide sufficient conductivity and/or flexibility, and may be prohibitively expensive. Further, the silver nanowire and silver nanoparticle inks herein have a conductivity when dry of about 10,000 S/cm to about 100,000 S/cm.

Figure 59A:
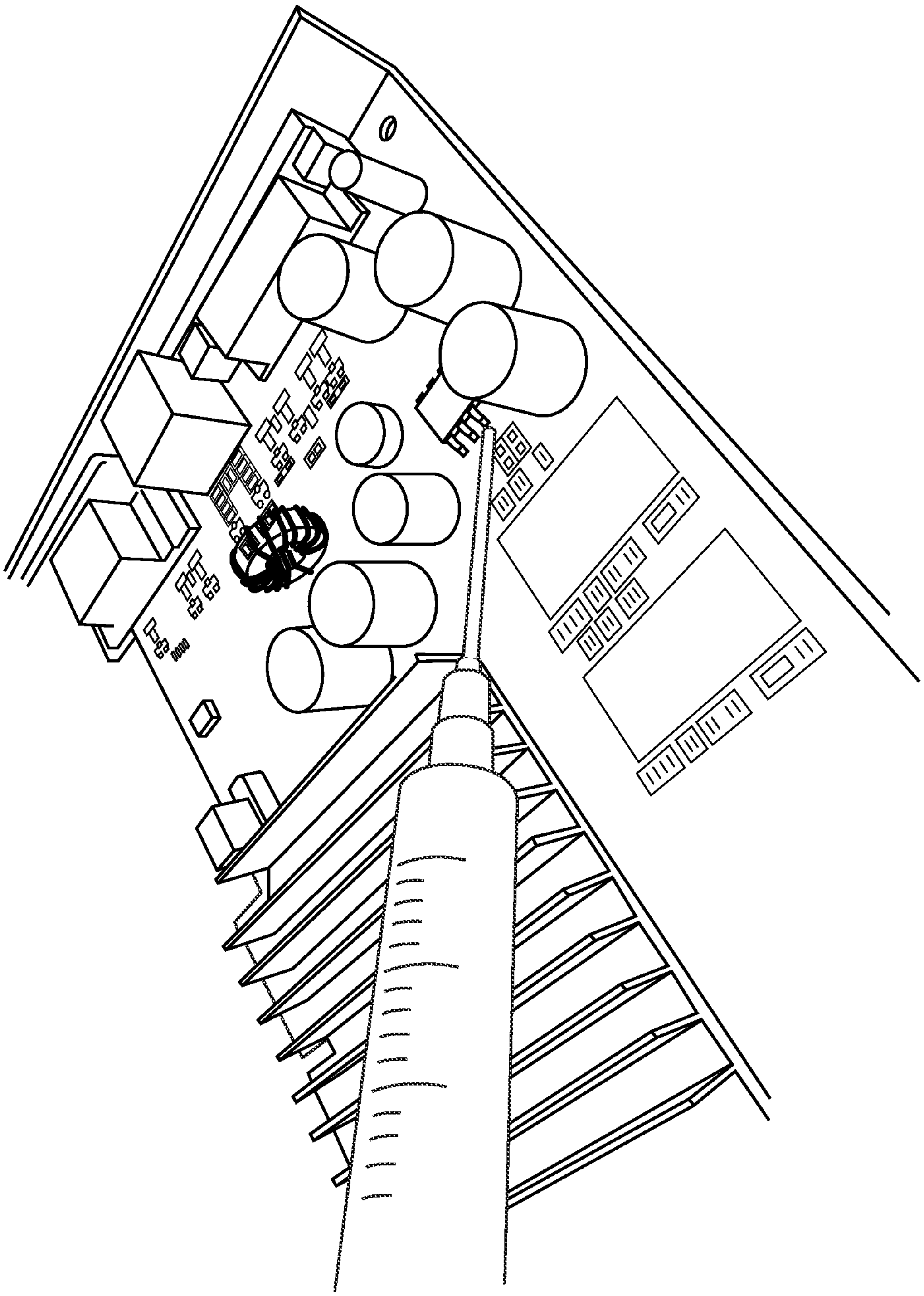
FIG. 59A displays exemplary image of bonding an electronic component to a circuit board using a conductive ink, according to one or more embodiments described herein.
Figure 59B:
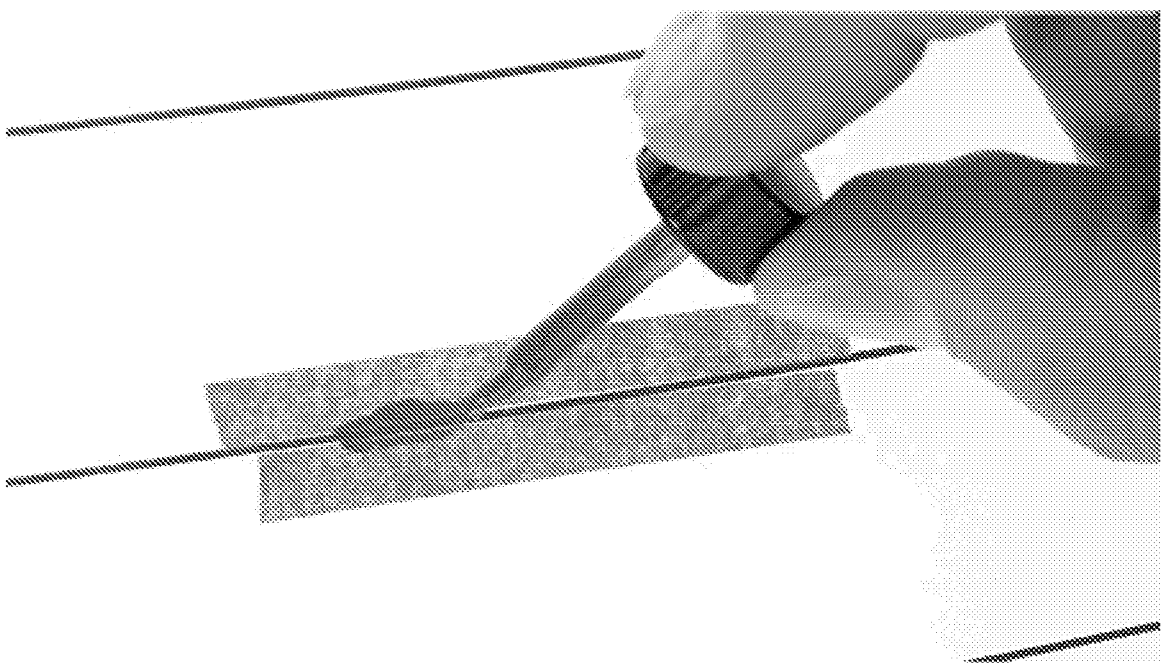
FIG. 59B displays an exemplary first image of fixing a defogger using the conductive ink, according to one or more embodiments described herein.
Figure 59C:
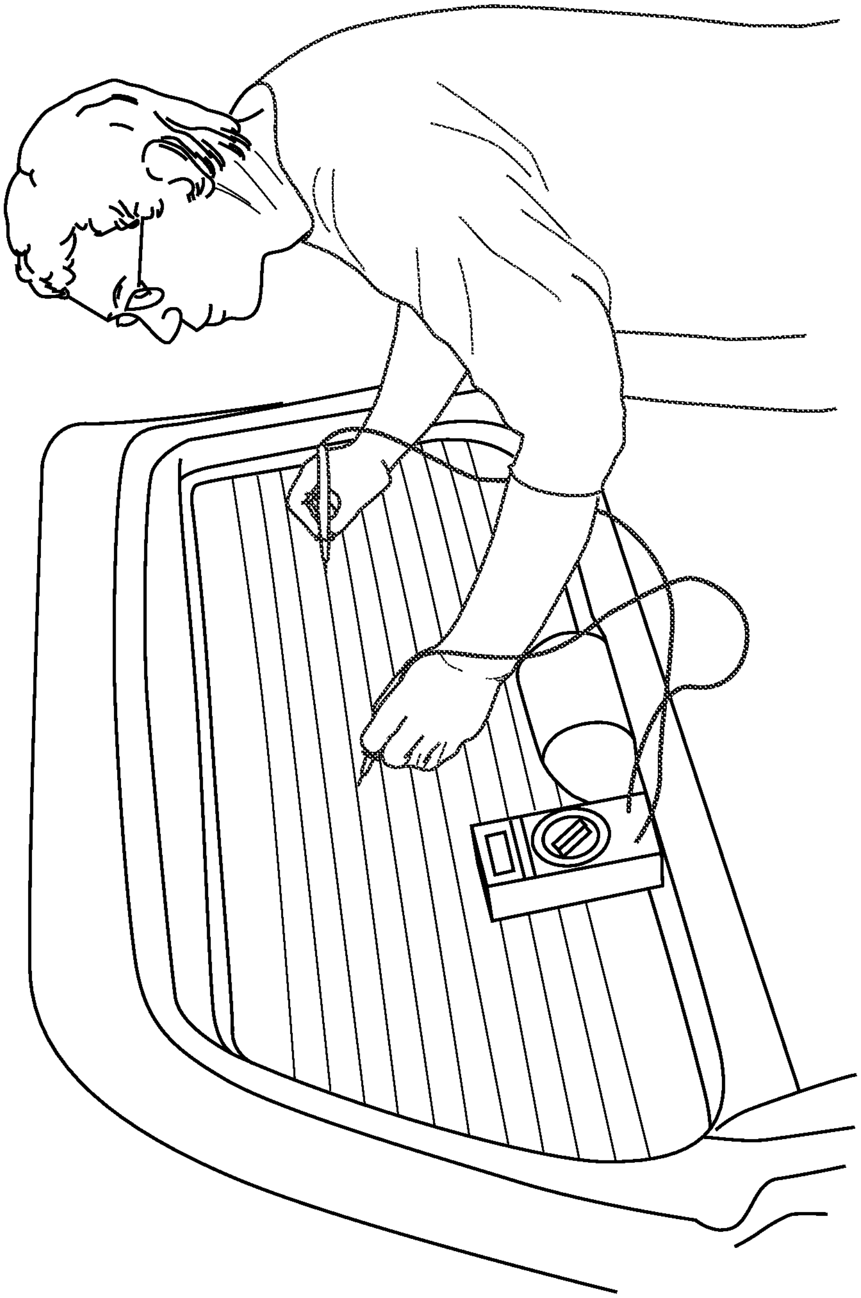
FIG. 59C displays an exemplary first image of fixing a defogger using the conductive ink, according to one or more embodiments described herein.

As such, the conductive inks may be used for a variety of applications, such as the applications shown in FIGS. 59A-59C of bonding an electronic component to a circuit board or fixing a defogger. The conductive inks herein may additionally be used for bonding, sauntering, splicing, bridging, short circuiting, printed electronics, flexible electronics, antenna formation, energy harvesting, composites, or any electrical formation or alteration procedure.

The conductive ink may dry or cure at room temperature and as such offers an alternative to conventional soldering where the use of high temperatures is not possible. Alternatively, the conductive ink may dry or cure at a temperature of about 60° C. to about 300° C. Alternatively, the conductive ink may dry or cure at a temperature of about 60° C. to about 70° C., about 60° C. to about 80° C., about 60° C. to about 100° C., about 60° C. to about 125° C., about 60° C. to about 150° C., about 60° C. to about 175° C., about 60° C. to about 200° C., about 60° C. to about 225° C., about 60° C. to about 250° C., about 60° C. to about 275° C., about 60° C. to about 300° C., about 70° C. to about 80° C., about 70° C. to about 100° C., about 70° C. to about 125° C., about 70° C. to about 150° C., about 70° C. to about 175° C., about 70° C. to about 200° C., about 70° C. to about 225° C., about 70° C. to about 250° C., about 70° C. to about 275° C., about 70° C. to about 300° C., about 80° C. to about 100° C., about 80° C. to about 125° C., about 80° C. to about 150° C., about 80° C. to about 175° C., about 80° C. to about 200° C., about 80° C. to about 225° C., about 80° C. to about 250° C., about 80° C. to about 275° C., about 80° C. to about 300° C., about 100° C. to about 125° C., about 100° C. to about 150° C., about 100° C. to about 175° C., about 100° C. to about 200° C., about 100° C. to about 225° C., about 100° C. to about 250° C., about 100° C. to about 275° C., about 100° C. to about 300° C., about 125° C. to about 150° C., about 125° C. to about 175° C., about 125° C. to about 200° C., about 125° C. to about 225° C., about 125° C. to about 250° C., about 125° C. to about 275° C., about 125° C. to about 300° C., about 150° C. to about 175° C., about 150° C. to about 200° C., about 150° C. to about 225° C., about 150° C. to about 250° C., about 150° C. to about 275° C., about 150° C. to about 300° C., about 175° C. to about 200° C., about 175° C. to about 225° C., about 175° C. to about 250° C., about 175° C. to about 275° C., about 175° C. to about 300° C., about 200° C. to about 225° C., about 200° C. to about 250° C., about 200° C. to about 275° C., about 200° C. to about 300° C., about 225° C. to about 250° C., about 225° C. to about 275° C., about 225° C. to about 300° C., about 250° C. to about 275° C., about 250° C. to about 300° C., or about 275° C. to about 300° C. Alternatively, the conductive ink may dry or cure at a temperature of about 60° C., about 70° C., about 80° C., about 100° C., about 125° C., about 150° C., about 175° C., about 200° C., about 225° C., about 250° C., about 275° C., or about 300° C. Alternatively, the conductive ink may dry or cure at a temperature of at least about 60° C., about 70° C., about 80° C., about 100° C., about 125° C., about 150° C., about 175° C., about 200° C., about 225° C., about 250° C., or about 275° C. Alternatively, the conductive ink may dry or cure at a temperature of at most about 70° C., about 80° C., about 100° C., about 125° C., about 150° C., about 175° C., about 200° C., about 225° C., about 250° C., about 275° C., or about 300° C.

The conductive ink may cure in about 1, 2, 3, 4, 5, 6, 7, 8, 9, 10, 12, 14, 16, 18, 20, or more minutes, including increments therein.

In some embodiments, the conductive ink has a sheet resistance when dried of about 0.002 ohms/sq/mil to about 40 ohms/sq/mil. In some embodiments, the conductive ink has a sheet resistance when dried of about 0.002 ohms/sq/mil to about 0.004 ohms/sq/mil, about 0.002 ohms/sq/mil to about 0.01 ohms/sq/mil, about 0.002 ohms/sq/mil to about 0.05 ohms/sq/mil, about 0.002 ohms/sq/mil to about 0.1 ohms/sq/mil, about 0.002 ohms/sq/mil to about 0.5 ohms/sq/mil, about 0.002 ohms/sq/mil to about 1 ohm/sq/mil, about 0.002 ohms/sq/mil to about 5 ohms/sq/mil, about 0.002 ohms/sq/mil to about 10 ohms/sq/mil, about 0.002 ohms/sq/mil to about 20 ohms/sq/mil, about 0.002 ohms/sq/mil to about 30 ohms/sq/mil, about 0.002 ohms/sq/mil to about 40 ohms/sq/mil, about 0.004 ohms/sq/mil to about 0.01 ohms/sq/mil, about 0.004 ohms/sq/mil to about 0.05 ohms/sq/mil, about 0.004 ohms/sq/mil to about 0.1 ohms/sq/mil, about 0.004 ohms/sq/mil to about 0.5 ohms/sq/mil, about 0.004 ohms/sq/mil to about 1 ohm/sq/mil, about 0.004 ohms/sq/mil to about 5 ohms/sq/mil, about 0.004 ohms/sq/mil to about 10 ohms/sq/mil, about 0.004 ohms/sq/mil to about 20 ohms/sq/mil, about 0.004 ohms/sq/mil to about 30 ohms/sq/mil, about 0.004 ohms/sq/mil to about 40 ohms/sq/mil, about 0.01 ohms/sq/mil to about 0.05 ohms/sq/mil, about 0.01 ohms/sq/mil to about 0.1 ohms/sq/mil, about 0.01 ohms/sq/mil to about 0.5 ohms/sq/mil, about 0.01 ohms/sq/mil to about 1 ohm/sq/mil, about 0.01 ohms/sq/mil to about 5 ohms/sq/mil, about 0.01 ohms/sq/mil to about 10 ohms/sq/mil, about 0.01 ohms/sq/mil to about 20 ohms/sq/mil, about 0.01 ohms/sq/mil to about 30 ohms/sq/mil, about 0.01 ohms/sq/mil to about 40 ohms/sq/mil, about 0.05 ohms/sq/mil to about 0.1 ohms/sq/mil, about 0.05 ohms/sq/mil to about 0.5 ohms/sq/mil, about 0.05 ohms/sq/mil to about 1 ohm/sq/mil, about 0.05 ohms/sq/mil to about 5 ohms/sq/mil, about 0.05 ohms/sq/mil to about 10 ohms/sq/mil, about 0.05 ohms/sq/mil to about 20 ohms/sq/mil, about 0.05 ohms/sq/mil to about 30 ohms/sq/mil, about 0.05 ohms/sq/mil to about 40 ohms/sq/mil, about 0.1 ohms/sq/mil to about 0.5 ohms/sq/mil, about 0.1 ohms/sq/mil to about 1 ohm/sq/mil, about 0.1 ohms/sq/mil to about 5 ohms/sq/mil, about 0.1 ohms/sq/mil to about 10 ohms/sq/mil, about 0.1 ohms/sq/mil to about 20 ohms/sq/mil, about 0.1 ohms/sq/mil to about 30 ohms/sq/mil, about 0.1 ohms/sq/mil to about 40 ohms/sq/mil, about 0.5 ohms/sq/mil to about 1 ohm/sq/mil, about 0.5 ohms/sq/mil to about 5 ohms/sq/mil, about 0.5 ohms/sq/mil to about 10 ohms/sq/mil, about 0.5 ohms/sq/mil to about 20 ohms/sq/mil, about 0.5 ohms/sq/mil to about 30 ohms/sq/mil, about 0.5 ohms/sq/mil to about 40 ohms/sq/mil, about 1 ohm/sq/mil to about 5 ohms/sq/mil, about 1 ohm/sq/mil to about 10 ohms/sq/mil, about 1 ohm/sq/mil to about 20 ohms/sq/mil, about 1 ohm/sq/mil to about 30 ohms/sq/mil, about 1 ohm/sq/mil to about 40 ohms/sq/mil, about 5 ohms/sq/mil to about 10 ohms/sq/mil, about 5 ohms/sq/mil to about 20 ohms/sq/mil, about 5 ohms/sq/mil to about 30 ohms/sq/mil, about 5 ohms/sq/mil to about 40 ohms/sq/mil, about 10 ohms/sq/mil to about 20 ohms/sq/mil, about 10 ohms/sq/mil to about 30 ohms/sq/mil, about 10 ohms/sq/mil to about 40 ohms/sq/mil, about 20 ohms/sq/mil to about 30 ohms/sq/mil, about 20 ohms/sq/mil to about 40 ohms/sq/mil, or about 30 ohms/sq/mil to about 40 ohms/sq/mil. In some embodiments, the conductive ink has a sheet resistance when dried of about 0.002 ohms/sq/mil, about 0.004 ohms/sq/mil, about 0.01 ohms/sq/mil, about 0.05 ohms/sq/mil, about 0.1 ohms/sq/mil, about 0.5 ohms/sq/mil, about 1 ohm/sq/mil, about 5 ohms/sq/mil, about 10 ohms/sq/mil, about 20 ohms/sq/mil, about 30 ohms/sq/mil, or about 40 ohms/sq/mil. In some embodiments, the conductive ink has a sheet resistance when dried of at least about 0.002 ohms/sq/mil, about 0.004 ohms/sq/mil, about 0.01 ohms/sq/mil, about 0.05 ohms/sq/mil, about 0.1 ohms/sq/mil, about 0.5 ohms/sq/mil, about 1 ohm/sq/mil, about 5 ohms/sq/mil, about 10 ohms/sq/mil, about 20 ohms/sq/mil, or about 30 ohms/sq/mil. In some embodiments, the conductive ink has a sheet resistance when dried of at most about 0.004 ohms/sq/mil, about 0.01 ohms/sq/mil, about 0.05 ohms/sq/mil, about 0.1 ohms/sq/mil, about 0.5 ohms/sq/mil, about 1 ohm/sq/mil, about 5 ohms/sq/mil, about 10 ohms/sq/mil, about 20 ohms/sq/mil, about 30 ohms/sq/mil, or about 40 ohms/sq/mil.

In some embodiments, the conductive ink has a conductivity when dried of about 5 S/m to about 500,000 S/m. In some embodiments, the conductive ink has a conductivity when dried of about 5 S/m to about 10 S/m, about 5 S/m to about 50 S/m, about 5 S/m to about 100 S/m, about 5 S/m to about 500 S/m, about 5 S/m to about 1,000 S/m, about 5 S/m to about 5,000 S/m, about 5 S/m to about 10,000 S/m, about 5 S/m to about 50,000 S/m, about 5 S/m to about 100,000 S/m, about 5 S/m to about 500,000 S/m, about 10 S/m to about 50 S/m, about 10 S/m to about 100 S/m, about 10 S/m to about 500 S/m, about 10 S/m to about 1,000 S/m, about 10 S/m to about 5,000 S/m, about 10 S/m to about 10,000 S/m, about 10 S/m to about 50,000 S/m, about 10 S/m to about 100,000 S/m, about 10 S/m to about 500,000 S/m, about 50 S/m to about 100 S/m, about 50 S/m to about 500 S/m, about 50 S/m to about 1,000 S/m, about 50 S/m to about 5,000 S/m, about 50 S/m to about 10,000 S/m, about 50 S/m to about 50,000 S/m, about 50 S/m to about 100,000 S/m, about 50 S/m to about 500,000 S/m, about 100 S/m to about 500 S/m, about 100 S/m to about 1,000 S/m, about 100 S/m to about 5,000 S/m, about 100 S/m to about 10,000 S/m, about 100 S/m to about 50,000 S/m, about 100 S/m to about 100,000 S/m, about 100 S/m to about 500,000 S/m, about 500 S/m to about 1,000 S/m, about 500 S/m to about 5,000 S/m, about 500 S/m to about 10,000 S/m, about 500 S/m to about 50,000 S/m, about 500 S/m to about 100,000 S/m, about 500 S/m to about 500,000 S/m, about 1,000 S/m to about 5,000 S/m, about 1,000 S/m to about 10,000 S/m, about 1,000 S/m to about 50,000 S/m, about 1,000 S/m to about 100,000 S/m, about 1,000 S/m to about 500,000 S/m, about 5,000 S/m to about 10,000 S/m, about 5,000 S/m to about 50,000 S/m, about 5,000 S/m to about 100,000 S/m, about 5,000 S/m to about 500,000 S/m, about 10,000 S/m to about 50,000 S/m, about 10,000 S/m to about 100,000 S/m, about 10,000 S/m to about 500,000 S/m, about 50,000 S/m to about 100,000 S/m, about 50,000 S/m to about 500,000 S/m, or about 100,000 S/m to about 500,000 S/m. In some embodiments, the conductive ink has a conductivity when dried of about 5 S/m, about 10 S/m, about 50 S/m, about 100 S/m, about 500 S/m, about 1,000 S/m, about 5,000 S/m, about 10,000 S/m, about 50,000 S/m, about 100,000 S/m, or about 500,000 S/m. In some embodiments, the conductive ink has a conductivity when dried of at least about 5 S/m, about 10 S/m, about 50 S/m, about 100 S/m, about 500 S/m, about 1,000 S/m, about 5,000 S/m, about 10,000 S/m, about 50,000 S/m, or about 100,000 S/m. In some embodiments, the conductive ink has a conductivity when dried of at most about 10 S/m, about 50 S/m, about 100 S/m, about 500 S/m, about 1,000 S/m, about 5,000 S/m, about 10,000 S/m, about 50,000 S/m, about 100,000 S/m, or about 500,000 S/m.

In some embodiments, one of the conductivity, the surface area, and the C:O ratio of the conductive ink is measured by methylene blue absorption Terms and Definitions Unless otherwise defined, all technical terms used herein have the same meaning as commonly understood by one of ordinary skill in the art to which this disclosure belongs.

All values herein may be measured by any standard technique and may comprise a single value, a mean value, a median value, or a mode value.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein. As used herein, the term "about" in reference to a percentage refers to an amount that is near the stated amount by about plus or minus 10%, 5%, or 1%, or increments therein.

As used herein, the term "glue" refers to an adhesive comprising a single compound.

As used herein, the term "epoxy" refers to an adhesive comprising two or more compounds. The two or more compounds may comprise a resin and a hardener, whereas the epoxy solidifies upon mixing of the resin and the hardener.

As used herein, the term "pigment" refers to a material that changes the color of reflected or transmitted light as the result of wavelength-selective absorption. A pigment may be soluble or insoluble.

As used herein, the term "dye" refers to a colored substance that has an affinity to the substrate to which it is being applied.

As used herein, the term "colorant" refers to a pigment, a dye, a nanoparticle, or any combination thereof. The nanoparticle may comprise a dispersion of nanoparticles in water, an alcohol, a solvent, or any combination thereof. In some embodiments, the nanoparticles are in an aqueous dispersion. In some embodiments, the nanoparticles are in a non-aqueous dispersion (e.g., no more than about 5%, about 4%, about 3%, about 2%, about 1%, about 0.5%, or about 0.1% water). In some embodiments, the nanoparticles are in an alcohol dispersion (e.g., ethanol or isopropanol).

As used herein, the term "percolation threshold" refers to a mathematical concept representing the formation of long-range connectivity in random systems. Below the threshold a giant connected component does not exist; while above it, there exists a giant component of the order of system size.

Non-Limiting Examples

In one non-limiting example of silver nanowire synthesis, 50 mL of ethylene glycol (EG) is added to the reaction vessel with a stir bar. The vessel is then suspended in an oil bath and heated at 155° C. for 1 hour under magnetic stirring at 200 rpm. An amount of 400 μL of 4 mM $CuCl_2$/EG solution is then added, and the solution is heated and stirred continuously for an additional 15 minutes to ensure a homogenous solution. An amount of 15 mL of 0.147 M polyvinyl pyrrolidone, sodium dodecyl sulfonate, vitamin B2, poly (vinyl alcohol), dextrin, and poly(methyl vinyl ether) with a molecular weight of 20,000 is then dissolved in an EG solution and is then injected into the reaction vessel. Finally, 15 mL of 0.094 M $AgNO_3$/EG solution is injected to the solution immediately or over the course of 15 minutes. The solution is allowed to react for 1 hour before it is cooled to room temperature. The silver nanoparticles are collected by centrifuging the solution at 3,000 rpm for 20 minutes and washing with ethanol. This washing process is repeated 3 times to remove excess EG and poly(vinyl alcohol). The final silver product is re-dispersed and stored in ethanol.

The invention claimed is:

1. A conductive adhesive comprising:
(a) a conductive additive comprising:
(i) a carbon-based additive comprising two or more of graphene nanoparticles, graphene nanosheets, and graphene microparticles; and
(ii) silver-based nanoplatelets; and
(b) an adhesive agent.

2. The conductive adhesive of claim 1, having a percolation threshold when dried of at most about 15%.

3. The conductive adhesive of claim 1, wherein the adhesive agent comprises a hardener and a resin.

4. The conductive adhesive of claim 3, wherein at least a portion of the conductive additive is incorporated into the hardener, the resin, or both.

5. The conductive adhesive of claim 1, further comprising a thinner.

6. The conductive adhesive of claim 1, having a sheet resistance of about 5 ohm/sq to about 500 ohm/sq when dried.

7. The conductive adhesive of claim 1, having a sheet resistivity of about 0.3 ohm/sq/mil to about 2 ohm/sq/mil when dried.

8. The conductive adhesive of claim 1, having a conductivity of about 0.15 S/m to about 60 S/m when dried.

9. The conductive adhesive of claim 1, further comprising a pigment, a colorant, a dye, or any combination thereof.

10. The conductive adhesive of claim 1, wherein a silver-based additive further comprises silver nanorods, silver nanoflowers, silver nanofibers, silver nanoribbons, silver nanocubes, silver bipyramids, or any combination thereof.

11. A conductive ink comprising:
(a) a conductive additive comprising:
(i) a carbon-based additive comprising graphene nanosheets and graphene oxide nanosheets; and
(ii) a silver-based additive comprising silver nanowires and silver nanoparticles; and
(b) a solvent.

12. The conductive ink of claim 11, having a percolation threshold when dried of at most about 15%.

13. The conductive ink of claim 11, wherein a proportion by weight of the conductive additive in the conductive ink is 0.25% to about 20%.

14. The conductive ink of claim 11, having a viscosity of at most about 40 centipoise.

15. The conductive ink of claim 11, having a sheet resistance when dried of less than 0.8 ohm/sq/mil.

16. The conductive ink of claim 11, having a conductivity of greater than 10 S/cm when dried.

17. The conductive ink of claim 11, further comprising at least one of a binder, a surfactant, and a defoamer.

18. The conductive ink of claim 11, further comprising a pigment, a colorant, a dye, or any combination thereof.

19. The conductive ink of claim 11, wherein the silver-based additive further comprises silver nanorods, silver nanoflowers, silver nanofibers, silver nanoribbons, silver nanocubes, silver bipyramids, or any combination thereof.

* * * * *